US008819557B2

(12) United States Patent
Matsuda et al.

(10) Patent No.: US 8,819,557 B2
(45) Date of Patent: Aug. 26, 2014

(54) MEDIA-EDITING APPLICATION WITH A FREE-FORM SPACE FOR ORGANIZING OR COMPOSITING MEDIA CLIPS

(75) Inventors: Ken Matsuda, Sunnyvale, CA (US); Dave Cerf, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 12/837,492

(22) Filed: Jul. 15, 2010

(65) Prior Publication Data

US 2012/0017152 A1    Jan. 19, 2012

(51) Int. Cl.
*G06F 3/00* (2006.01)

(52) U.S. Cl.
USPC .......................................... 715/723; 715/716

(58) Field of Classification Search
CPC .................................. G06F 3/00; G11B 27/00
See application file for complete search history.

(56) References Cited

U.S. PATENT DOCUMENTS

| | | | |
|---|---|---|---|
| 5,404,316 A | | 4/1995 | Klingler et al. |
| 5,442,744 A | * | 8/1995 | Piech et al. .................... 715/251 |
| 5,521,841 A | | 5/1996 | Arman et al. |
| 5,659,539 A | | 8/1997 | Porter et al. |
| 5,664,216 A | | 9/1997 | Blumenau |
| 5,682,326 A | | 10/1997 | Klingler et al. |
| 5,781,188 A | * | 7/1998 | Amiot et al. ................... 715/723 |
| 5,838,313 A | * | 11/1998 | Hou et al. ....................... 715/201 |
| 5,861,886 A | * | 1/1999 | Moran et al. ................... 715/863 |
| 5,892,507 A | | 4/1999 | Moorby et al. |
| 5,999,173 A | | 12/1999 | Ubillos |
| 6,031,529 A | * | 2/2000 | Migos et al. ................... 715/783 |
| 6,154,600 A | | 11/2000 | Newman et al. |
| 6,154,601 A | | 11/2000 | Yaegashi et al. |
| 6,161,115 A | | 12/2000 | Ohanian |
| 6,204,840 B1 | * | 3/2001 | Petelycky et al. ............. 715/202 |

(Continued)

FOREIGN PATENT DOCUMENTS

| | | |
|---|---|---|
| WO | WO 2009/020103 | 2/2009 |
| WO | WO 2009/026159 | 2/2009 |
| WO | WO 2009/128227 | 10/2009 |
| WO | WO 2010/106586 | 9/2010 |

OTHER PUBLICATIONS

Casares, Juan, et al., "Simplifying Video Editing Using Metadata," Proceedings of Designing Interactive Systems (DIS 2002), Jun. 2002, pp. 157-166, London, United Kingdom.
Chisan, James, et al., "Video Bench—Final Report: SEng 480a/CSc 586a," Apr. 11, 2003, University of Victoria.
Diakopoulos, Nicholas, et al., "Videotater: An Approach for Pen-Based Digital Video Segmentation and Tagging," Proceedings of the 19th Annual ACM Symposium on User Interface Software and Technology (UIST'06), Oct. 15-18, 2006, pp. 221-224, Montreux, Switzerland.

(Continued)

*Primary Examiner* — Matt Kim
*Assistant Examiner* — Mahelet Shiberou
(74) *Attorney, Agent, or Firm* — Adeli LLP

(57) ABSTRACT

For a media-editing application, some embodiments of the invention provide a novel two-dimensional free-form space that allows a user to both visually organize media clips and composite media clips in order to create composite presentations. To visually organize media clips in the space, some embodiments allow the user to add, remove, visually arrange and rearrange, and minimize the media clips. Also, the media clips in the space can be placed at any location within the entire space when the user is visually organizing the media clips. To composite media clips in the free-form space, some embodiments also allow the user to create sequences of media clips, reorder the media clips within sequences, stack sequences, and add or remove media clips from sequences. In some embodiments, the media clips or created sequences can be placed at any location within the entire space when the user is organizing and compositing media clips.

23 Claims, 75 Drawing Sheets

(56) References Cited

U.S. PATENT DOCUMENTS

| | | | |
|---|---|---|---|
| 6,324,335 B1 | 11/2001 | Kanda | |
| 6,400,378 B1 | 6/2002 | Snook | |
| 6,414,686 B1* | 7/2002 | Protheroe et al. | 345/474 |
| 6,469,711 B2 | 10/2002 | Foreman et al. | |
| 6,522,342 B1* | 2/2003 | Gagnon et al. | 715/716 |
| 6,539,163 B1 | 3/2003 | Sheasby et al. | |
| 6,546,188 B1 | 4/2003 | Ishii et al. | |
| 6,628,303 B1 | 9/2003 | Foreman et al. | |
| 6,629,104 B1 | 9/2003 | Parulski et al. | |
| 6,650,826 B1 | 11/2003 | Hatta | |
| 6,654,930 B1* | 11/2003 | Zhou et al. | 715/202 |
| 6,658,194 B1 | 12/2003 | Omori | |
| 6,714,216 B2 | 3/2004 | Abe | |
| 6,741,996 B1 | 5/2004 | Brechner et al. | |
| 6,928,613 B1 | 8/2005 | Ishii et al. | |
| 7,035,463 B1 | 4/2006 | Monobe et al. | |
| 7,062,713 B2 | 6/2006 | Schriever et al. | |
| 7,073,127 B2 | 7/2006 | Zhao et al. | |
| 7,165,219 B1 | 1/2007 | Peters et al. | |
| 7,225,405 B1 | 5/2007 | Barrus et al. | |
| 7,313,755 B2 | 12/2007 | Rahman et al. | |
| 7,325,199 B1* | 1/2008 | Reid | 715/723 |
| 7,362,946 B1 | 4/2008 | Kowald | |
| 7,383,508 B2 | 6/2008 | Toyama et al. | |
| 7,432,940 B2 | 10/2008 | Brook et al. | |
| 7,434,155 B2 | 10/2008 | Lee | |
| 7,444,593 B1 | 10/2008 | Reid | |
| 7,480,864 B2 | 1/2009 | Brook et al. | |
| 7,561,160 B2 | 7/2009 | Fukuya | |
| 7,614,012 B1 | 11/2009 | Dulaney | |
| 7,623,755 B2 | 11/2009 | Kuspa | |
| 7,710,439 B2 | 5/2010 | Reid et al. | |
| 7,805,678 B1 | 9/2010 | Niles et al. | |
| 7,809,802 B2 | 10/2010 | Lerman et al. | |
| 7,890,867 B1 | 2/2011 | Margulis | |
| 8,020,100 B2 | 9/2011 | Ubillos et al. | |
| 2001/0020953 A1* | 9/2001 | Moriwake et al. | 345/723 |
| 2001/0036356 A1 | 11/2001 | Weaver et al. | |
| 2001/0040592 A1 | 11/2001 | Foreman et al. | |
| 2002/0023103 A1 | 2/2002 | Gagne | |
| 2002/0140719 A1 | 10/2002 | Amir et al. | |
| 2002/0154140 A1 | 10/2002 | Tazaki | |
| 2002/0154156 A1 | 10/2002 | Moriwake et al. | |
| 2002/0175917 A1 | 11/2002 | Chakravarty et al. | |
| 2002/0180803 A1* | 12/2002 | Kaplan et al. | 345/810 |
| 2003/0016254 A1 | 1/2003 | Abe | |
| 2003/0090504 A1 | 5/2003 | Brook et al. | |
| 2003/0117431 A1* | 6/2003 | Moriwake et al. | 345/723 |
| 2003/0137531 A1* | 7/2003 | Katinsky et al. | 345/716 |
| 2003/0234803 A1 | 12/2003 | Toyama et al. | |
| 2004/0001106 A1* | 1/2004 | Deutscher et al. | 345/838 |
| 2004/0071441 A1 | 4/2004 | Foreman et al. | |
| 2004/0098379 A1* | 5/2004 | Huang | 707/3 |
| 2004/0201609 A1 | 10/2004 | Obrador | |
| 2004/0227768 A1 | 11/2004 | Bates et al. | |
| 2004/0260916 A1* | 12/2004 | Ueda et al. | 713/1 |
| 2005/0201724 A1 | 9/2005 | Chu | |
| 2005/0216840 A1 | 9/2005 | Salvucci | |
| 2005/0237321 A1 | 10/2005 | Young et al. | |
| 2005/0257152 A1* | 11/2005 | Shimizu et al. | 715/723 |
| 2006/0008247 A1* | 1/2006 | Minami et al. | 386/52 |
| 2006/0036971 A1* | 2/2006 | Mendel et al. | 715/856 |
| 2006/0136556 A1 | 6/2006 | Stevens et al. | |
| 2006/0150072 A1 | 7/2006 | Salvucci | |
| 2006/0155684 A1 | 7/2006 | Liu et al. | |
| 2006/0253781 A1 | 11/2006 | Pea et al. | |
| 2006/0277454 A1* | 12/2006 | Chen | 715/500.1 |
| 2007/0016872 A1 | 1/2007 | Cummins et al. | |
| 2007/0168873 A1 | 7/2007 | Lentz | |
| 2007/0174774 A1* | 7/2007 | Lerman et al. | 715/723 |
| 2007/0189708 A1 | 8/2007 | Lerman et al. | |
| 2007/0203945 A1 | 8/2007 | Louw | |
| 2007/0239787 A1* | 10/2007 | Cunningham et al. | 707/104.1 |
| 2007/0262995 A1 | 11/2007 | Tran | |
| 2008/0044155 A1* | 2/2008 | Kuspa | 386/52 |
| 2008/0104127 A1 | 5/2008 | Billmaier et al. | |
| 2008/0120328 A1 | 5/2008 | Delgo et al. | |
| 2008/0126191 A1 | 5/2008 | Schiavi | |
| 2008/0138034 A1 | 6/2008 | Hiroi et al. | |
| 2008/0152297 A1* | 6/2008 | Ubillos | 386/52 |
| 2008/0152298 A1 | 6/2008 | Ubillos | |
| 2008/0155420 A1 | 6/2008 | Ubillos et al. | |
| 2008/0155421 A1 | 6/2008 | Ubillos et al. | |
| 2008/0155459 A1 | 6/2008 | Ubillos | |
| 2009/0006475 A1 | 1/2009 | Udezue et al. | |
| 2009/0049409 A1* | 2/2009 | Leclercq et al. | 715/838 |
| 2009/0087161 A1 | 4/2009 | Roberts et al. | |
| 2009/0089690 A1 | 4/2009 | Chi et al. | |
| 2009/0172543 A1 | 7/2009 | Cronin et al. | |
| 2009/0201316 A1 | 8/2009 | Bhatt et al. | |
| 2009/0235166 A1* | 9/2009 | Keohane et al. | 715/273 |
| 2009/0265649 A1* | 10/2009 | Schlossberg et al. | 715/769 |
| 2010/0050080 A1* | 2/2010 | Libert et al. | 715/716 |
| 2010/0063961 A1 | 3/2010 | Guiheneuf et al. | |
| 2010/0077289 A1 | 3/2010 | Das et al. | |
| 2010/0107126 A1 | 4/2010 | Lin et al. | |
| 2010/0153395 A1 | 6/2010 | Hannuksela et al. | |
| 2010/0156887 A1* | 6/2010 | Lindroos et al. | 345/418 |
| 2010/0158471 A1 | 6/2010 | Ogikubo | |
| 2010/0275121 A1* | 10/2010 | Johnson | 715/719 |
| 2010/0281375 A1 | 11/2010 | Pendergast et al. | |
| 2010/0281376 A1 | 11/2010 | Meaney et al. | |
| 2010/0281385 A1 | 11/2010 | Meaney et al. | |
| 2011/0029934 A1* | 2/2011 | Locker et al. | 715/863 |
| 2011/0072037 A1 | 3/2011 | Lotzer | |
| 2011/0103772 A1 | 5/2011 | Suzuki | |
| 2011/0116769 A1 | 5/2011 | Sugiyama et al. | |
| 2011/0161348 A1 | 6/2011 | Oron | |
| 2011/0161912 A1* | 6/2011 | Eteminan et al. | 717/101 |

OTHER PUBLICATIONS

Myers, Brad A., et al., "A Multi-View Intelligent Editor for Digital Video Libraries," The First ACM+IEEE Joint Conference on Digital Libraries (JCDL'01), Jun. 24-28, 2001, pp. 106-115, Roanoke, VA, USA.

Author Unknown, "Apple Announces Final Cut Pro 4," NAB, Apr. 6, 2003, 3 pages, Apple Inc., Las Vegas, NV, USA.

Author Unknown, "Adobe Premiere Pro CS3: User Guide," Apr. 1, 2008, 455 pages, Adobe Systems Incorporated, San Jose, California, USA.

Author Unknown, "Apple Aperture 3," Month Unknown, 2007, pp. 1-7, USA, available at http://www.apple.com/aperture/what-is.html.

Author Unknown, "Frame-specific Editing with Snap—Premiere Pro CS4 Classroom in a Book," Dec. 17, 2008, 17 pages, Adobe Press, USA.

Author Unknown, "iMovie '08 Getting Started," Month Unknown, 2008, pp. 1-50, Apple Inc., USA.

Author Unknown, "Using ADOBE Premiere Elements 8 Editor", last updated Aug. 12, 2010, 313 pages, Adobe Systems Incorporated, San Jose, California, USA.

Bolante, Anthony, "Premiere Pro CS3 for Windows and Macintosh: Visual QuickPro Guide", Dec. 4, 2007, 2 pages, Peachpit Press, USA.

Brenneis, Lisa, "Final Cut Pro 3 for Macintosh: Visual Quick Pro Guide," Apr. 2002, 288 pages, Peachpit Press, Berkeley, California, USA.

Huang, Yu, "Adaptive Nonlinear Video Editing: Retargeting, Replaying, Repainting and Reusing (R4)," Apr. 2009, 40 pages, Multimedia Content Networking Lab, Bridgewater, New Jersey, USA.

Kutics, Andrea, et al., "Use of Adaptive Still Image Descriptors for Annotation of Video Frames," Month Unknown, 2007, pp. 686-697, Springer-Verlag, Berlin, Heidelberg.

Martin, Steve, "Final Cut Express System Requirements, OS 10.2 or Higher," Jan. 13, 2003, 8 pages, The Ripple Training, USA.

Oetzman, Anthony, "Audible-Editing for Beginners Part 2—Cut, Copy and Paste," Apr. 12, 2004, 3 pages, USA, available at http://audacity.sourceforge.net/manual-1.2/tutorial_ed_ed_beginner2.html.

Wang, Yijin, et al. "MyVideos—A System for Home Video Management," Proceedings of the 10th ACM International Conference on Multimedia, Dec. 1-6, 2002, pp. 412-413, Juan-les-Pins, France.

* cited by examiner

MEDIA-EDITING APPLICATION WITH A FREE-FORM SPACE FOR ORGANIZING OR COMPOSITING MEDIA CLIPS

This application is related to the following application: U.S. patent application Ser. No. 12/837,490, filed Jul. 15, 2010, now published as U.S. Patent Publication 2012/0017153.

BACKGROUND

Digital graphic design, image editing, audio editing, and video editing applications (hereafter collectively referred to as media content editing applications or media-editing applications) provide graphical designers, media artists, and other users with the necessary tools to create a variety of media content. Examples of such applications include Final Cut Pro® and iMovie®, both sold by Apple Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Various media-editing applications facilitate such composition through electronic means. Specifically, a computer or other electronic device with a processor and computer readable storage medium executes the media content editing application. In so doing, the computer generates a graphical interface whereby designers digitally manipulate graphical representations of the media content to produce a desired result.

One difficulty in media-editing is that a user cannot easily try out different ideas of compositing media content elements and see the resulting media presentations. For example, to create a media presentation, contents in the form of media clips need to be brought into a media project, which usually has a timeline and multiple tracks. The timeline and multiple tracks necessarily creates positional relationships between the media clips placed in the tracks. Understanding the meaning or effect of placing a media clip on a particular track at a particular position of the timeline requires familiarity and the sophistication associated with the complex applications and tends to overwhelm or discourage untrained users. Moreover, there is a sense of commitment or structure in a timeline that does not encourage experimentation or "playing around."

BRIEF SUMMARY

For a media-editing application that creates composite presentations, some embodiments of the invention provide a novel two-dimensional free-form space (e.g., display area) that allows a user to both visually organize media clips and composite media clips in order to create composite presentations. To visually organize media clips in the free-form space, some embodiments allow the user to add, remove, visually arrange and rearrange, and minimize the media clips. Also, the media clips in the space can be placed at any location within the entire space when the user is visually organizing the media clips. To composite media clips in the free-form space, some embodiments also allow the user to create sequences of media clips, reorder the media clips within sequences, stack sequences, and add or remove media clips from sequences. In some embodiments, the media clips or created sequences of such media clips can be placed at any location within the entire space when the user is organizing and compositing media clips.

Some embodiments provide a free-form space that allows the user to place media clips (and sequences of media clips) in regions within the space that overlap each other at the same or different instances in time. In some embodiments, a free-form space does not limit the placement of media clips within the free-form space. That is, the media clips can be placed at any location within the free-form space of such embodiments, as mentioned above.

In some embodiments, the free-form space is a trackless space that allows the user to place media clips and sequences of media clips without being constrained by such tracks (e.g., the media clips and sequence of media clips do not have to be aligned along tracks). In other words, the free-from space in some embodiments does not include tracks, such as those included in a typical timeline-based compositing area of a media-editing application that is for compositing media presentations. In typical media editing applications, adjacent tracks are non-overlapping regions in which media clips can be placed without the media clips overlapping each other. As mentioned above, the free-form space of some embodiments media clips and sequences to be placed in regions that overlap at the same or different instances in time.

Rather than use tracks, the free-form space of some embodiments is a gridded space that includes gridlines on which the media clips align. Some embodiments define the gridlines of the space as fine as the pixels of a display device displaying the space. In such embodiments, the free-form space is referred to as gridless display area since a media clip placed in any position in the free-form space aligns with the pixel gridlines. Other embodiments, however, define the gridlines of the space more coarse.

For the space of some embodiments, the positional relation between two items in the space (e.g., between two clips, between a sequence and a clip, between two sequences) does not necessarily define any relationship between the two items. For instance, because a timeline does not span along this space in some embodiments, the positional relationship between two items in this space does not necessarily define a temporal relationship between them. As another example, in some embodiments, the positional relationship between two items does not necessarily define a logical relationship between the two items. However, for some items in the space, the positional relationship does define a relationship when two items have been somehow associated with each other (e.g., through user action). For example, as described above, a user can create a sequence of media clips (e.g., by concatenate together several media clips). In such a concatenated sequence, these media clips do have a temporal positional relationship with each other. Moreover, when two sequences are concatenated or composited together in this space, the sequences (and the media clips in the sequences) have a temporal positional relationship with each other.

The embodiments described above mention numerous features of a free-form space. However, other embodiments do not have to include all the features mentioned above. For instance, although the free-form space is a trackless space in some embodiments, this space is divided into several tracks in other embodiments in order to allow the user to both visually organize and composite media clips. Furthermore, in some embodiments, the free-form space is one of many spaces through which a user of the media-editing application organizes media clips. Other spaces can be used to organize media clips as well. In other embodiments, the free-form space is one of many spaces through which a user of the media-editing application composites media clips. Other spaces, such as a timeline space, can be used to composite media clips. However, in some embodiments, the free-form space may not include all the features and functionalities provided by the other spaces while in other embodiments the free-form space does include all the features and functionalities provided by the other spaces.

For some embodiments of invention, a graphical user interface ("GUI") of a media-editing application includes an organizing and editing free-form space and a media library through which the application's user can select media clips to add to the free-form space to organize and edit. The media clips may be displayed with different appearances or dimensions in different areas of the GUI. For instance, the media clips in the free-form space are represented using thumbnails (i.e., a set of equally-sized images) while the media clips in the media library are represented using smaller thumbnails (i.e., a set of equally-sized, but smaller, images). As such, different embodiments define the appearance and dimensions of the media clips differently.

Additional media clips can be added to the free-form space from the media library at any time. These clips can be added to the free-form space in several different ways. For instance, in some embodiments, the user can add a media clip by first selecting a media clip. The selected media clip is then added to the free-form space through a drag-and-drop operation (i.e., by using a cursor-control device, such as a mouse or trackpad or a finger for a touch-screen device) to select this media clip from the media library and dragging to the free-form space. As another example, a media clip can be added to the free-form space by selecting an option from a pull-down menu or a pop-up menu after selecting a media clip in the media library.

In the free-form space, media clips can be placed near each other to form visual grouping. In some embodiments, media clips in a visual grouping can be rearranged so that the user can change the visual arrangement of the media clips in the visual grouping. These groupings can then be rearranged to form different visual groupings. For instance, the user can move one media clip in one visual grouping near media clips in another visual grouping to form a new visual grouping that includes all of those media clips. Thus, the user can visually group the media clips into any number of different visual groupings that the user desires.

In some embodiments, two media clips closely placed next to each other automatically slide away from each other to make room for a third media clip when the third media clip is placed between them. In other embodiments, the two media clips do not move when the third media clip is placed between the two media clips. As such, the third media clip can be made to overlap the two other media clips.

In addition to visual groupings, the media clips in the free-form space can be grouped into logical groupings. For instance, in some embodiments, the user can select several media clips in the free-form space and create a logical grouping that includes the selected media clips by executing a key command (e.g., control-G), a combination of key commands, a hotkey, or any other appropriate method. Some embodiments require that media clips to be within a particular distance of each other before they can be logically grouped while other embodiments allow media clips located anywhere in the free-form space to be logically grouped together. Once a logical grouping of media clip is created, the logical grouping can be moved within the space as a single item. For instance, performing a drag-and-drop operation on one of the logically grouped media clips also moves the other media clips in the logical group in the same relative direction and distance as the medial clip on which drag-and-drop operation is performed.

In some embodiments, media clips can be minimized or collapsed into a smaller thumbnail or an icon in the free-form space. A media clip can be minimized or collapsed in several different ways. For instance, a user can minimize or collapse a media clip by selecting the media clip and then selecting a minimize button that is displayed at a location in the GUI. In some embodiments, the user selects a menu item that is displayed in a pull-down menu that is accessed by selecting a top-level menu in the GUI or a pop-up menu that is accessed through a cursor control operation (e.g., a right-click cursor operation or a control-click cursor operation).

Some embodiments allow a user to play back media clips in the free-form space. A media clip is played back through a set of playback controls or through a menu item selection. A set of playback controls in some embodiments includes a user selectable UI item for backward playback of a media clip, a user selectable UI item for pausing playback of the media clip, and a user selectable UI item for forward playback of the media clip.

In some embodiments, the playback of the selected media clip is displayed in the media clip itself while in other embodiments playback of the selected media clip is displayed in a viewing area which is an area separate from the free-form space. In yet other embodiments, the playback of the selected media clip is displayed both in the media clip itself and a viewing area.

Some embodiments display a playhead (or scrubber bar) over a selected media clip that moves horizontally along the selected media clip as it is playing back. The position of the playhead along the displayed length of the media clip indicates the position of the content being played. For example, if the media clip is a video clip that includes a sequence of frames, the position of the playhead along the length of the media clip represents the position of the currently displayed frame in the sequence of frames of the video clip.

In some embodiments, the rate at which the playhead moves horizontally along the selected media clip being played is different for media clips that have different durations. This is because, in some embodiments, the displayed length of a media clip represents the duration of the content associated with the media clip with the left edge representing the starting point and the right edge representing the ending point of the content and the media clips displayed in the free-form space are uniform-sized rectangles. For example, in such embodiments, a playhead moves horizontally along a three-minute audio clip faster than a playhead along a five-minute video clip since the duration of the audio clip is shorter than the duration of the video clip.

In some embodiments, the viewing area is located within the free-form space while in other embodiments the viewing area is located outside the free-form space. In some embodiments, the viewing area is shared with other workspaces of the media-editing application. In other words, the media clips in other workspaces are also played back in the viewing area. Furthermore, the viewing area of some embodiments is expanded (e.g., by using a keystroke, a combination of keystrokes, a hotkey, a pull-down or pop-up menu selection etc.) to occupy the entire monitor or display device (i.e., full screen playback) of the computing device on which the media-editing application is being executed.

In some embodiments, a media clip in the free-form space is played back by the user's selecting a play option (e.g., by left-clicking) displayed in a pop-up menu. In some embodiments, the pop-up menu is accessed through a cursor control operation (e.g., a right-click cursor operation or a control-click cursor operation). In some embodiments, playback of the media clip is only displayed in the viewing area (i.e., playback is not displayed in the selected media clip itself).

As mentioned above, the free-form space in some embodiments allows a user to create sequences of media clips, reorder the media clips within sequences, and add or remove media clips from sequences in addition to allowing the user to add, organize, visually arrange, collapse, and play back the media clips. In some embodiments, a sequence of media clips is a chronological grouping of two or more media clips. Some embodiments form a sequence of media clips by horizontally concatenating media clips in the free-form space. For example, a sequence that includes a first media clip and a second media clip is formed when the second media clip is placed or moved in the free-form space such that the left edge of the second media clip coincides with the right edge of the first media clip. When playing back the sequence, the first media clip is first played back and then the second media clip is played back. In some embodiments, when a media clip is moved within a threshold distance of another media clip in the free-form space, the media clip being moved "snaps" to the other media clip in order to form a sequence.

Some embodiments allow the user to reorder the media clips in a sequence in order to change the chronological order of the media clips in the sequence. For example, in a sequence of three media clips, the third media clip can be placed between the first two media clips in the sequence. In some embodiments, when a media clip is placed between two media clips in a sequence, the two media clips automatically slide horizontally away from each other in order to make a room for the media clip being placed between the two media clips.

Some embodiments allow the user to add a media clip to a sequence of media clips. For example, a media clip which is not part of any sequence can being added into a sequence of three media clips. To add the media clip to this sequence, the user selects the media clip and moves it between any two media clips in the sequence (e.g., by performing a drag-and-drop operation) in the sequence. The two media clips automatically slide horizontally away from each other in order to make a room for the media clip to be added.

Some embodiments allow the user to layer media content of a media clip or a sequence of media clips over media content of another media clip or sequence of media clips in a composite presentation composed of these media clips or sequences of media clips. In some such embodiments, media content in one layer (e.g., the top layer) is played back over any media content in the other layer (e.g., the lower layers) when a composite presentation composed of these media clips or sequences is played back. One way of layering media content of media clips or sequences is to stack a media clip or a sequence of media clips above another media clip or sequence of media clips in the free-form space. For example, a media clip could be placed above a sequence of three media clips so that the lower edge of media clip would be aligned to the upper edge of the sequence. The bottom of a media clip can snap to the top of a sequence when the lower edge of the media clip is within a threshold distance of the top edge of the sequence.

For some embodiments, the free-form space also allows the user to edit media clips in the free-form space. In some embodiments, the user can perform a trim operation on a selected a media clip to set a start and/or end point (i.e., in- and/or out-point) of the media clip. In some such embodiments, the trim operation can be performed by selecting and moving a side edge of the media clip. For instance, the left edge of a selected media clip can be selected and moved (e.g., by performing a drag-and-drop operation) towards the right to set a start (i.e., an in-point) of the media clip. Similarly, the right edge of the selected media clip can be selected and moved (e.g., by performing a drag-and-drop operation) towards the left to set an end point (i.e., an out-point) of the media clip.

In some embodiments, the trimming operation can be completed by using an appropriate side edge of the media clip to select (e.g., by releasing the click in a drag-and-drop operation) a position along the length of the media clip to set as a starting or ending point. Some embodiments generate a new media clip that represents the trimmed media clip.

Different embodiments allow the user to set the edit points of a media clip differently. For instance, instead of selecting and moving either side edge of a media clip to a new location, the user can invoke edit commands when the playhead is at a desired position along the length of the media clip during playback of the media clip. Specifically, when the playhead reaches a desired position, the user can invoke an editing command to trim from the beginning of the media clip to the position represented by the location of the playhead (e.g., a "cut to the play head" command). In other embodiments, the user can drag the playhead to a desired position without playing back the media clip and then invoke an editing command.

Some embodiments allow the user to split a media clip into two separate media clips in the free-form space. The user places a playhead over a media clip when the media clip is being played back or when the user manually selects a position along the length of the media clip. In some embodiments, the user can invoke a split command that divides the selected media clip into two separate media clips. One of the split media clips represents a portion of the media content represented by the original media clip from the beginning of the media content to the position represented by the position of the playhead when the command was invoked, and the other split media clip represents the rest of the media content represented by the original media clip (i.e., the portion of the media content starting from the position represented by the position of the playhead to the end of the media content).

In addition to allowing the user to invoke editing commands, the free-form space in some embodiments also allows the user to mark a region of interest on a media clip. In some embodiments, the user can mark a region of interest on a media clip by invoking a command (e.g., holding a keyboard key, selecting a UI item, etc.) to mark the start of a region of interest and invoking another command to mark the end of the region of interest while the playhead moves along the media clip. In some embodiments, the marked region of interest is represented by a marker on the media clip that horizontally spans the start and end of the marked region of interest.

Different embodiments allow the user to mark a region of interest differently. For instance, instead of invoking two commands at the beginning and the ending of the region of interest, the user can hold down a hotkey while the playhead moves from the beginning and the ending of the region. Alternatively, the user can click and hold down a UI item instead of the hotkey. In some embodiments, a media clip can be created based on a marked region of interest. The user selects a marker and drags (e.g., using a drag-and-drop operation) the marker away from the media clip to another location in the free-form space.

Moreover, some embodiments allow the user to tag at various positions of a media clip to further organize the media clips in the free-form space. For example, a user can tag a frame of a video clip associated with a media clip that shows a car with the tag "car," "automobile," or "transportation". As such, the user can tag the content associated with media clip in any which way to further assist the user in organizing the media clips in the free-form space.

Some embodiments allow the user to create a media clip based on a marked region of interest. In some embodiments, the marker is a selectable UI item for creating the media clip based on the marked region of interest. However, the region of the selectable UI item for creating the media clip based on the marked region of interest may be defined differently in different embodiments. For instance, the entire vertical section of the media clip that includes the marker may be defined as the selectable UI item for creating the media clip based on the marked region of interest. The user selects the selectable UI item that represents the marked region of interest and drags (e.g., using a drag-and-drop operation) the marker away from the media clip to another location in the display area to create a new media clip that includes the marked portion of the marked media clip. Instead of selecting and dragging a selectable UI item that represents the marked region of interest, some embodiments create a media clip from a marked region of interest through a copy and paste operation (e.g., by using a series of hotkeys, keystrokes, combinations of keystrokes, or options selected from a pull-down or pop-up menu). Other methods are possible as well. As mentioned above, some embodiments allow the user to tag positions of a media clip. When a media clip that is created based on a marked region of interest and the marked region of interest includes tags, some embodiments include the tags that are in the marked region of interest in the media clip that is created based on the marked region of interest (tags outside the marked region of interest are not included).

In addition, some embodiments provide additional tools for editing media clips, such as dynamic editing and playback of media clips in the space. In some embodiments, dynamic editing allows a user to perform operations on a media clip while the media clip is being played back. Examples of dynamic editing operations include tagging instances in time of the media clip, splitting the media clip into multiple media clips, trimming the ends of the media clip, and extending a trimmed media clip, among other operations.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
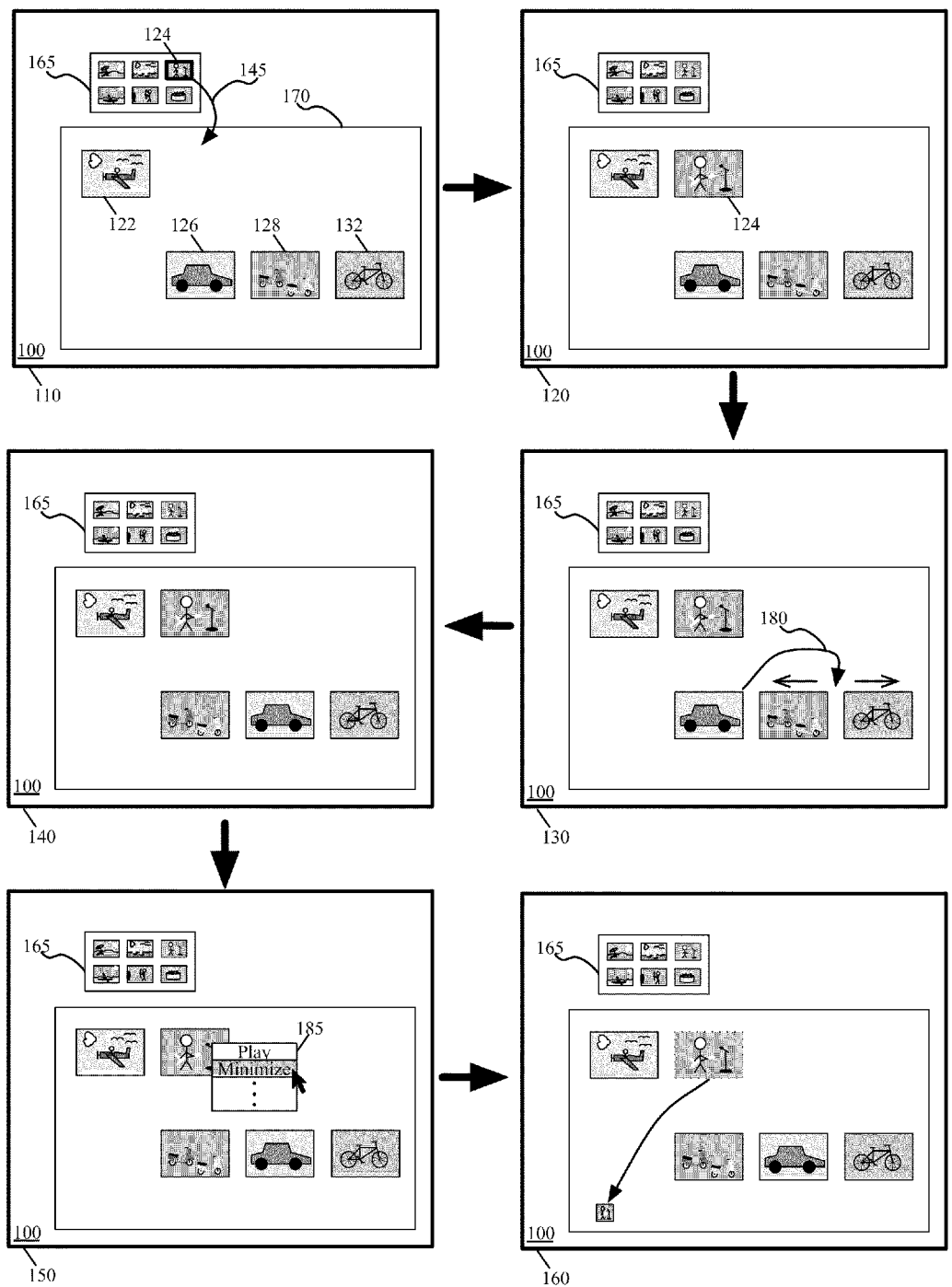
FIG. 1 conceptually illustrates a GUI of a media-editing application at several stages that show organizing graphical representations of media clips.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a media-editing application that creates composite presentations, some embodiments of the invention provide a novel free-form space (e.g., display area) that allows a user to both visually organize media clips and composite media clips in order to create composite presentations. In some embodiments, a media clip is a graphical representation of a piece of media content that is stored on the computing device on which the media-editing application executes or on a computing device to which the media-editing application has access. Examples of such media content include audio data, video data, text data, image data, and/or other media data. Accordingly, a media clip of some embodiments is any kind of content clip (e.g., audio clip, video clip, text clip, picture clip, or other media clip) that can be used to create a composite presentation.

To visually organize media clips in the free-form space, some embodiments allow the user to add, remove, visually arrange and rearrange, and minimize the media clips. To composite media clips in the free-form space, some embodiments also allow the user to create sequences of media clips, reorder the media clips within sequences, stack sequences, and add or remove media clips from sequences. In some embodiments, the media clips or created sequences of such media clips can be placed at any location within the entire space when the user is organizing compositing media clips. Compositing media clips, as used here and in the following sections of this application, Some embodiments provide a free-form space that allows the user to place media clips (and sequences of media clips) in regions within the space that overlap each other at the same or different instances in time. In some embodiments, a free-form space does not limit the placement of media clips within the free-form space. That is, the media clips can be placed at any location within the free-form space of such embodiments, as mentioned above.

In some embodiments, the free-form space is a trackless space that allows the user to place media clips and sequences of media clips without being constrained by such tracks (e.g., the media clips and sequence of media clips do not have to be aligned along tracks). In other words, the free-from space in some embodiments does not include tracks, such as those included in a typical timeline-based compositing area of a media-editing application that is for compositing media presentations. In typical media editing applications, adjacent tracks are non-overlapping regions in which media clips can be placed without the media clips overlapping each other. As mentioned above, the free-form space of some embodiments media clips and sequences to be placed in regions that overlap at the same or different instances in time.

Rather than use tracks, the free-form space of some embodiments is a gridded space that includes gridlines on which the media clips align. Some embodiments define the gridlines of the space as fine as the pixels of a display device displaying the space. In such embodiments, the display area is referred to as gridless display area since a media clip placed in any position in the display area aligns with the pixel gridlines. Other embodiments, however, define the gridlines of the space more coarse.

For the space of some embodiments, the positional relation between two items in the space (e.g., between two clips, between a sequence and a clip, between two sequences) does not necessarily define any relationship between the two items. For instance, because a timeline does not span along this space in some embodiments, the positional relationship between two items in the space does not necessarily define a temporal relationship between them. As another example, in some embodiments, the positional relationship between two items does not necessarily define a logical relationship between the two items. However, for some items in the space, the positional relationship does define a relationship when two items have been somehow associated with each other (e.g., through user action). For example, as described above, a user can create a sequence of media clips (e.g., by concatenating together several media clips). In such a concatenated sequence, these media clips do have a temporal positional relationship with each other. Moreover, when two sequences are concatenated or composited together in this space, the sequences (and the media clips in the sequences) have a temporal positional relationship with each other.

The embodiments described above mention numerous features of a free-form space. However, other embodiments do not have to include all the features mentioned above. For instance, although the free-form space is a trackless space in some embodiments, this space is divided into several tracks in other embodiments in order to allow the user to both visually organize and composite media clips. Furthermore, in some embodiments, the free-form space is one of many spaces through which a user of the media-editing application organizes media clips. Other spaces can be used to organize media clips as well. In other embodiments, the free-form space is one of many spaces through which a user of the media-editing application composites media clips. Other spaces, such as a timeline space, can be used to composite media clips. However, in some embodiments, the free-form space may not include all the features and functionalities provided by the other spaces while in other embodiments the free-form space does include all the features and functionalities provided by the other spaces.

Several more detailed embodiments and examples will be described below. In many of these embodiments and examples, the space is a free-form space that is for visually organizing media clips and compositing media clips. However, one of ordinary skill will realize that these embodiments and examples can be implemented without some or all of these features. For example, in some embodiments, the free-form space is not a trackless space, but rather has several tracks that are used for organizing and compositing the media clips.

For some embodiments of invention, FIG. 1 illustrates a graphical user interface ("GUI") 100 of a media-editing application that includes an organizing and editing free-form space. Specifically, this figure illustrates the GUI 100 at six different stages 110, 120, 130, 140, 150, and 160 that show how the organizing and editing space can be used to organize media clips. Each of these stages will be described in more detail below after an introduction of the elements of GUI 100.

As shown in FIG. 1, the GUI 100 includes a media library 165, a display area 170, media clips (e.g., media clip 124) in the media library 165, and media clips (e.g., media clip 122) in the display area 170. The media library 165 is an area in the GUI 100 through which the application's user can select media clips to add to the display area 170 in order to organize and edit the media clips. The display area 170 is an area in the GUI 100 where a user can add, remove, organize, visually arrange, collapse, and play back media clips, for example. As shown, media clips may be displayed with different appearances or dimensions in different areas of the GUI 100. For instance, the media clips in the display area 170 in this example are represented using thumbnails (i.e., a set of equally-sized images) while the media clips in the media library 165 are represented using smaller thumbnails (i.e., a set of equally-sized, but smaller, images). In other embodiments, the media clips in differently areas of the GUI 100 are defined any number of different ways.

The operation of the GUI 100 will now be described by reference to the state of this GUI during the six stages 110, 120, 130, 140, 150, and 160 that are illustrated in FIG. 1. In the first stage 110, the display area 170 displays media clips 122, 126, 128, and 132. These clips have been previously added to the display area 170 by a user of the application. The media clips 126, 128, and 132 are placed near each other in the display 170 area to illustrate an example of media clips visually grouped together.

Additional media clips can be added to the display area 170 from the media library 165 at any time. These clips can be added to the display area 170 in several different ways. For instance, in some embodiments, the user can add a media clip from the media library 165 by first selecting a media clip in the media library 165. The selected media clip is then added to the display area 170 through a drag-and-drop operation (e.g., by using a cursor-control device, such as a mouse or trackpad or a finger for a touch-screen device, to select this media clip from the media library 165 and drag it to the display area 170). As another example, a media clip from the media library 165 can be added to the display area 170 by selecting the media clip in the media library 165 and then selecting an option from a pull-down menu or a pop-up menu (not shown). The first stage 110 illustrates a media clip being added to the display area 170. In this stage, a user selects (e.g., clicking on, tapping) the media clip 124 in the media library 165. This selection is indicated by the bold border of the media clip 124. The user then adds the media clip 124 to the display 170 by performing a drag-and-drop operation as indicated by the arrow 145.

In the second stage 120, the display area 170 displays the media clip 124 that was added in the first stage 110 in addition to the media clips 122, 126, 128, and 132. As shown, the media clip 124 is placed near the media clip 122, and the two media clips form a visual grouping in the display area 170. In this stage, there are two visual groupings—one grouping that includes the media clips 126, 128, and 132 and another grouping that includes the media clips 122 and 124. In the display area 170, these groupings can be rearranged to form different visual groupings. For instance, the user can move the media clip 132 near the media clips 122 or 124 to form a new visual grouping that includes the media clips 122, 124, and 132. Thus, the user can visually group the media clips into any number of different visual groupings that the user desires.

In some embodiments, media clips in a visual grouping can be rearranged so that the user can change the visual arrangement of the media clips in the visual grouping. The third stage 130 illustrates an example of such rearranging of media clips in a visual grouping. In this stage, the user moves the media clip 126 (e.g., through a drag-and-drop operation) between the media clips 128 and 132 as indicated by the arrow 180. In some embodiments, the media clips 128 and 132 automatically slide horizontally away from each other, as shown by arrows, to make room for the media clip 126 when the media clip 126 is placed between them. In other embodiments, the media clips 128 and 132 do not move when the media clip 126 is placed between the media clips 128 and 132. In such embodiments, the media clip 126 will overlap the media clips 128 and 132.

The fourth stage 140 illustrates the GUI 100 after the completion of the rearrangement of the media clips 126, 128, and 132 in the third stage 130. As shown, the media clips 126, 128, and 132 are now rearranged in the order of 128, 126, and 132 from left to right. In addition to visual groupings, the media clips in the display area 170 can be grouped into logical groupings. For instance, in some embodiments, the user can select several media clips in the display area 170 and create a logical grouping that includes the selected media clips by executing a key command (e.g., control-G), a combination of key commands, a hotkey, or any other appropriate method. Some embodiments require that media clips to be within a particular distance of each other before they can be logically grouped while other embodiments allow media clips located anywhere in the free-form space to be logically grouped together. Once a logical grouping of media clip is created, the logical grouping can be moved within the space as a single item. For instance, performing a drag-and-drop operation on one of the logically grouped media clips also moves the other media clips in the logical group in the same relative direction and distance as the medial clip on which drag-and-drop operation is performed.

In some embodiments, media clips can be minimized or collapsed into a smaller thumbnail or an icon in the display area. A media clip can be minimized or collapsed in several different ways. For instance, a user can minimize or collapse a media clip by selecting the media clip and then selecting a minimize button that is displayed on or close to the media clip. In some embodiments, the user selects a menu option that is displayed in a pull-down menu that is accessed by selecting a top-level menu in the GUI or displayed in a pop-up menu that is accessed through a cursor control operation (e.g., a right-click cursor operation or a control-click cursor operation).

In the fifth stage 150, the GUI 100 shows an example of a media clip being minimized in the display area 170. The stage shows the media clip 124 after a right-click cursor operation has been performed on the media clip 124 to cause a pop-up menu 185 that includes a minimize command to be displayed. The pop-up menu 185 includes a play option and a minimize option in addition to other options (not shown) Although the pop-up menu 185 in this example shows a set of particular options, one of ordinary skill will recognize that other embodiments include different menu options and/or commands in the pop-up menu 185. This stage also shows the user selecting the minimize option to shrink the media clip 124 into a smaller thumbnail. The sixth stage 160 illustrates the media clip 124 after it has been minimized. As shown, the minimized media clip 124 is now represented by a smaller sized rectangle and is moved to the lower left corner of the GUI 100. The size and location of the media clip 124 before it was minimized is depicted as a dotted rectangle. In some embodiments, the application provides an animation to illustrate the size minimization and movement of the media clip 124.

Figure 2:
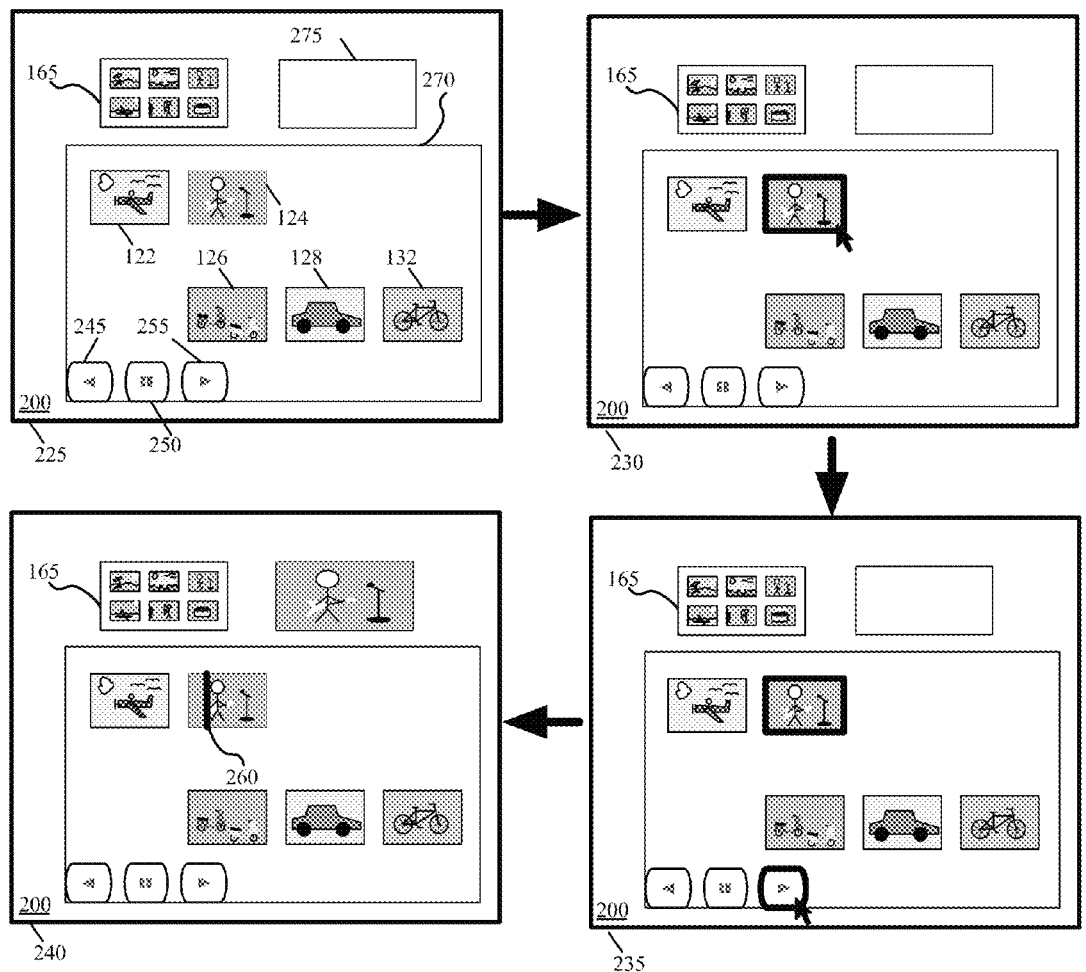
FIG. 2 illustrates an example GUI at several stages that show playing back a media clip in some embodiments.
Figure 3:
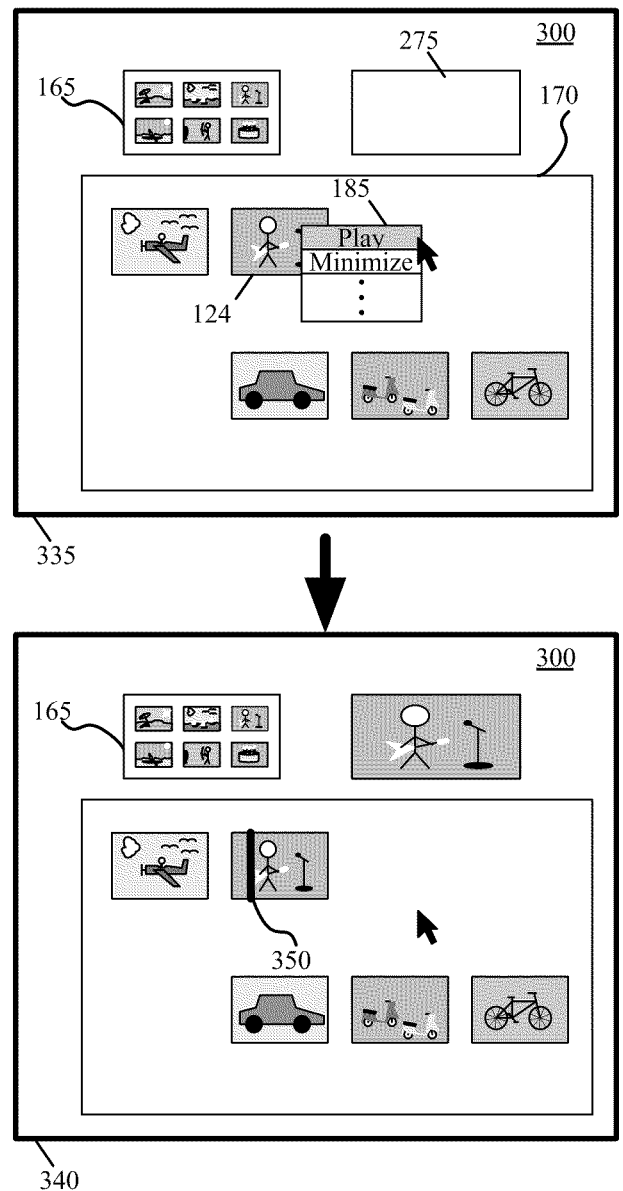
FIG. 3 illustrates an example GUI at several stages that show playing back a media clip in some embodiments.

Some embodiments allow a user to play back media clips in a free-form space of a media-editing application. For instance, FIGS. 2 and 3 illustrate two different methods of playing back media clips in a free-form display area of some embodiments. Specifically, FIG. 2 shows playing back a media clip through a set of playback controls, and FIG. 3 shows playing back a media clip through a menu item selection. FIG. 2 will now be described followed by a description of FIG. 3.

FIG. 2 illustrates a GUI 200 at four different stages 225, 230, 235, and 240 of a media clip playback operation. The GUI 200 is similar to the GUI 100 described above by reference to FIG. 1, except the GUI 200 includes a set of playback controls 245-255 for playing back a media clip in the display area 270 and a viewing area 275 for displaying playback of a media clip. As shown, the set of playback controls 245-255 includes a user selectable UI item 245 (e.g., backward playback button 245) for backward playback of a media clip, a user selectable UI item 250 (e.g., pause button 250) for pausing playback of the media clip, and a user selectable UI item 255 (e.g., forward playback button 255) for forward playback of the media clip.

In some embodiments, playback of the selected media clip is displayed within the selected media clip while in other embodiments playback of the selected media clip is displayed in a viewing area (e.g., viewing area 275). In yet other embodiments, playback of the selected media clip is displayed both within the selected media clip itself and a viewing area, which is illustrated by FIGS. 2 and 3.

Some embodiments display a playhead (or scrubber bar) over a selected media clip that moves horizontally along the selected media clip as it is playing back. The position of the playhead along the displayed length of the media clip indicates the position of the content being played. For example, if the media clip is a video clip that includes a sequence of frames, the position of the playhead along the length of the media clip represents the position of the currently displayed frame in the sequence of frames of the video clip.

In some embodiments, the rate at which the playhead moves horizontally along the selected media clip being played is different for media clips that have different durations. This is because, in some embodiments, the displayed length of a media clip represents the duration of the content associated with the media clip with the left edge representing the starting point and the right edge representing the ending point of the content and the media clips displayed in the free-form space are uniform-sized rectangles. For example, in such embodiments, a playhead moves horizontally along a three-minute audio clip faster than a playhead along a five-minute video clip since the duration of the audio clip is shorter than the duration of the video clip.

As mentioned above, the viewing area 275 is an area in the GUI 200 where playback of a media clip is displayed. As shown, the viewing area 275 is located outside the display area 270. In some embodiments, however, the viewing area 275 is located within the display area 270 (not shown). The viewing area 275 is shared with other workspaces included in the media-editing application in some embodiments. For example, media clips in other workspaces are also played back in the viewing area 275. Furthermore, the viewing area 275 of some embodiments is expanded (e.g., by using a keystroke, a combination of keystrokes, a hotkey, a pull-down or pop-up menu selection, etc.) to occupy the entire monitor or display device (i.e., full screen mode playback) of the computing device on which the media-editing application is being executed.

The operation of the GUI 200 will now be described by reference to the state of this GUI during four different stages 225, 230, 235, and 240 that are illustrated in FIG. 2. In the first stage 225, the display area 270 displays media clips 122, 124, 126, 128, and 132. These clips have been previously added to the display area 270 by a user of the application. None of the media clips are being played back in this stage.

In the second stage 230, the user selects (e.g., by clicking on, tapping) the media clip 124 to play back, as indicated by the bold edges of media clip 124. In the third stage 235, the user selects (e.g., by clicking on, tapping) the forward play button 255 to start playback of the media clip 124. The fourth stage 240 shows the GUI 200 after the start of the playback of the media clip 124. As mentioned above, this example displays the playback of the media clip 124 within the media clip 124 and in the viewing area 275. As shown, the current position of the playback of the media clip 124 in this stage is indicated by the position of the playhead 260 along the displayed length of the media clip 124.

FIG. 3 illustrates another method of playing back a media clip in a free-form display area 370 of a GUI 300. This figure shows the GUI 300, which is similar to the GUI 200 illustrated in FIG. 2, of a media-editing application of some embodiments. FIG. 3 shows the GUI 300 in two different stages 335 and 340 of a media clip playback operation. In the first stage 335, the user selects (e.g., by clicking on, tapping) a play option displayed in a pop-up menu 185. In some embodiments, the pop-up menu 185 is accessed through a cursor control operation (e.g., a right-click cursor operation or a control-click cursor operation) that is performed on the media clip 124, which the user selects as the media clip to play back. The second stage 340 illustrates the GUI 300 during the playback of the media clip 124 after the play option was selected from the pop-up menu 185. In this stage, playback of the media clip 124 is displayed in the viewing area 275 as well as within the media clip 124. As noted above, a playhead 350 indicates the position of the content being played. In some embodiments, playback of the media clip 124 is only displayed in the viewing area 275 (i.e., playback is not displayed within the selected media As mentioned above, the free-form display area of some embodiments allows the user to create sequences of media clips, reorder the media clips within sequences, stack sequences, and add or remove media clips from sequences in addition to allowing a user to add, remove, organize, visually arrange, collapse, and play back the media clips. In some embodiments, a sequence of media clips is a group of media clips associated in a particular chronological order. Some embodiments form a sequence of media clips by horizontally concatenating media clips in the display area. For example, a sequence that includes a first media clip and a second media clip is formed when the second media clip is placed or moved in the display area such that the left edge of the second media clip coincides with the right edge of the first media clip. When playing back the sequence, the first media clip is first played back and then the second media clip is played back.

Figure 4:
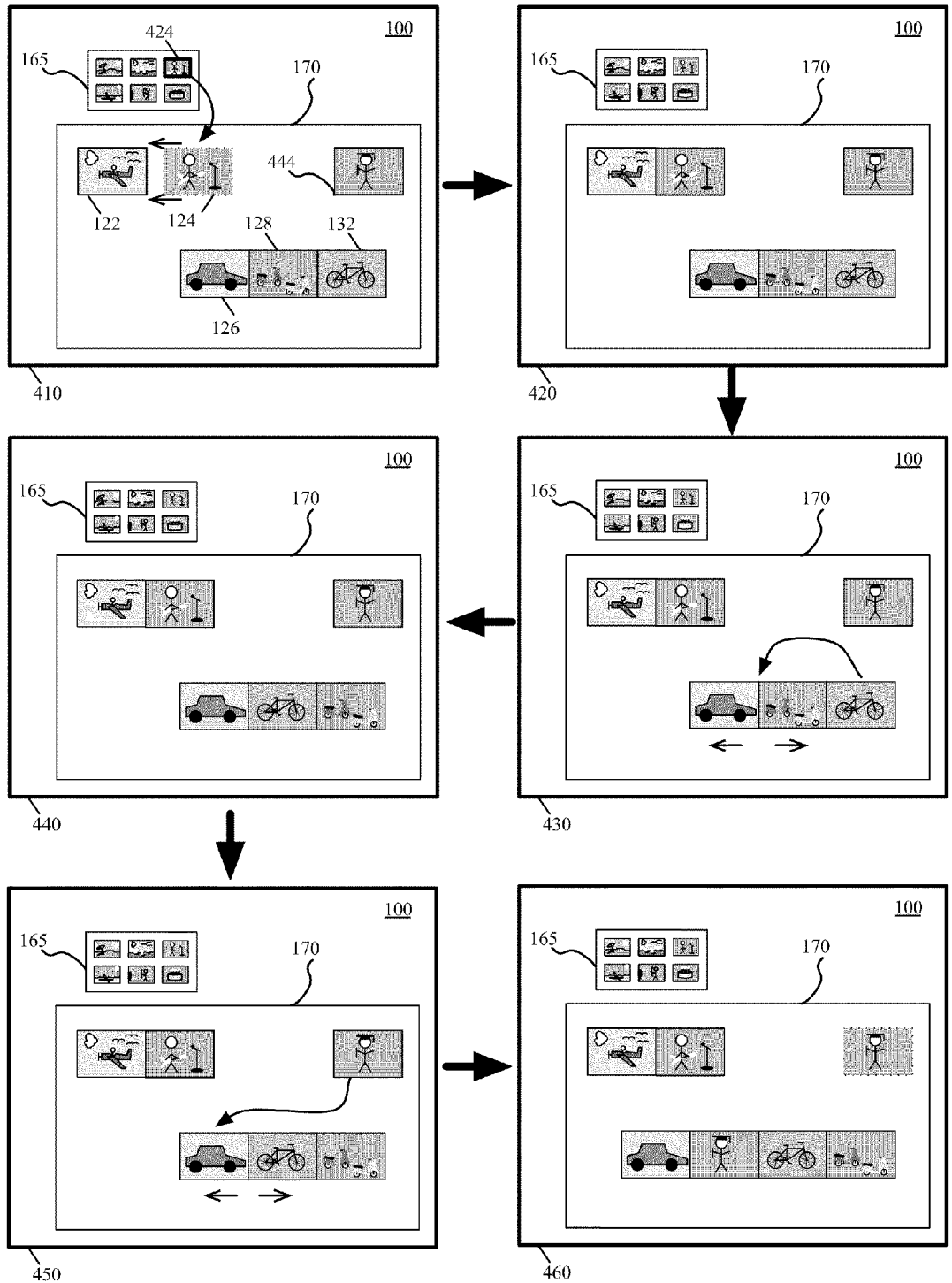
FIG. 4 illustrates an example GUI at several stages that show rearranging media clips in a sequence of media clips in some embodiments.

FIG. 4 illustrates examples of operations performed on media clips and sequences in a free-form display area 170 of GUI 100. Specifically, this figure illustrates the GUI 100 in five different stages 410, 420, 430, 440, 450, and 460 of the operations. The GUI 100 is similar to the GUI 100 described above by reference to FIG. 1. In FIG. 4, the first stage illustrates an operation for creating a sequence of media clips. This stage shows a display area 170 that displays media clips 122, 124, 444, 126, 128, and 132. As shown, the media clips 126, 128, and 132 form a sequence of media clips. In this stage, the user selects (e.g., by clicking on, tapping) the media clip 124 in the media library 165 and adds it to the display area 170 (e.g., by performing a drag-and-drop operation). The bold border of media clip 124 indicates the selection of the media clip 124. As the user adds the media clip 124 to the display area 170, the user places it near the right side of media clip 122 to form a sequence.

In some embodiments, when a media clip is moved within a threshold distance of another media clip in the display area, the media clip being moved "snaps" to the other media clip in order to form a sequence. Referring to the first stage 410 as an example, as the media clip 124 is added to the display area 170 and as the left edge of the media clip 124 moves close to the right edge of the media clip 122, the left edge of the media clip 124 and the right edge of the media clip 122 "snaps" together. Further details of this snapping feature will be described below. The second stage 420 illustrates the GUI 100 after the completion of the creation of the sequence formed by the media clips 122 and 124. At this stage, the display area 170 displays two sequences chronologically ordered from left to right: a sequence formed by the media clips 126, 128, and 132, and a sequence formed by the media clips 122 and 124. Some embodiments chronologically order the media clips included in a sequence from right to left. However, for purposes of explanation and clarity, the sequences described in this application are chronologically ordered from left to right.

As mentioned above, a sequence is a group of media clips associated in a particular chronological order. Some embodiments allow the user to reorder the media clips in a sequence in order to change the chronological order of the media clips in the sequence. The third stage 430 illustrates an example operation for reordering media clips in a sequence of media clips. This stage shows the user moving the media clip 132 from the right end of the sequence to between the media clips 126 and 128 (e.g., by performing a drag-and-drop operation) as indicated by an arrow. In some embodiments, when a media clip is placed between two media clips in a sequence, the two media clips automatically slide horizontally away from each other in order to make a room for the media clip being placed between the two media clips. The third stage 430 illustrates such a sliding feature with the two arrow pointing away from each other under the media clips 126 and 128. The fourth stage 440 illustrates the GUI 100 after the reordering operation is completed. The chronological order of the sequence from left to right is now from the media clip 126 to 132 to 128.

The fifth stage 450 shows an operation for adding a media clip to a sequence of media clips. In this stage, a media clip 444, which is not part of any sequence, is added into a sequence formed by media clips 126, 132, and 128. To add the media clip 444 to this sequence, the user selects the media clip 444 and moves it between the media clips 126 and 132 (e.g., by performing a drag-and-drop operation) in the sequence. Like the media clips 126 and 128 in the third stage 430, the media clips 126 and 132 automatically slide horizontally away from each other in order to make a room for the media clip 444 to be added. The sixth stage 460 illustrates the GUI 100 after the completion of the addition operation. This stage shows the sequence of the media clips 126, 444, 132, and 128 chronologically ordered from left to right.

Some embodiments allow the user to layer media content of a media clip or a sequence of media clips over media content of another media clip or sequence of media clips in a composite presentation composed of these media clips or sequences of media clips. In some such embodiments, media content in the one layer (e.g., the top layer) is played back over any media content in the other layers (e.g., the lower layers) when a composite presentation composed of these media clips or sequences is played back. For instance, in some embodiments, the media content in the top layer is played back over any other content in the lower layers while in other embodiments, the media content in the bottom layer is played back over any other content in the upper layers. One example way of layering media content of media clips or sequences is to stack a media clip or a sequence of media clips above another media clip or sequence of media clips. For example, the media clip 444 could be placed above the sequence of media clips 126, 128, 132 in the first stage 410 so that the lower edge of media clip 444 would be aligned to the upper edge of the sequence. Like the snapping feature described above, the bottom of a media clip can snap to the top of a sequence when the lower edge of the media clip is within a threshold distance of the top edge of the sequence. In such example, if the media clip 444 is place above the media clip 128 of the sequence, the media content (e.g. image frames) represented by the media clip 444 will be displayed over the media content represented by the media clip 128 when a composite presentation that includes the media clip 444 and the sequence that includes the media clip 128 is played back in some embodiments.

Figure 5:
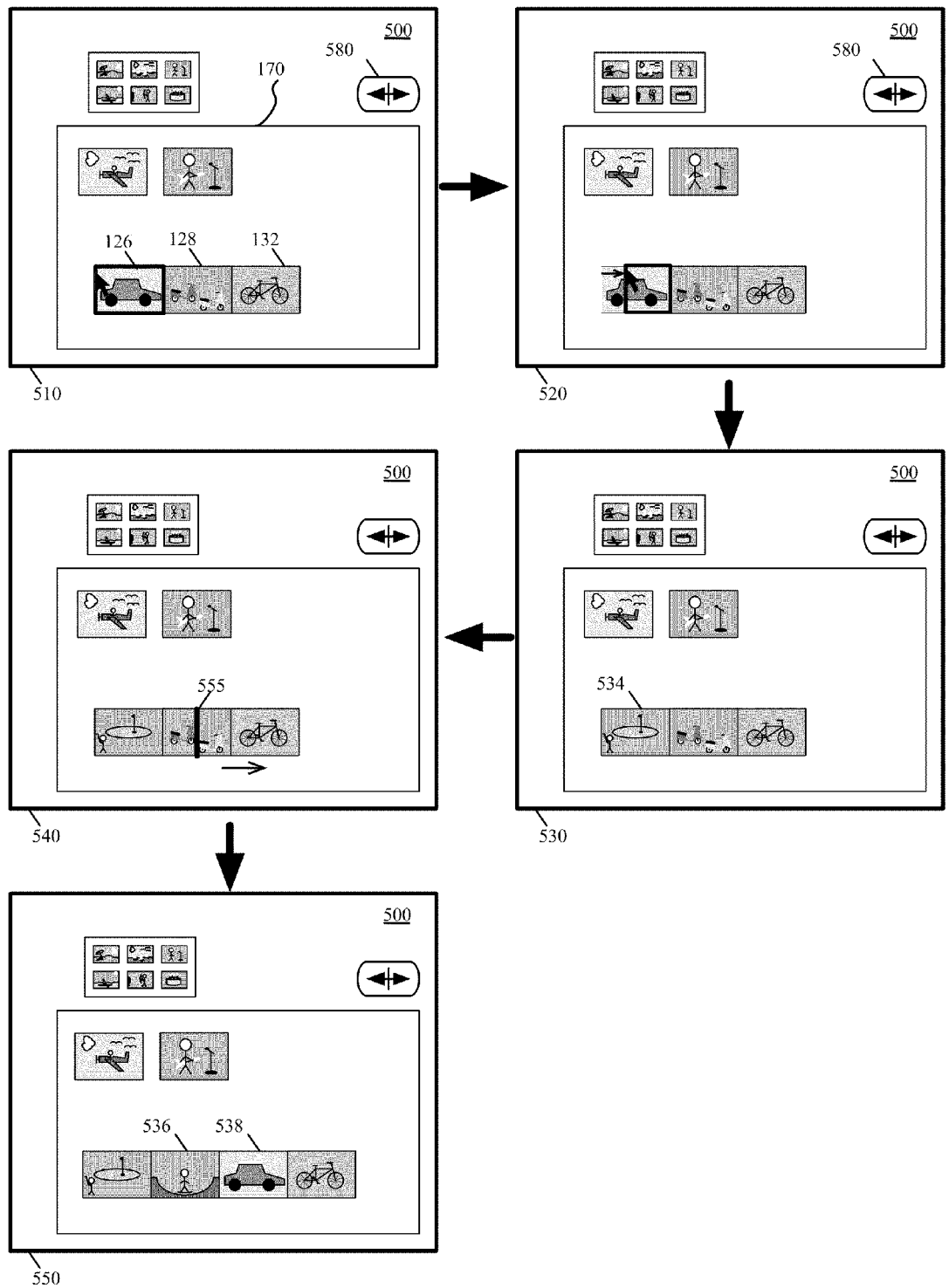
FIG. 5 illustrates an example GUI at several stages that show editing media clips in a sequence of media clips in some embodiments.

For some embodiments, the free-form display area allows the user to edit media clips in the display area. FIG. 5 illustrates examples of trimming and splitting operations within this display area in some embodiments. Specifically, this figure illustrates a GUI 500 in five different stages 510, 520, 530, 540, and 550 of the operations for editing media clips. The GUI 500 is similar to the GUI 100 described above by reference to FIG. 1, except the GUI 500 includes a user selectable UI item 580 (e.g., split button 580) for activating a splitting tool to split a media clip into several media clips.

The first stage 510 illustrates a sequence of media clips that includes media clips 126, 128, and 132. As shown by the bold border, the user selects (e.g., by clicking on, tapping) the media clip 126. In some embodiments, the user can perform a trim operation on a selected a media clip to set a start and/or end point (i.e., in- and/or out-point) of the media clip. In some such embodiments, the trim operation can be performed by selecting and moving a side edge of the media clip. For instance, the left edge of a selected media clip can be selected and moved (e.g., by performing a click-and-drag operation) towards the right to set a start (i.e., an in-point) of the media clip. Similarly, the right edge of the selected media clip can be selected and moved (e.g., by performing a click-and-drag operation) towards the left to set an end point (i.e., an out-point) of the media clip.

The second stage 520 illustrates the GUI 500 in the middle of a trim operation. In this stage, the user has selects and moves the left edge of the media clip 126 towards the right, as indicated by an arrow. In some embodiments, a border with the original dimensions of the media clip is displayed in addition to the border that is being moved, as shown in this stage.

The third stage 530 illustrates the GUI 500 after the completion of the trimming operation. In some embodiments, the trimming operation can be completed by using an appropriate side edge of the media clip to select (e.g., by releasing the click in a click-and-drag operation) a position along the length of the media clip to set as a starting or ending point. Some embodiments generate a new media clip that represents the trimmed media clip. As shown, a new media clip 534 is generated and replaces the media clip 126 in the sequence. In addition, the displayed length of the media clip 534 remains the same as the displayed length of the media clip 126 even though the durations of the media clips 534 and 126 are different. This is because the media clips illustrated in FIG. 5 are represented by uniform-sized rectangles, as described above and below in some embodiments.

Different embodiments allow the user to set the edit points of a media clip differently. For instance, instead of selecting and moving either side edge of a media clip to a new location, the user can invoke edit commands when the playhead is at a desired position along the length of the media clip during playback of the media clip. Specifically, when the playhead reaches a desired position, the user can invoke an editing command to trim from the beginning of the media clip to the position represented by the location of the playhead (e.g., a "cut to the play head" command). In other embodiments, the user can drag the playhead to a desired position without playing back the media clip and then invoke an editing command.

The fourth stage 540 shows the GUI 500 before an operation for splitting a media clip into two separate media clips. As mentioned above, a playhead is displayed over a media clip when the media clip is being played back or when the user manually selects a position along the displayed length of the media clip. As shown, a playback head 555 is displayed over the media clip 128. In this example, the media clip 128 is playing back. In some embodiments, the user can invoke a split command (e.g., by selecting the split button 580) that divides the selected media clip into two separate media clips. One of the split media clips represents a portion of the media content represented by the original media clip from the beginning of the media content to the position represented by the position of the playhead 555, and the other split media clip represents the rest of the media content represented by the original media clip (i.e., the portion of the media content starting from the position represented by the position of the playhead 555 to the end of the media content).

The fifth stage 550 illustrates the GUI 500 after the split operation is completed. As illustrated in this stage, two media clips 536 and 538 area generated to represent the two media clips that resulted from the split operation performed on the media clip 128 in the fourth stage 540. In some embodiments, the media clips 126 and 132 slide horizontally away from each other in order to make a room for the media clips 536 and 538 in the sequence, as indicated by the arrow below the media clip 132 pointing to the right. Similar to the media clip 534 illustrated the third stage 530, the displayed length of the media clips 536 and 538 remains the same as the displayed length of the media clip 128 despite the durations of the media clips 536 and 538 being different than the duration of the media clip 128. Again, this is because the media clips illustrated in FIG. 5 are represented by uniform-sized rectangles.

Figure 6:
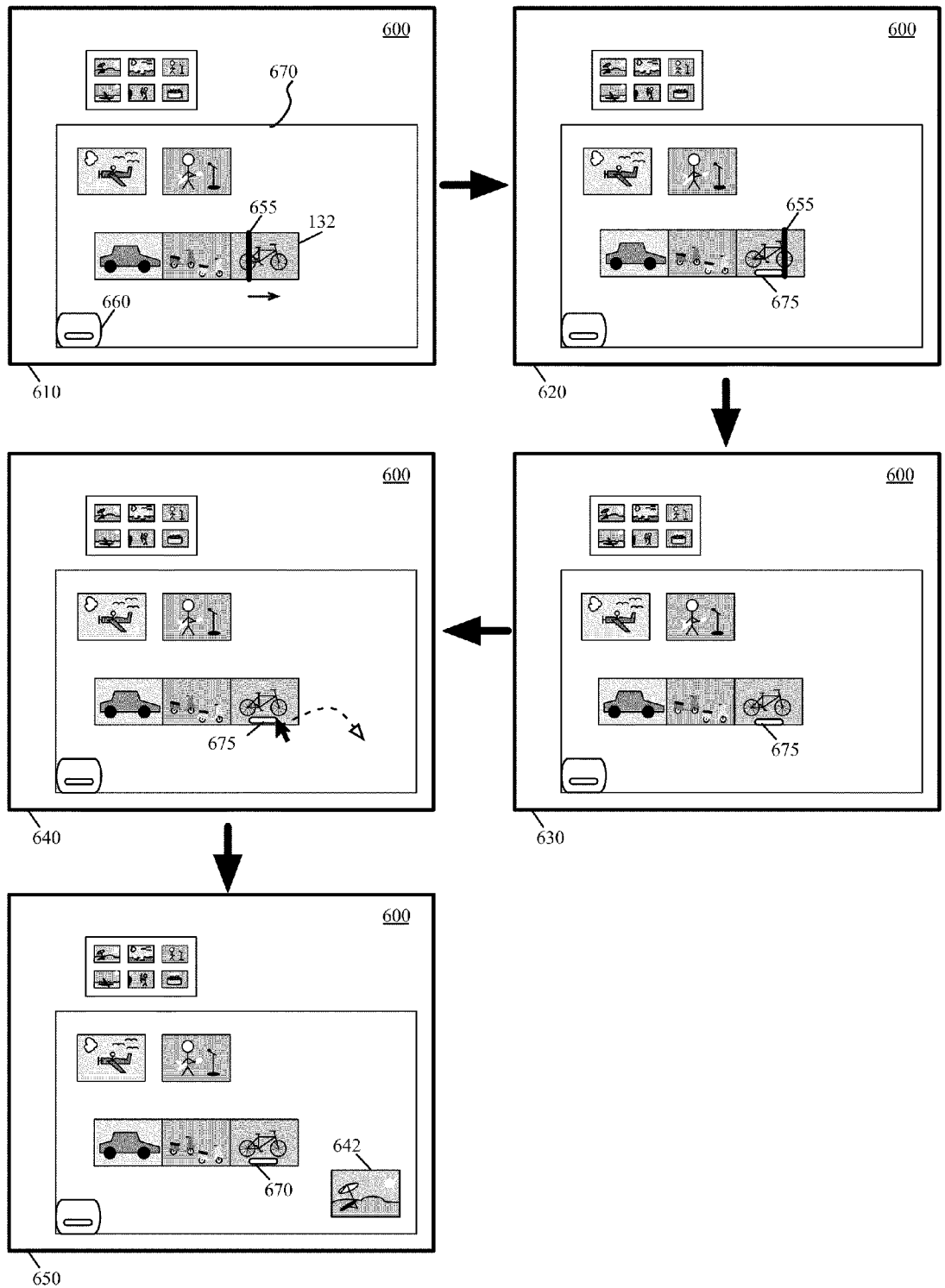
FIG. 6 illustrates an example GUI at several stages that show editing media clips in a sequence of media clips in some embodiments.

FIG. 6 illustrates that the free-form display area in some embodiments also allows the user to mark a region of interest on a media clip and create a new media clip based on the marked region on the media clip, in addition to allowing the user to invoke editing commands. Specifically, this figures illustrates a GUI 600 at five different stages 610, 620, 630, 640, and 650 that show the creation of a region of interest of a media clip 132 and the use of this region of interest to create another media clip 642. The GUI 600 is similar to the GUI 100 described above by reference to FIG. 1, except the GUI 600 includes a user selectable UI item (e.g., region button 660) for marking a region of interest on a media clip.

The first stage 610 illustrates the free-form display area 670 as the media clip 132 is being played back within its thumbnail representation. During this playback, a playhead 655 is displayed over the media clip 132 to indicate the position of the playback of the media clip 132. In some embodiments, the user can mark a region of interest on a media clip by invoking a command (e.g., holding a keyboard key, selecting a UI item such the region button 660, etc.) to mark the start of a region of interest and invoking another command to mark the end of the region of interest while the playhead moves along the media clip. In this example, the user selects (e.g., by clicking on, tapping) the region button 660 to start marking a region of interest and selects (e.g., by clicking on, tapping) the region button 660 again to stop marking the region of interest while the playhead 655 moves along the displayed length of media clip 132. Accordingly, the user selects the region button 660 in this stage.

Different embodiments allow the user to mark a region of interest differently. For instance, instead of invoking two commands (i.e., one at the beginning and another at the ending of the desired region of interest), the user can hold down a hotkey while the playhead moves along the displayed length of the media clips playing back in order to mark a region of interest in some embodiments. Alternatively, the user can click and hold down the region button 660 instead of the hotkey.

In some embodiments, the marked region of interest is represented by a marker on the media clip that horizontally spans the start and end of the marked region of interest. The second stage 620 illustrates a marker 675 that represents the marked region of interest. At this stage, the user has just selected the region button 660 a second time to indicate the end of the region of interest. The third stage 630 illustrates the GUI 600 after the completion of the marking the region of interest. In this stage, the marker 675 represents the entire marked region of interest.

In some embodiments, a media clip can be created based on a marked region of interest. The fourth stage 650 illustrates such an operation. In this stage, the marker 675 is a selectable UI item for creating the media clip based on the marked region of interest. However, the region of the selectable UI item for creating the media clip based on the marked region of interest may be defined differently in different embodiments. For instance, the entire vertical section of the media clip 132 that includes the marker may be defined as the selectable UI item for creating the media clip based on the marked region of interest. The user selects the marker 675 and drags (e.g., using a drag-and-drop operation) the marker 675 away from the media clip 132 to another location in the display area 670 as indicated by a dotted arrow. Instead of selecting and dragging a selectable UI item that represents the marked region of interest, some embodiments create a media clip from a marked region of interest through a copy and paste operation (e.g., by using a series of hotkeys, keystrokes, combinations of keystrokes, or options selected from a pull-down or pop-up menu).

The fifth stage 650 shows the GUI 600 after the completion of the operation in the fourth stage 640. Media clip 642 represents the media clip created as a result of the operation. That is, the media clip 642 represents the portion of the content of media clip 132 that was marked with the marker 675.

Some embodiments allow the user to tag at various positions of a media clip to further organize the media clips in the display area. For example, a user can tag a frame of a video clip associated with a media clip that shows a car with the tag "car," "automobile," or "transportation". As such, the user can tag the content associated with media clip in any which way to further assist the user in organizing the media clips in the display area, which is described in further detail below. In some embodiments, tags included in a marked region of interest are also included in a media clip that is created based on the marked region of interest (tags outside the marked region of interest are not included).

In addition, some embodiments provide additional tools for editing media clips, such as dynamic editing and playback of media clips in the free-form space. In some embodiments, dynamic editing allows a user to perform operations on a media clip while the media clip is playing back. Examples of dynamic editing operations include tagging instances in time of the media clip, splitting the media clip into multiple media clips, trimming the media clip, and extending a trimmed media clip, among other operations.

Several more detailed embodiments of the invention are described in the sections below. Section I provides a conceptual description of the attributes of the display areas of some embodiments that allow the user to organize and edit media clips in the display areas of some embodiments. Next, Section II describes an organizational aspect of the display areas of some embodiments. Section III describes compositing media clips within the display areas of some embodiments. In addition, Section III describes several operations that a user can perform with composited media clips. Next, Section IV follows this with a description of editing operations that can be performed on a single media clip or composited media clips. Section V describes the software architecture of an application that employs the display areas of some embodiments. Next, Section VI describes the process used to define the media-editing application of some embodiments. Finally, Section VII describes a computer system that implements some embodiments of the invention.

I. Display Area

As mentioned above, display areas of the media-editing application of some embodiments have several attributes that allow a user of the application to organize and edit media clips and sequences of media clips within these areas. Several more detailed examples of such attributes will now be described below.

As mentioned above, some embodiments provide a free-form space that allows the user to place media clips (and sequences of media clips) in regions within the space that overlap each other at the same or different instances in time. In some embodiments, a free-form space does not limit the placement of media clips within the free-form space. That is, the media clips can be placed at any location within the free-form space of such embodiments, as mentioned above.

In some embodiments, the free-form space is a trackless space that allows the user to place media clips and sequences of media clips without being constrained by such tracks (e.g., the media clips and sequence of media clips do not have to be aligned along tracks). In other words, the free-from space in some embodiments does not include tracks, such as those included in a typical timeline-based compositing area of a media-editing application that is for compositing media presentations. In some media editing applications, a track is a region defined by two parallel horizontal lines in a compositing space. Typically, there are multiple tracks in such media-editing application. Media clips or sequences can be placed in a track and are aligned to either of the two parallel horizontal lines defining the track. Media clips and sequences cannot vertically overlap within a track. Where there are multiple tracks, neither a media clip nor a sequence can occupy multiple tracks at once.

Figure 7:
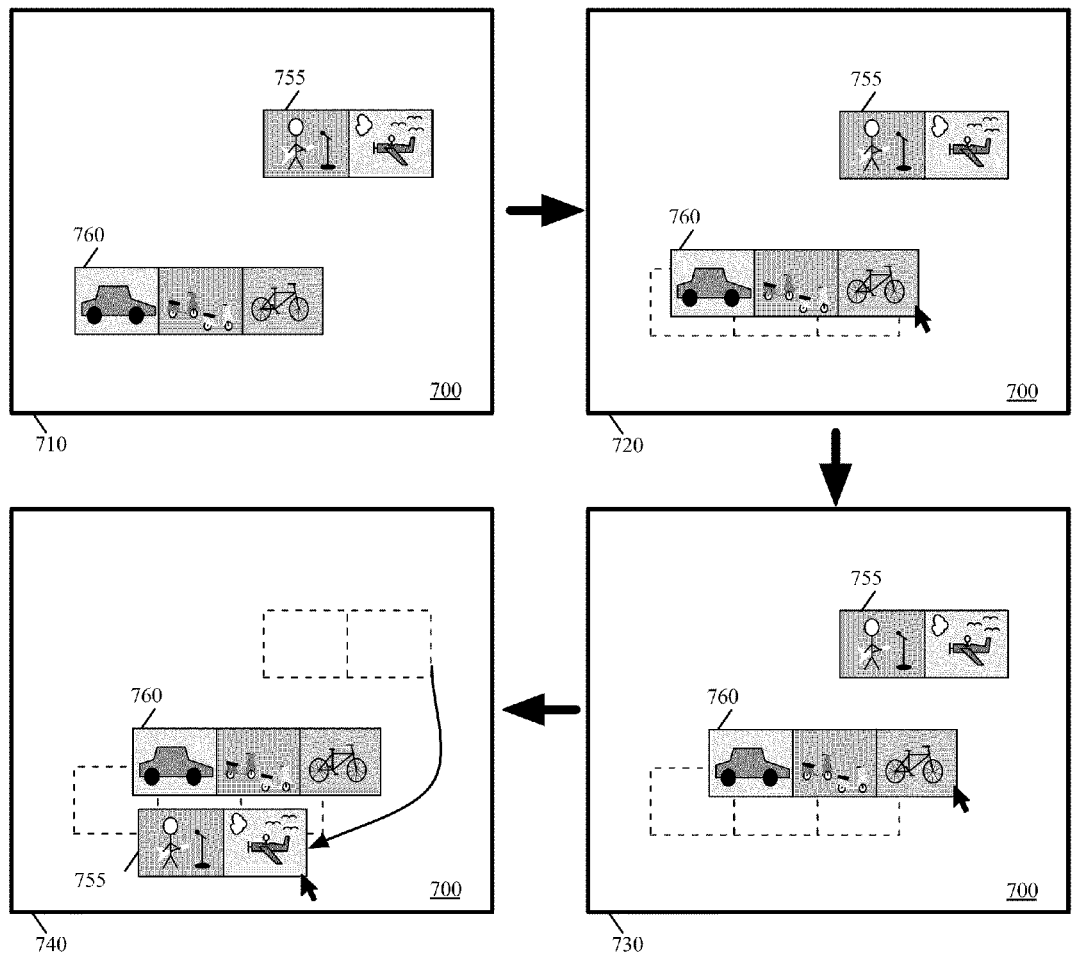
FIG. 7 illustrates an example GUI at several stages that show moving a sequence of media clips in some embodiments.

In some embodiments, a display area of some embodiments allows the user to move media clips and sequences in the display area such that regions that the media clips and sequences occupy after being moved can overlap with the regions the media clips and sequences used to occupy before being moved. FIG. 7 illustrates an example of a region-overlap aspect of a free-form display area 700 of some embodiments. Specifically, this figure illustrates sequences positioned at different locations in the display area 700. As shown, FIG. 7 illustrates the display area 700 at five different stages 710, 720, 730, 740, and 750. The display area 700 is an area of a GUI (not shown) for an application in which a user places media clips and sequences.

The first stage 710 shows sequences 755 and 760 positioned in the free-form display area 700. The sequence 755 includes two media clips and the sequence 760 includes three media clips. At this stage 710, none of the sequences 755 and 760 are being moved within the display area 700

The second stage 720 illustrates the movement of the sequence 760 within the trackless free-form display area 700. Specifically, the sequence 760 is moved (e.g., by performing a drag-and-drop operation) slightly up and to the right from its previous position, which is indicated by a dotted sequence of rectangles. As shown, the region in which the sequence 760 is positioned partially overlaps with the region in which it used be positioned within the display area 700.

The third stage 730 illustrates another movement of the sequence 760 within the free-form display area 700. Similarly, the sequence 760 is moved (e.g., by performing a drag-and-drop operation) slightly up and to the right from its location within the free-form display area 700 in the second stage 720. In this stage, the region in which the sequence 760 is positioned still partially overlaps with the region in which it was originally positioned in the first stage 710 (and the second stage 720). Thus, these stages illustrate how the sequence 760 can be positioned in multiple regions within the free-form display area 700 that overlap with the region in which the sequence 760 was originally positioned in the first stage 710.

The fourth stage 740 shows the movement of the sequence 755 within the free-form display area 700. The sequence 755 is moved (e.g., by performing a drag-and-drop operation) down and to the left from its location within the free-form display area 700 in the stages 710-730. In particular, the sequence 755 is moved to a region that partially overlaps the region in which the sequence 760 was originally positioned in the first stage 710.

The tracks of typical media-editing applications have a temporal component. In particular, the tracks are defined to span a single common timeline. For example, a particular media clip (or sequence) on a track is chronologically ordered before any media clips or sequences positioned to the right of the particular media clip (even those on different tracks) on the timeline. Therefore, when the composite presentation is played back, the particular media clip is played back before any media clips or sequences positioned to the right of the particular media clip on the timeline.

However, a free-form display area of some embodiments does not have such a temporal component. Referring to FIG. 7 as an example, the first stage 710 shows the sequence 760 positioned to the left of the sequence 755. Unlike a space with tracks and a timeline of typical media-editing applications, the sequence 755 can be played back before the sequence 760 and vice versa. In fact, the sequences 755 and 760 in the display area 700 are disjointed and temporally unrelated: they are two separate and independent sequences.

A. Display Area Data Structure

Figure 8:
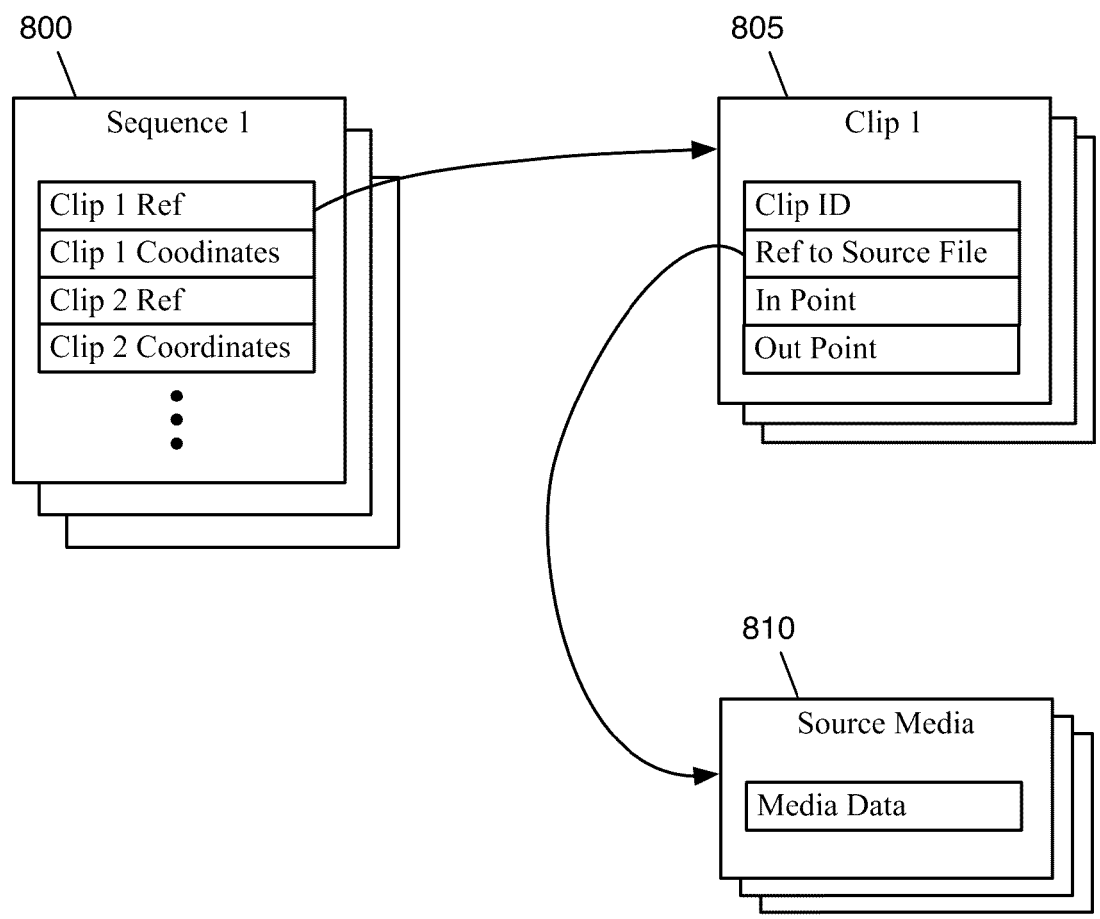
FIG. 8 illustrates an example of data structure for a display area of some embodiments.

FIG. 8 illustrates a data structure 800 for a free-form display area of some embodiments. The media-editing application creates the data structure 800 when the media-editing application is opened for execution in some embodiments. In other embodiments, a data structure is created when a first media clip is placed into an empty free-form display area of the application. The data structure 800 includes different pieces of information that define the media clips in the display area. As shown, the data structure 800 includes a list of media clips that are displayed in the display area and coordinates for each media clip that determine the location of the media clip in the display area. In some embodiments, the coordinates are expressed in a Cartesian coordinate system format (e.g., distance x, distance y) while in other embodiments the coordinates are expressed in a polar coordinate system format (e.g., radius r, angle $\theta$). Other two-dimensional coordinate system formats are possible in other embodiments.

Each media clip in the list is a reference to a data structure for the particular media clip in some embodiments. As shown, the reference for clip 1 links to a data structure 805 for the media clip. The data structure 805 includes a clip ID field that uniquely defines the media clip, a reference to a source media file (e.g., an audio file, a video file), an in-point for the source file, and an out-point for the source file. In some embodiments, the default in-points and out-points are the beginning and the end of the whole duration of the media clip. In some such embodiments, the in-point and out-point store an in-point and an out-point within the timecode of the source media file that respectively serves as the beginning and the end of the media content represented by the media clip. The reference to the media source file for media clip 1 links to a data structure 810, as shown in FIG. 8. The data structure 810 includes media data. Examples of media data include audio data, video data, text data, image data, and/or other media data.

When a media clip is added to the display area, information about the newly added media clip is added to the data structure 800. Conversely, when a media clip is removed from the display area, information about the media clip is removed from the data structure. When a media clip in the display area is moved, the coordinates corresponding to the moved media clip are updated with the coordinates of the new position of media clip in the display area.

Different embodiments may include different information in a data structure for a free-form display area. For instance, some embodiments might include a data field that defines the resolution of the display area. Some embodiments might include a data field that defines the granularity of a grid for the display area. Although the data structure 800 shows a list of references to media clips, the list can include references to sequences, such as the sequence data structure described in further detail below by reference to FIG. 29, and coordinates that determine the location of corresponding sequences in the display area.

B. Gridded Display Area

In some embodiments, the free-form display area is a gridded display area. The gridded display area of some embodiments is a display area that positions media clips within the display area by using a grid (e.g., a set of evenly spaced and interleaving horizontal and vertical gridlines) that is coarser than the pixel grid used to display the user interface. In other words, each tile (e.g., the area encompassed by a pair of consecutive horizontal gridlines and a pair of vertical gridlines) of such a grid includes more than one pixel. In a gridded display area, media clips and sequences of media clips are positioned such that one or more edges (e.g., all edges) of the media clips and sequences of media clips are aligned with the gridlines of the grid. In addition, media clips and sequences of media clips can span multiple consecutive gridlines (i.e., occupy multiple tiles of the grid) and still be aligned with the gridlines of the grid. In such cases, two media clips can be positioned so that the regions they occupy (horizontally, vertically, or both) overlap each other at same or different instance in time.

In other embodiments, the free-form display area is a gridless display area. In these embodiments, the grid of the gridless display area is not coarser than the grid formed by the pixels used to display the user interface. That is, gridlines of the grid are defined by the pixels themselves. In such a gridless display area, any position of media clips and sequences of media clips align with the gridlines defined by the pixels. Like the gridded display area of some embodiments, a gridded display area allows two media clips to be positioned so that the regions they occupy overlap each other at same or different instance in time.

Figure 9:
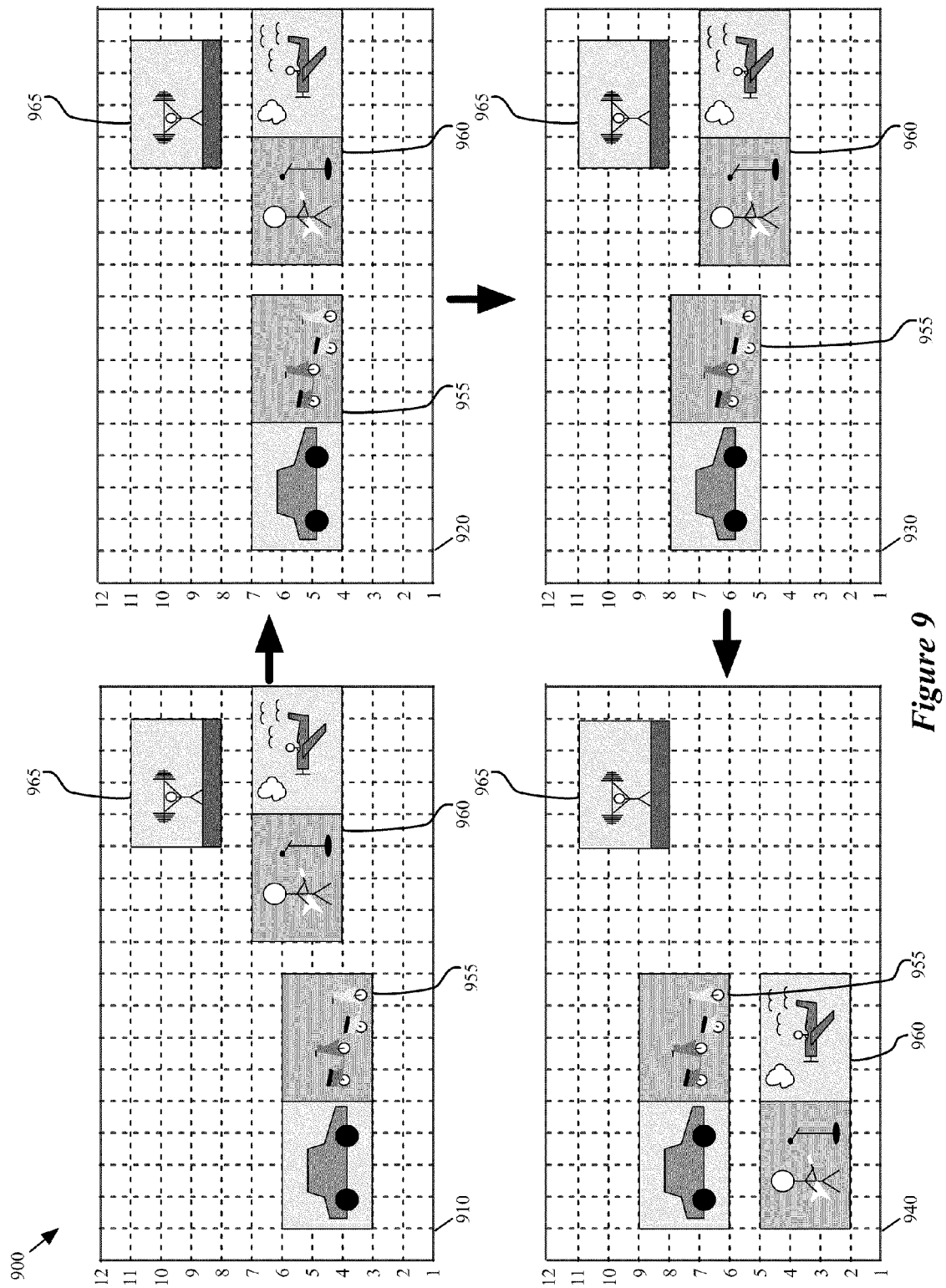
FIG. 9 illustrates an example of a free-form display area in some embodiments.

FIG. 9 illustrates an example of such a gridded display area 900 of some embodiments. This figure illustrates the display area 900 at four different stages 910, 920, 930, and 940. The display area 900 is similar to the display area 700 described above by reference to FIG. 7, except the display area 900 includes gridlines. The display area 900 displays sequences of media clips 955 and 960, and a media clip 965. The display area 900 also displays dashed lines show the gridlines of the display area 900. However, the gridlines do not have to be shown as dashed lines (e.g., solid lines) in some embodiments. In fact, some embodiments do not display the gridlines of the gridded display area.

In the first stage 910, the sequence 955 is positioned in a region of the display area 900 defined by three rows of the grid between horizontal gridlines 3 and 6 as shown. The sequence 960 is positioned in a region of the display area 900 also defined by three rows of the grid but from horizontal gridline 4 to horizontal gridline 7. The media clip 965 is positioned in a region defined by three rows of the grid from horizontal gridline 8 to horizontal gridline 11. As shown, the positions of the media clips and sequences displayed in the display area 900 are defined by the gridlines of the display area 900 (i.e., they are aligned to the vertical and horizontal gridlines).

The second stage 920 illustrates the display area 900 after the sequence 955 is moved up (e.g., by performing a drag-and-drop operation) by one row of the grid and is now positioned in a region defined by three rows of the grid between horizontal gridlines 4 and 7. As shown, the position of the sequence 955 in this stage overlaps with its position in the first stage 910.

The third stage 930 shows the display area 900 after the sequence 955 is moved up (e.g., by performing a drag-and-drop operation) again by one row of the grid and is now positioned in a region defined by three rows of the grid between horizontal gridlines 5 and 8. In this stage, the position of the sequence 955 overlaps its position in the first and second stages 910 and 920.

In the fourth stage 940, the sequence 960 is moved instead of the sequence 955. In this stage, the sequence 960 is moved (e.g., by performing a drag-and-drop operation) and positioned in a region that overlaps the region defined by the position of the sequence 955 in the first stage. As shown, the sequence 960 is positioned in a region defined by three rows of the grid between horizontal gridlines 1 and 4. As illustrated by the exemplary positioning of sequences in FIG. 9, media clips and sequences displayed in a gridded display area can be positioned at any position in the display area defined by the gridlines of the grid including positions that overlap each other and positions that overlap their previous positions.

C. Secondary Organizing Space

Figure 10:
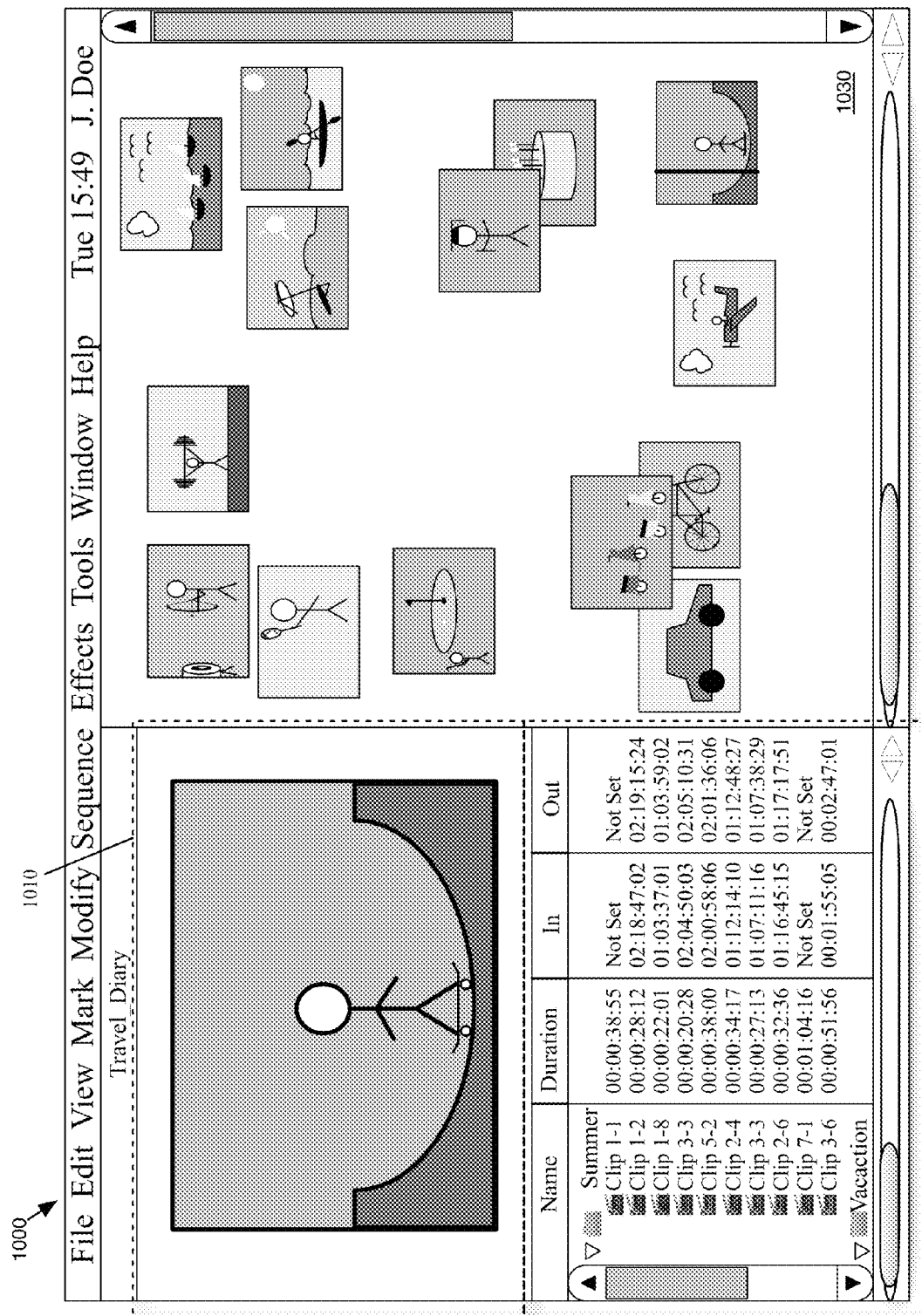
FIG. 10 illustrates an example GUI of a media-editing application of some embodiments.

As noted above, some embodiments provide a free-form display area as one of several workspaces through which the user organizes media clips, composite media clips, or both. FIG. 10 illustrates a GUI 1000 of a media-editing application of some embodiments that includes a free-form display area 1030 as one of several organizing spaces. As shown in FIG. 10, the GUI 1000 includes a viewing area 1010, a browser 1020, and the display area 1030. The viewing area 1010 is an area in the GUI 1000 for displaying playback of a media clip. For instance, a user can select a media clip in browser 1020 or in the display area 1030 and play back the selected media clip in the viewing area 1010. In some embodiments, the browser 1020 is the primary area for organizing media clips and sequences of media clips, and the display area 1030 is the secondary organizing area. In other embodiments, the display area 1030 is instead the primary area for organizing media clips and sequences of media clips, and the browser 1020 is the secondary organizing area.

The browser 1020 is an area in the GUI 1000 for organizing media clips. The user can create bins (or folders) in the browser to organize media clips in any way the user desires. Media clips can be added to the browser 1020 by selecting (e.g., by clicking on, tapping) a media clip from a media library, such as the one illustrated in FIG. 1, and placing (e.g., by performing a drag-and-drop operation) the media clip in one of the bins. In addition, the user can select and move (e.g., by performing a drag-and-drop operation) media clips in the browser 1020 from one bin to another bin in the browser 1020. The display area 1030 is an area in the GUI 1000 for visually organizing media clips as previously described. Thus, media clips can be added to the display area (e.g., by selecting them from a media browser), visually grouped together, and collapsed (i.e., minimized). Furthermore, media clips can be added from one organizing space to another. For instance, a media clip in the browser 1020 can be selected and moved (e.g., by performing a drag-and-drop operation) into the display area 1030. Similarly, a media clip in the display area 1030 can be selected and moved (e.g., by performing a drag-and-drop operation) into the browser 1020 (e.g., by performing a drag-and-drop operation on the media clip). As such, the viewing area 610 and the display area 1030 provide the user with two different organizing spaces of the GUI 1000 for organizing media clips differently.

D. Secondary Compositing Space

Figure 11:
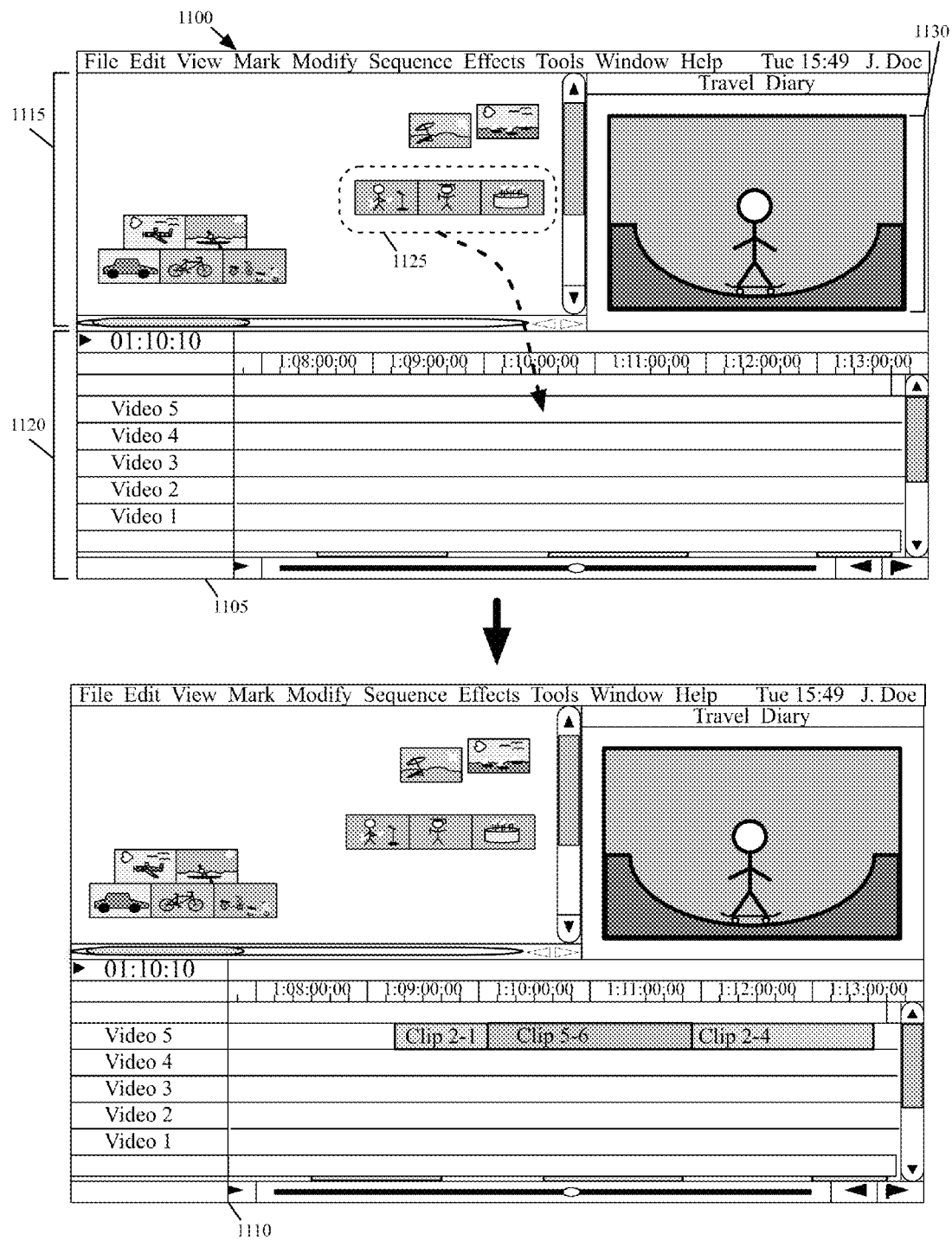
FIG. 11 illustrates an example GUI of a media-editing application at several stages that show adding a sequence of media clips to one area of the GUI from the other area of the GUI.

FIG. 11 illustrates a GUI 1100 of a media-editing application of some embodiments that includes a display area 1115 as one of several compositing spaces in the GUI 1100. As shown in FIG. 11, the GUI 1100 includes the display area 1115, a composite display area 1120, and a viewing area 1130. The viewing area 1130 is for displaying playback of media clips and sequences in the display area 1115 and the composite display area 1120. In some embodiments, the composite display area 1120 is the primary area for compositing media clips, and the display area 1115 is the secondary compositing area. In other embodiments, the display area 1115 is the primary area for compositing media clips rather than the composite display area 1120, and the composite display area 1120 is the secondary compositing area.

The composite display area 1120 includes multiple tracks that span a single timeline and displays a graphical representation of the composite presentation (also called a "composite representation") by displaying media clips (or sequences) that form the composite presentation. As such, the media clips in the composite display area 1120 have positional relationships among each other. Specifically, the media clips placed in these multiple tracks have temporal relationships relative to each other based on the single timeline. As mentioned above, a particular media clip is chronologically ordered before any media clips (or sequences) positioned to the right of the particular media clip in the composite presentation based on the timeline.

In the GUI 1100, the display area 1115 is an area like the display area 700 described above by reference to FIG. 7. The display area 1115 allows a user of the media-editing application to composite media clips by forming sequences with media clips. Since there is no timeline or formal tracks in the display area 1115, the sequences formed in the display area 1115 do not have any positional relationships with each other. In other words, the sequences displayed in the display area 1115 are disjointed and temporally unrelated. In some embodiments, the user can freely experiment with different compositing ideas in the display area 1115 and then bring the composited media clips into the composite display area 1120 to fine-tune the resulting composite presentation.

FIG. 11 illustrates the GUI 1100 at two different stages 1105 and 1110 of such an operation. The first stage 1105 shows the user selecting and moving (e.g., by performing a drag-and-drop operation) a sequence of media clips 1125 in the display area 1115 into the composite display area 1120, as indicated by a dotted arrow. The second stage 1110 shows the GUI 1100 after the sequence 1125 is moved into the composite display area 1120. In particular, the sequence 1125 is moved to video track 5 in the composite display area 1120. As shown, the three media clips included in the sequence 1125 are displayed in the composite display area 1120 in the same chronological order. Since the composite display area 1120 includes a timeline, the media clips in the composite display area 1120 are shown with different lengths, which represent the durations of the different media clips. As illustrated in this stage, moving the sequence 1125 from the display area 1115 to the composite display area 1120 does not remove the sequence 1125 from the display area 1115. In this manner, the user can fine-tune the composite presentation and continue to experiment with the sequence 1125 in the display area 1115. In some embodiments, selecting and moving the sequence 1125 from the display area 1115 to the composite display area 1120 removes the sequence from the display area 1115.

Figure 12:
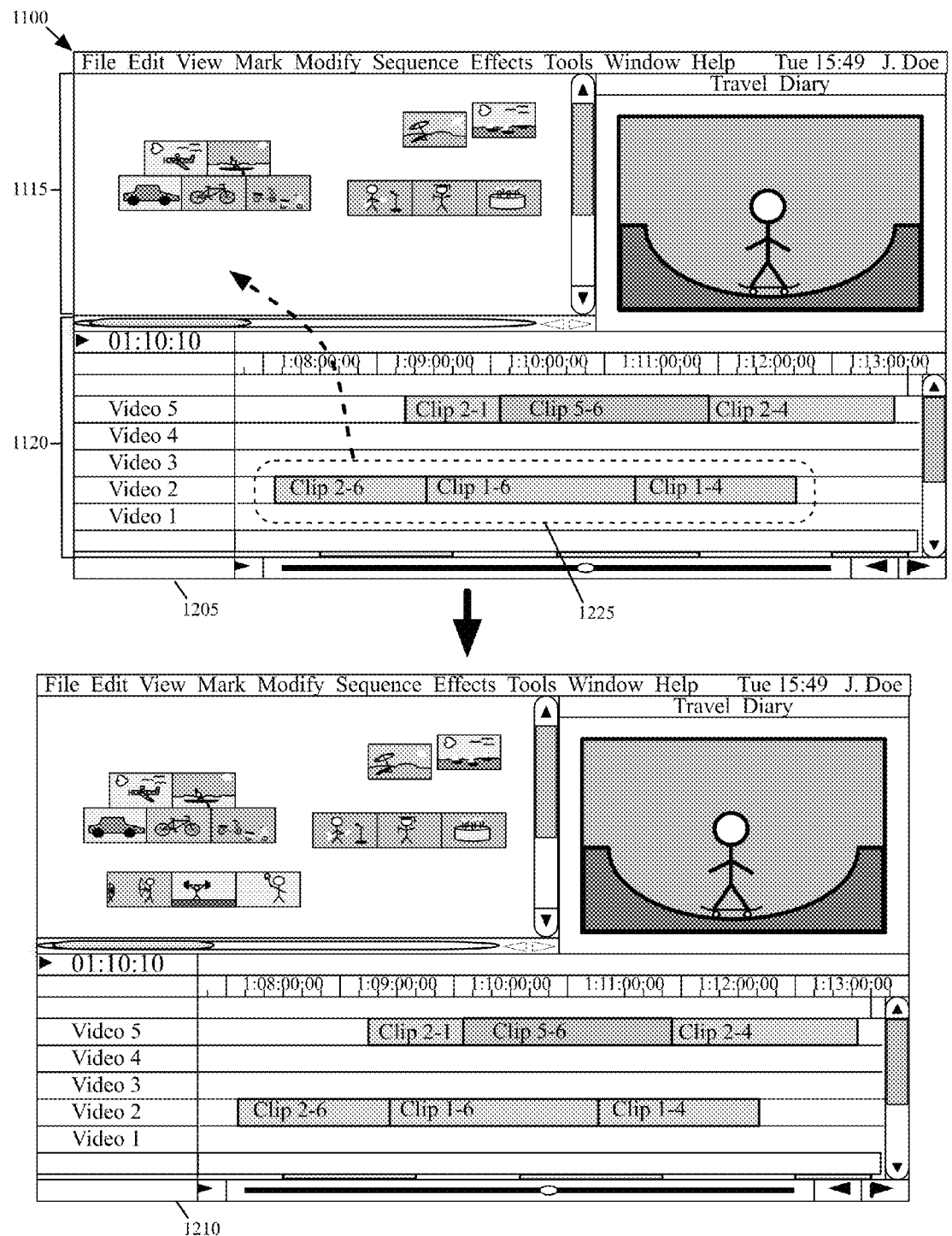
FIG. 12 illustrates an example GUI of a media-editing application at several stages that show adding a sequence of media clips to one area of the GUI from the other area of the GUI.

FIG. 12 conversely illustrates the user moving a sequence from a composite display area to a display area in order to make edits to the sequence in the display area. As shown, this figure illustrates a GUI 1100 at two different stages 1205 and 1210 of such operation. The composite display area 1120 displays an additional sequence 1225 in the composite presentation.

In the first stage 1205, the user selects and moves (e.g., by performing a drag-and-drop operation) a sequence 1225 from the composite display area 1120 to the display area 1115. The second stage 1210 illustrates the GUI 1100 after the sequence 1225 is moved to the display area 1115. In this stage, the three media clips included in the sequence 1225 are displayed in the display area 1115 in the same chronological order as shown in the first stage 1205.

In addition, the media clips and sequences of media clips area represented in the display area 1115 differently than in the composite display area 1120 in some embodiments, as shown in this figure. For instance, the media clips in the display area 1115, which are shown having different durations in the composite display area 1120, are shown with the same displayed length since media clips are represented by uniform-sized rectangles in the free-form display area of some embodiments (even if the media clips have different durations), as described above. On the other hand, the displayed lengths of the media clips in the composite display area 1120 are represented based on the duration of the media clips relative to the timeline. For example, the displayed length of a two-minute media clip will span two minutes along the timeline in the composite display area 1120.

This stage also shows that moving the sequence 1225 from the composite display area 1120 into the display area 1115 does not remove the sequence 1225 from the composite display area 1120. This way, the user can use both the display area 1115 to experiment with the sequence 1225 and the composite display area 1120 to fine-tune the composite presentation. Some embodiments, however, remove the sequence 1225 from the composite display area 1120 after the sequence 1225 is moved to the display area 1115.

E. Secondary Organizing and Compositing Space

Figure 13:
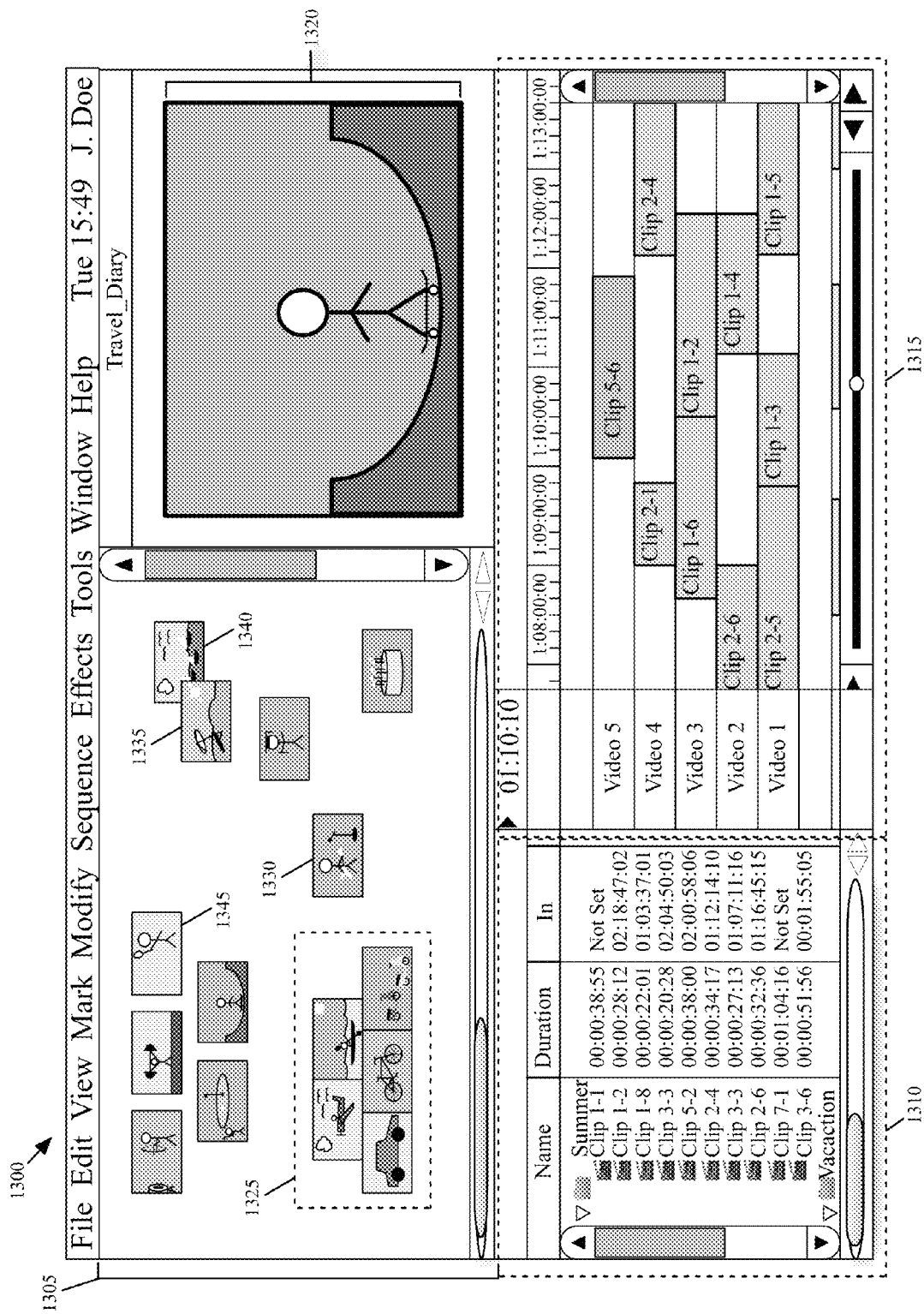
FIG. 13 illustrates an example GUI of a media-editing application of some embodiments.

FIG. 13 illustrates a GUI 1300 of a media-editing application of some embodiments that includes a display area 1305 as one of several organizing and compositing spaces in the GUI 1300. As shown, the GUI 1300 includes the display area 1305, a browser 1310 that is similar to the one illustrated in FIG. 11, a composite display area 1315 similar to the one illustrated in FIG. 12, and a viewing area 1320. The viewing area 1320 is for displaying playback of media clips and sequences in the display area 1305, the browser 1310, and the composite display area 1315.

The browser 1310 is similar to the browser 1020 described above by reference to FIG. 10, except the browser 1310 includes additional features. For instance, media clips in the browser can be selected and moved (e.g., by performing a drag-and-drop operation) into the composite display 1315 to be part of a composite presentation. The composite display 1315 is similar to the composite display area 1120 described above by reference to FIG. 11, except the composite display 1315 includes additional features. For example, media clips in the composite display 1315 can be selected and moved (e.g., by performing a drag-and-drop operation) into the browser 1310.

The display area 1305 includes the features and functionalities of the display area 1030 described above by reference to FIG. 10 and the features and functionalities of the display area 1115 described above by reference to FIGS. 11. Thus, the GUI 1300 allows the user to use the browser 1310 and display area 1305 to organize media clips and the display area 1305 and the composite display 1315 to composite media clips.

Similar to many of the display areas described above, the display area 1305 is, in some embodiments, a separate display area (e.g., a window) in a GUI of a media-editing application that allows items in the display area to be placed at any location within the entire display area when the user visually organizes and composites items (e.g., media clips and sequences) in the display area. In some embodiments, the display area 1305 is a two dimensional, bounded, and contiguous space in which items can be placed at any location. Some embodiments define the display area 1305 to not include any partitions that divide the display area into smaller partitions. In some embodiments, items cannot be placed between (straddle) multiple partitions in a display area that includes partitions. In some embodiments, a display area does not encompass two or more other display areas that have boundaries within the display area.

Moreover, one of ordinary skill will recognize that the display area 1305 of some embodiments could include typical display area functions. For instance, the display area 1305 of some embodiments includes user selectable UI items for closing, minimizing, and maximizing the display area (not shown). In addition, display areas can be resized, hidden, restored, and moved. While many features of a display area are described above, other embodiments of the display area include additional features, different features, or a combination of features. Referring to FIG. 13, the display area 1305, the browser 1310, the composite display 1315, and the viewing area 1320 are examples of different and separate display areas of the GUI 1300.

Like the free-form display areas described above, such as 170, 700, 900, etc., items (e.g., media clips and sequences) in a free-form display area of some embodiments do not necessarily have any defined relationship among each other. FIG. 13 illustrates examples of such unrelated items. Specifically, the figure shows multiple items, which do not have any defined relationship among each other, concurrently displayed in a free-form display area (i.e., display area 1305). For instance, sequence 1325 does not have any defined relationship with the other media clips in the display area 1305, such as media clip 1330, 1335, 1340, and 1345 among other media clips in the display area 1305. Accordingly, the display area 1305 of some embodiments allows multiple items that do not have any defined relationship among them to be concurrently displayed in the display area 1305. Furthermore, the display area 1305 of some such embodiments also allows unrelated items displayed in the display area 1305 to be concurrently placed at locations in the display area 1305 such that the unrelated items share a common area in the display area 1305. One such example is illustrated by the placement of the media clips 1335 and 1340. As shown, the upper right corner of the media clip 1335 and the lower left corner of the media clip 1340 share a common area (i.e., they overlap) in the display area 1305.

Having described a display area that has several attributes that enables a user of a media-editing application to visually organize and composite media clips, the following Section II will now describe in detail some operations that the user can perform using the display area in order to visually organize media clips.

II. Organizing and Viewing in Display Area

Several operations that a user of a media-editing application can perform to organize and play back media clips are described below. Examples of these operations include moving, piling, collapsing, skimming, and playing back media clips in a display area of some embodiments of the invention.

A. Moving Media Clips

Figure 14:
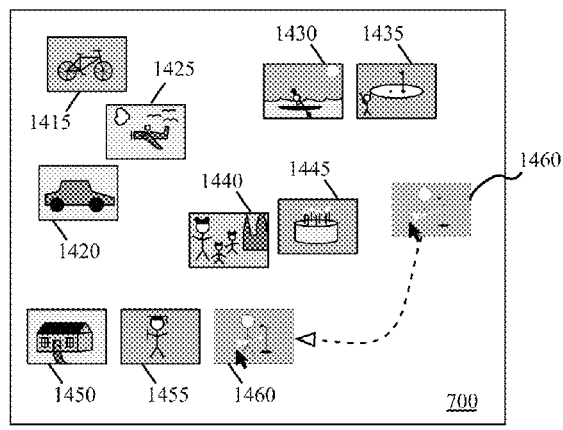
FIG. 14 illustrates an example GUI that shows moving a media clip in some embodiments.

FIG. 14 illustrates an example of moving media clips in a free-form display area 700 of some embodiments. Specifically, FIG. 14 illustrates the moving of a media clip to organize it in the display area 700. As shown, the display area 700 displays media clips 1415-1460. Before the media clip 1460 was moved, it was visually grouped by itself, as illustrated by a dotted rectangle that indicates the previous position of the media clip 1460. The media clip 1460 is selected and moved (e.g., by performing a drag-and-drop operation) next to the media clip 1455, as indicated by the dotted arrow, to visually group it with the media clips 1450 and 1455.

The display area 700 of some embodiments allows the user to visually group media clips together. As shown, the media clips 1415-1460 are visually grouped into several groups. Specifically, the media clips 1415-1425, 1430-1435, 1440-1445, and 1450-1460 are visually grouped together. As shown, media clips can be visually grouped in any number of different ways. For instance, the media clips 1415-1425 are positioned together vertically, but they are not vertically aligned. Similarly, the media clip 1440 and 1445 are positioned together horizontally, but they are not horizontally aligned. Further, the media clips 1430-1435 and 1450-1460 are positioned together in a horizontally-aligned manner. Although the media clips 1415-1460 are positioned separately (i.e., they do not overlap each other), the media clips 1415-1460 can be positioned to overlap each other. By allowing the user to visually group media clips in the display area 700, the user can organize media clips in the display area 700 in a visually meaningful way to the user.

Figure 15:
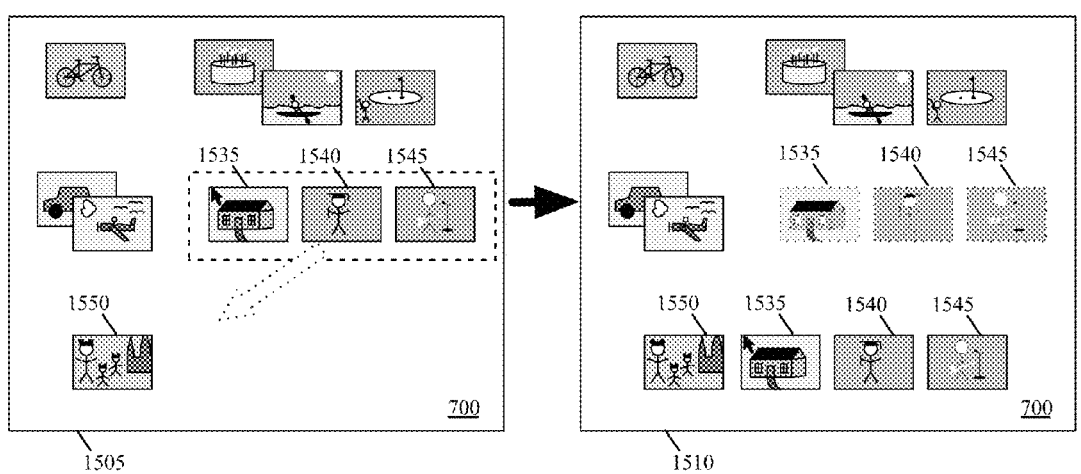
FIG. 15 illustrates an example GUI that shows moving several media clips in some embodiments.

Some embodiments allow the user to visually organize sequences of media clips by moving multiple media clips at once. FIG. 15 illustrates another example of moving media clips in a free-form display area 1500 of some embodiments. This figure illustrates the movement of multiple media clips in the display area 1500 in two different stages 1505 and 1510. As shown, the display area 1500 displays media clips 1535-1550 and other media clips. The display area 1500 is similar to the free-form display area 700 described above by reference to FIG. 7.

In the first stage 1505, the user selects the media clips 1535-1545, which is indicated by the dotted rectangle surrounding the media clips, and moves the selected media clips down and to the left within the display area 1500, which is indicated by the dotted hollow arrow. Different embodiments provide different methods for the user to select multiple media clips. In some embodiments, the media clips are individually selected (e.g., clicking on, tapping) while holding down a keyboard key or a hotkey. In some embodiments, the media clips are selected using a cursor-controlled device (e.g., a mouse, a trackball, a trackpad) to draw a selection box around the media clips (not shown). The user then performs a drag-and-drop operation on the selected media clips in order to place the selected media clips in a desired location within the display area.

The second stage 1510 illustrates the user moving the selected media clips to a new location within the display area 1500 next to the media clip 1550. The user in this example moves the selected media clips next to the media clip 1550 to create a visual grouping of media clips 1535-1550. The dotted rectangles indicate the previous locations of the media clips 1535-1545.

B. Piling Media Clips

Figure 16:
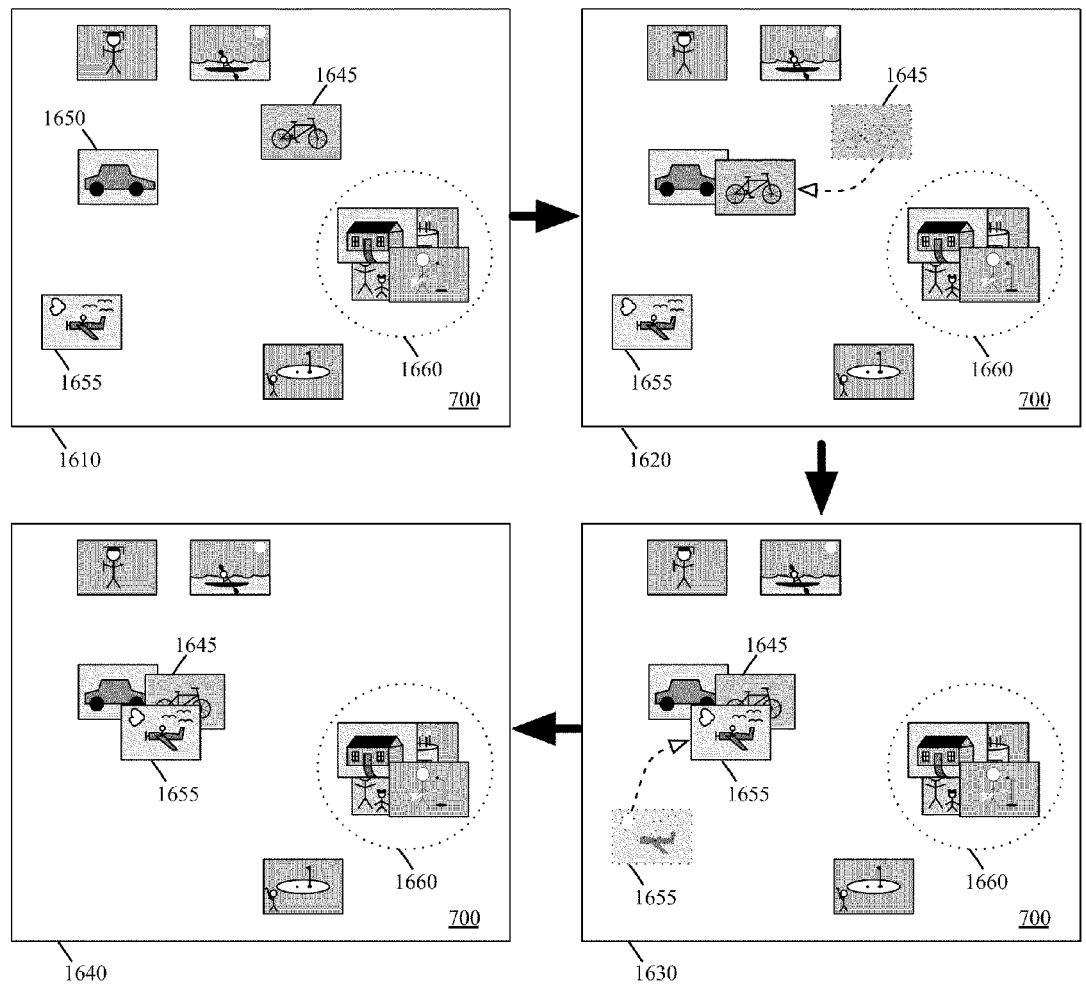
FIG. 16 illustrates an example GUI at several stages that show piling media clips in some embodiments.

Another way to organize media clips in a free-form display area of some embodiments is to pile the media clips together. FIG. 16 illustrates an example of the piling of media clips together in a free-form display area 700 of some embodiments. Specifically, this figure illustrates the piling of media clips together in the display area 700 at four different stages 1610-1640. As shown, the display area 700 displays a pile of media clips 1660 that includes four media clips, media clips 1645-1655, and other media clips.

The display area 700 allows the user to pile media clips together in order to create visual groupings and/or formal groupings. For example, the pile of media clips 1660 is a pile of media clips already created by the user. By creating the pile of media clips 1660, some embodiments automatically create a corresponding logical structure (e.g., a bin or a folder) that includes the media clips included in the pile of media clips 1660 while other embodiments do not create a corresponding logical structure (i.e., the pile of media clips 1660 is only a visual grouping).

The first stage 1610 shows the display area 700 before a piling of media clips operation. At the second stage 1620, the user selects the media clip 1645 and piles it on top of the media clip 1650 (e.g., by performing a drag-and-drop operation) similar to the selection and movement of the media clip 1460. As shown, the media clip 1645 is now piled on top of the media clip 1650. At this stage a pile of media clips 1645 and 1650 is created.

In the third stage 1630, the user selects the media clip 1655 and piles it on top of the media clips 1645 and 1650 (e.g., by performing a drag-and-drop operation) also similar to the selection and movement of the media clip 1460. This stage shows the media clip 1655 added to the pile of media clips 1645 and 1650 in the second stage 1620. The fourth stage 1640 shows the display area 700 after the piling operations illustrated in the second and third stages 1620 and 1630.

As shown in FIG. 16, the user can create a pile of media clips in order to create a visual grouping and/or formal grouping of the three media clips. Moreover, the user can add media clips to the pile of media clips, add media clips to other piles of media clips (e.g., the pile of media clips 1660), remove media clips from piles of media clips, and even pile sequences, as described in further detail below by reference to FIG. 37. Accordingly, piling media clips together provides the user with another way to visually group and/or formally group media clips in a free-form display area.

C. Collapsing Media Clips

Figure 17:
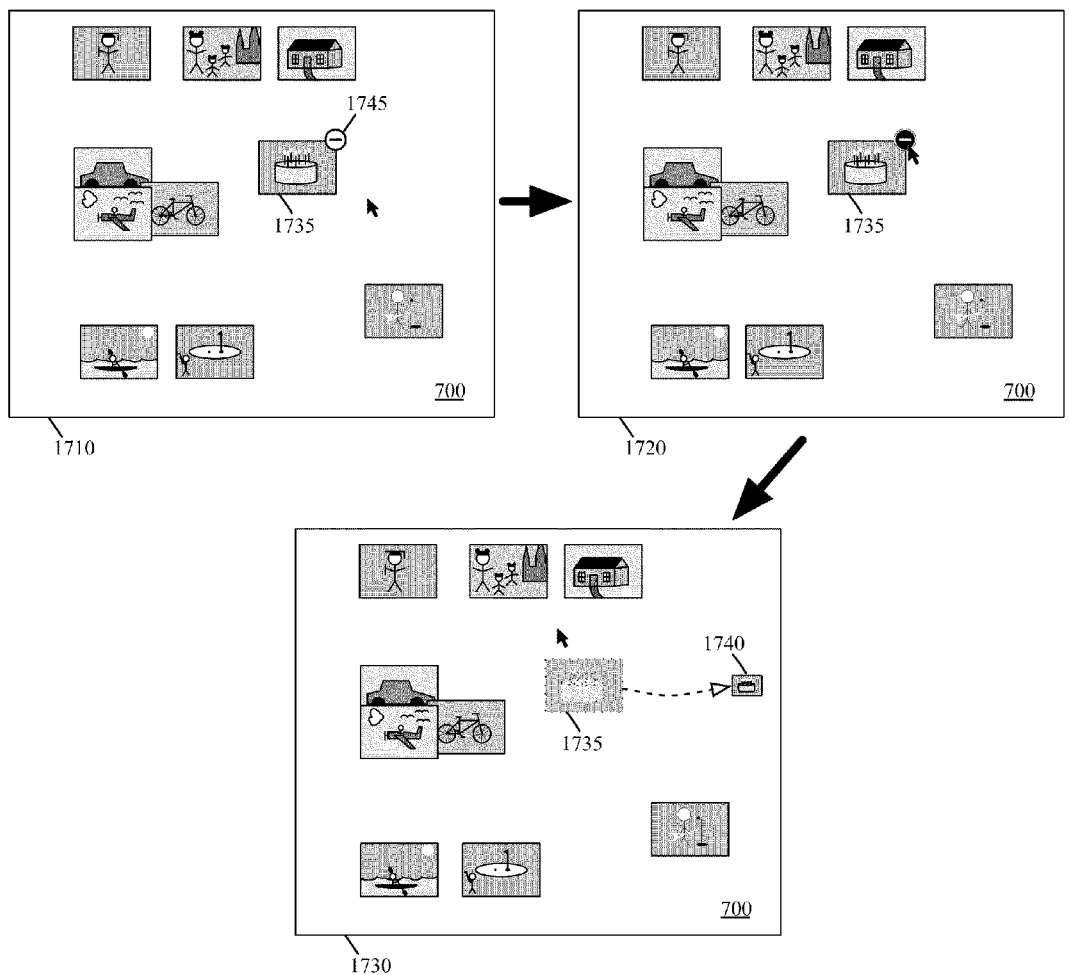
FIG. 17 illustrates an example GUI at several stages that show collapsing a media clip in some embodiments.

In some embodiments, the user is allow to collapse (or minimize) media clips in a free-form display area 700 of some embodiments. FIG. 17 illustrates an example of such collapsing operation of a media clip in the free-form display area 700 of some embodiments. This figure illustrates the display area 700 at three different stages 1710-1730 of the collapsing operation. As shown, the display area 700 displays media clip 1735 as well as other media clips.

The display area 1700 allows the user to minimize or collapse a media clip into a smaller display of the media clip or an icon in order to visually organize the media clips and/or reduce clutter in the display area 1700. In some embodiments, the collapsed media clips are automatically placed along the periphery of the display area 1700. Some such embodiments automatically place a collapsed media clip along the edge of the display area 1700 to which the media clip is closest when the media clip is collapsed. In other embodiments, a collapsed media clip is placed next to the position of the media clip before the media clip is actually collapsed. Alternatively, some embodiments allow the user to collapse a media clip by dragging the media clip and dropping it near one of the edges of the display area 1700. In these embodiments, when any part of media clip is placed within a threshold distance from an edge of the display area 1700 or in contact with the edge, the media clip collapses. Some such embodiments would require to disable any scrollbars that automatically scrolls the display area when a media clip or a cursor is placed near an edge of the display area.

Moreover, the user can select collapsed media clips to restore the media clips to their full size in some embodiments. In some such embodiments, moving a collapsed media clip away from the periphery of the display area causes the media clip to be restored to their full size.

The first stage 1710 illustrates the media clip 1735 that includes a selectable minimize item 1745. In some embodiments, the selectable minimize item 1745 is displayed on a media clip when a cursor (or any other type of position indicator) is within a threshold distance of the media clip 1735. In other embodiments, the selectable minimize item 1745 is displayed when the cursor moves over the media clip 1735. In yet other embodiments, the selectable minimize item 1745 is displayed only when the user selects (e.g., clicking on, tapping) the media clip 1735. Furthermore, different embodiments display the item 1745 at different locations. For instance, the item 1745 is displayed in the lower left corner of the media clip 1735 in some embodiments.

At the second stage 1720, the user moves the cursor over the selectable minimize item 1745 and selects (e.g., clicking on, tapping) the item 1745, as indicated by a highlighting of the item 1745. In some embodiments, the media clip 1735 is minimized by using a hotkey, a keystroke, a combination of keystrokes, an option selected from a pull-down or pop-up menu, or any other appropriate method. The third stage 1730 shows the media clip 1735 minimized into icon 1740 as a result of the selection of the selectable minimize item 1745 in the second stage 1720.

As described above, some embodiments allow the user to minimize media clips individually. Some embodiments also allow the user to minimize multiple media clips at once.

Figure 18:
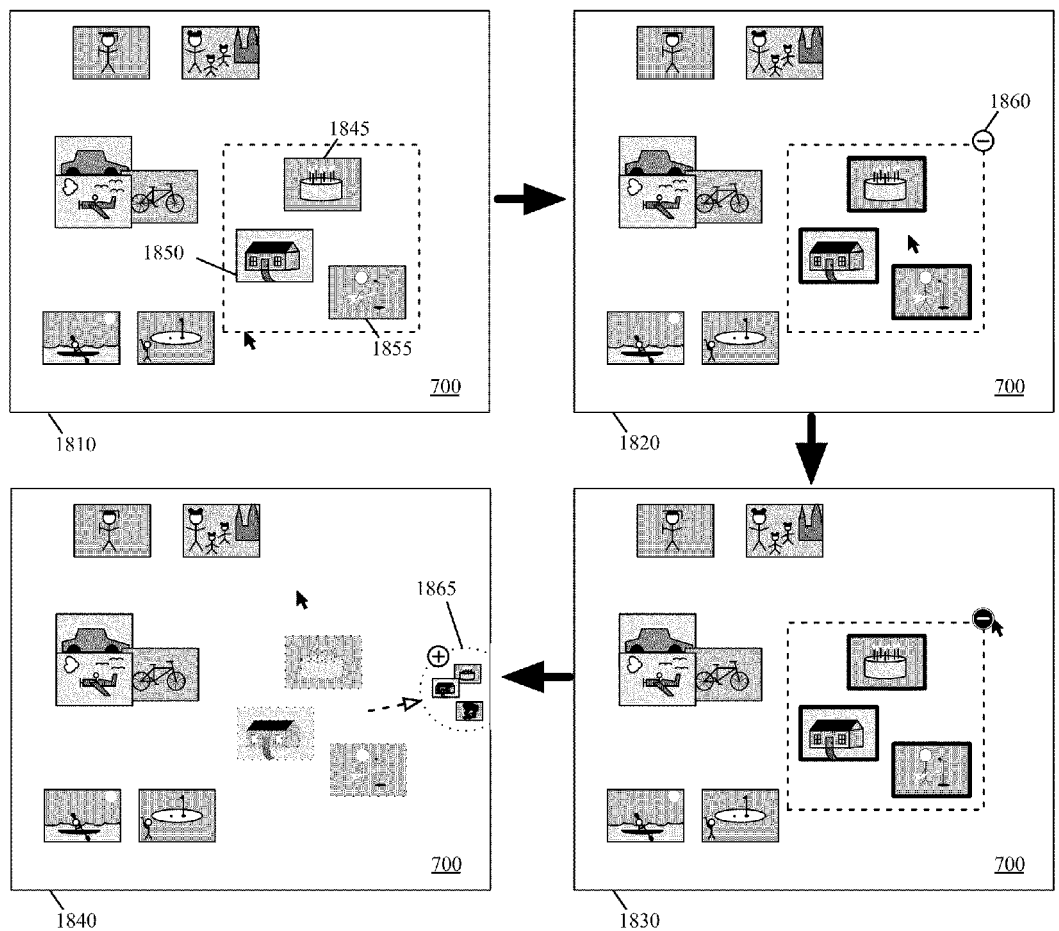
FIG. 18 illustrates an example GUI at several stages that show collapsing media clips in some embodiments.

FIG. 18 illustrates an example of a collapsing operation of a group of media clips in a free-form display area 700 of some embodiments. This figure illustrates the display area 700 at four different stages 1810-1840 of the collapsing operation. As shown, the display area 700 displays media clips 1845-1855 and other media clips.

The display area 700 allows the user to minimize or collapse a group of media clip into smaller displays of the media clips or icons. In some embodiments, collapsed groups of media clips are placed in a similar fashion as described above by reference to FIG. 17. In addition, the user can select collapsed groups of media clips to restore the media clips to their full size in some embodiments.

In the first stage 1810, the user selects the media clips 1845-1855 similar to the selection of the media clips 1535-1545. The selection is indicated by the dotted rectangle surrounding the three media clips. In some embodiments, the dotted rectangle remains displayed after the media clips are selected, as illustrated in this stage. The second stage 1820 illustrates a selectable minimize item 1860 displayed along the upper right corner of the dotted rectangle. Different embodiments display the item 1860 at different locations. For example, the item 1860 is displayed in the lower left corner of the dotted rectangle in some embodiments. The conditions that cause the minimize item 1860 to be displayed is similar to the conditions that cause the minimize item 1745 to be displayed.

In the third stage 1830, the user moves the cursor over the selectable minimize item 1860 and selects it, as indicated by the highlighting of the item 1860, similar to the selection of the item 1745. The fourth stage 1740 shows the group of the media clips 1835-1845 minimized into a group of icons 1865 and located on the right edge of the display area 700. As shown, a dotted circle is displayed around the group of icons 1865 and a selectable restore item 1870 is displayed near the top left portion of the dotted circle. The user can select the item 1870 to restore the group of icons 1865 to their full size.

D. Skimming Media Clips

Some embodiments allow a user to skim (or scrub) through a selected media clip in a free-form display area by dragging a playhead through the media clip. As the user drags the playhead across the media clip, the frame of the media clip that temporally corresponds to the location of the playhead in the media clip is displayed within the media clip. In addition, the user can skim media clips to identify a frame to represent the media clip (i.e., a poster frame) as described in further detail below by reference to FIG. 20.

In some embodiments, instead of selecting and dragging the playhead through the media clip, the user can skim a media clip simply by moving a cursor over the media clip without selecting the media clip. In such embodiments, the playhead is positioned at the location in the media clip where the cursor is placed.

Figure 19:
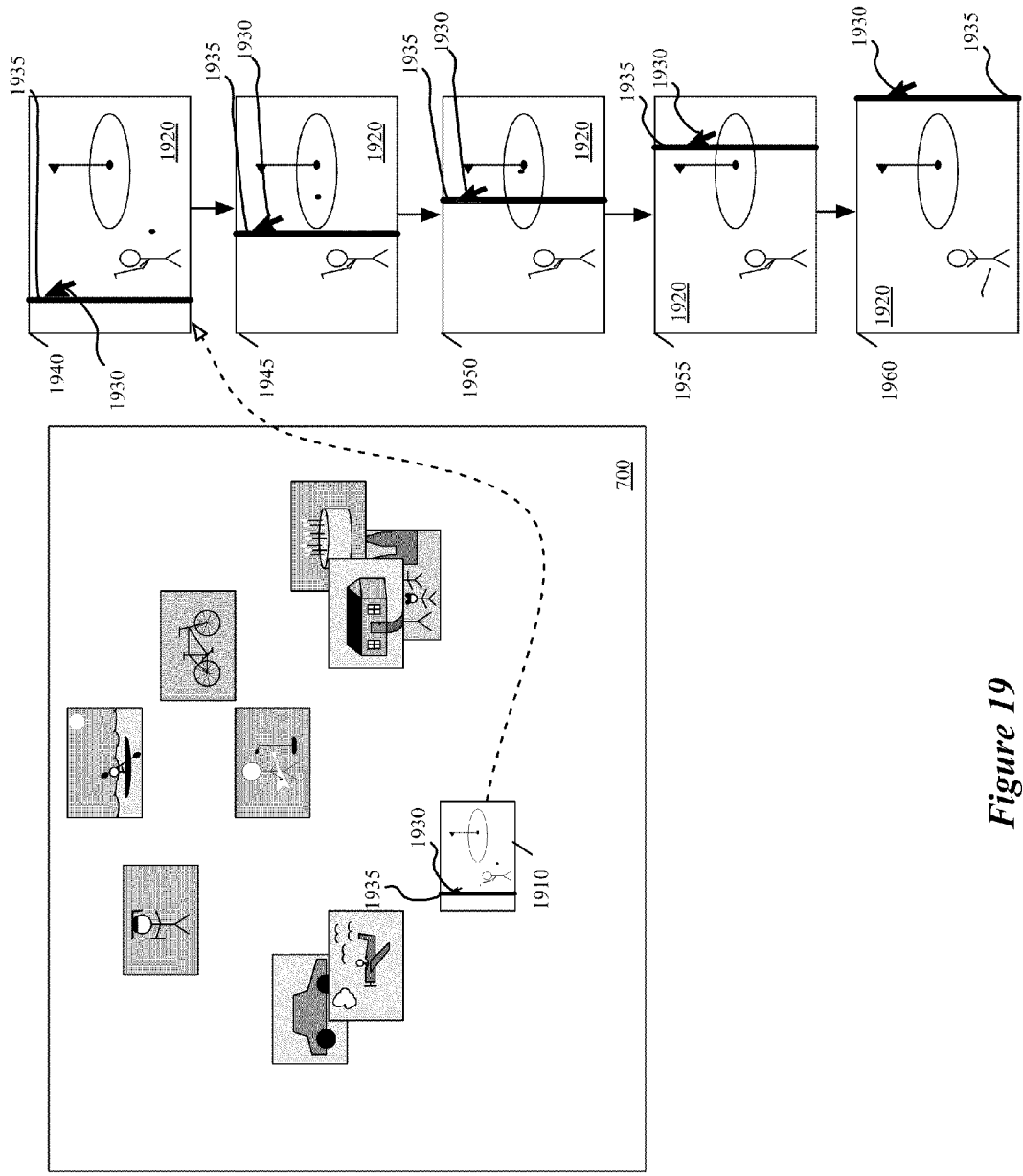
FIG. 19 illustrates an example GUI that shows skimming a media clip in some embodiments.

FIG. 19 illustrates an example of a skimming operation that may be performed on a media clip in a free-form display area 700 of some embodiments. As shown, the display area 700 displays a media clip 1910, other media clips, and a cursor 1930. The media clip 1910 includes a playhead 1935. FIG. 19 also illustrates the media clip 1910 at five different stages 1940-1960 of the skimming operation.

As mentioned, the user can skim a media clip by moving a cursor over the media clip without selecting the media clip. The example skimming operation will be described by reference to this method. At the first stage 1940, the user uses the cursor 1930 to move the playhead 1925 over the media clip 1910 at approximately one-sixth of the way through the media clip 1910. The frame of the media clip 1910 that represents the location of the playhead 1935 is displayed within the media clip 1910. The frame displays a person shortly after hitting a golf ball towards a hole on a green.

In the second stage 1945, the user uses the cursor 1930 to move the playhead 1935 further to the right at approximately halfway through the media clip 1910 and the frame of the media clip 1910 that represents the location of the playhead 1935 is displayed within the media clip 1910. The frame displayed in this stage shows the golf ball on the green. The third stage 1950 shows the media clip 1910 after the user uses the cursor 1930 to move the playhead 1935 to the frame that is a little past halfway through the media clip 1910. As shown, this frame shows the golf ball about to go in the hole on the green.

At the fourth stage 1955, the user uses the cursor 1930 to move the playhead 1935 at approximately five-sixths through the media clip 1910, and the frame of the media clip 1910 that represents the location of the playhead 1935 is displayed in the media clip 1910. This frame shows the person and green shortly after the ball rolled into the hole on the green. At the last stage 1960, the user uses the cursors 1930 to move the playhead 1935 near the last frame of the media clip 1910. This frame shows the person celebrating after the ball rolled in the hole on the green.

While skimming a media clip, some embodiments provide a method for the user to set a frame in the media clip as a representative frame of the media clip (also referred to as a poster frame or a representative thumbnail) in order to select a frame that better represents the contents of the media clip. In some embodiments, a representative frame of a media clip is a video frame (e.g., frame or field) of the media clip that is the visual representation of the media clip in the display area when the media clip is not played or skimmed. Some embodiments use the first frame of a media clip as the poster frame of the media clip while other embodiments use the middle frame of the media clip. Thus, different embodiments define the default poster frame of media clips differently.

Figure 20:
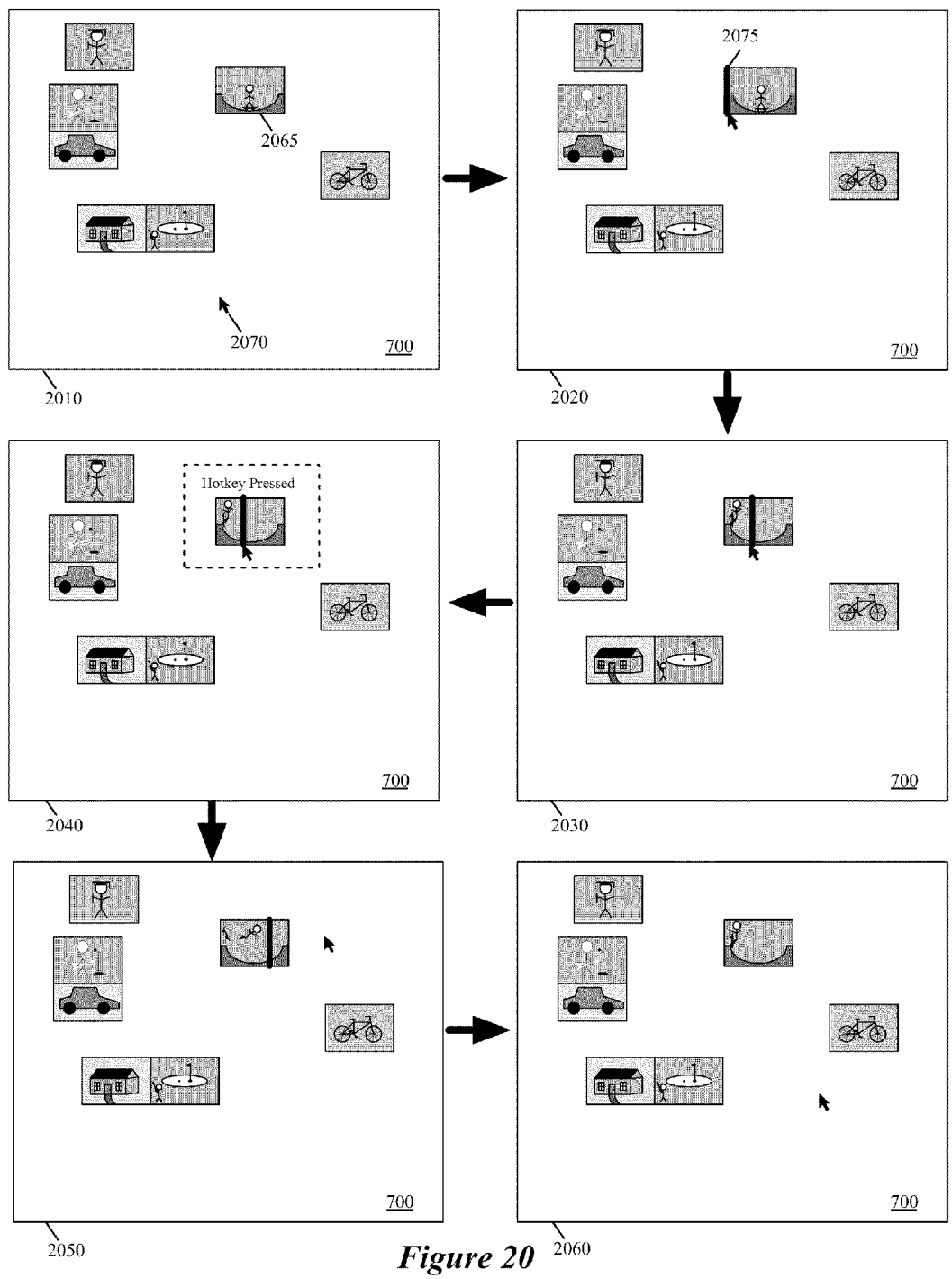
FIG. 20 illustrates an example GUI at several stages that show setting a representative frame of a media clip in some embodiments.

FIG. 20 illustrates an example of setting a frame of a media clip as a representative frame of the media clip in a free-form display area 700 of some embodiments. This figure illustrates the free-form display area 700 at six different stages 2010-2060 of the frame setting operation. As shown, the display area 700 displays a media clip 2065, other media clips, and a cursor 2070.

The first stage 2010 illustrates the display area 2000 before the start of the frame setting operation. At the second stage 2020, the user moves the cursor 2070 over the media clip 2065 and moves a playhead 2075 to a frame near the beginning of the media clip 2065 in a similar manner to the skimming operation described above by reference to FIG. 19. The frame shows a skateboarder at the bottom of a half-pipe. In the third stage 2030, the user continues to skim the media clip 2065 and moves the playhead 2075 to a frame at approximately two-fifths through the media clip 2065. This frame shows the skateboarder near the top of the left side of the half-pipe.

The fourth stage 2040 illustrates the user using a hotkey to set the frame in the third stage 2040, which shows the skateboarder near the top of the left side of the half-pipe, as the poster frame. Although this example shows the user using hotkey to set the poster frame, other embodiments use different methods, such as using a keystroke, a combination of keystrokes, an option selected from a pull-down or pop-up menu, or any other appropriate method. At the fifth stage 2050, the user uses the cursor 2070 to move the playhead 2075 to at approximately three-quarters through the media clip 2065. This frame shows the skateboarder in midair in the middle of a fall. At the last stage 2060, the user is no longer skimming the media clip 2065. As shown, the poster frame of the media clip 2065 is the frame set in the fourth stage 2040.

Figure 21:
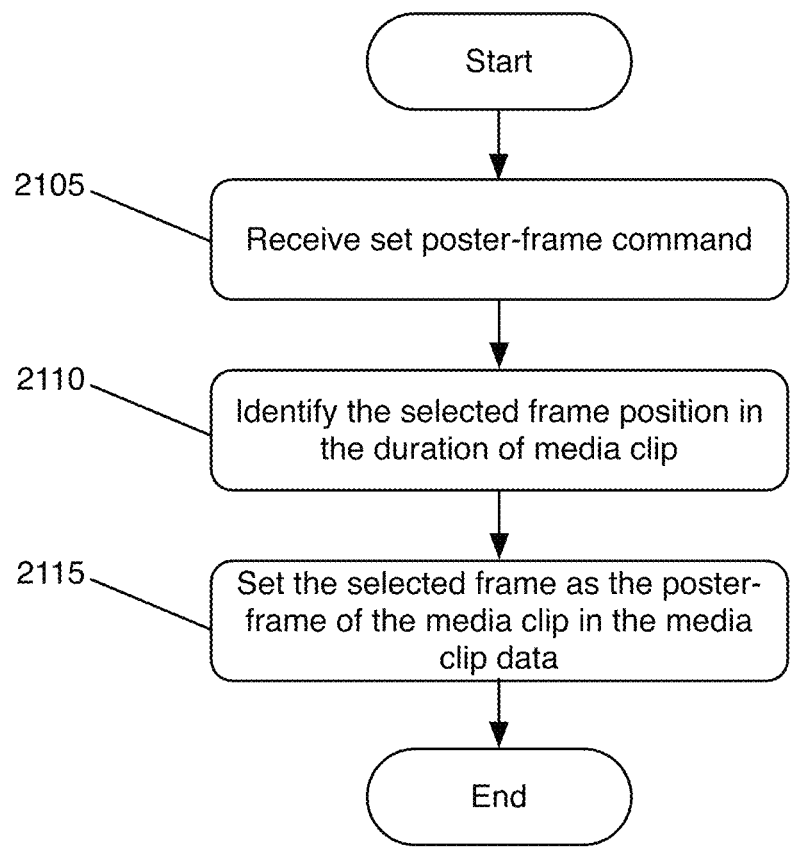
FIG. 21 illustrates an example of a conceptual process that some embodiments use to set a representative frame of a media clip.

FIG. 21 illustrates a process 2100 of some embodiments for setting a poster frame for a media clip. In some embodiments, the process 2100 is performed when the user inputs a command, such as the one illustrated in FIG. 20, while skimming a media clip (or playback of the media clip). The process 2100 starts by receiving (at 2105) a "set poster-frame" command. Different embodiments define different commands to set poster-frame of a media clip. For instance, some embodiments use a hotkey, a keystroke, a combination of keystrokes, an option selected from a pull-down or pop-up menu, or any other appropriate command.

Next, the process identifies (at 2110) the selected frame position in the media clip. In some embodiments, the position of the selected frame in the media clip is expressed as a timecode in the source file associated with the media clip. The process 2100 then sets (at 2115) the identified frame as the poster-frame of the media clip in the media clip data structure, such as the media clip data structure illustrated above in FIG. 8.

E. Playing Back Media Clips

Some embodiments allow a user to play back a media clip in a free-form display area. A playhead similar to the one displayed during a skimming operation moves across the media clip as it is being played back. In some embodiments, the playhead moves across the media clip at different speeds based on the duration of the media clip. For instance, if a first media clip is five minutes long and a second media clip is ten minutes long, the playhead on the first media clip moves across the media clip twice as fast in the display during playback as during playback of the second media clip. In some embodiments, a playhead is not displayed during playback of a media clip.

Figure 22:
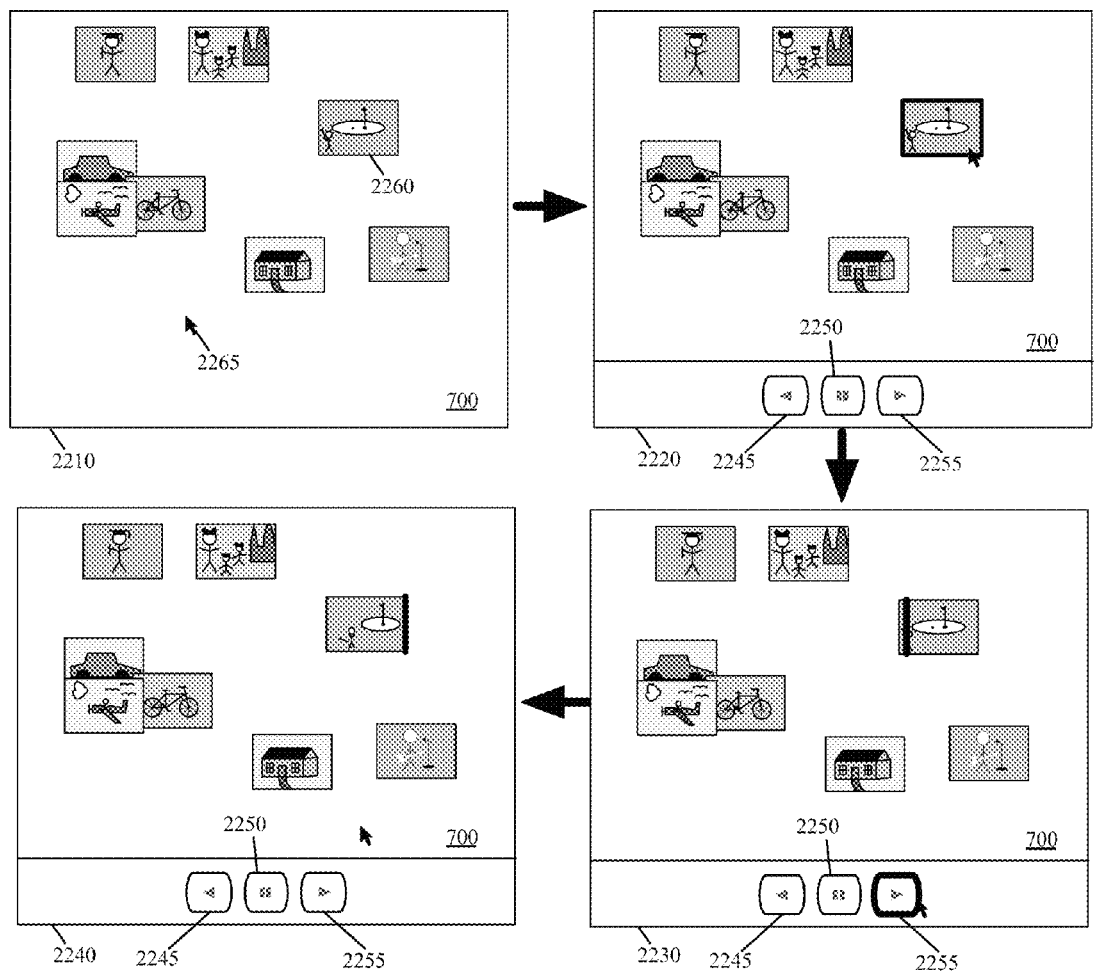
FIG. 22 illustrates an example GUI at several stages that show playing back a media clip in some embodiments.

FIG. 22 illustrates an example of a playback operation of a media clip in a free-form display area 700 of some embodiments. Specifically, FIG. 22 illustrates media clip 2230 at four different stages 2210-2240 of the playback operation. As shown, the display area 700 displays a media clip 2260, other media clips, and a cursor 2265. The first stage 2210 shows the display area 700 before the start of the playback operation.

At the second stage 2220, the user selects (e.g., by clicking on, tapping) the media clip 2260 using the cursor 2265. In some embodiments, a set of playback controls 2245-2255 are displayed when the user selects the media clip 2260. The set of playback controls is similar to the set of playback controls 245-255. That is, the selectable UI item 2245 is for backward playback, the selectable UI item 2250 is for pausing playback, and the selectable UI item 2255 is for forward playback. In some embodiments, selecting the UI item 2245 while a media clip is already playing backwards increases the speed of the backward playback. Conversely, selecting the UI item 2255 while a media clip is already playing forwards increases the speed of the forward playback in some embodiments. Further, the direction of playback can be changed by selecting the opposite playback button while a media clip is being played back in a particular direction.

At the third stage 2230, the user selects the UI item 2255 to play the media clip 2260 forward. Different embodiments implement playback control commands differently. For instance, hotkeys can be assigned to the playback control commands so that pressing a hotkey invokes the corresponding playback control command. Alternatively, a set of drop-down menu items may replace or be used in conjunction with the playback controls 2245-2255. In some embodiments, a playhead 2270 is displayed on the media clip 2260 when the media clip 2260 is played back (forward or backwards) to indicate the frame of the media clip that is being played back. In this stage, the playhead 2270 indicates a frame near the beginning of the media clip 2260 is being played. The fourth stage 2240 shows the display area 700 near the end of the playback of the media clip 2260, as indicated by the position of the playhead 2270 on the media clip 2260. In some embodiments, the set of playback controls 2245-2255 disappear after the playback of a media clip is finished.

Figure 23:
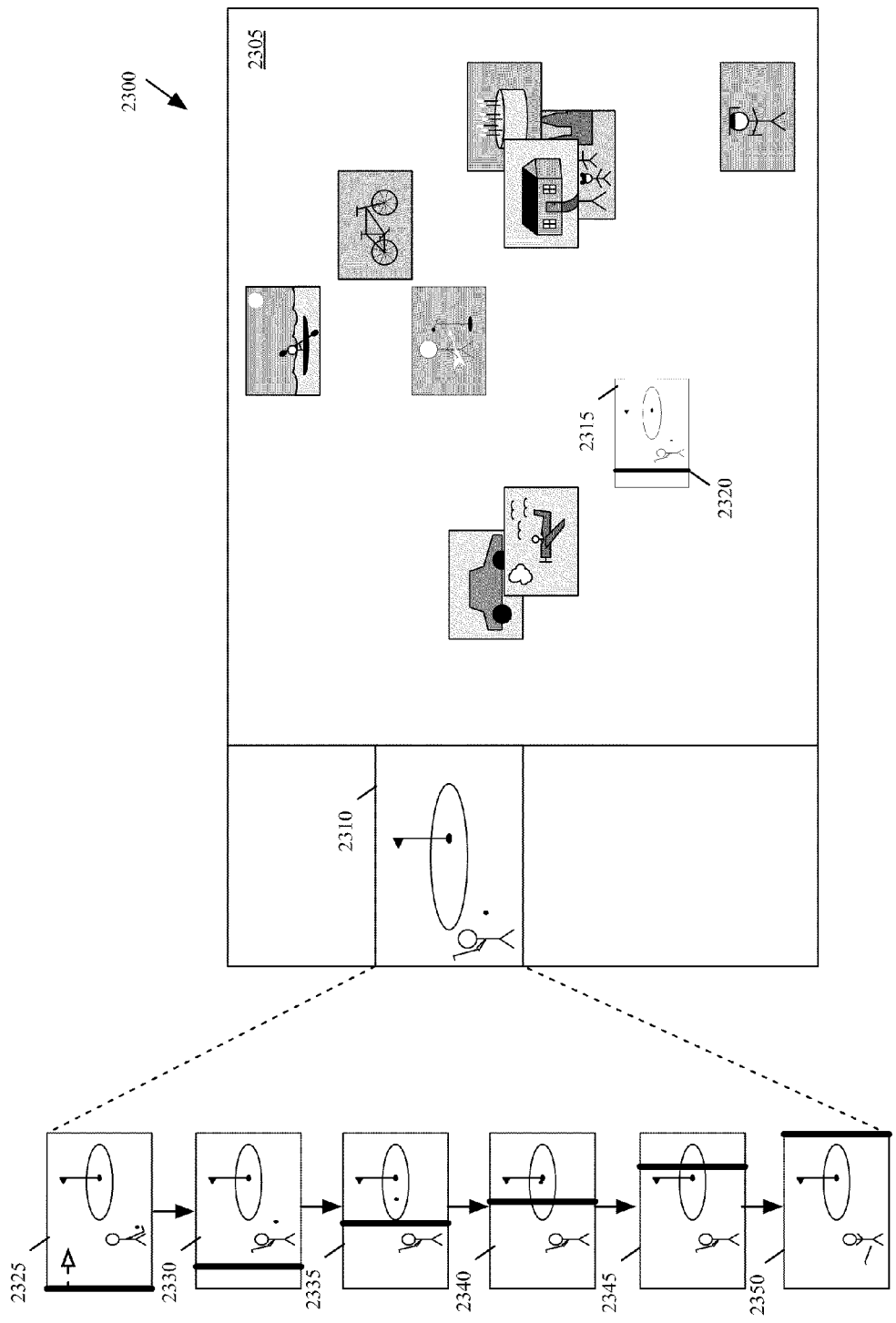
FIG. 23 illustrates an example GUI that show playing back a media clip in some embodiments.

FIG. 23 illustrates another example of a playback operation of a media clip in a free-form display area 2305 of a GUI 2300. As shown, the GUI 2300 includes the display area 2305 and a viewing area 2310. The viewing area 2310 is for displaying playback of a media clip in the display area 2305. The display area 2305 displays a media clip 2315 that includes a playhead 2320 as well as displaying other media clips. The display area 2300 is similar to the display area 700 described above by reference to FIG. 7. FIG. 23 also illustrates the media clip 2320 at six different stages 2325-2350 of the playback operation.

The first stage 2325 shows the media clip 2315 at the start of the forward playback of the media clip 2315. As mentioned above, different embodiments implement playback controls, such as hotkeys, keystrokes, combinations of keystrokes, selections from a pull-down or pop-up menu, or any other appropriate method. The second through sixth stages 2330-2350 illustrate the progress of the playback of the media clip 2315, which is indicated at each stage by the position of the playhead 2320 on the media clip 2315. In some embodiments, the playback of the media clip 2315 is only displayed within the media clip 2315 while in other embodiments the playback of the media clip 2315 is only displayed in the viewing area 2310. In yet other embodiments, the playback of the media clip 2315 is displayed in both.

Figure 24:
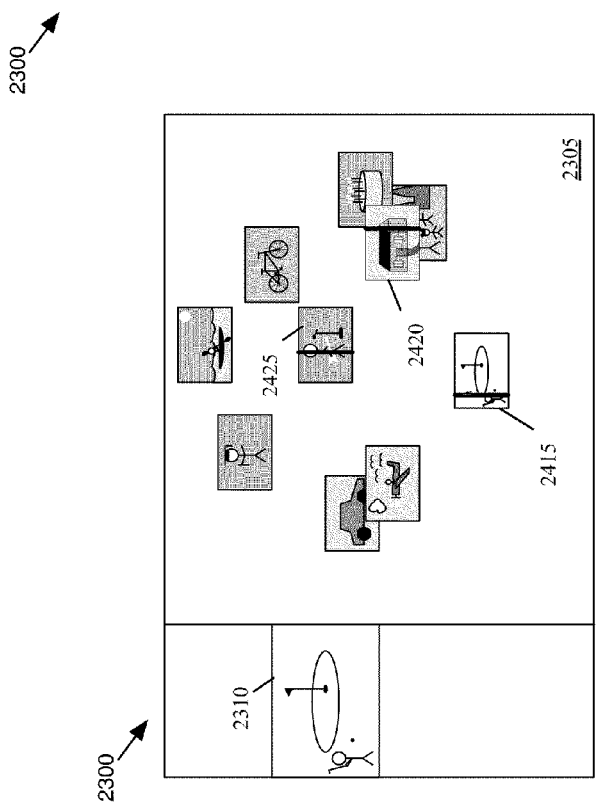
FIG. 24 illustrates an example GUI that shows playing back and skimming several media clips in some embodiments.

FIGS. 22 and 23 both illustrate the playback of one media clip. Some embodiments also allow the user to simultaneously playback and skim multiple media clips. FIG. 24 illustrates an example of simultaneous playback and skimming of multiple media clips in a free-form display area 2305 of a GUI 2300. The display area 2310 displays media clips 2415-2425 and other media clips.

As shown in FIG. 24, the media clips 2420 and 2425 are playing back and the media clip 2415 is being skimmed by the user. To start the playback of the media clips 2420 and 2425, the user successively selects and invokes a command to start playback of the media clips 2420 and 2425 similar to the way playback is started for media clip 2315. After the playback is started for the media clips 2420 and 2425, the user skims the media clip 2415 similar to the skimming of 1910 while the media clips 2420 and 2425 are still playing back.

In some embodiments, the viewing area 2310 displays the playback or skimming of the media clip that the user most recently started or skimmed. In this example, since the user is still skimming the media clip 2415, the frame being skimmed by the user is displayed in the viewing area 2310. If a media clip is not being skimmed, playback of the most recently started media clip is displayed in the viewing area 2310.

Figure 25:
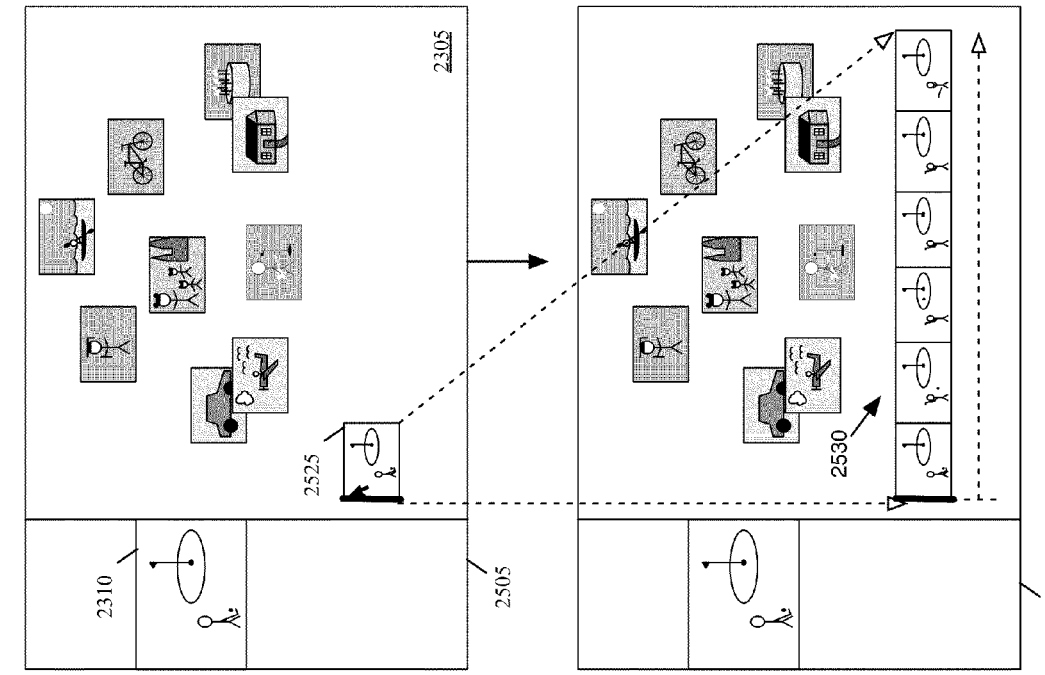
FIG. 25 illustrates an example GUI at several stages that show expanding a media clip into a filmstrip in some embodiments.

FIG. 25 illustrates an example of expanding a media clip into a filmstrip in a free-form display area 2305 of a GUI 2300. As shown, the display area 2305 displays a media clip 2525 as well as other media clips.

The display area 2305 also allows the user to expand a media clip into a filmstrip. As mentioned above, the media clips in the display area are represented as uniformly-sized rectangles in some embodiments. A filmstrip is another way to represent media content of a media clip. In some embodiments, a filmstrip is displayed in the display area as a series of horizontally concatenated rectangles each of which displays a frame of the media clip. The number of rectangles in a filmstrip displayed in the display area is pre-determined in some embodiments. In such embodiments, the media content of the media clip is divided into the pre-determined number of segments and each segment is represented by a rectangle in a filmstrip. As such, a filmstrip effectively is a series of chronologically ordered sub-clips of one media clip.

When the user is skimming or marking a region of interest of a media clip represented as a filmstrip, because the media content of the media clip is represented by a longer length of the filmstrip, the user is able to locate a frame more precisely than the user is able to when the media clip is represented as a single-rectangle. When not being skimmed or played back, the filmstrip displays the poster-frame of each segment in each rectangle in some embodiments. In addition, a filmstrip is skimmed and played back in the same manner as a media clip represented as a single rectangle in some embodiments. Also, a region of interest of a media clip can be marked on a filmstrip in the same manner as a media clip represented as a single rectangle is marked. Once the user is done viewing, the user may choose to restore the media clip back to its original single-rectangle representation.

FIG. 25 illustrates the GUI 2300 at two different stages 2505 and 2510 of the filmstrip operation. At the first stage 2505 of the GUI 2300, the user invokes a command to expand the media clip 2525 into a filmstrip. In some embodiments, the user invokes the command by performing any one of the following operations: a double-click operation on the media clip 2535, a keystroke, a combination of keystrokes, and an option selection from a pull-down or pop-up menu. Other embodiments do not allow all of these operations and only allow a subset of these operations to perform to invoke the command. Yet other embodiments provide other appropriate operations to perform to invoke the command.

The second stage 2510 of the GUI 2300 shows the media clip 2525 expanded into a filmstrip 2530. In this example, a filmstrip is defined to have six segments. As such, the display area 2305 displays the six segments of the media clip 2525 as six rectangles that each display a poster-frame of the corresponding segments.

Figure 26:
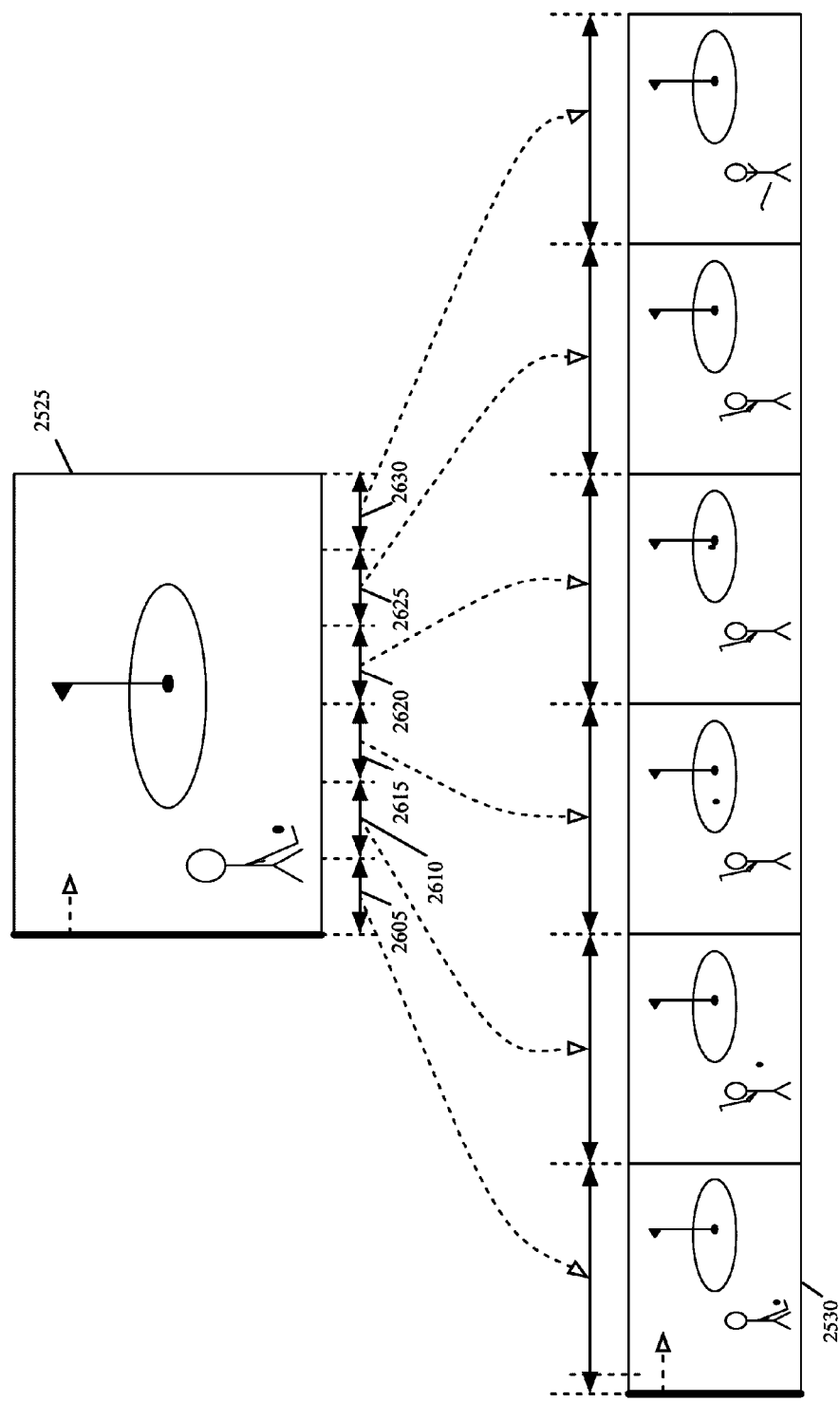
FIG. 26 illustrates an example media clip at several stages that show expanding the media clip into a filmstrip in some embodiments.

FIG. 26 illustrates the media clip 2525 and its filmstrip 2530 in greater detail. The displayed length of the media clip 2525 represents the duration of the media clip 2525, which is six seconds in this example. Six bi-directional arrows 2605-2630 that together span the displayed length of the media clip 2525 each represent one second of the media clip. When represented as the filmstrip 2530, each of the six one-second segments of the media clip 2525 is represented by a rectangle in the filmstrip 2530. As such, the duration of each rectangle in the filmstrip 2530 is one second.

Figure 27:
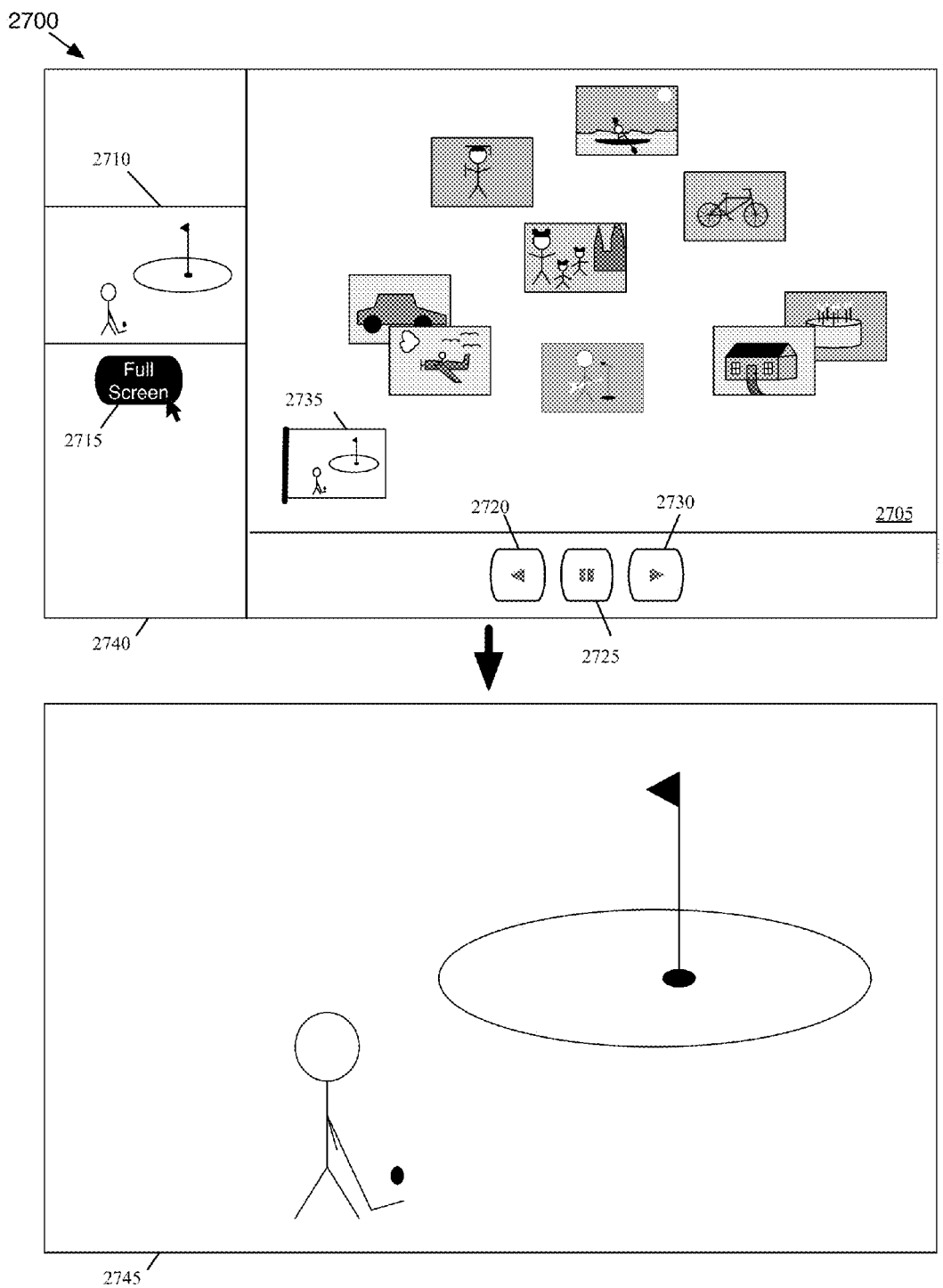
FIG. 27 illustrates an example GUI at several stages that show playing back a media clip.

FIG. 27 illustrates an example of a playback operation of a media clip in a full screen mode in a free-form display area 2705 of a GUI 2700. As shown, the GUI 2700 includes a viewing area 2710, a set of playback controls 2720-2730, and the display area 2705. The viewing area 2710 is similar to the viewing area 2300 and the set of playback controls 2720-2730 is similar to the set of playback controls 245-255. The display area 2705 displays a media clip 2735 and other media clips as well. The display area 2705 is similar to the display area 2305 described above by reference to FIG. 23.

The display area 2705 also allows the user to playback a media clip in the display area in a full screen mode. In the full screen mode, the media clip being played back is displayed over the entire GUI 2700 in some embodiments. Other embodiments play back a media clip over the entire display area 2705 in the full screen mode. In yet other embodiments, playback of a media clip in the full screen mode displays the media clip over the entire screen (not shown) or display area of the device on which a media-editing application that provides the display area 2705 executes.

In some embodiments, the user can switch the playback of a media clip to a full screen mode by invoking a command, such as using a hotkey, a keystroke, a combination of keystrokes, an option selection from a pull-down or pop-up menu, or any other appropriate method. Some embodiments allow the media clip to be played back in full screen mode before or after the media clip has already begun playback in the display area. Other embodiments only allow playback of a media clip in the full screen mode if the command is invoked before the playback of the media clip starts. Yet other embodiments only allow playback of a media clip in the full screen mode after the playback of the media clip starts. In some such embodiments, the poster frame of the selected media clip is displayed in full screen mode before playback begins. In some embodiments, a playhead does not appear in the full screen mode.

FIG. 27 illustrates the GUI 2700 at two different stages 2740 and 2745 of the full screen mode playback operation. At the first stage 2740, the user selects the media clip 2735 and then selects the selectable full screen item 2715. The user then selects the selectable forward play item 2730 to start playback of the selected media clip 2735. The second stage 2745 shows the GUI 2700 after playback of the media clip 2735 in full screen mode starts. As shown, the playback of the media clip 2735 is displayed over the entire GUI 2700.

Having described several operations that a user of a media-editing application can perform to organize and play back media clips in a display area, the following Section III will now describe in detail some operations that the user can perform to composite media clips in the display area.

III. Compositing and Viewing in Display Area

The above sections describe the use of the free-form display area for viewing and organizing media clips. In addition to these organizing operations, some embodiments provide the functionality for a user to composite media clips in the free-form display area in order to create a media presentation. A user can create sequences of media clips within the display area in some embodiments by concatenating a first media clip to a second media clip. As mentioned above, a sequence of media clips is a group of media clips associated in a particular chronological order.

A. Concatenating Clips to Form a Sequence

Figure 28:
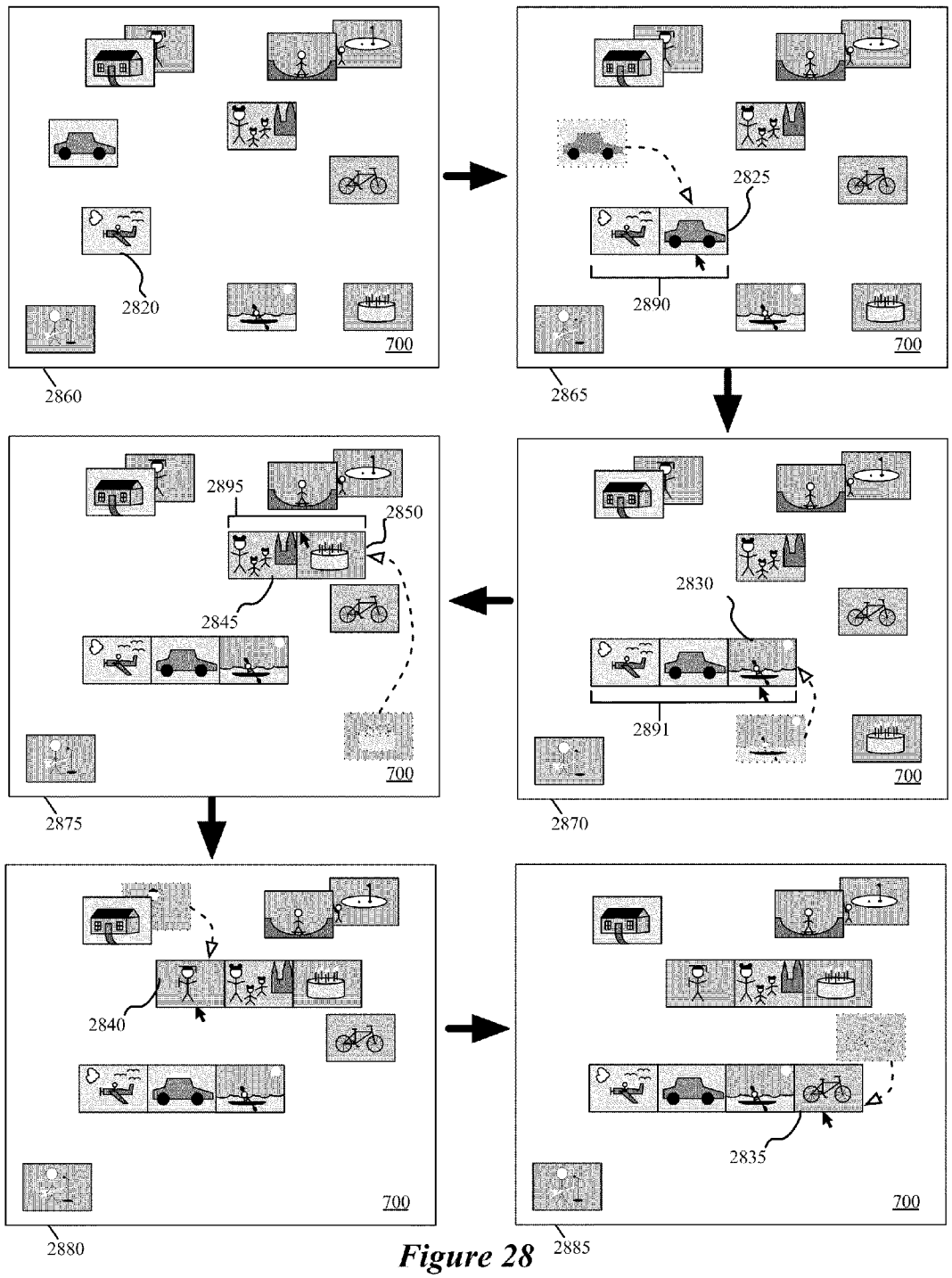
FIG. 28 illustrates an example GUI at several stages that show compositing media clips in some embodiments.

For some embodiments of the invention, FIG. 28 illustrates an example of the creation of sequences of media clips in a free-form display area 700. Specifically, FIG. 28 illustrates the creation of two sequences of media clips in the display area 700 by concatenating the media clips over six stages 2860-2885. At each of the above stages, a media clip is concatenated to one of the sequences. As shown, the display area 700 displays media clips 2820-2850 as well as other media clips.

The display area 700 also allows the user to create sequences of media clips by concatenating multiple media clips horizontally. At the first stage 2860, the media clips 2820-2850 are all displayed individually, as no clips are associated with any other clips. The second stage 2865 illustrates that a user has dragged a clip 2825 such that the left edge of 2825 is next to the right edge of 2820. This creates a sequence 2890 of these two clips. Some embodiments create a data structure for the sequence, which is described below by reference to FIG. 29. The two clips can now be moved as one entity, and can be played back as though a single video clip in some embodiments.

In order to concatenate the two media clips together, some embodiments define an area (having a particular size) around the edge of a non-moving first clip. When a second clip is moved into this area (and, in some embodiments, if the movement has a particular set of properties), the edge of the moving second clip is automatically snapped into alignment with the edge of the first clip. This snapping process is described in further detail below by respect to FIGS. 31 and 30.

The third stage 2870 illustrates that a user has added another media clip 2830 on the right edge of the sequence 2890. The resulting sequence is sequence 2891. Thus, when a user plays back the sequence 2891, media clip 2820 will play, followed by clip 2825, and then clip 2830. Some embodiments do not impose any limit on the number of clips that can be concatenated into a sequence.

At the fourth stage 2875, the user has dragged a media clip 2850 to the right edge of media clip 2845, thereby creating a second sequence 2895. The free-form display area 700 now includes two distinct sequences that are separate from each other. Some embodiments allow a user to create as many sequences as the user wants to in the free-form display area.

The fifth stage 2880 illustrates that the user has moved a media clip 2840 to the left edge of the media clip 2845, thereby adding the media clip 2840 to the beginning of the sequence 2895. As shown, the right edge of a moving clip can be snapped to the left edge of a non-moving clip in some embodiments. When a user plays back the second sequence 2895, media clip 2840 will play, followed by clip 2845, and then clip 2850.

The sixth stage 2885 illustrates that the user has moved a media clip 2835 to the right edge of the first sequence 2891, such that this sequence now includes four clips. In some embodiments, users can move back and forth between various sequences, adding clips to a first sequence, then a second, then back to the first sequence.

In some embodiments, each of the clips is moved separately. For instance, when a user controls the media-editing application with a cursor controller such as a mouse, each media clip is selected and dragged to its new location in a separate interaction. On the other hand, when the media-editing application operates on a touch-screen device (e.g., an iPad®), some embodiments allow a user to move multiple clips at once with multiple fingers. For example, a coordinated user could create sequence 2890 with the left hand and sequence 2895 with the right hand in one fluid motion.

Figure 29:
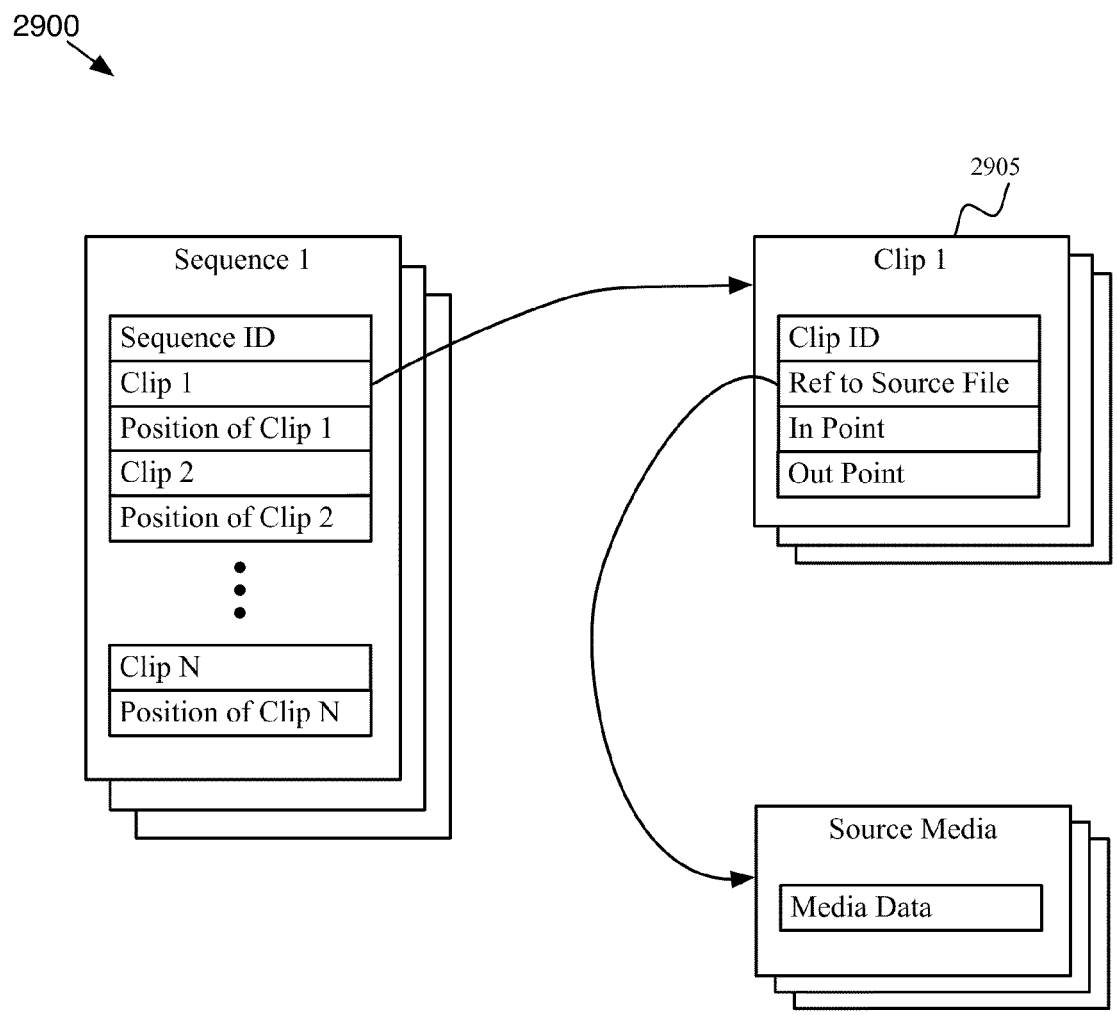
FIG. 29 illustrates an example of data structure for a sequence of media clips in some embodiments.

FIG. 29 illustrates a data structure 2900 for a sequence according to some embodiments. The media-editing application creates a data structure such as structure 2900 when two clips are concatenated to begin the formation of a sequence. The sequence data structure 2900 includes various pieces of information that defines the unique sequence. The data structure 2900 includes a sequence ID field that uniquely identifies the sequence, and a list of the clips that form the sequence. Each clip is assigned a position in the sequence (e.g., 1, 2, 3, etc.) that defines the order of the media clips in the sequence. When a clip is added to the beginning of the sequence, information about the new clip may be added to the end of the data structure. The new clip is assigned position 1, and the positions of the other clips in the sequence are updated.

Each clip listing is a reference to a data structure for the particular media clip in some embodiments. As shown, the reference for clip 1 links to a data structure 2905 for the media clip. As described above, the media clip data structure of some embodiments includes a reference to a source media file (e.g., an audio or video file) as well as in and out-points in the source file.

Different embodiments may include different information in a data structure for a sequence. For instance, some embodiments might include a count of the number of clips in the sequence. Some embodiments include location information for the sequence in the free-form display area. As described above, some embodiments of the free-form display area include this location information in the data structure for the display area. However, in other embodiments, this information is stored in the data structure for the clips and/or sequences. Yet other embodiments store this information in the data structure for the display area as well as for the clips and/or sequences.

Figure 30:
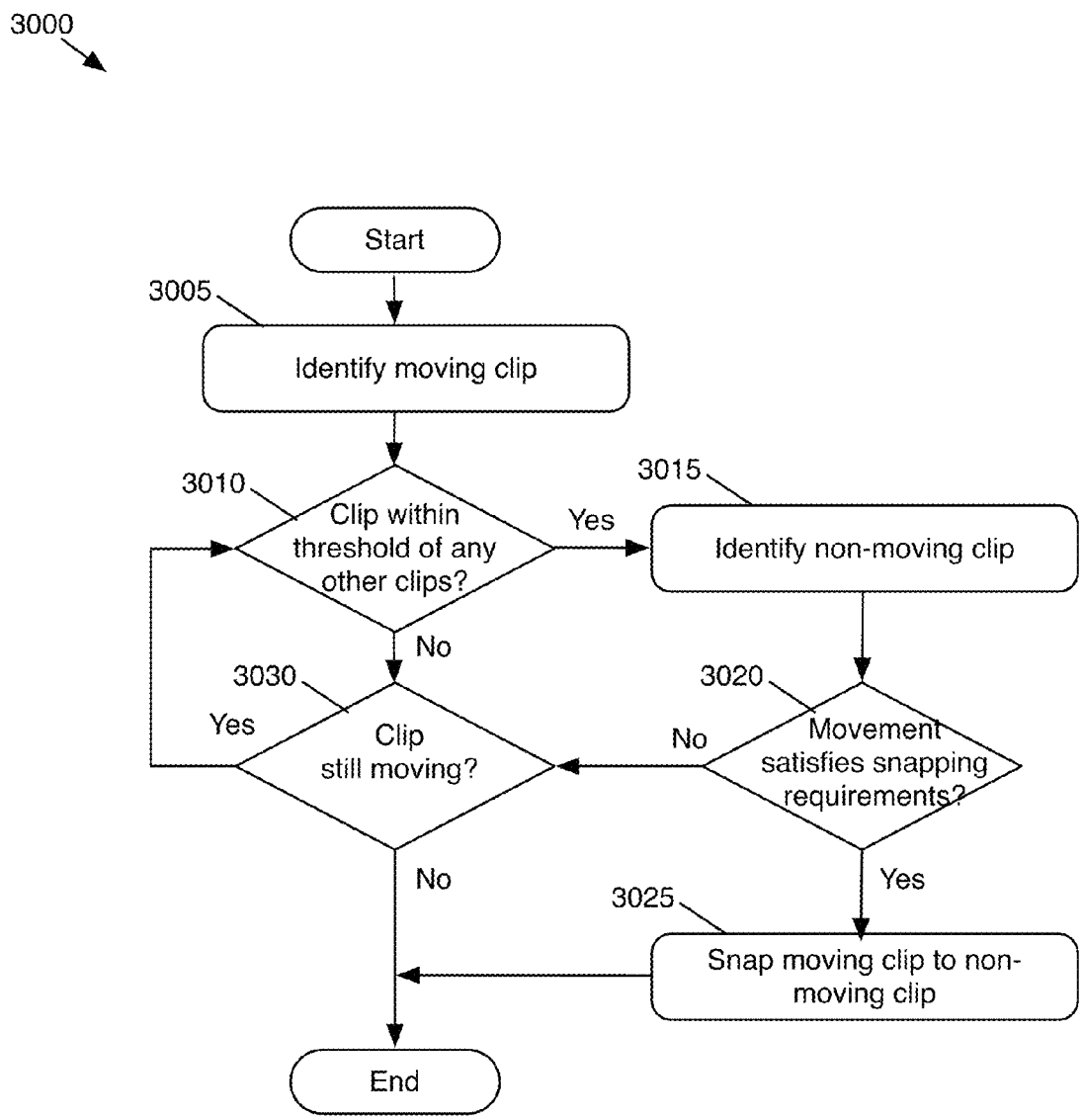
FIG. 30 illustrates an example of a conceptual process that some embodiments use to snap one media clip to another.

As described above, some embodiments concatenate two clips together when a first clip is moved within a threshold area of a second clip. FIG. 30 conceptually illustrates a process 3000 of some embodiments for snapping a first clip to a second clip in a free-form display area. The process 3000 will be described by reference to FIG. 31.

Figure 31:
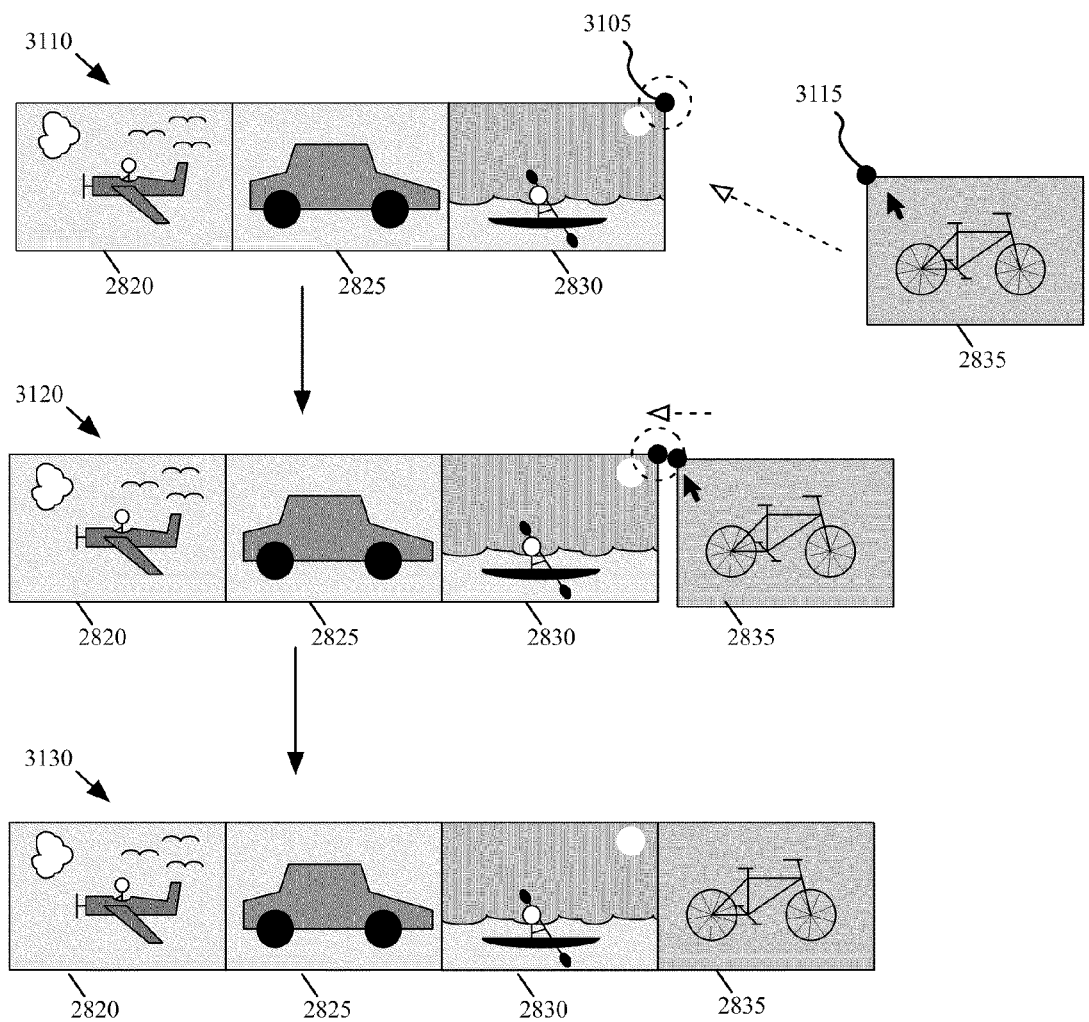
FIG. 31 illustrates an example of snapping a media clip into a sequence of media clips in some embodiments.

FIG. 31 illustrates an example of the operation of the snapping feature of the free-form display area of some embodiments. FIG. 31 illustrates media clips 2820-2835 from the display area 700 of FIG. 28. For simplicity, the full display area 700 is not illustrated in FIG. 31. FIG. 31 illustrates in detail the stage 2885 at which media clip 2835 is added to the sequence 2891, in three sub-stages 3110-3130.

As shown, the process 3000 begins by identifying (at 3005) a moving first media clip. The media clip may be moving as a result of input from a cursor controller, through a touch screen, etc. As mentioned above, in some embodiments, multiple clips may be moving at once (e.g., when the media-editing application operates on a touch-screen device). In this case, multiple instantiations of the process 3000 may be performed at once, or a separate process for keeping track of the multiple moving clips may be performed.

The process then determines (at 3010) whether the moving media clip is within a threshold distance of any other media clips in the free-form display area. In some embodiments, as described above, each of the media clips is represented as a uniformly-dimensioned rectangle in the free-form display area. In such embodiments, the left edge of a first clip and the right edge of a second clip are the same height and are parallel.

Some embodiments determine whether the moving clip is within a threshold distance of a second media clip by determining whether a particular point on either the right or left edge (e.g., the top corners) of the moving clip is within a threshold distance of a corresponding point on either the left or right edge of a non-moving second clip. Some embodiments define magnet points at the upper corners of each clip, and a right edge magnet point can only be attracted to a left edge magnet point of another clip, and vice versa. Other embodiments define a magnetized area along the entire edge of the static clip, such that if the top left corner of a moving clip comes within a threshold of any point on the right edge of the static clip (or vice versa), the clips may be snapped together.

Stage 3110 of FIG. 31 illustrates that the media clip 2830 has a magnet point 3105 at its top right corner, and the moving media clip 2835 has a magnet point 3115 at its top left corner. At this stage, the media clip 2835 is moving towards the static media clip 2830, but is not yet within the threshold distance of the static media clip. Stage 3120 illustrates that the media clip 2835 is now within the threshold distance of the static media clip 2830, as its magnet point 3115 is within the range of magnet point 3105.

Returning to FIG. 30, when the process 3000 determines that the moving clip is not within the threshold distance of another clip, the process proceeds to 3030, described below. However, when the moving first clip is within the threshold of a second clip, the process identifies (at 3015) this second clip.

The process then determines (at 3020) whether the movement of the first clip satisfies any requirements for snapping the first clip to the second clip. Some embodiments evaluate the velocity (both speed and direction of movement) and acceleration of the media clip to determine whether the user intends to concatenate the moving first clip to the static second clip. For instance, when a user intends to concatenate the clips, the user will often slow down (decelerate) the first clip as it nears the second clip. On the other hand, if the clip is still moving fairly quickly, the user probably intends to move the first clip past the second clip to a new location in the free-form display area.

When the movement of the first clip satisfies the snapping requirements, the process snaps (at 3025) the moving first clip to the non-moving second clip, and then ends. Some embodiments snap the first clip to the second clip by aligning the upper left corner of the first clip with the upper right corner of the second clip (or vice versa). The non-moving clip stays in the same location in the display area, and the moving clip is positioned so as to align with the non-moving clip. Stage 3130 illustrates that as a result of being within the threshold distance of clip 2830, clip 2835 has snapped to clip 2830, and is added onto the sequence 2891.

B. Inserting a Clip into a Sequence

Figure 32:
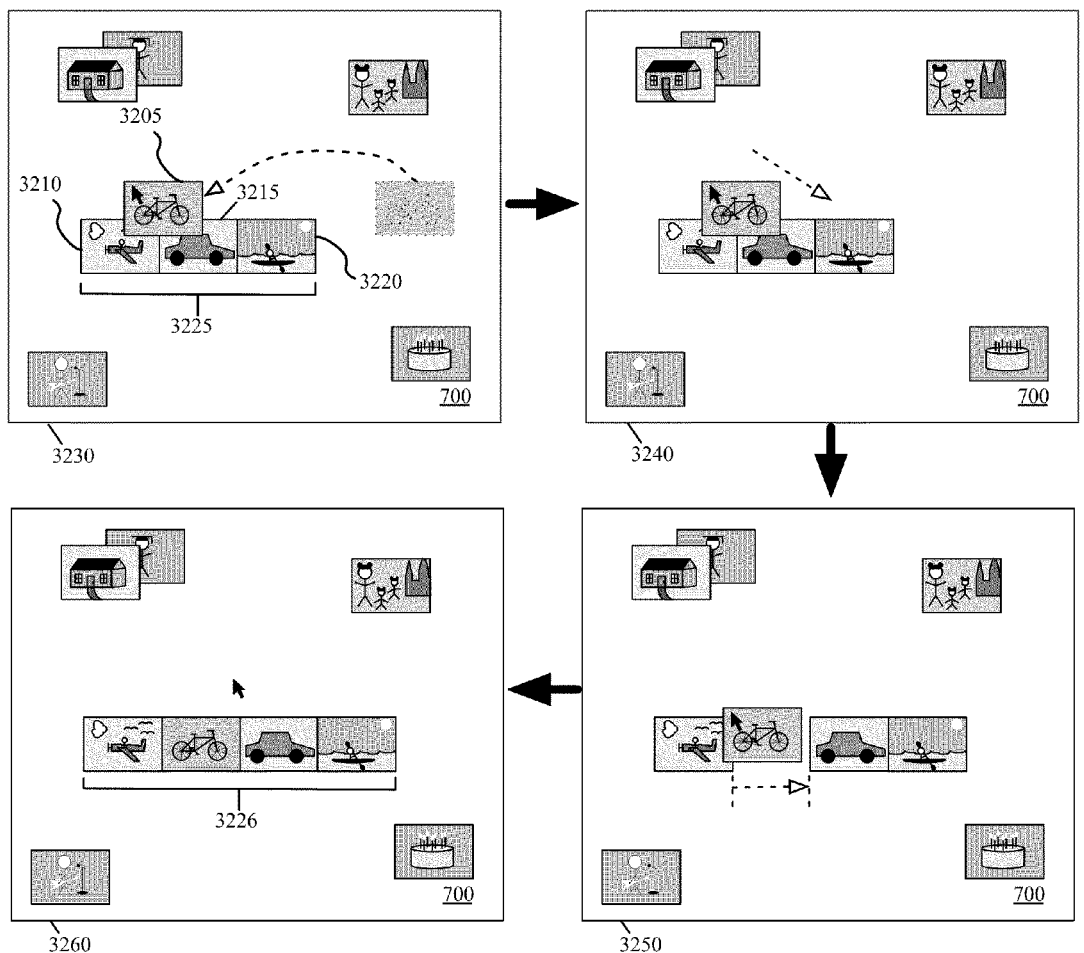
FIG. 32 illustrates an example GUI at several stages that show inserting a media clip into a sequence of media clips in some embodiments.

In some embodiments, users can also insert a media clip into the middle of a sequence between two other clips in the sequence. FIG. 32 illustrates an example of moving a clip 3205 into the middle of a sequence 3225 that contains media clips 3210, 3215, and 3220 within a free-form display area 700. FIG. 32 illustrates this process in four stages 3230-3260.

In the first stage 3230, the user drags media clip 3205 from a location in the display area indicated by the dotted media clip 3205 to a new location over media clips 3210 and 3215 as shown. In some embodiments, simply moving the individual clip to this location will not automatically insert the clip into the sequence. For example, some embodiments also allow a user to pile a media clip (or a sequence) on top of a sequence, without inserting the media clip into the sequence.

The second stage 3240 illustrates that the user decides to insert media clip 3205 between media clips 3210 and 3215 in the sequence 3225. As shown, the user moves media clip 3205 slightly downward in the display area 700 in order to insert the media clip into the sequence. Different embodiments recognize different inputs for inserting the clip into the sequence. Various examples of such inputs include hotkeys, holding the media clip 3205 in approximately the same position over the two clips 3210 and 3215, etc. Some embodiments also require that the media clip being inserted (clip 3205) cover at least a particular portion (e.g., half) of the edge between the two adjacent media clips (clips 3210 and 3215) in order to insert the clip into the sequence. Other embodiments do not differentiate whether the media clip 3205 is inserted from the top of the sequence 3220 as shown or from the bottom of the sequence as long as the clip being inserted is placed between the two media clips of the sequence 3220.

The third stage 3250 illustrates that media clips 3215 and 3220 (all clips in the sequence after the insertion point) have slid to the right to make a room for media clip 3205 in the sequence 3225. In some embodiments, the media-editing application snaps the inserted media clip into the space created between the formerly adjacent media clips. In this example, media clip 3205 snaps into the space that media clip 3215 used to occupy. The fourth stage illustrates the resulting sequence 3226 after media clip 3215 has been inserted into the sequence 3225.

As described above, when a user inserts a media clip into the middle of a sequence, the data structure for the sequence is updated to include the new media clip. Some embodiments add the new media clip at the end of a list of media clips and update the position information for any required media clips in the clip listing of the sequence data structure.

C. Removing a Clip from a Sequence

Figure 33:
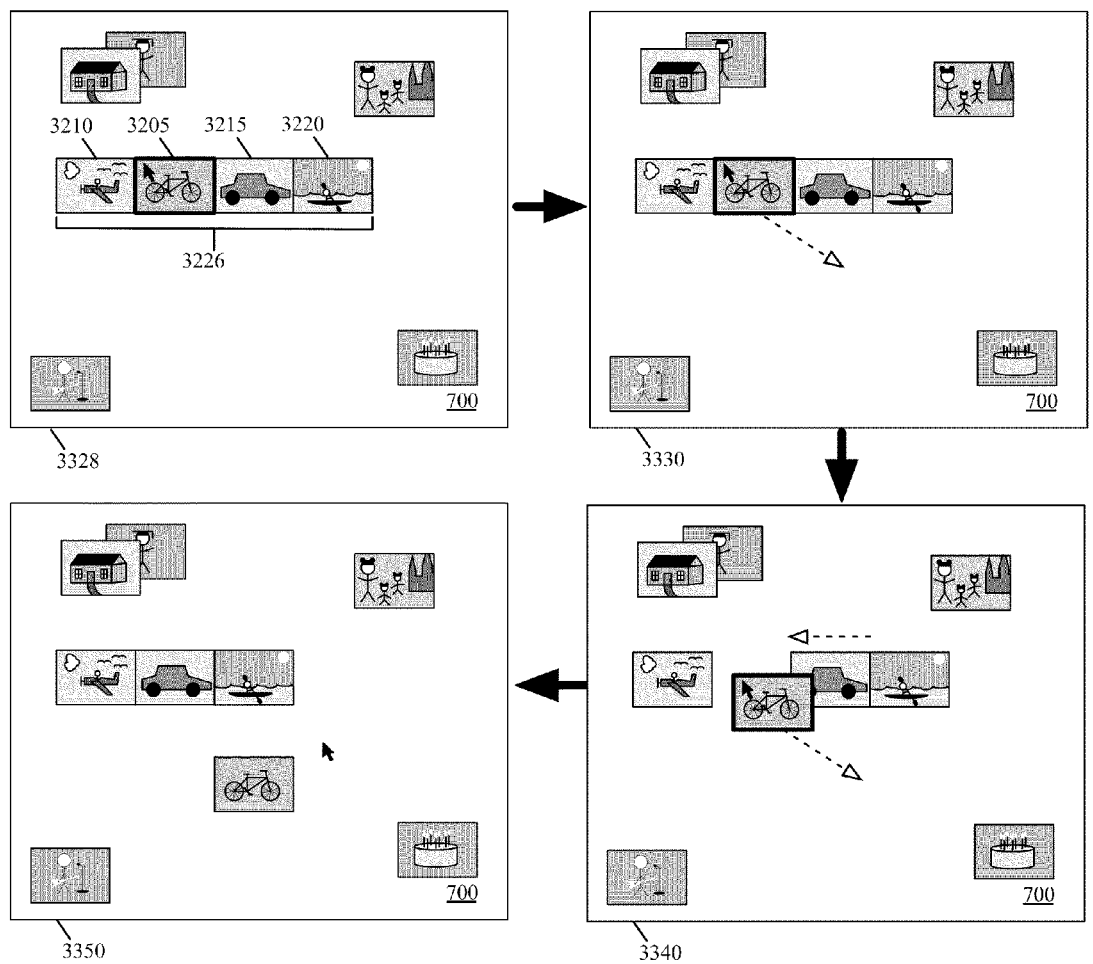
FIG. 33 illustrates an example GUI at several stages that show removing a media clip from a sequence of media clips in some embodiments.

In addition to creating sequences by adding clips together, a user may want to remove a clip from a sequence. Some embodiments allow a user to remove a clip either from the middle of a sequence or from the end of a sequence. FIG. 33 illustrates an example of removing a media clip 3205 from the middle of a sequence 3226 that contains clips 3205-3220 within a free-form display area 700. FIG. 33 illustrates this process in four stages 3328-3350.

At the first stage 3328, the user has selected media clip 3205 in the sequence 3226. In some embodiments, the media clip 3205 is selected by a user clicking on the media clip, or double-clicking (or double-tapping) in the case where a single click (or tap) selects the sequence of which the media clip is a part.

At the second stage 3330, the user has moved the cursor (or, if using a touch screen, the user's finger) down and to the right in order to move media clip 3205 out of the space in the sequence that media clip 3205 is occupying in the direction indicated by the dotted arrow. In some embodiments, when a media clip in a sequence is moved out of a space in the sequence that the media clip has occupied and leaves a substantial portion (e.g., more than half) of the space empty, one of the possible two media clips and other media clips adjacent those media clips slide in so that the space that used to be occupied by the moving out media clip does not remain unoccupied after the media clip moves out.

The third stage 3340 illustrates that media clip 3205 has been moved out of the sequence 3226. Some embodiments require that the user input at least a minimum threshold amount of movement in order to break the media clip free of the sequence (e.g., at least a particular distance or at least a particular speed). In this case, the user has moved the cursor down and to the right fast enough to break the media clip 3205 free of the sequence 3205.

When the media clip is moved out of the sequence, any clips after the media clip in the sequence are moved to the left so that the sequence stays together. As shown at the fourth stage 3350, the clips 3215 and 3220 are moved to the left so that clip 3215 is adjacent to clip 3210. The media clip 3205 is now on its own in the display area 700.

Figure 34:
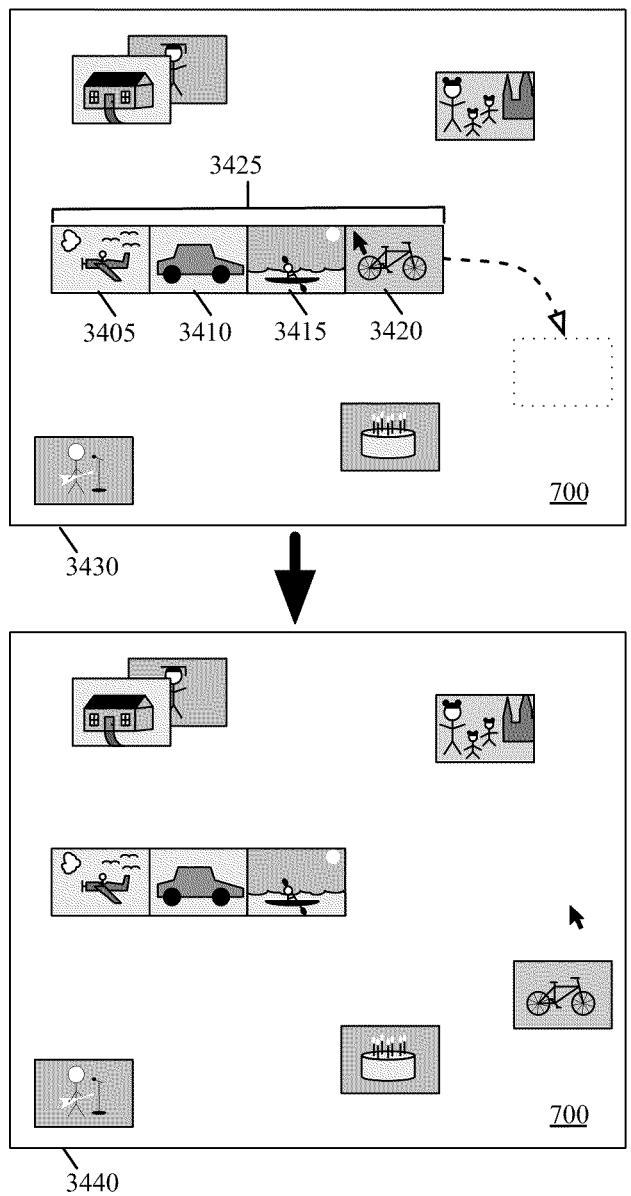
FIG. 34 illustrates an example GUI at several stages that show removing a media clip from a sequence of media clips in some embodiments.

FIG. 34 illustrates an example of removing a media clip 3420 from the end of a sequence 3425 that contains clips 3405-3420 within a free-form display area 700. This process is illustrated in two stages 3430 and 3440.

In the first stage 3430, the user selects media clip 3420 to remove it from the sequence. In some embodiments, the requirements for removing a media clip from the end of a sequence are the same as for removing a clip from the middle of a sequence (e.g., moving a cursor a far enough distance at a fast enough speed). The second stage 3440 illustrates that the sequence 3425 remains without the media clip 3420, which is now on its own in the display area 700. In this example, media clip 3420 is removed from the right side of the sequence (i.e., media clip 3420 is the last media clip in the sequence). It is also possible to remove the first media clip of the sequence in a similar manner.

When a media clip is removed from a sequence, some embodiments remove the reference to the media clip in the data structure for the sequence. In addition, when the media clip is removed from the beginning or middle of the sequence, the position information of the other clips listed in the sequence data structure is adjusted.

FIGS. 32-34 described above illustrate examples of editing a sequence by inserting a media clip into the sequence, removing a media clip from the sequence, augment the sequence with a media clip or another sequence. These editing operations illustrated in FIGS. 32-33 can be used in conjunction or in succession in order to edit a sequence by reordering the media clips in the sequence. For instance, media clip 3205 removed from the sequence illustrated in FIG. 33 can be inserted between media clips 3215 and 3220 or added to the sequence by snapping media clip 3205 to media clip 3210 or 3220.

The above subsections described the creation of sequences through various media-editing operations. The following subsections will describe various operations performed on the sequences, such as moving sequences, piling sequences, concatenating sequences, stacking sequences, collapsing sequences, etc.

D. Moving Sequences

Figure 35:
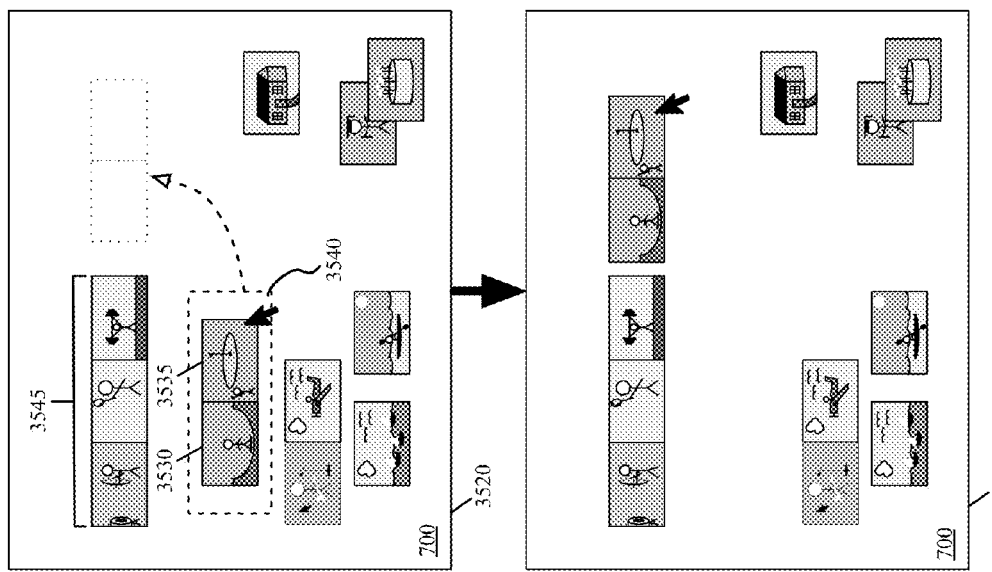
FIG. 35 illustrates an example GUI at several stages that show moving a sequence of media clips in some embodiments.

FIG. 35 illustrates an example of the movement of a sequence to a new location within a free-form display area 700. FIG. 35 illustrates the display area 700 at two different stages 3520 and 3530. The display area 700 displays media clips 3530 and 3535, which form a sequence 3540, along with other media clips and sequences. The several sequences illustrated in FIG. 35, including sequence 3540, are created by the user in a similar manner to that described above by reference to FIG. 28.

The display area 700 also allows a user to move sequences anywhere within the display area in order to organize and composite the media clips and sequences. In some embodiments, the user moves these sequences to new locations within the display area 700 in a similar manner to that described above by reference to FIG. 15.

In the first stage 3520, the user selects the sequence 3540 and moves the sequence up and to the right within the free-form display area. Different embodiments enable different ways for the user to select a sequence. In some embodiments, when clips are concatenated in a sequence, selecting (e.g., clicking on, tapping) a clip automatically selects the entire sequence. In some embodiments, the default selection is for a single clip and double-clicking (or double-tapping) the clip will select the entire sequence. The user can select a sequence by enclosing the entire sequence in a selection box or selecting each clip in the sequence (e.g., while holding down a shift key) in some embodiments. The user then performs a drag-and-drop operation on the selected sequence in order to place the sequence in a desired location within the display area. As mentioned, stage 3520 illustrates the user moving the sequence 3540 up and to the right.

The second stage 3530 illustrates that the sequence 3540 has been moved to a new location within the display area 700 next to another sequence 3545. The user may have chosen this location in order to see whether the user wants to combine the two sequences into one sequence. The dashed version of sequence 3540 indicates that sequence's original location before being moved.

E. Concatenating Sequences

Figure 36:
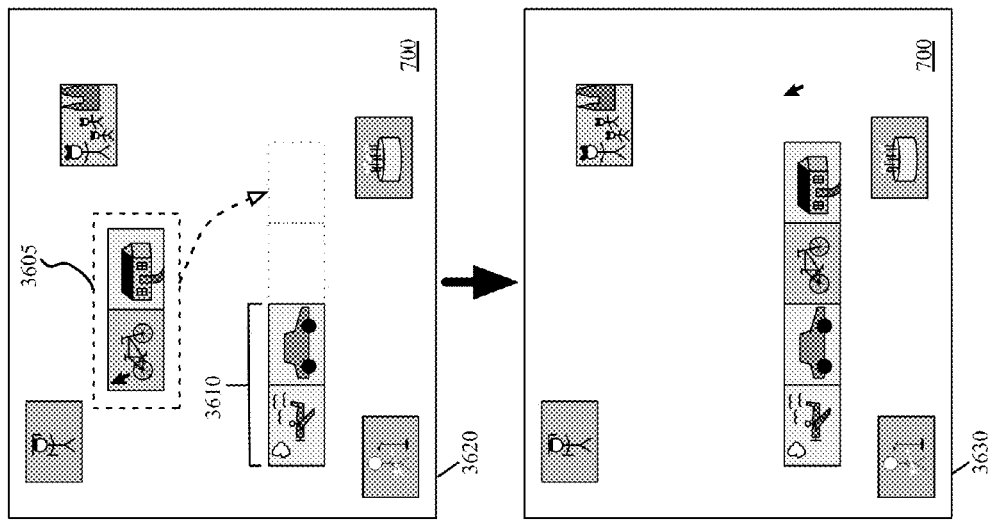
FIG. 36 illustrates an example GUI at several stages that show adding a sequence of media clips to another sequence of media clips in some embodiments.

In addition to concatenating a clip to another clip or sequence as described above in subsection A, some embodiments allow a user to concatenate a first sequence to the beginning or end of a second sequence. FIG. 36 illustrates this process in two stages 3620 and 3630.

In the first stage 3620, the user selects sequence 3605 and drags the sequence down and right such that the left edge of the first clip in sequence 3605 is near the right edge of sequence 3610. In some embodiments, the user selects the sequence 3605 in any of the ways described above in subsection C (e.g., clicking on a clip, enclosing the entire sequence, etc.).

The second stage 3630 illustrates that sequence 3610 has been augmented by adding the media clips of sequence 3605. In some embodiments, when the left edge of sequence 3605 comes within a threshold distance of the right edge of sequence 3610 (i.e., the right edge of the right-most media clip in the sequence), the media-editing application concatenates sequence 3605 into sequence 3610 in a similar manner as with the two media clips described above in detail by reference to FIG. 31. In this example, sequence 3605 is added to the right side of sequence 3610. It is also possible to add a first sequence to the left side of a second sequence in a similar manner.

When the user adds the sequence 3605 to the end of sequence 3610, some embodiments update the data structure for sequence 3610 to include all of the media clips from sequence 3605. In addition, some embodiments delete the data structure for sequence 3605, as it is no longer an independent sequence. Other embodiments update the data structure for the moved sequence 3605 and delete the data structure for the static sequence 3610.

F. Piling Sequences

Figure 37:
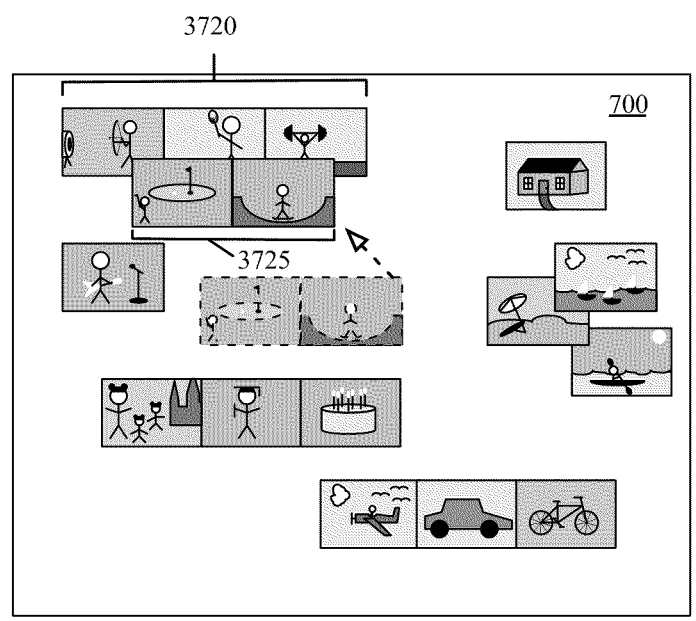
FIG. 37 illustrates an example GUI that shows piling sequences of media clips in some embodiments.

FIG. 37 illustrates an example of the piling of sequences in a free-form display area 700. The display area 700 displays sequences 3720 and 3725, along with other sequences and individual media clips. The several sequences illustrated in FIG. 37, including sequences 3720 and 3725, are created by the user in a similar manner to that described above by reference to FIG. 28.

The display area 700 also allows a user to pile up sequences of media clips within the display area. In some embodiments, the user piles up the sequences in a similar manner to that described above by reference to FIG. 16 for single clips. As shown in FIG. 37, the user has selected and moved a sequence 3725 (e.g., with a drag-and-drop operation) similar to the selection and movement of sequence 3540. In this case, the sequence 3725 is piled on top of the sequence 3720. This allows the user to create a visual grouping of these two sequences. Some embodiments also create a logical grouping in the data structures of the media-editing application between the two sequences and/or between all of the clips in the sequences. For instance, some embodiments append a tag referencing the data structure for sequence 3725 in the data structure for sequence 3720.

G. Stacking Clips and Sequences

Figure 38:
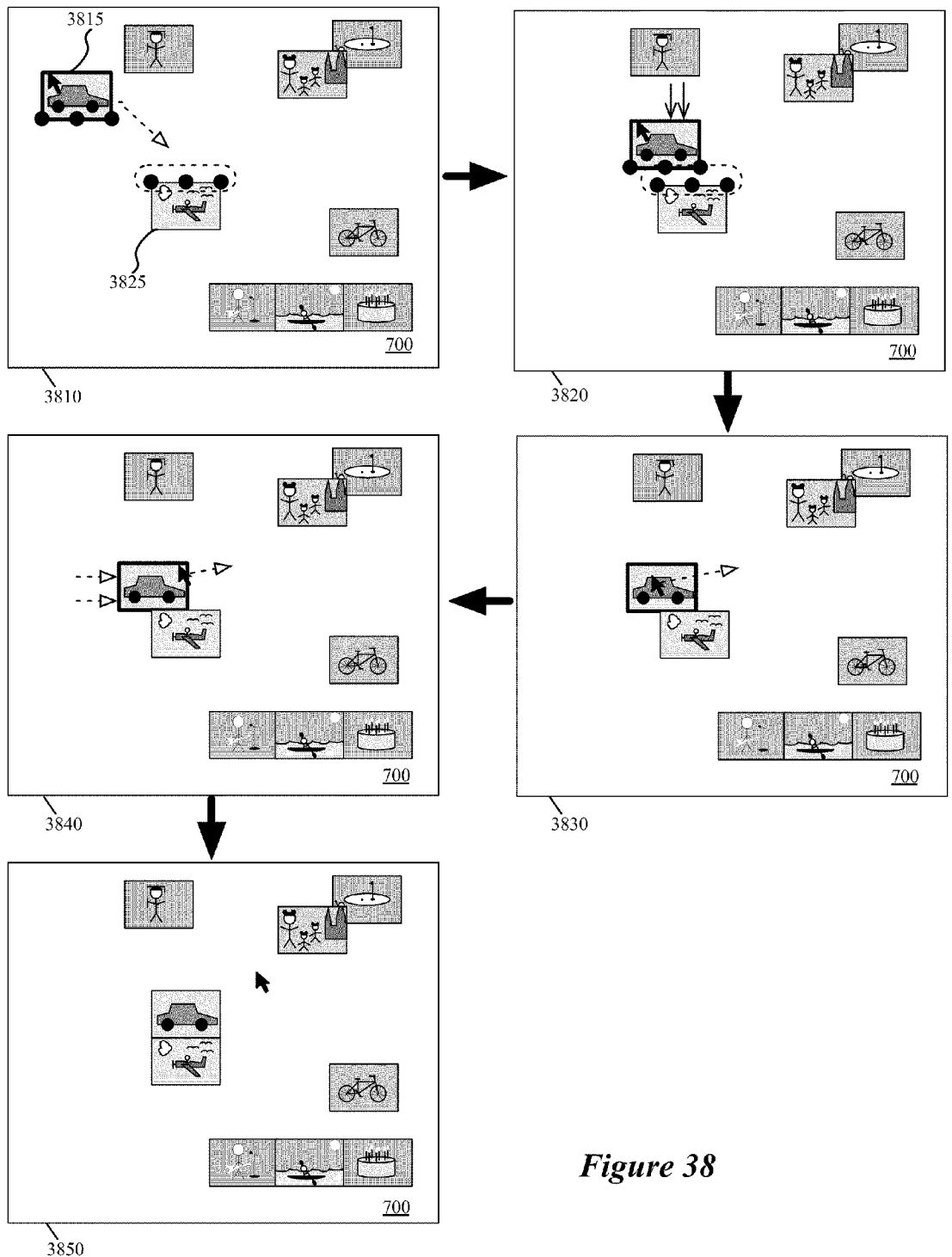
FIG. 38 illustrates an example GUI at several stages that show stacking media clips in some embodiments.

In addition to snapping clips together horizontally to build sequences, some embodiments snap clips and sequences together vertically. This allows users to easily move pairs (or larger groups) of clips and sequences together without having to composite the clips together as sequences. It can also be used to associate two clips or sequences without compositing the clips as a sequence. In addition, it can also be used to layer the media content represented by the top clip over the media content represented by the bottom clip in a composite media presentation. FIG. 38 illustrates an example of stacking two clips 3815 and 3825 together in a free-form display area 700. FIG. 38 illustrates this process in five stages 3810-3850.

In the first stage 3810, a user drags the media clip 3815 down and to the right, towards the non-moving media clip 3825. As shown at this stage, media clip 3825 includes a set of magnets along its top edge and media clip 3815 includes a set of "oppositely polarized" magnets along its bottom edge. Thus, when the bottom of a moving first media clip is brought within a threshold distance of the top of a non-moving second media clip, the two clips are snapped together in some embodiments. Similarly, when the top of a moving first media clip is brought within a threshold distance of the bottom of a non-moving media clip, the two clips are also snapped together.

The second stage 3820 illustrates that the bottom of the moving clip 3815 is within the magnetic threshold of non-moving clip 3825. As shown, some embodiments snap the moving clip straight down and do not automatically align the clips horizontally. Because the display area is timeline-free, there is not necessarily any inherent meaning to having one clip vertically aligned with another. However, some embodiments create layers of media content with the media content represented by the top clip as a top layer and the media content represented by the bottom clip as a bottom layer. In addition, as described above with respect to horizontal snapping, some embodiments impose requirements on the clip movement in order to snap the clips together. That is, based on the clip's velocity and acceleration (and, in some cases, other factors), the media-editing application determines whether to snap the clips together.

The third stage 3830 illustrates that the moved clip 3815 has been snapped straight down to connect with the clip 3825. In addition, at this stage, after the clips have snapped together, the user (with the clip 3815 still selected) has moved the cursor to the right and slightly upwards. As shown at stage 3840, the clip 3815 slides horizontally along the top of clip 3825. In some embodiments, when two clips are stacked vertically, cursor movements (or, if displayed on a touch screen, finger movements) with less than a threshold amount of vertical movement will be treated as purely horizontal for the purpose of moving the selected clip. The fifth stage 3850 illustrates that the clip 3815 has been moved such that it is horizontally aligned with the clip 3825. When two stacked clips are within a small threshold of horizontal alignment, some embodiments automatically align the two clips.

Figure 39:
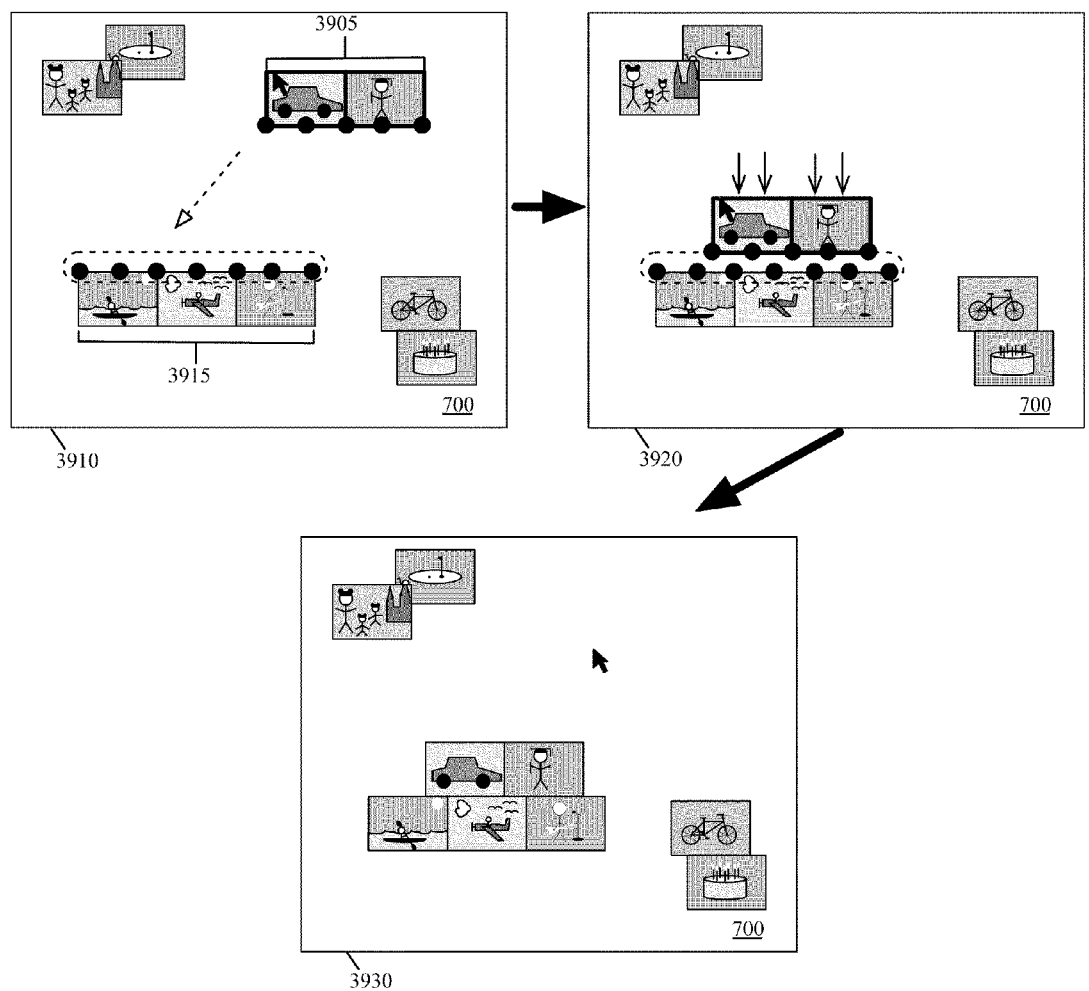
FIG. 39 illustrates an example GUI at several stages that show snapping a sequence of media clips to another sequence of media clips in some embodiments.

As mentioned, some embodiments also stack sequences in a similar fashion. FIG. 39 illustrates an example of stacking two sequences 3905 and 3915 together in a free-form display area 700. FIG. 39 illustrates this process in three stages 3910-3930.

In the first stage 3910, the user drags a selected sequence 3905 down and left towards sequence 3915. Sequence 3905 might be selected in any of the ways described above (e.g., single or double-clicking, single- or double-tapping, enclosing the sequence with a selection box, etc.). When the bottom edge of sequence 3905 is brought within a threshold distance of the top edge of 3915, the sequence 3905 is automatically snapped downwards and stacked on top of sequence 3915, as shown at the second stage 3920. The third stage 3930 illustrates the result, with sequence 3905 stacked on top of sequence 3915. As with the clips, sequences can also be moved so as to snap to the bottom of another sequence or media clip.

In some embodiments, an option is provided to display the thumbnails as having varying lengths based on the length of the represented media clips. For example, a two minute clip would be twice as long as a one minute clip. In such embodiments, the stacking of sequences can be used to simulate media tracks, as the displayed length of the sequence would be representative of the temporal length of the sequence.

Some embodiments allow sequences created in the free-form display area (e.g., display area 700) to be dragged or otherwise moved (e.g., via a hotkey) into another compositing space of the GUI, such as the composite display area described above (e.g., by reference to FIG. 11). When a sequence is moved into the composite display area, the sequence is placed on a track. In some embodiments, a user can move a pair of stacked sequences such that the sequences are placed on two tracks in the composite display area.

Some embodiments allow the user to layer media content of a sequence over media content of another sequence in a composite presentation composed of these sequences. In some such embodiments, media content in the top layer is played back over the media content in a bottom layer when a composite presentation composed of these sequences is played back.

The previous two figures illustrated some examples of stacking one media clip over another media clip and stacking one sequence over another sequence. In some embodiments, a media clip can be stacked over a sequence, or vice versa, in a similar manner as described above by reference to these two figures.

Moreover, media clips and sequences can be stacked in more than two rows in some embodiments. Each row of these stacked media clips and sequences in some embodiments is a layer of the media content represented by the media clips or sequences of the row in a composite presentation composed of these media clips and sequences.

H. Collapsing Sequences

Figure 40:
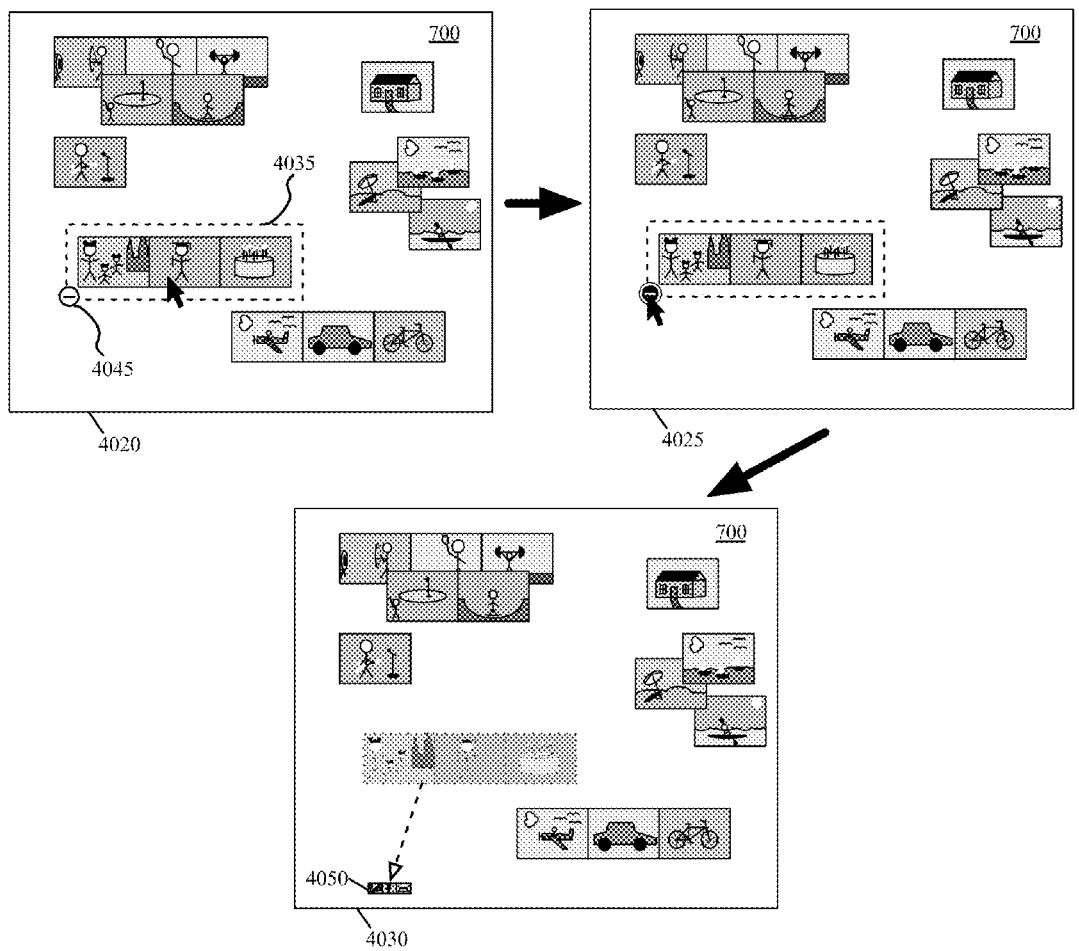
FIG. 40 illustrates an example GUI at several stages that show collapsing a sequence of media clips in some embodiments.

FIG. 40 illustrates an example of the minimizing (or collapsing) of a sequence 4035 into a smaller sequence or an icon in a free-form display area 700. FIG. 40 illustrates the free-form display area at three different stages 4020-4030.

The display area 700 also allows the user to minimize or collapse a sequence into a smaller display of the sequence, or an icon. In some embodiments, these minimized sequences are organized along the bottom or right edge of the display area 700. In some embodiments, the sequences are minimized in a manner similar to that described above for individual clips by reference to FIG. 17.

In the first stage 4020, the user has moved a cursor over a selected sequence 4035. The sequence 4035 might be selected in any of the ways described above (e.g., single or double-clicking, single- or double-tapping, enclosing the sequence with a selection box, etc.). When the cursor moves over the sequence, a selectable minimization item 4045 is displayed in the bottom left corner of the selected sequence.

At the second stage 4025, the user has moved the cursor over the selectable item 4045 and selected the item. As a result, at the third stage 4030, the sequence 4035 has been minimized into icon 4050 and located near the bottom edge of the free-form display area 700.

Some embodiments determine whether the icon is closer to the bottom or right edge and display the small icon for a minimized sequence or clip along that edge. In some embodiments, a user can minimize a clip or sequence by dragging the item to the edge. In such embodiments, the small icon is displayed along the edge to which the user drags the item. In addition, some embodiments enable a user to minimize a clip or sequence with a hotkey. When a user wants to restore a minimized sequence, the user can select the icon in some embodiments, which will automatically restore the sequence to full size.

I. Skimming Through a Sequence

In some embodiments, a user can skim (or scrub) through a selected sequence in a display area by dragging a playhead through the sequence. As the user moves the playhead across a particular video clip in the sequence, the frame of the video clip that corresponds temporally to the location of the playhead in the video clip is displayed. A user can use this feature, for example, to find a particular frame of a video clip that is part of a sequence.

As mentioned above, a sequence is an association of media clips in chronological order. The associated media clips in some embodiments are video clips that are composed of multiple image frames. In some embodiments, the user can perform a skimming operation on a sequence of media clips in the display area by moving a cursor over the media clips in the sequence. The skimming operation on a sequence is performed in a similar manner described above for a single clip by reference to FIG. 19.

Different embodiments implement a skimming operation differently. For instance, the user performs the operation by first selecting a sequence to skim in the free-form display area. When the sequence is selected, a playhead appears and the user drags the playhead to move it along the length of the selected sequence. In some cases, the user places the cursor over a media clip to skim without selecting it first. In these cases, placing the cursor over the media clip causes a playhead to appear on the sequence at the location along the length of the media clip where the cursor is placed.

Figure 41:
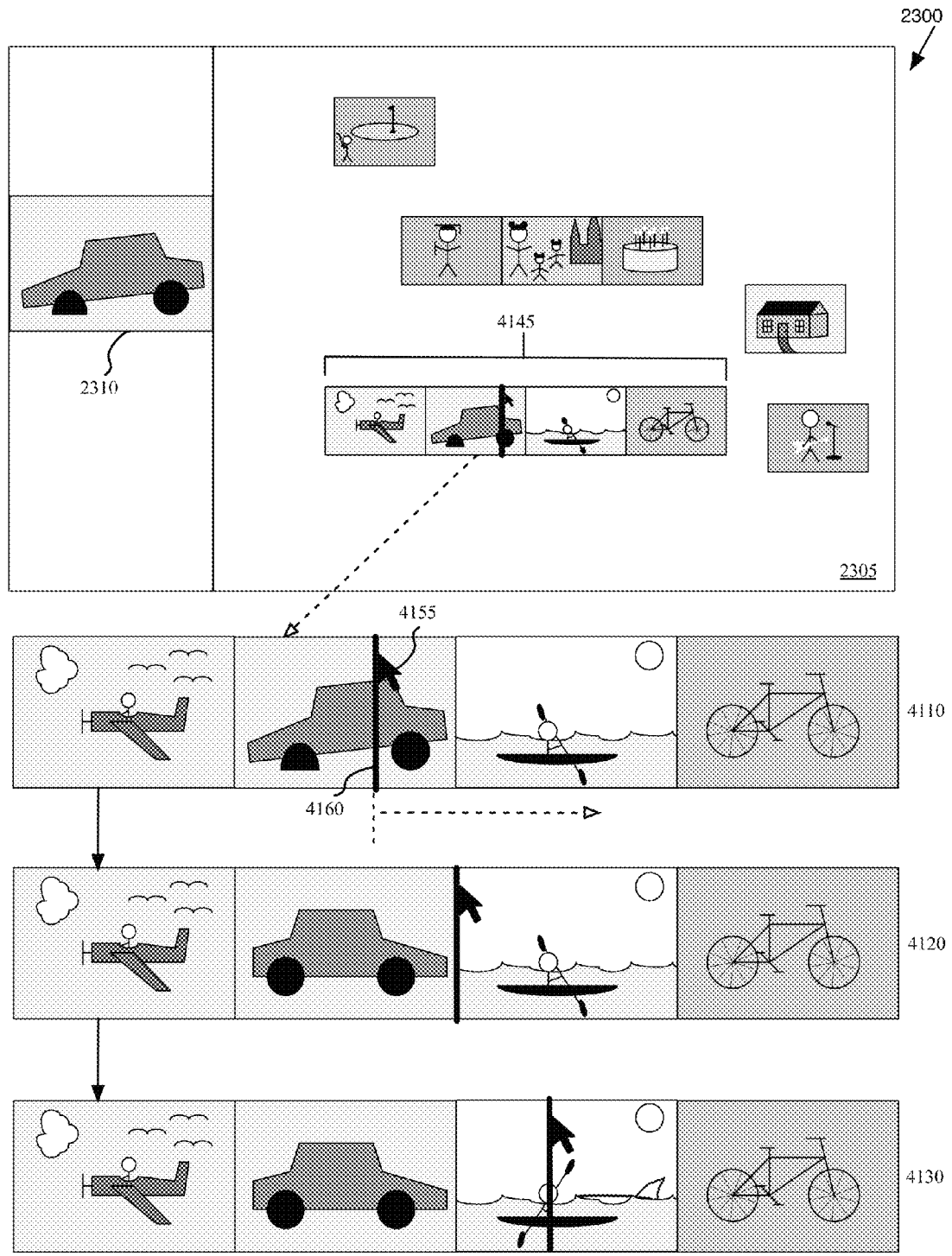
FIG. 41 illustrates an example GUI that shows skimming a sequence of media clips in some embodiments.

FIG. 41 illustrates an example of skimming through a sequence in a free-form display area 2305 of GUI 2300. As shown, a GUI 2300 includes the display area 2305 and a viewing area 2310. The display area 2305 displays sequence 4145 as well as other sequences and media clips. FIG. 41 illustrates the sequence 4145 at three different stages 4110-4130.

In operation, the user moves cursor 4155 over sequence 4145 in the display area 2305. A playhead 4160, depicted as a bold vertical bar, appears on sequence 4145 at the location of the cursor. As the user moves the playhead 4160 with cursor 4155 to the right to display the frames in the sequence 4145, the image frames represented by new locations of the playhead 4160 along the length of sequence 4145 are displayed in succession as illustrated in stages 4110-4130. At the first stage 4110, the poster frames (or representative thumbnails) for the first, third, and fourth clips in the sequence are displayed, and the frame that is approximately two-thirds of the way through the second clip is displayed. This frame is also displayed in the viewing area 2310 in some embodiments.

The frames are displayed within a particular media clip representation within the sequence as shown. When the playhead leaves a media clip in the sequence, the media clip displays its poster frame or keeps the last frame displayed before the playhead left. The user may move the playhead 4160 in either horizontal direction (i.e., to the left or right) to display a desired image frame of sequence 4145. At the second stage 4120, the playhead is at the first frame of the third media clip in sequence 4145 (which also happens to be the poster frame for the media clip), while at stage 4130 the playhead is approximately two-fifths of the way through the third clip. In both of these stages, the second clip has gone back to displaying its poster frame.

The user can use this skimming feature to find a frame in a sequence which the user desires to use as a starting point from which to lay the media content represented by a media clip over the media content represented by the sequence in some embodiments. In some such embodiments, when a media clip is stacked on top of a sequence to layer the media content represented by the media clip over the media content represented by the sequence, a playhead appears on the sequence underneath a point in the displayed length of the media clip. The playhead moves along the displayed length of the sequence with the point in the displayed length of the media clip as the user slides the media clip horizontally along the top of the sequence. Different embodiments define different points along the displayed length of the media clip that the playhead on the sequence moves with. For instance, the playhead on the sequence moves with the left or right edge (i.e., points that represent the first or last frame, respectively) of the media clip. Other embodiments have the playhead of the sequence move with the position of a cursor along the displayed length of the media clip. The user stops sliding when the user finds a frame of the sequence to use as the starting point of layering a media content represented by the media clip on top of the media content represented by the sequence.

Figure 42:
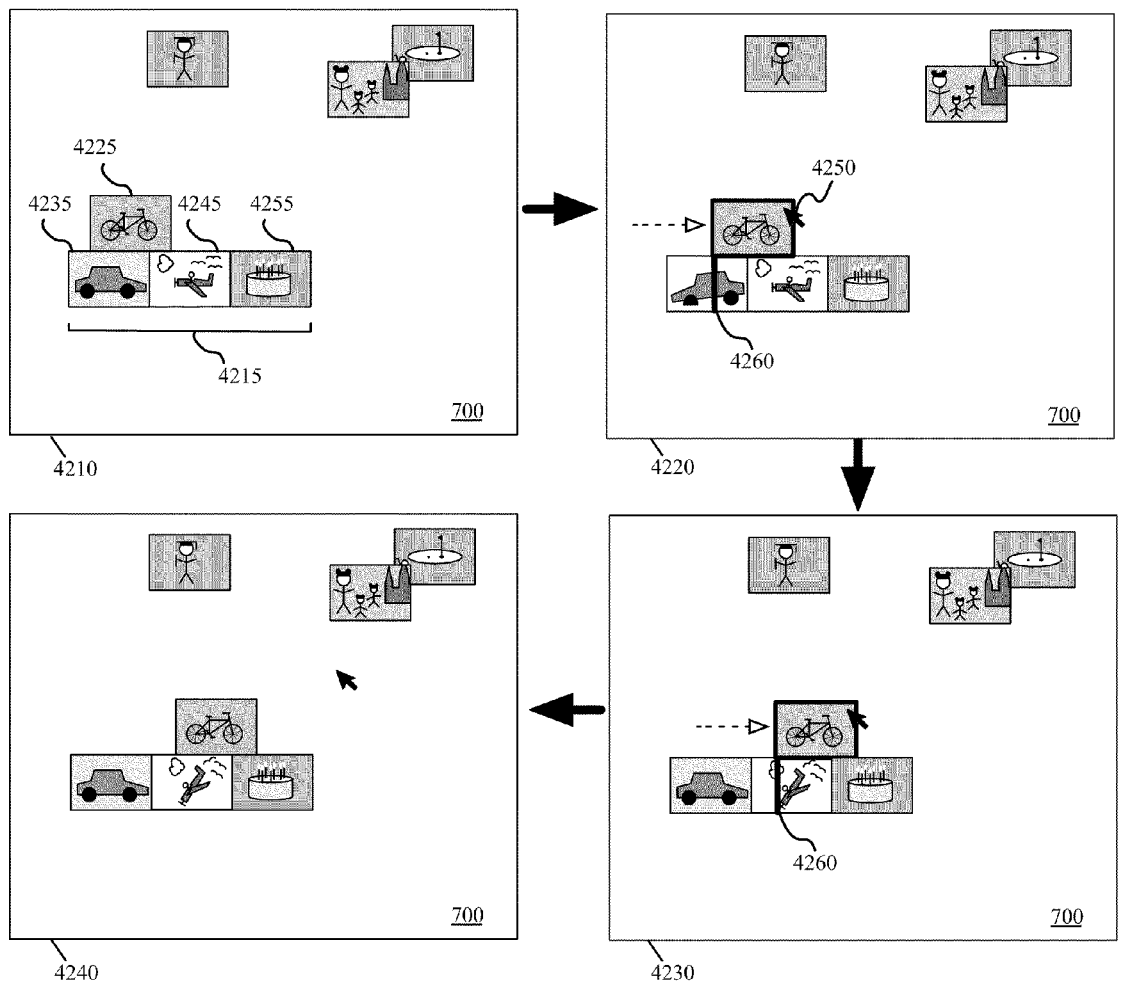
FIG. 42 illustrates an example GUI at several stages that show skimming a sequence of media clips in some embodiments.

FIG. 42 shows an example of picking a frame of a sequence formed of several media clips from which the media content represented by a media clip is layered over. FIG. 42 illustrates this process in four stages 4210-4240.

The first stage 4210 illustrates media clips 4225, 4235, 4245, and 4255 and other media clips. The media clips 4235, 4245, and 4255 form a sequence 4215. The user has stacked the media clip 4225 on top of the sequence 4215 in a similar manner as described above by reference to FIGS. 38 and 39. The media clip 4225 is stacked such that its left edge is about a quarter way from the left edge of the media clip 4235 in the sequence 4215. The poster frames (or, representative thumbnails) are displayed for the media clips.

In the second stage 4220, the user selects (e.g., clicking on) the media clip as indicated by the thick border of the media clip. A playhead 4260 appears on the sequence 4260 when the media clip 4260 is selected as shown. In some embodiments, the playhead 4260 appears when the media clip 4225 is just placed on top of the sequence 4250 in the process of stacking the media clip on top of the sequence. In this example, the playhead appears at a position along the length of the sequence that is vertically synchronized with the left edge of the media clip 4250.

The media clip 4235 displays a frame represented by the position of the playhead along the length of the media clip 4235 as shown. The user is about to slide the media clip 4250 to the right along the top of the sequence 4215 as indicated by the dotted arrow in this stage.

In the third stage 4230, the user has slid the media clip to the right such that the left edge of the media clip 4225 is about a third way from the left edge of the media clip 4245 along the length of the media clip 4245 in the sequence 4215. The playhead 4260 has moved together with the left edge of the media clip 4245 as shown. The media clip 4245 displays a frame represented by the position of the playhead along the length of the media clip 4245. The user might want this frame of the media clip 4245 to be the starting point for the media content represented by the media clip 4225 to be layered over the media content represented by the media clip 4225.

The fourth stage 4240 illustrates that the user has unselected (e.g., releasing the mouse button and removing the cursor out from) the media clip 4225. The media clip 4225 is stacked on top of the sequence 4215 from the point along the length of the sequence where the playhead 4260 was placed in the third stage. As such, the user has chosen a frame in the sequence from which the media content represented by the media clip 4225 is layered over the content represented by the sequence 4215.

In the embodiments that synchronize the position of a playhead with the horizontal position of a cursor, as the cursor 4250 is dragging the media clip 4225 and sliding the media clip to the right as shown in the second stage 4220, the playhead 4260 would appear about a half-way along the length of the media clip 4245 such that it is vertically synchronized with the position of the cursor 4250 along the length of the media clip 4225 in the second stage 4220. In addition, in some such embodiments, another playhead appears on the media clip 4225 and the media clip displays a frame represented by the position of that playhead along the length of the media clip 4225. These embodiments allow the user to layer the frame displayed on the top media clip over a desired frame displayed on the bottom media clip.

In some embodiments, the media clip 4225 is a media clip in a sequence. That is, a sequence including the media clip 4225 is stacked on top of the sequence 4215. By selecting the top sequence and sliding along the top of the bottom sequence, the user is able to select a frame in the bottom sequence from which the media content represented by the top sequence is layered over the media content represented by the bottom sequence.

As mentioned above, media clips or sequences can be stacked in more than two rows in some embodiments. In some such embodiments, when a media clip in the top row is selected, playheads appear on the media clips or sequences in the rows below the top row such that the user can view the frames represented by the positions of the playheads along the lengths of media clips or sequences.

In some embodiments, the media clip 4225 is an audio clip representing audio data in a source audio file. These embodiments allow the user to layer the audio data over the media content represented by the sequence 4215 starting from a desired frame represented by the position of the playhead 4260 along the length of the sequence 4215.

J. Playing Back a Sequence

As with a single clip, some embodiments enable a user to play back a sequence in a free-form display area. When a sequence of video clips is played back in the free-form display area, some embodiments play the first clip within the thumbnail for the first clip, then the second clip within its thumbnail, and so on. A playhead moves across the sequence as the clips are being played back. In some embodiments, the playhead moves at different speeds across the different clips in a sequence to account for the different lengths of the clips. For instance, if a first clip is one minute long, and a second clip is two minutes long, the playhead will move twice as fast in the display while playing the first clip as while playing the second. Some embodiments also play the sequence in a separate viewing area as though the sequence is a single clip.

Figure 43:
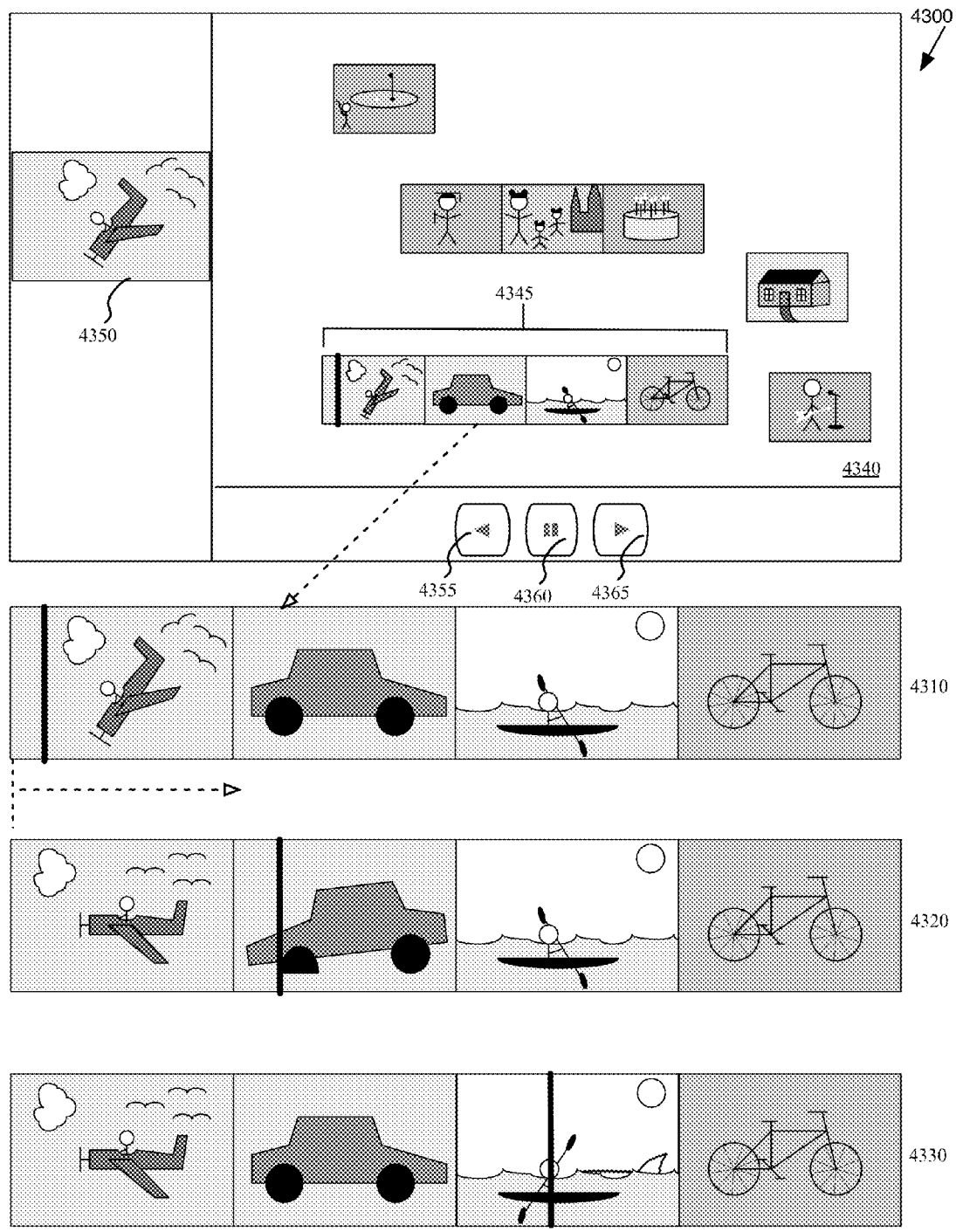
FIG. 43 illustrates an example of GUI that shows playing back a sequence of media clips in some embodiments.

FIG. 43 illustrates an example of playing back a sequence 4345 in a free-form display area 4340 of GUI 4300. As shown, the GUI 4300 includes the display area 4340, a viewing area 4350, and playback controls 4355-4365. The display area 4340 displays sequence 4345 as well as other sequences and media clips. The display area 4340 is similar to the free-form display area 2305 described above by reference to FIG. 23, while the viewing area 4350 is similar to the viewing area 2310 described above by reference to FIG. 23.

The playback controls 4355-4365 are the same as the set of playback controls 245-255 described above by reference to FIG. 2. These controls enable a user to play, pause, or rewind a selected media clip or sequence of media clips. In some embodiments, a set of drop-down menu items may replace or be used in conjunction with the playback controls 4355-4365. In some embodiments, hotkeys are assigned to the playback control commands such that a user's pressing the hotkey invokes the corresponding playback control command.

The first stage of FIG. 43 illustrates the sequence shortly after the user has started playback for the sequence 4345. The playhead is not all that far into the first clip of the sequence. The current frame is played in the clip representation within the sequence, as well as within the viewing area 4350. In the following stage 4320, the playhead has progressed to approximately one-fifth of the way through the second clip in the sequence 4345. At this point, the first clip displays its poster frame (representative thumbnail), though some embodiments display the last frame of the clip instead. At the third stage 4330, the playhead is approximately two-fifths through the third clip, and the poster frame is now displayed for the second clip.

Figure 44:
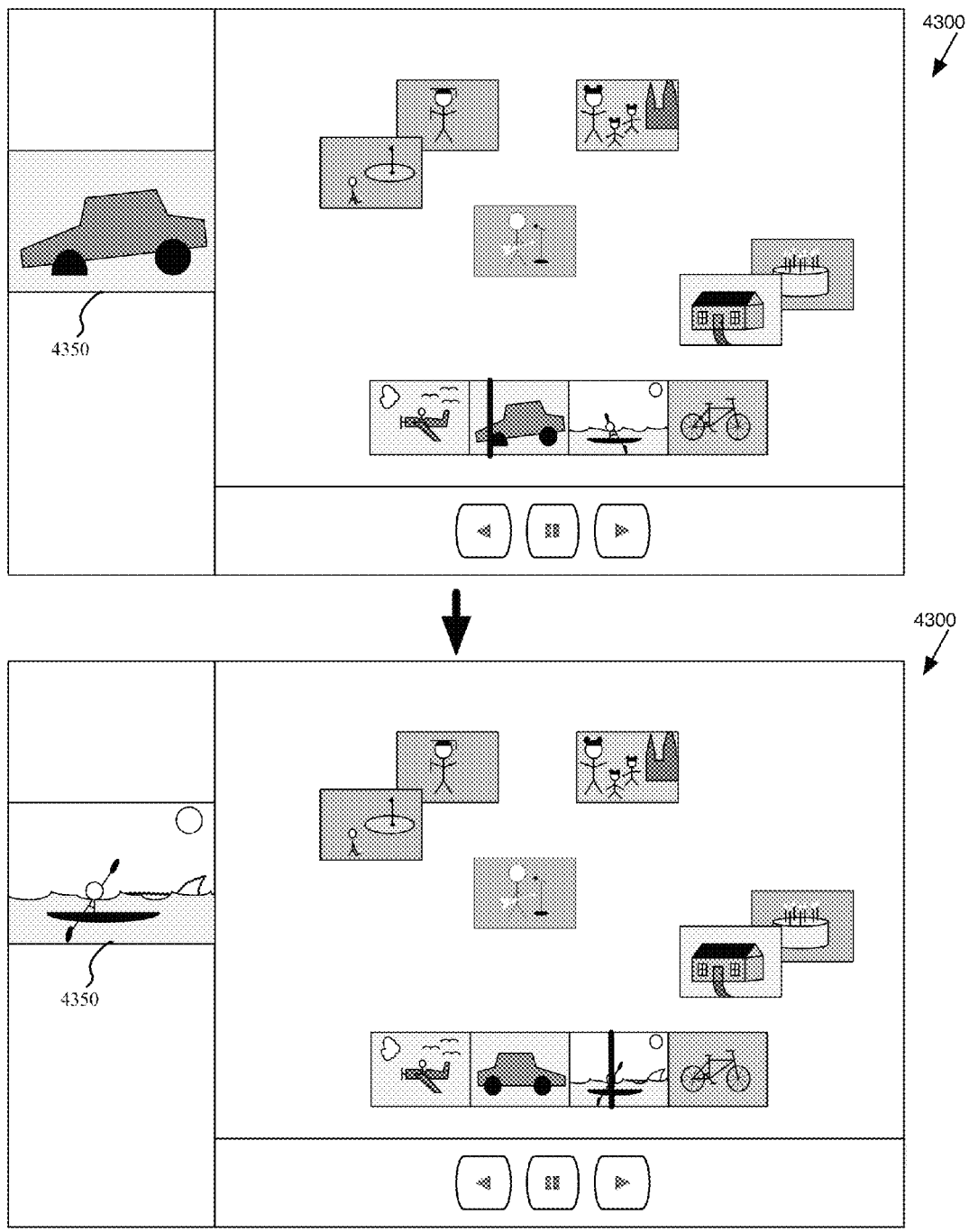
FIG. 44 illustrates an example of GUI at several stages that show playing back of a sequence of media clips in some embodiments.

As mentioned, the viewing area 4350 displays the currently playing video clip in the sequence. In some embodiments, multiple sequences and/or individual media clips can be played concurrently in the free-form display area. In some such embodiments, the viewing area 4350 plays the sequence or clip most recently selected for playback by the user. If this sequence or clip ends while another sequence or clip is still playing, then the viewing area of some embodiments starts to play that sequence or clip. FIG. 44 illustrates the full GUI 4300 during the latter two stages of FIG. 43. As can be seen, the viewing area 4350 in each of these stages displays the currently playing frame from the sequence 4345.

Figure 45:
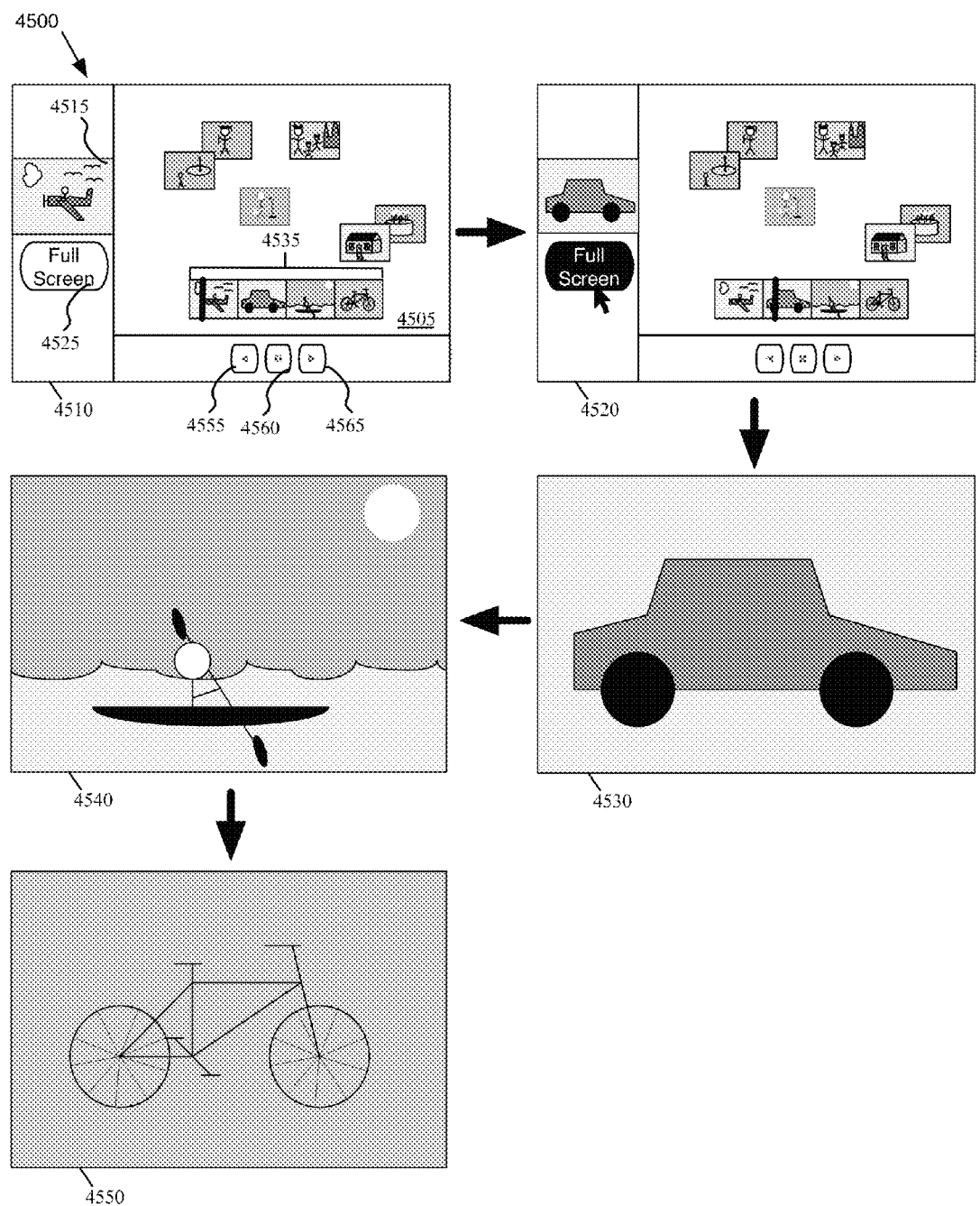
FIG. 45 illustrates an example of GUI at several stages that show playing back of a sequence of media clips in some embodiments.

In some embodiments, a clip or sequence can also be played back in full screen mode. Once the sequence is being played back in the display area, the user can invoke the full screen mode by a hotkey, a user interface item, etc. FIG. 45 illustrates an example of playing back a sequence 4535 in such a full screen mode in a GUI 4500. FIG. 45 illustrates the playback of the sequence at five stages 4510-4550. As shown, the GUI 4400 includes a display area 4505, a viewing area 4515, and playback controls 4555-4565. The display area 4505 displays a sequence 4535 as well as other sequences and individual media clips. The controls, display area, and viewing area are the same as shown above in FIG. 43, except that the viewing area 4515 also includes a full screen invocation control 4525. In some embodiments this control is located instead near the playback controls 4555-4565.

At the first stage of FIG. 45, the user has invoked the playback feature and the sequence 4535 has begun to play in the display area 4505 and the viewing area 4515. At the second stage, the user places a cursor over the full screen invocation control 4525 as the sequence continues to play and selects the control. In some embodiments, a hotkey is used to invoke the full screen playback mode. As a result, at the third stage 4530, the entire GUI 4500 is occupied by the playing video clip. The stages 4540 and 4550 illustrate that the sequence continues to play back in full screen mode.

As shown, in some embodiments a media clip or sequence can be played back in full screen mode when the sequence is already being played back in the display area. In some embodiments, the user can first select a sequence to play back and switch to the full screen mode before the user starts to play back the sequence. In some such embodiments, the poster frame of the left-most media clip in the sequence is displayed in full screen mode and then the user can invoke a playback command. A playhead does not appear in the full screen mode in some embodiments.

In some embodiments, many of the editing and organizing features described in the previous sub-sections can be performed as the sequence is being played back in the free-form display area. For example, users can concatenate additional media clips to a sequence, remove media clips from a sequence, move a sequence in the display area, pile or stack sequences, etc., while one or more of the sequences is playing. In addition, other editing operations on both single clips and sequences, described below, may also be performed as the video is played back in the free-form display area.

IV. Editing Media Clips in Display Area

As mentioned above, some embodiments allow a user of a media-editing application to edit media clips in a free-form display area of the media-editing application. The user can create composite presentations in the display area by concatenating multiple media clips into sequences, as described in the previous section. The user also can edit media clips in the display area in other ways, as will be described in detail below. Sub-section IV.A will describe several embodiments that allow the user to edit single media clips, while sub-section IV.B will then describe several examples of editing composite presentations.

A. Editing Single Media Clips

Some embodiments provide several different operations for a user of a media-editing application to perform to edit single media clips in a display area. Some such operations include marking regions of interest within media clips, duplicating media clips, tagging and filtering media clips, trimming media clips and other editing commands. Before describing these editing operations, the following subsection will describe a feature of some embodiments that displays the file names associated with media clips in the free-form display area. The subsections following this will then describe various editing operations that a user can perform on media clips in the free-form display area.

i. Revealing Names of Media Clips

As mentioned, some embodiments provide an option that enables a user to cause the media-editing application to display file names associated with media clips in the free-form display area. As described above, each media clip in the free-form display area refers to a source file. The file name of this source file is displayed over the media clips in some embodiments.

Figure 46:
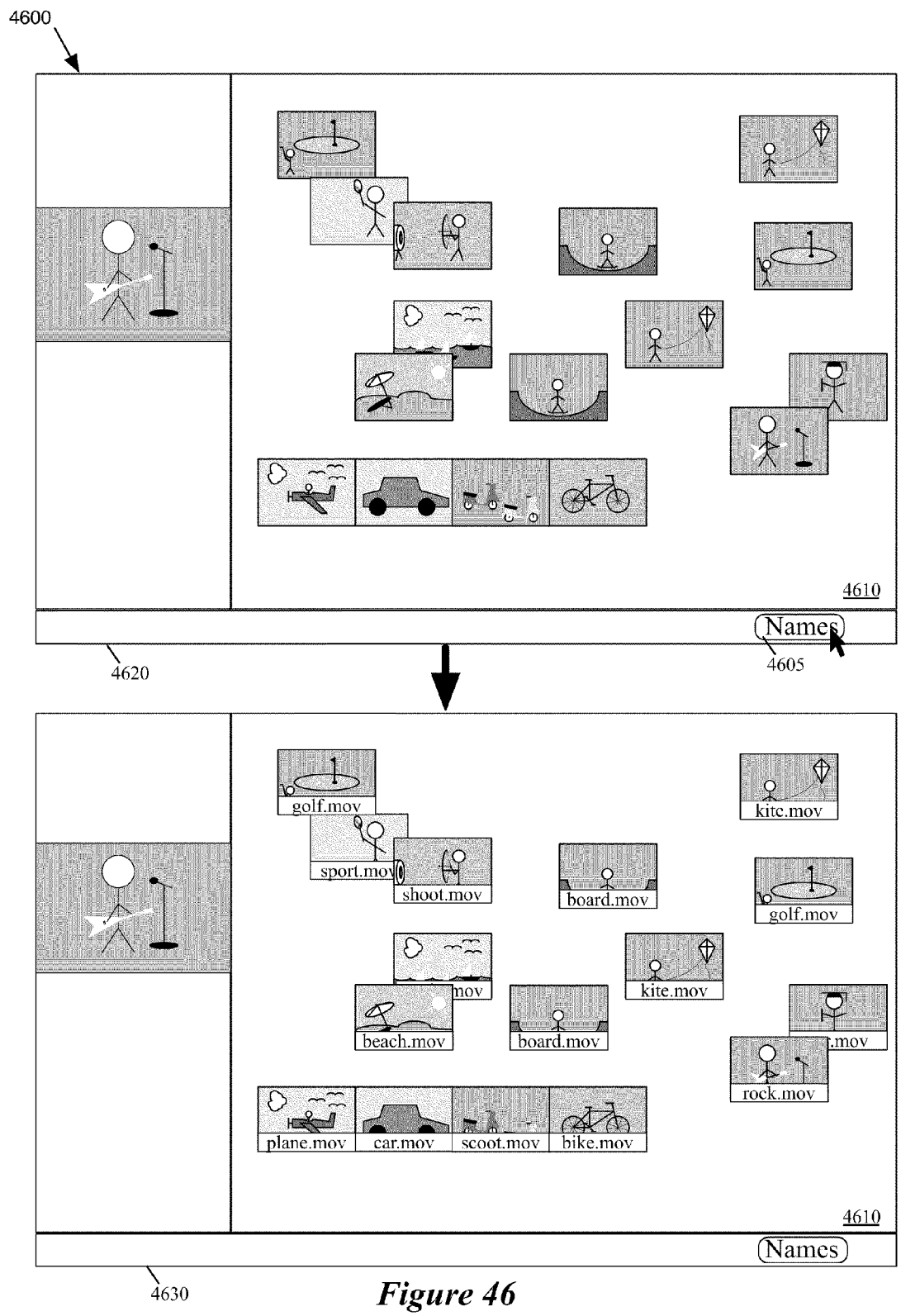
FIG. 46 illustrates an example of GUI at several stages that show revealing names of media clips in some embodiments.

FIG. 46 illustrates an example of the use of such a name display feature in a GUI 4600. FIG. 46 illustrates the operation of this feature in two stages 4620 and 4630. The GUI 4600 includes a display area 4610 that is similar to the free-form display area 700 described above by reference to FIG. 7, and also includes a selectable name display UI item 4605. The selection of the UI item 4605 causes the names of the source media files with which the media clips in the free-form display area are associated to be displayed.

At the first stage 4620, a user has moved a cursor over the selectable item 4605. In various embodiments, the name display feature may be invoked in various ways: through a drop-down menu, a hotkey, etc. At the second stage 4630, the names of the media files for the media clips are shown over the bottom of the thumbnail representing the media clips. In this example, names are displayed for all of the media clips in the free-form display area. Some embodiments allow a user to selectively display names for media clips by selecting particular clips and then invoking the name display feature. In some embodiments, a user can invoke the command a second time to have the names no longer displayed.

Different embodiments display the names of media clips differently. For instance, the names can be displayed inside the media clip as shown. Some embodiments enable a user to configure the location in or around the clip representation where the file names are displayed (e.g., at the bottom, at the top, underneath, etc.).

ii. Regions of Interest

Figure 47:
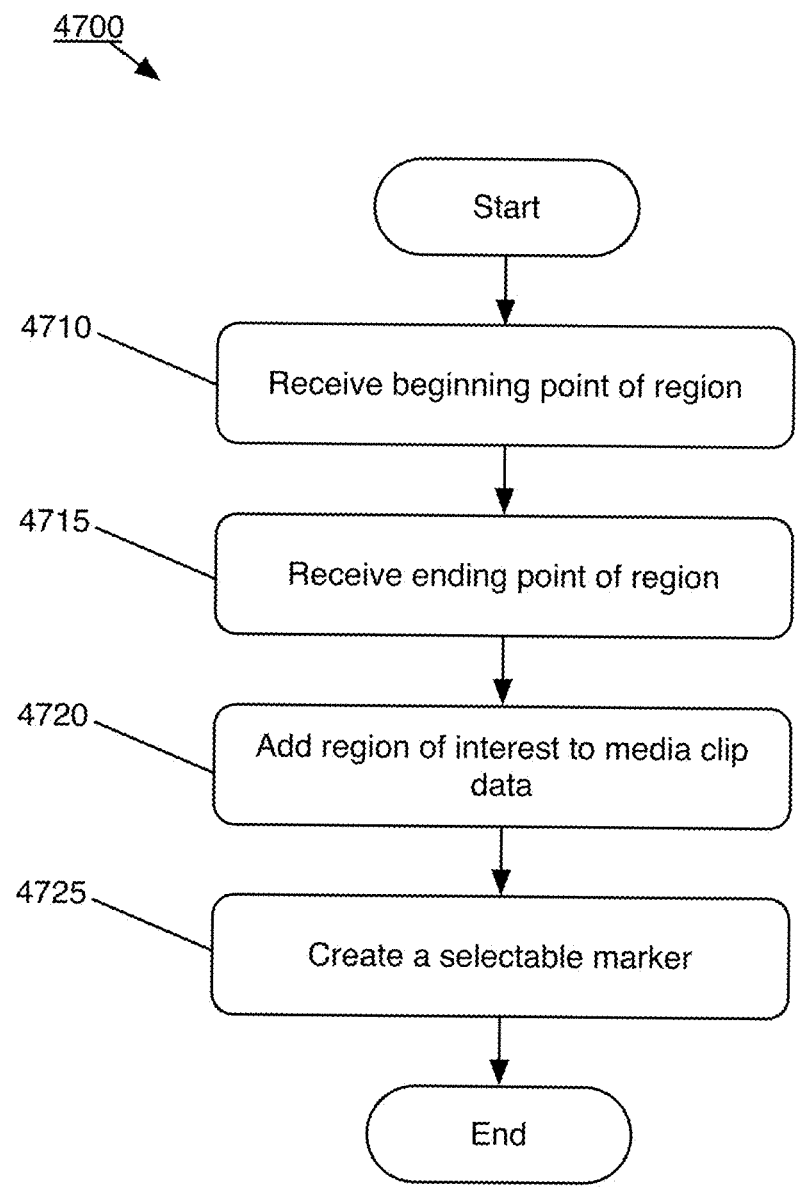
FIG. 47 illustrates an example of a conceptual process that some embodiments use to mark a region of interest in a media clip in some embodiments.

Some embodiments enable a user to mark a region of interest of a media clip in the free-form display area. A region of interest is a temporal portion of a media clip that is selected by the user. FIG. 47 conceptually illustrates a process 4700 of some embodiments for marking a region of interest of a video clip. The process will be described by reference to FIGS. 48 and 49, which illustrate different ways to mark a region of interest in a media clip.

Figure 48:
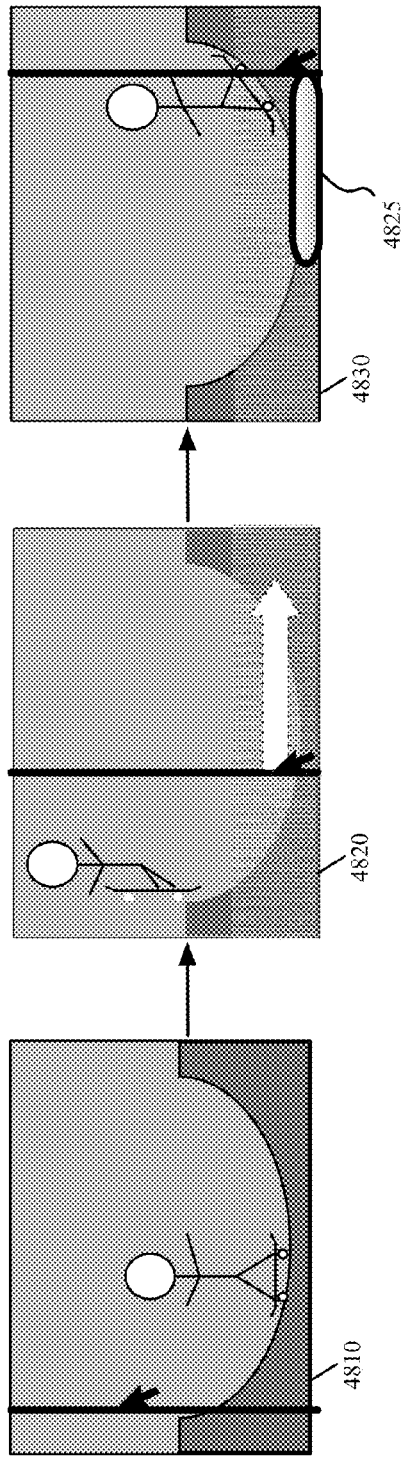
FIG. 48 illustrates an example media clip at several stages that show marking a region of interest in a media clip in some embodiments.
Figure 49:
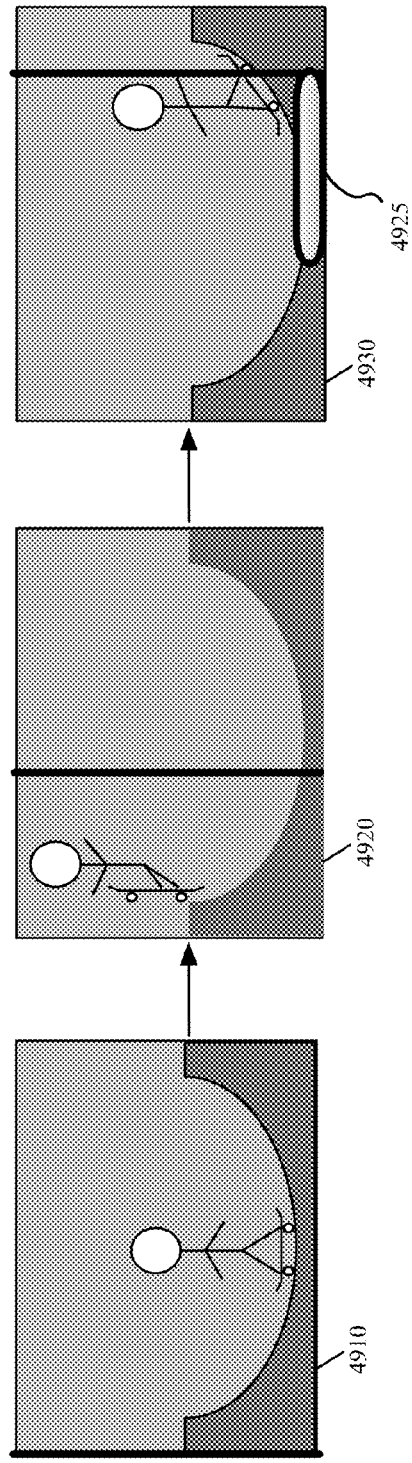
FIG. 49 illustrates an example media clip at several stages that show marking a region of interest in a media clip in some embodiments.

Each of FIGS. 48 and 49 illustrates a media clip 4800 over three stages. In FIG. 48, the user selects a region of interest while scrubbing through the media clip 4800 over stages 4810-4830. In FIG. 49, the user selects a region of interest while playing back the media clip 4800 over three stages 4910-4930. Stage 4810 illustrates that a user is scrubbing through the media clip by dragging the playhead with a cursor. Stage 4910 illustrates that the user has begun playback of the media clip.

Returning to FIG. 47, the process 4700 begins by receiving (at 4710) a beginning point in a media clip for a region of interest. The beginning point may be anywhere in the temporal length of the media clip. Stage 4820 illustrates that the playhead has been moved to a first location in the media clip (approximately two-fifths of the way through). At this juncture, the user performs input to indicate the marking of the media clip. In some embodiments, the user holds a mouse button down along with a hotkey and drags the playhead across the media clip.

Stage 4920 illustrates that the playhead is approximately two-fifths of the way through the media clip in its playback. At this point, the user performs input to indicate the marking of the media clip. In some embodiments, the user holds down a hotkey during playback or performs other input in order to select the region of interest.

The process 4700 next receives (at 4715) an end point in the media clip for the region of interest. The end point may be anywhere in the temporal length of the media clip after the beginning point. Stage 4830 illustrates that the playhead has been moved to a second location in the media clip that is approximately five-sixths of the way through the clip. At this point, the user has released the hotkey and/or mouse button in order to mark the endpoint. Similarly, at stage 4930 illustrates that the user has performed input (e.g., releasing the hotkey) to mark the end of the region of interest during the playback of the media clip.

The process then adds (at 4720) the region of interest to the data structure for the media clip. Some embodiments, as described above, store a data structure for each media clip in the free-form display area. The process 4700 adds information about the region of interest (i.e., the beginning and end points in the timecode of the source file) to the data structure for the media clip.

The process also creates (at 4725) a selectable marker over the representation of the media clip in the free-form display area. As shown at stage 4830 (and at stage 4930), a marker 4825 (or 4925) is displayed that spans the selected region of interest. While the markers are shown as a gray bar, one of ordinary skill will recognize that any other user interface item may be used. The illustrated marker spans a portion of the thumbnail representing the media clip that corresponds to the temporal position of the region of interest.

Figure 50:
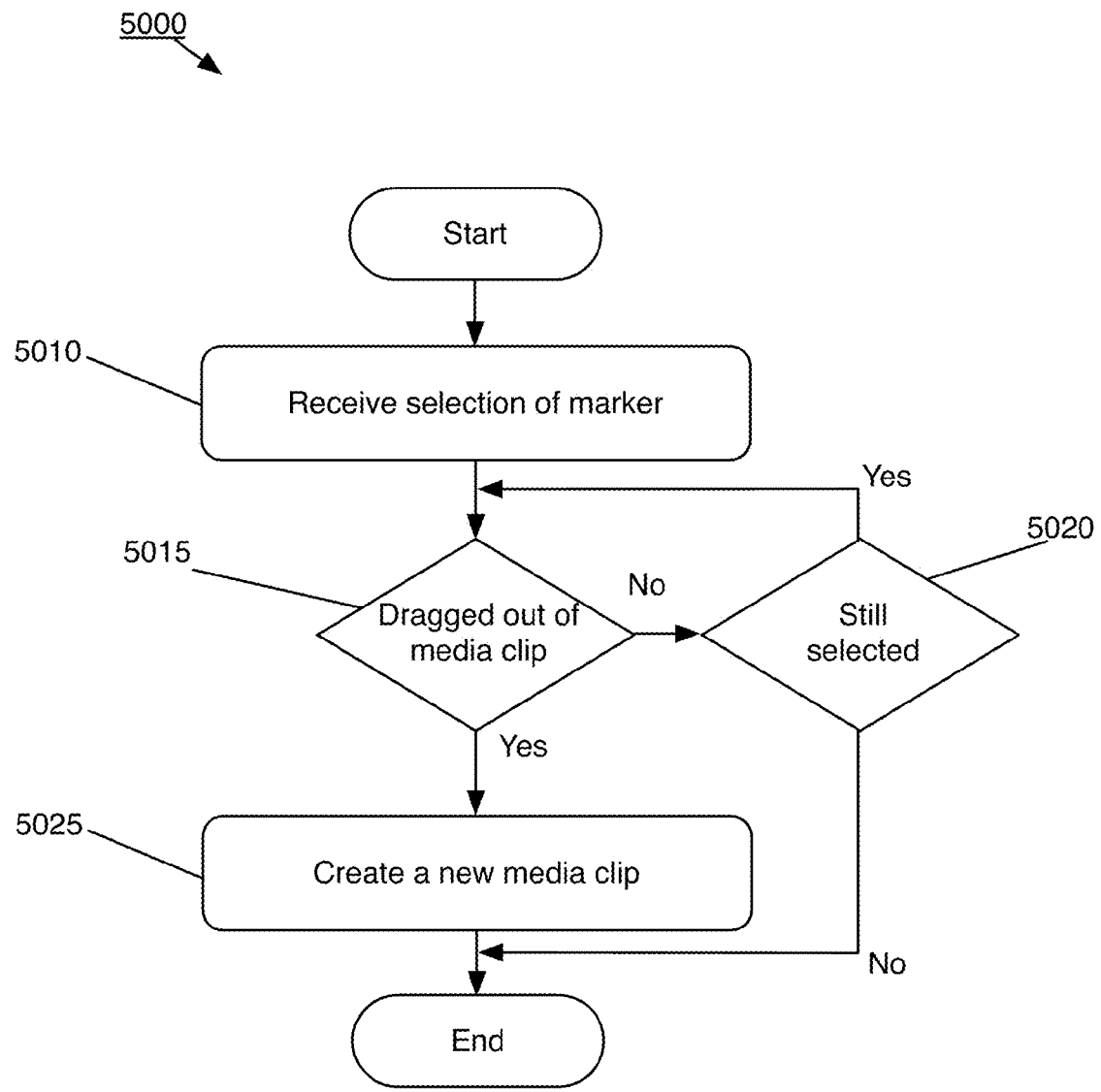
FIG. 50 illustrates an example of a conceptual process that some embodiments use to create a new media clip out of a marked media clip in some embodiments.

Once a region of interest is selected, the user can create a new media clip that contains only the media spanned by the region of interest (i.e., eliminating the rest of the original media clip). FIG. 50 conceptually illustrates a process 5000 of some embodiments for extracting a region of interest to create a new media clip. The process 5000 will be described by reference to FIG. 51, which illustrates such an extraction in a GUI of some embodiments.

Figure 51:
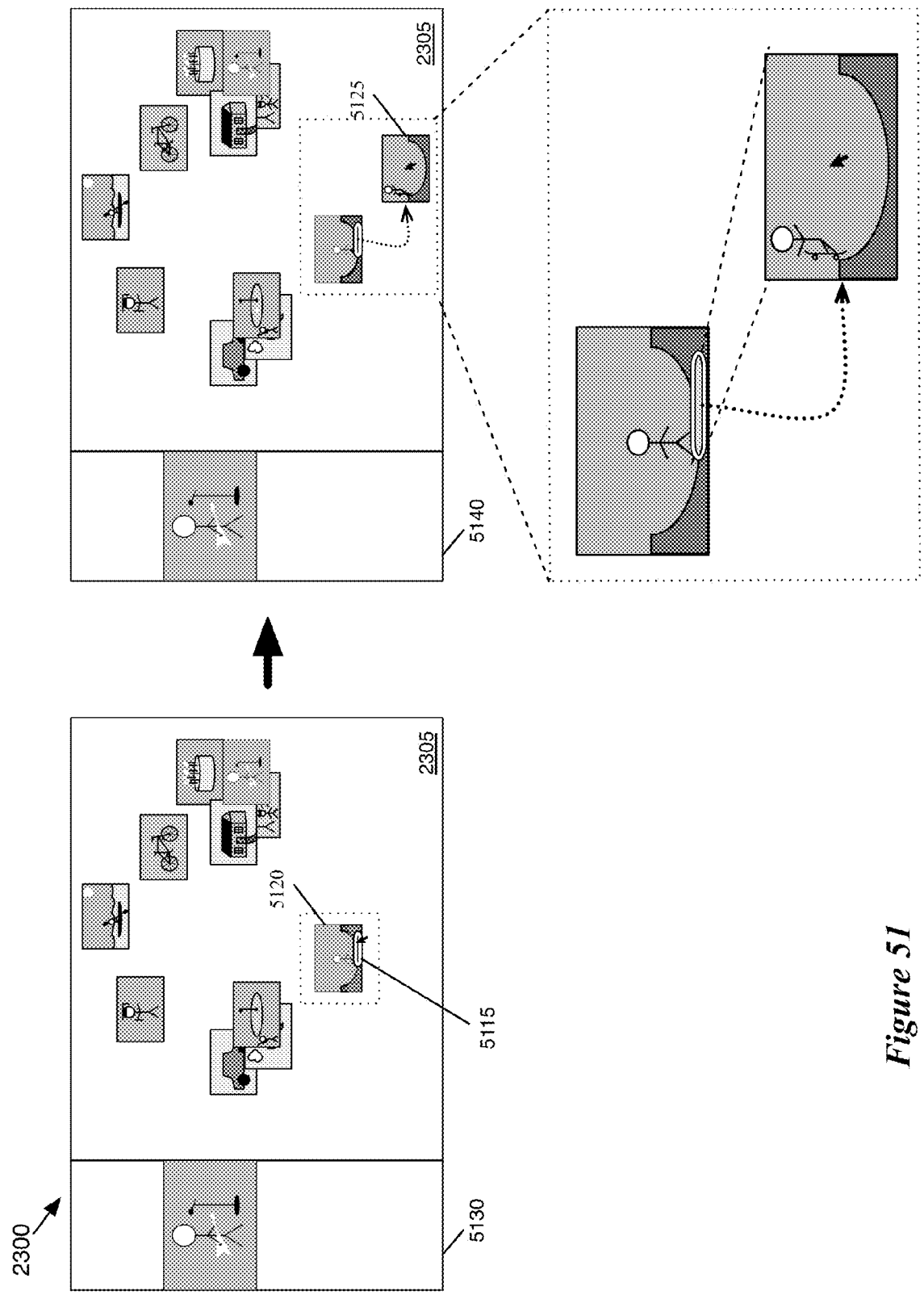
FIG. 51 illustrates an example GUI at several stages that show creating a new media clip out of a marked media clip in some embodiments.

FIG. 51 illustrates the extraction of a region of interest 5115 from a media clip 5120 over two stages, 5130 and 5140. In the first stage 5130, the media clip is displayed in a free-form display area 2305 of the GUI 2300.

As shown, the process 5000 begins by receiving (at 5010) a selection of a marker representing a region of interest of a media clip. The user may select the marker by touching it on a touch screen, clicking a mouse button with the cursor over the marker, etc. The process then determines (at 5015) whether the marker has been dragged out of the media clip. In order to create a new clip in some embodiments, the user selects a marker and drags it outside of the clip.

Thus, when the marker has been dragged out of the media clip, the process creates (at 5025) a new clip from the region of interest and ends. The new clip that is created will refer to the same source media file as the clip from which it was created, but will have different in and out-points. The in and out-points of the new clip will be the start and end points of the region of interest in some embodiments. In some embodiments, rather than extracting the selected region of interest by dragging, a user can press a hotkey or select an option from a drop-down menu in order to create a new media clip using the selection region. For instance, by pressing a hotkey or selection an option from a drop-down menu, the user can copy the marker and paste in a display area to create a new media clip.

The second stage 5140 illustrates that the user has moved the region of interest outside of the media clip 5120 to create a new clip 5125. As illustrated in the exploded view, the start of clip 5125 is the start of the region of interest 5115, and the end of clip 5125 is the end of the region of interest 5115.

When the marker has not been dragged out of its media clip, the process 5000 determines (at 5020) whether the marker is still selected. If a user has unselected the region of interest (e.g., if the user decides not to extract the region of interest) or deleted the region of interest (in some embodiments, the region of interest is deletable), the process ends. Otherwise, the process returns to 5015 to again determine whether the region of interest has been extracted.

Figure 52:
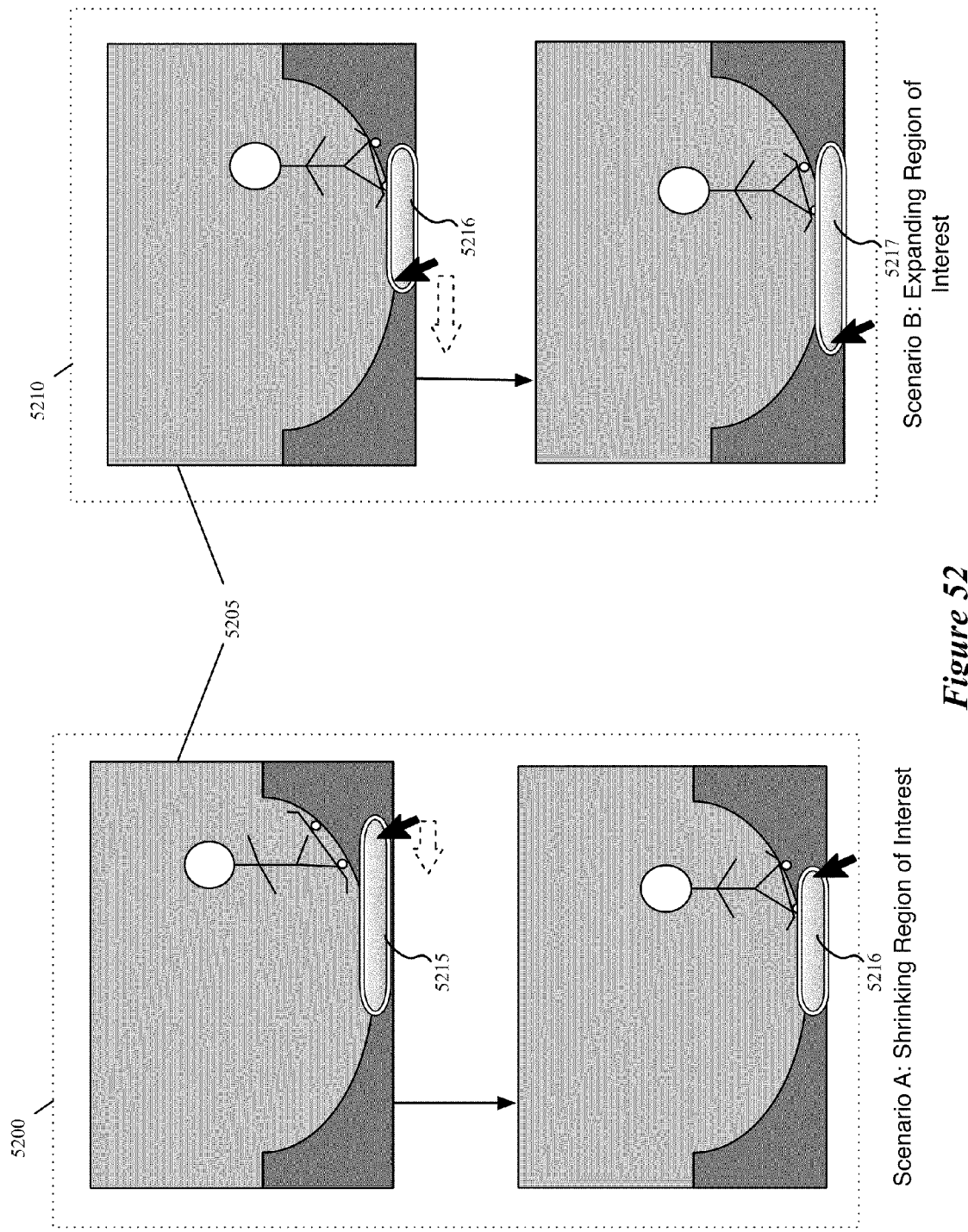
FIG. 52 illustrates an example GUI at several stages and in several scenarios that show adjusting a marked region of a media clip in some embodiments.

Regions of interest of a media clip can also be adjusted in some embodiments. Such regions can be expanded, shrunk, or moved in some embodiments. FIG. 52 illustrates two scenarios 5200 and 5210, each of which illustrates a media clip 5205 in two stages. The media clip 5205 includes a region of interest represented by a marker 5215.

In the first scenario 5200, a user shrinks the region of interest. The user places a cursor over the right edge of the marker 5215, selects this edge (e.g., by pressing down on a mouse button), and moves the cursor to the left. Some embodiments define a portion of the region of interest marker 5215 over which the cursor can be when the mouse button is pressed in order to select the edge for adjustment. By moving the cursor to the left with the right (ending) edge selected, the end point of the region of interest is moved earlier in the media clip, thereby shortening the region of interest. The resulting marker is marker 5216. The user can also select the left (starting) edge and move it to the right in order to shorten the region of interest by moving the start point later in the media clip.

In the second scenario 5210, a user expands the region of interest. The user places a cursor over the left edge of the marker 5216, selects this edge (e.g., by pressing down on a mouse button), and moves the cursor to the left. By moving the cursor to the left with the left (starting) edge selected, the start point of the region of interest is moved earlier in the media clip, thereby expanding the region of interest. The resulting marker is marker 5217. The user can also select the right (ending) edge and move it to the right in order to expand the region of interest by moving the end point later in the media clip.

Some embodiments also allow a user to keep the length of the region of interest the same, but move the region of interest within the media clip. By selecting a portion of the region of interest close to the center (i.e., away from the edges) and moving the cursor, the region of interest can slide along the timeline of the media clip.

iii. Duplication of Media Clips

Within the free-form display area of some embodiments, duplicates of multiple clips can exist. When clips are duplicates, some embodiments create duplicate data structures that point to the same source media file and have the same in and out-points. A user might want duplicate clips so that the user can insert the clip into different sequences to see how the different sequences will look. In addition, a user can edit one of the duplicates to modify the in and out-points and create different media clips that point to the same source media file.

Figure 53:
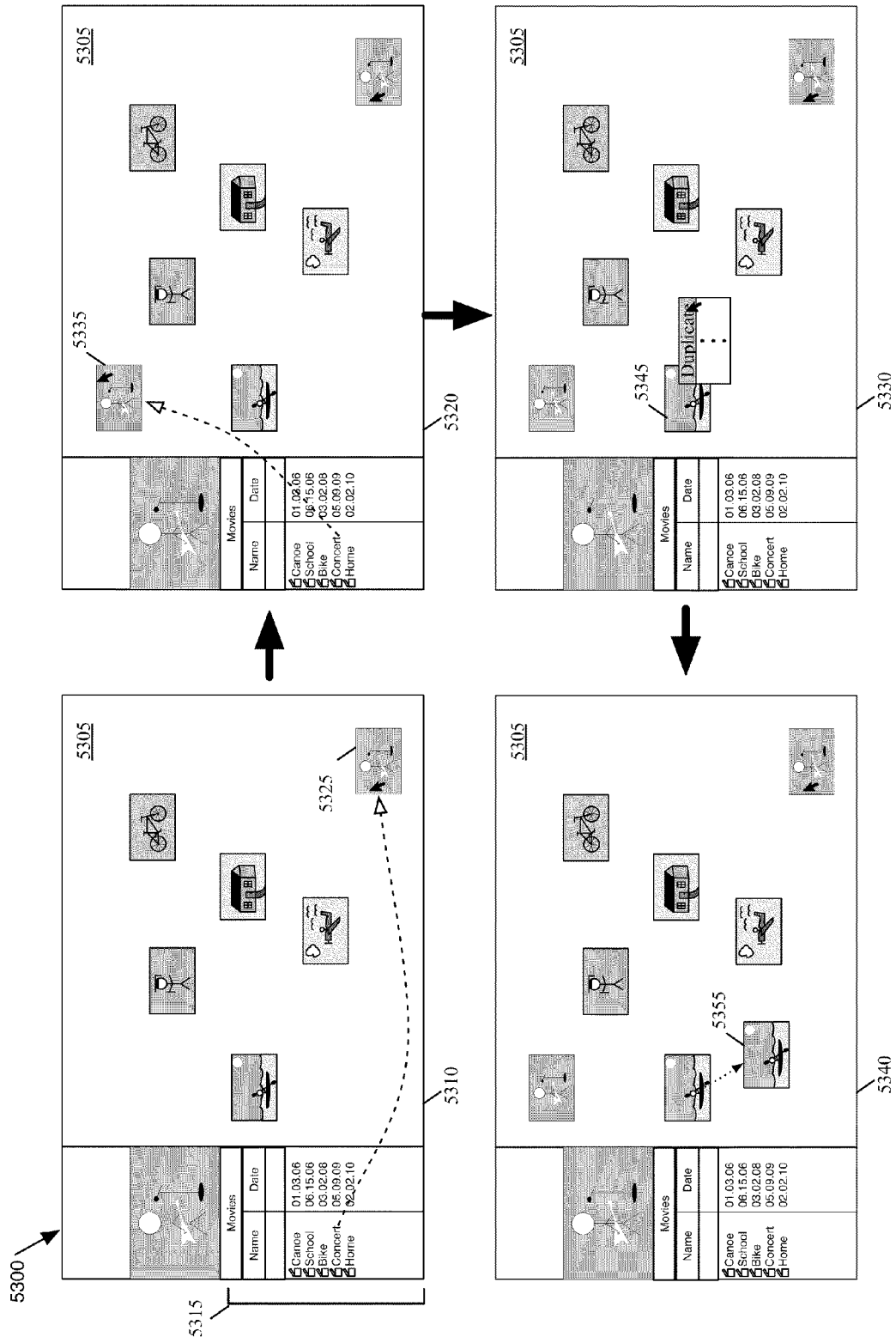
FIG. 53 illustrates an example GUI at several stages that show duplicating a media clip in some embodiments.

FIG. 53 illustrates examples of duplicating media clip in a free-form display area 5305 of some embodiments. FIG. 53 illustrates the operation of this feature in four stages of a GUI 5300: in the first two stages 5310 and 5320, the same clip is inserted twice from a browser 5315, while in the third and fourth stage 5330 and 5340 a clip is duplicated within the free-form display area. This figure illustrates that the free-form display area 5305 and the browser 5315 are part of the same GUI 5300 for a media-editing application. In some embodiments, the browser operates separately from the media-editing application (e.g., the browser could be a file folder).

As shown at stage 5310, the user has selected a source media file ("concert") in the browser 5315 and dragged that into the free-form display area 5305 to create a media clip 5325. At this point, some embodiments create a data structure for the media clip. The in and out-points of this newly created clip are the start and end timecodes of the source file in some embodiments. At the second stage 5320, the user has again selected the same source media file ("concert") in the browser 5315 and dragged that into a different location in the free-form display area 5305 to create another media clip 5335. The media clip 5335 will have the same information in its data structure as that for clip 5325, except that its unique ID will be different.

Stage 5330 illustrates that a user has selected a media clip 5345 and executed a duplicate clip command. In some embodiments, the user can right click on the clip to cause a drop-down menu to appear, and one of the commands in the menu is a duplicate clip command. In some embodiments, the user can also use a hotkey to cause the menu to appear, or use a hotkey to execute the command. At stage 5340, a new media clip 5355 has appeared in the free-form display area that is a duplicate of the selected clip 5345. A new data structure is created for this clip that has the same information (source file, in and out-points) as the data structure for clip 5345, except with a different unique identifier. In some embodiments, a user can also create a region of interest that is the entire length of a media clip and then extract that region to arrive at the same result.

iv. Tagging and Filtering Media Clips

In some embodiments, media clips in the free-form display area can be tagged and thereby grouped into categories. Users can type in tags for the media clips, select from a group of listed tags, etc. Once a list of one or more tags exists for a project, some embodiments perform auto-completion as a user types in a tag. In addition, users can filter the display of media clips in the free-form display area based on tags. Users can select a tag and the media-editing application will display only clips that are tagged with the selected tag in the free-form display area.

Some embodiments perform the tagging at the frame level rather than the clip level, or at both levels. A user can tag a specific frame or set of frames in some embodiments, and this tag applies to both the frame and the clip. If the frame is extracted as part of a new clip, the clip will also have the same tag in some embodiments.

Figure 54:
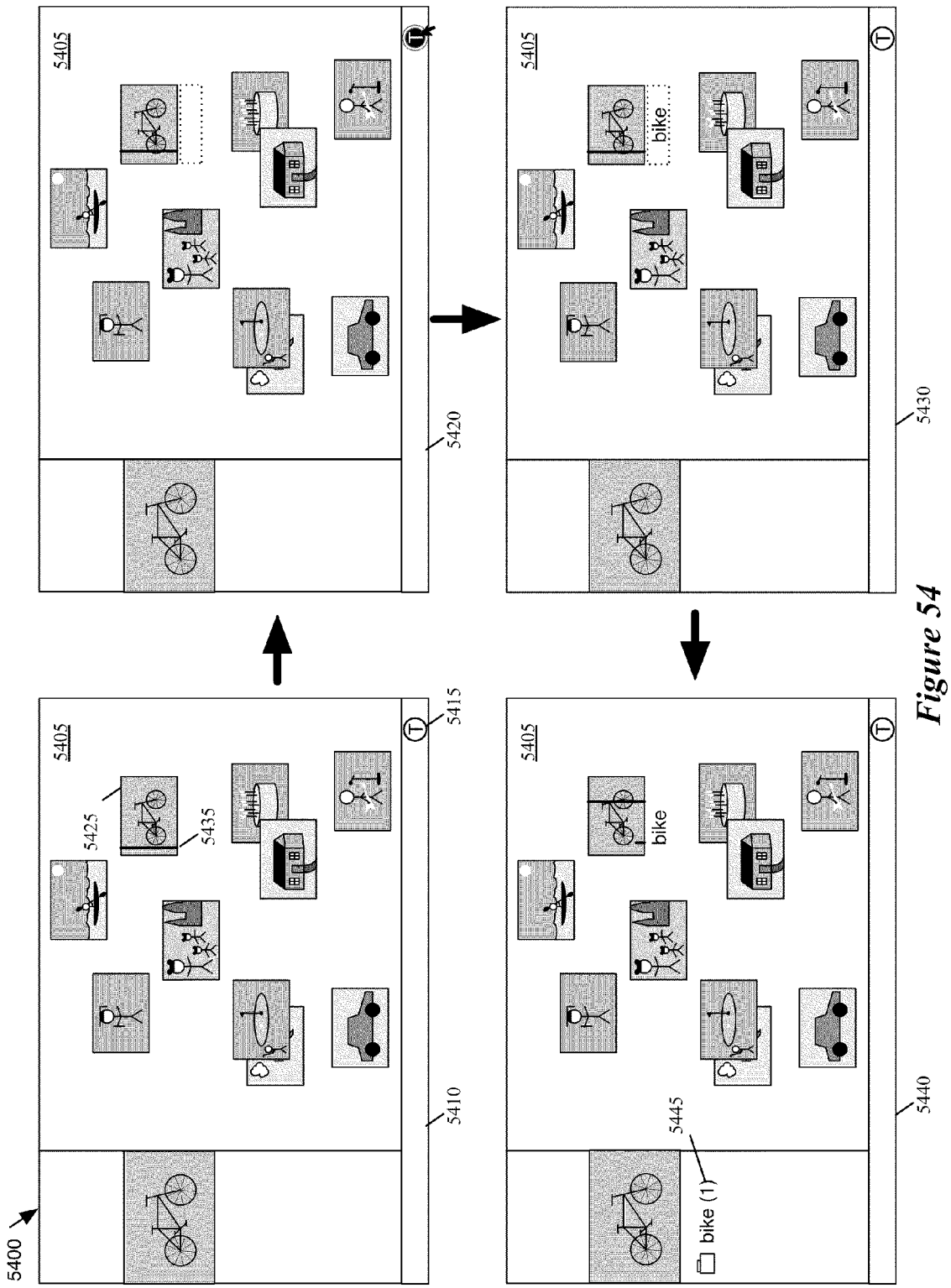
FIG. 54 illustrates an example GUI at several stages that show tagging a media clip and creating a bin in some embodiments.

FIG. 54 illustrates an example of tagging a media clip in a free-form display area 5405 of some embodiments. FIG. 54 illustrates this tagging process in four stages 5410-5440 of a GUI 5400 that includes the display area 5405. The display area 5405 is similar to the free-form display area 700 described above by reference to FIG. 7. The display area 5405 includes a tag input UI item 5415 and a media clip 5425, as well as several other media clips.

In the first stage 5410, a playhead 5435 is currently at a particular frame early in clip 5425. The user could have scrubbed through the media clip to that frame or the media clip could be playing back. At the second stage 5420, the user has selected the tag input UI item 5415 with a cursor. In some embodiments, the user accesses the tagging functionality through a hotkey, a menu option, etc. As a result of the selection of the UI item 5415, a text input window is now displayed below the media clip 5425.

At the third stage 5430, the user has typed the word "bike" into the text input window below the media clip 5425. The fourth stage 5440 illustrates that the user has input "bike" as a tag for the media clip 5425. At least the frame at which the playhead was located at stage 5420 is tagged with the word "bike". The location of this frame in the temporal length of the media clip is indicated by the marker in the clip. In addition, a bin 5445 for the tag "bike" has been created in a browser 5450.

Some embodiments store the tag information as metadata about the media clip. In some embodiments, the tag and the frames of the media clip with which it is associated is stored in the data structure for the media clip. The metadata in the data structures is discussed in further detail below.

Figure 55:
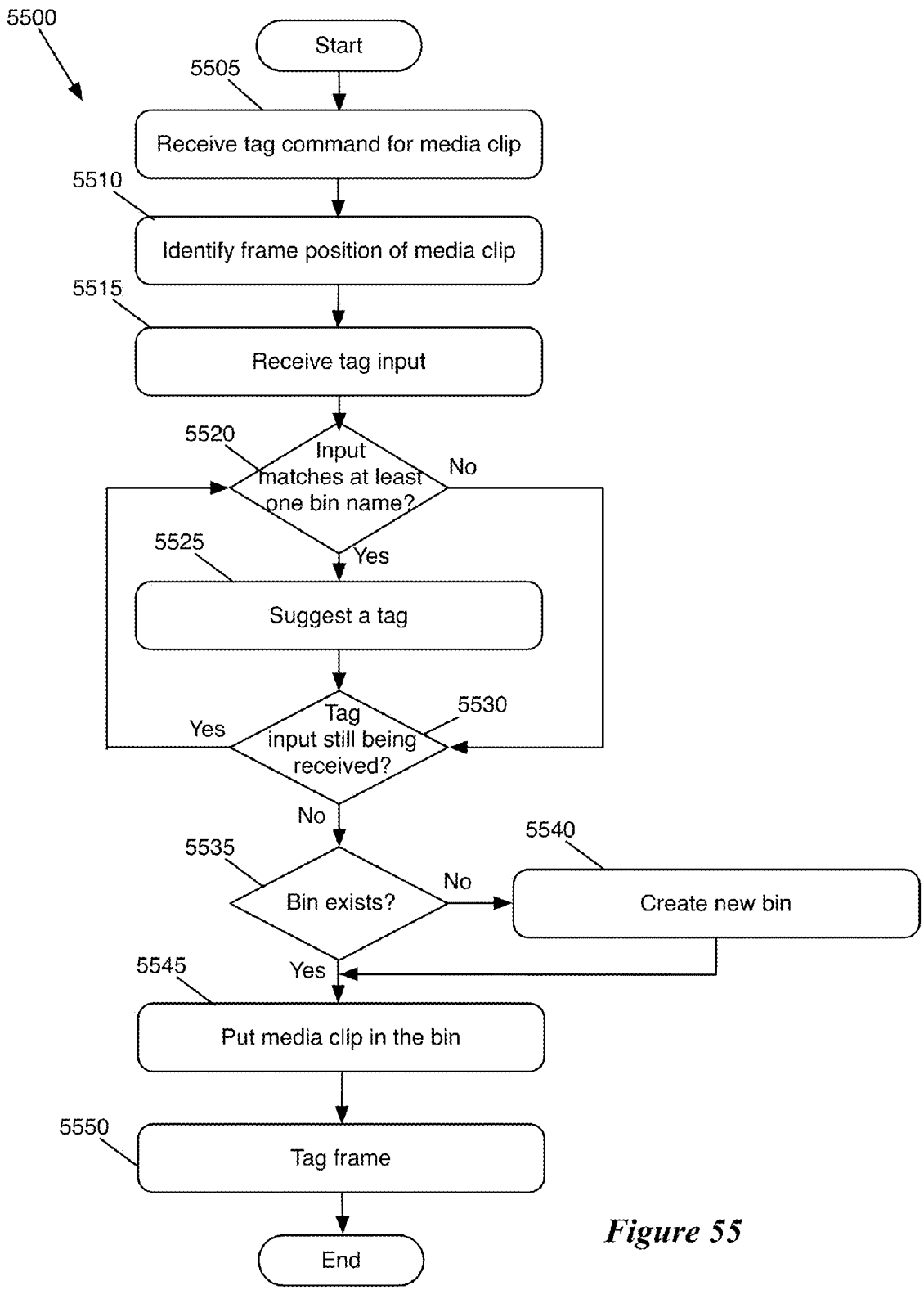
FIG. 55 illustrates an example of a conceptual process that some embodiments use to tag a media clip and create a bin in some embodiments.

FIG. 55 conceptually illustrates a process 5500 of some embodiments for tagging a media clip. The process 5500 is performed by the media-editing application as a user types in a tag for a media clip (or frame of a media clip), and suggests tags based on what the user has typed and any tags already created for media clips in the project that includes the media clip. The process 5500 will be described by reference to FIG. 56, which illustrates the GUI 5400 in four stages 5610-5640. At the first stage 5610, the GUI 5400 has two tag bins with one media clip each. Media clip 5425 is tagged with "bike" and therefore has been placed bin 5445, and media clip 5625 is tagged with "ride" and therefore has been placed in bin 5455.

Returning to FIG. 55, the process 5500 begins by receiving (at 5505) a tag command for a media clip. As described above, this command may be received by selection of a selectable UI item (as shown in FIG. 54), selection from a drop-down or other menu, typing of a hotkey, etc. After receiving the tag command, the process 5500 identifies (at 5510) the frame position of the media clip. In some embodiments, the frame position is the current location of the playhead in the selected media clip that is being tagged. The playhead could have been scrubbed to its current location or might be at the position as a result of the media clip being played back.

Stage 5620 illustrates that a user has selected the tag entry UI item 5415 and that a text entry field has appeared underneath the playhead 5435, which is approximately two-thirds of the way through media clip 5425. At this point, the operation of the GUI 5400 is similar to its operation in the first two stages of FIG. 54.

The process 5500 next receives (at 5515) tag input (e.g., from a user typing text into the text input field). At stage 5630 of FIG. 56, the user has typed the letter "r" into the text input field. The process determines (at 5520) whether the received input matches at least one bin name. That is, the process checks the typed input against the various tags that have already been input for the project that is displayed in the free-form display area.

Figure 56:
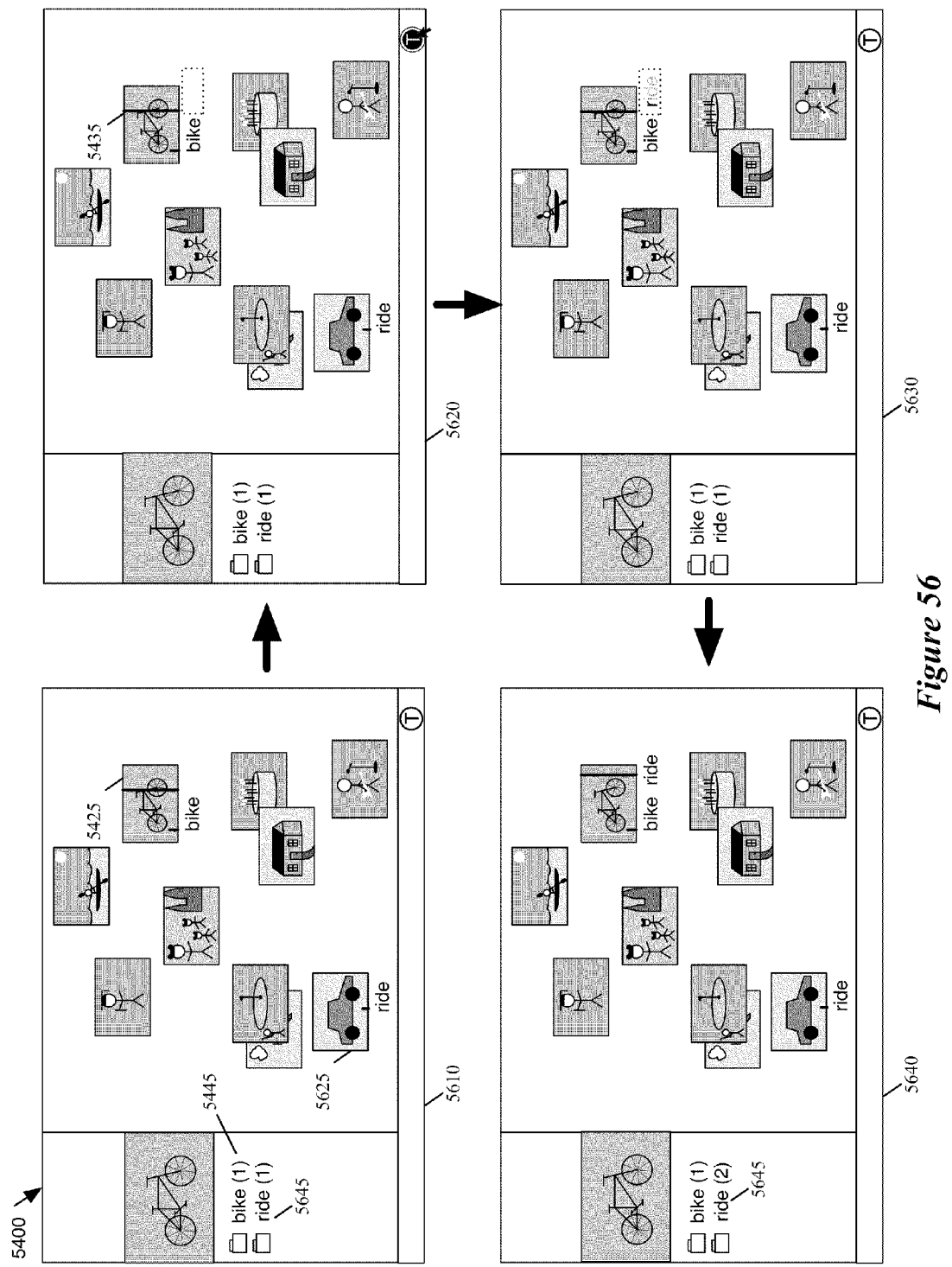
FIG. 56 illustrates an example GUI at several stages that show tagging a media clip in some embodiments.

When the input matches one of the tags that has already been created, the process suggests (at 5525) the tag. When multiple tags match (e.g., the user has typed the letter "b" and the tags "baseball" and "basketball" already exist, different embodiments use different criteria to determine which tag to suggest. Some embodiments go in alphabetical order (i.e., suggesting the first tag that matches). Instead of or in conjunction with going in alphabetical order, other embodiments suggest the tag that has been used the most or that has been used most recently. Stage 5630 of FIG. 56 illustrates that as the user has typed the letter "r", the rest of the word "ride" appears in light text, indicating that the word "ride" is suggested but that the user has not typed the letters "ide".

The process then determines (at 5530) whether tag input is still being received. The user could be deleting letters, continuing to type, etc. When the user has not finished inputting the tag, the process returns to 5520, described above. When the user has finished inputting the tag, the process determines (at 5535) whether a bin already exists for the input tag.

In the case that a user chooses to use a suggested tag, a bin will already exist for that tag. A user may also type out a full tag name for which a bin already exists while ignoring the suggestion feature. On the other hand, in some cases (e.g., the first time a tag is used for a project) a bin will not yet exist for the input tag. In this case, the process 5500 creates (at 5540) a new bin for the input tag. In either case, the process then places (at 5545) the tagged media clip in the appropriate bin. Finally, the process 5500 tags (at 5550) the frame identified at 5510. The process then ends.

Stage 5640 illustrates that the media clip 5435 is now tagged with the tag "ride" and added to the bin 5645 for the tag "ride". This bin now has two tags. Additionally, the media clip 5435 has now been placed in multiple bins, as it is tagged with both the tag "bike" and the tag "ride". In some embodiments, the space in each bin is unlimited and the number of tags for a particular clip is also unlimited.

Figure 57:
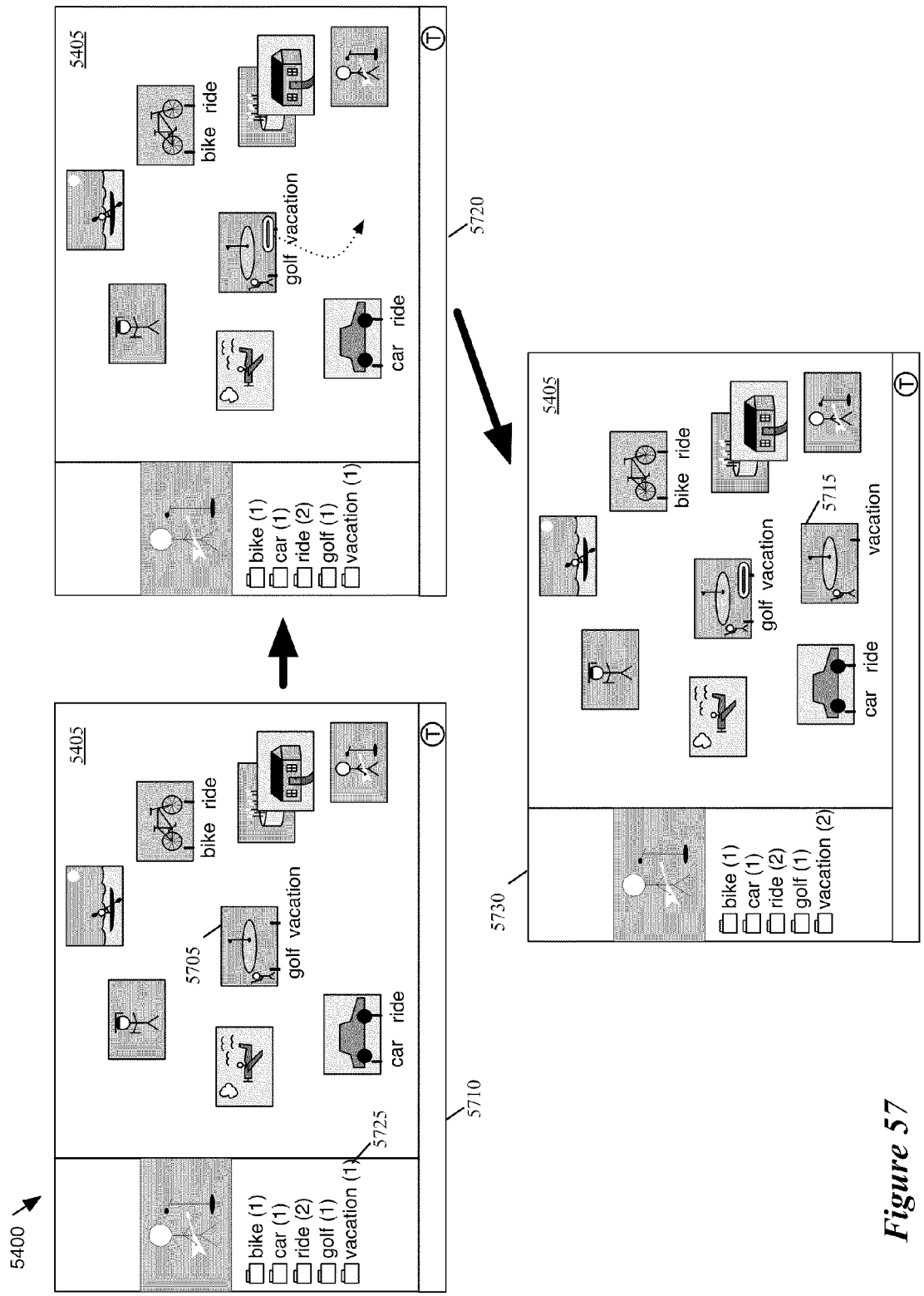
FIG. 57 illustrates an example GUI at several stages that show filtering media clips in some embodiments.

In some embodiments, a new clip extracted from a tagged clip may be created with a tag if one of the extracted frames is tagged. FIG. 57 illustrates such a clip creation process in three stages 5710-5730 of the GUI 5400. At the first stage 5710, the free-form display area 5405 includes a media clip 5705 that is tagged with the tags "golf" and "vacation". The term "golf" tags an early frame in the media clip while the term "vacation" tags a later frame in the media clip.

The second stage 5720 illustrates that a user has created a region of interest in the second half of media clip 5705 and extracted the region of interest in order to create a new media clip. The region of interest includes the frame that is tagged with the "vacation" tag. At stage 5730, the new clip 5715 is created. As this new clip includes the frame tagged with "vacation", the clip is also tagged with the tag "vacation". Accordingly, the bin 5725 for the "vacation" tag now includes two media clips (clips 5705 and 5715).

Figure 58:
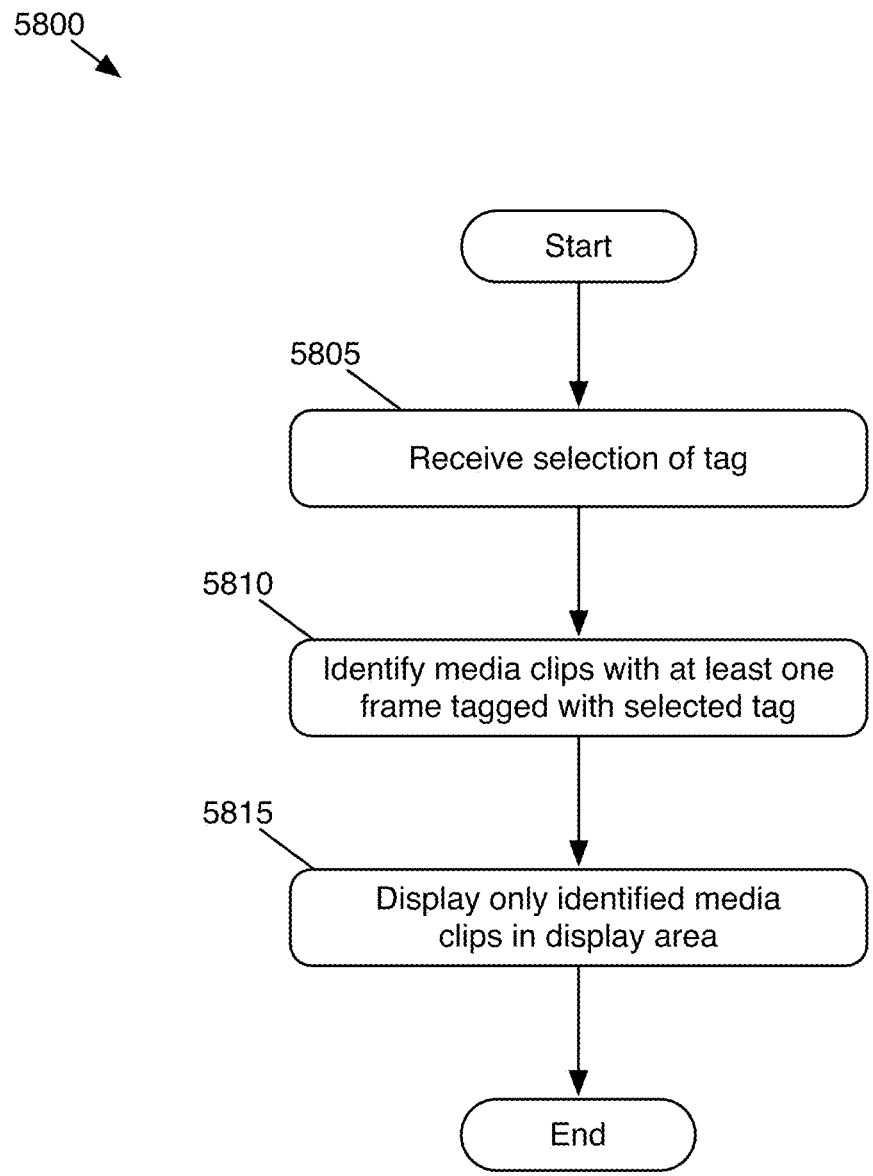
FIG. 58 illustrates an example of a conceptual process that some embodiments use to filter media clips.

Some embodiments use the tags and bins for filtering of the free-form display area. A user may select one of the bins, and the media-editing application will then only display clips or sequences in the selected bin within the free-form display area. FIG. 58 conceptually illustrates a process 5800 of some embodiments for filtering the display area in such a manner. The process 5800 will be described by reference to FIG. 59, which illustrates the GUI 5400 in four stages 5910-5940. At the first stage 5910, the GUI 5400 is displaying all media clips in the project within the free-form display area 5405.

As shown, the process 5800 begins by receiving (at 5805) a selection of a tag. In some embodiments, a tag is selected when a user selects the bin for that tag. The user might click on the bin, tap the bin on a touch-screen display, navigate to the bin using a hotkey or series of keystrokes, etc. In some embodiments, a tag can also be selected by clicking on (or tapping) an instance of the tag in the free-form display area.

Figure 59:
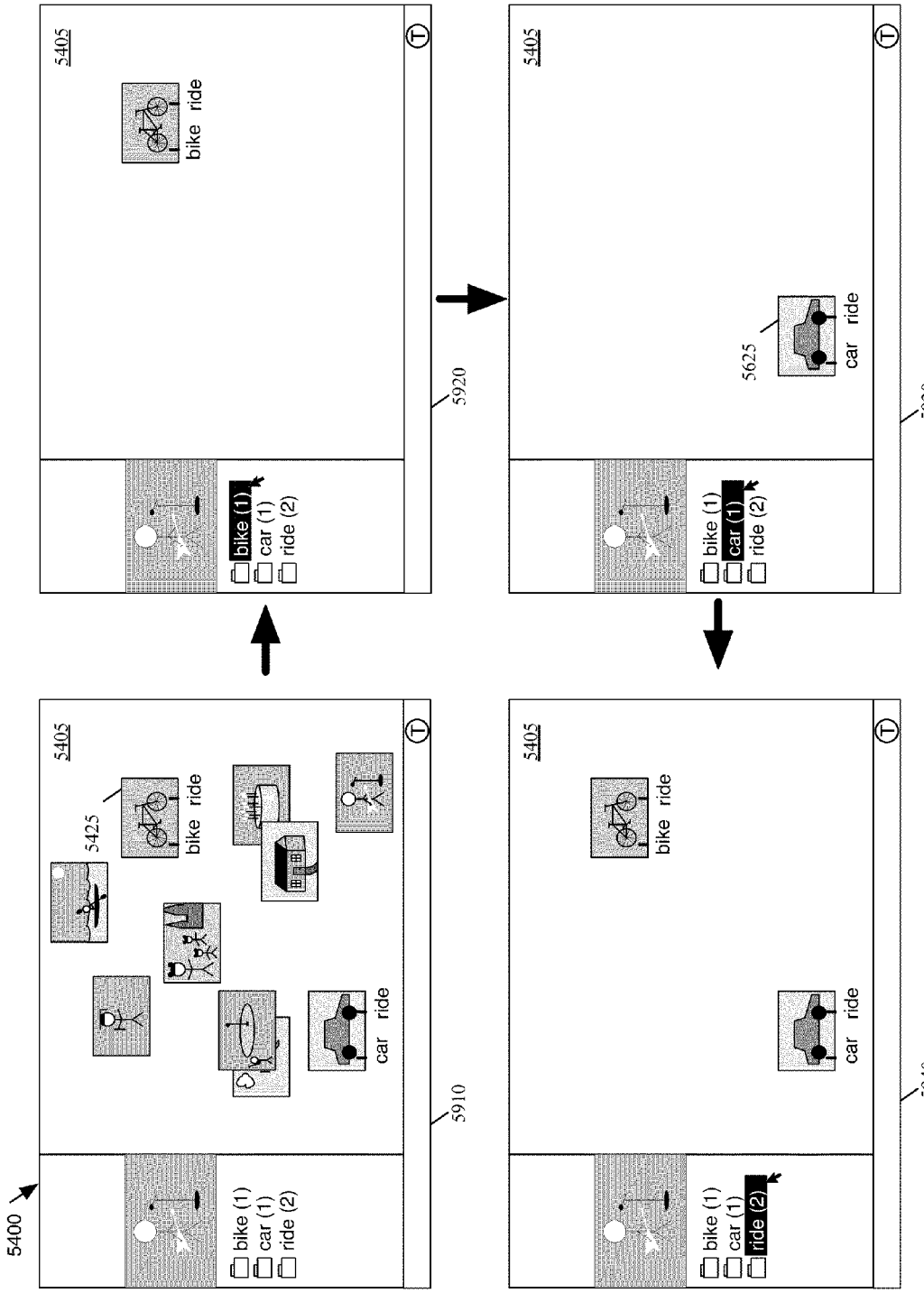
FIG. 59 illustrates an example GUI at several stages that show filtering media clips in some embodiments.

The process then identifies (at 5810) any media clips with at least one frame tagged with the selected tag. In some embodiments, this will be each media clip in the bin for the selected tag. The process then displays only the identified media clips in the free-form display area. Stage 5920 of FIG. 59 illustrates that a user has selected the "bike" bin, and as a result only the one media clip 5425 that is tagged with the "bike" tag is displayed. At stage 5930, the user has selected the "car" bin, and thus only media clip 5625 is displayed. At stage 5940, the user has selected the "ride" tag, such that both clips 5425 and 5625 are displayed. This feature may be used to identify similar media clips and so that these clips may be more easily edited into a sequence. In some embodiments, clicking in the browser off of the bins will restore all of the media clips to the free-form display area. Other user interface interactions, such as using a hotkey, will restore the media clips in various embodiments.

The embodiments described above by reference to FIGS. 54-59 use words as tags. However, one of ordinary skill will recognize that some embodiments provide different types of tags in addition to words. For instance, in some embodiment, any alphanumeric characters, string, or any symbols can be used as tags.

Figure 60:
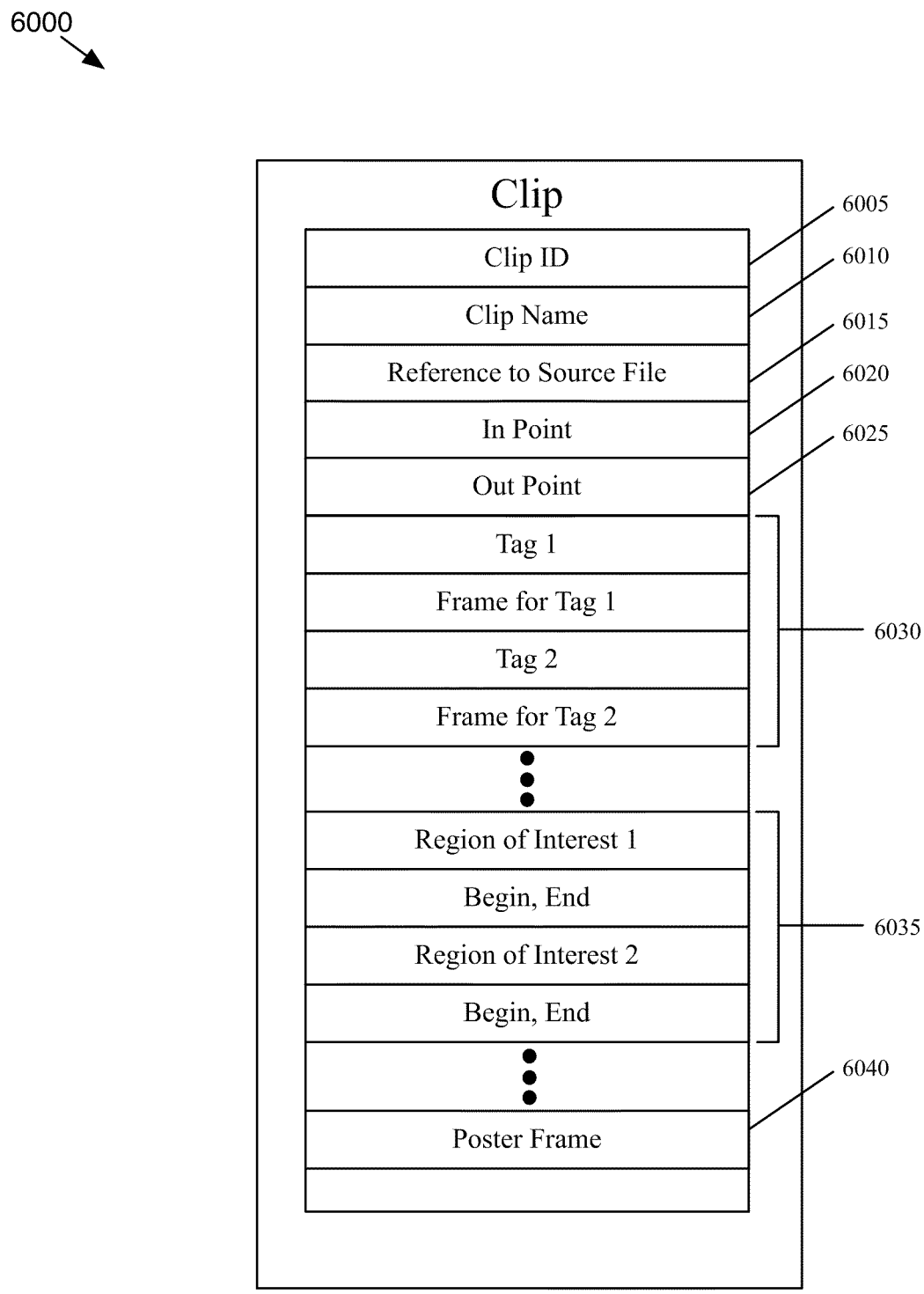
FIG. 60 illustrates an example of data structure for a media clip in some embodiments.

As mentioned above, some embodiments create data structures for each media clip in the free-form display area. An example of such a data structure is described above by reference to FIG. 8, which shows a media clip data structure having a reference to a source media file and an in and out-point in that source file. As described above, however, some embodiments may insert additional information the data structures to account for tags, regions of interest, etc. FIG. 60 illustrates an example data structure 6000 stored for a media clip in the free-form display area. As shown, the media clip data 6000 includes a clip ID 6005, clip name 6010, a reference 6015 to a source file, an in-point 6020 and out-point 6025 in the source file, a set of tag information 6030, a set of region of interest information 6035, and a poster frame identification 6040.

The clip ID 6005 is a unique identification of the media clip. In some embodiments, a clip ID is unique within each of functional spaces (e.g., organizing spaces and compositing spaces described above by reference to FIGS. 10-13) of a media-editing application. In other embodiments, it is unique within a media-editing application.

The clip name 6005 is a secondary identification of a media clip. In some embodiments, it is the file name of a media source file (e.g., "movie1.mov", "movie2.avi", etc.). When a media clip is duplicated in a display area in some embodiments, the duplicate copies of the two media clips have the same clip name but have different clip ID.

The reference to source file 6015 points to a location (e.g., on a local or network storage) at which the media source file (e.g., an audio file, video file, etc.) is stored. An example of reference to source file is a memory address. The in-point and out-point data elements 6020 and 6025 store in and out-points within the timecode of the source media file that respectively serves as the beginning and the of the media content represented by the media clip. In some embodiments, the in and out-points are the beginning and the end of the whole duration of the media clip by default. However, these in and out-points may be edited, as described below by reference to FIGS. 61-66. Thus, two media clips may point to a source file, but have different content due to different in and out-points in the source file.

The tag information 6030 stores information about any tags that have been used to tag the media clip. The tag information includes the name of each tag and, for each tag, a particular frame or set of frames of the media clip that are associated with the tag. The frame information may be stored as timecode information that refers to the timecode of the source media file in some embodiments.

The region of interest information 6035 stores information about any regions of interest that have been defined within the media clip, as described above by reference to FIGS. 48-52 and 73. Each time a new region is marked, some embodiments add data for this region to the data structure 6000. For each region of interest, beginning and ending points are stored. This information may be stored as timecode information that refers to the timecode of the source media file in some embodiments.

The poster frame data element 6040 stores the location of the poster frame (i.e., representative thumbnail that is displayed in the free-form display area to represent the media clip) when the media clip is a video clip. In some embodiments, the poster frame of a media clip is the first frame of the media clip by default, unless modified by a user. The modification of the poster frame is described above by reference to FIG. 20.

Although a media clip in some embodiments have many attributes as described above, a media clip in other embodiments do not necessarily have all these attributes. For instance, a media clip in some embodiments does not necessarily have in and out-points or reference to a source file. In some such embodiments, the data structure for a media clip includes media content data.

v. Trimming Media Clips in Display Area

The media-editing application of some embodiments provides the ability to modify the media clips in the free-form display area. For instance, some embodiments provide functionality that enables the user to trim the media clip using the representation of the media clip in the free-form display area. The user can remove portions of the source file from the media clip by modifying the in and out-points of the media clip. One of ordinary skill in the art will note that such modifications to the media clips do not affect the actual source media files.

Figure 61:
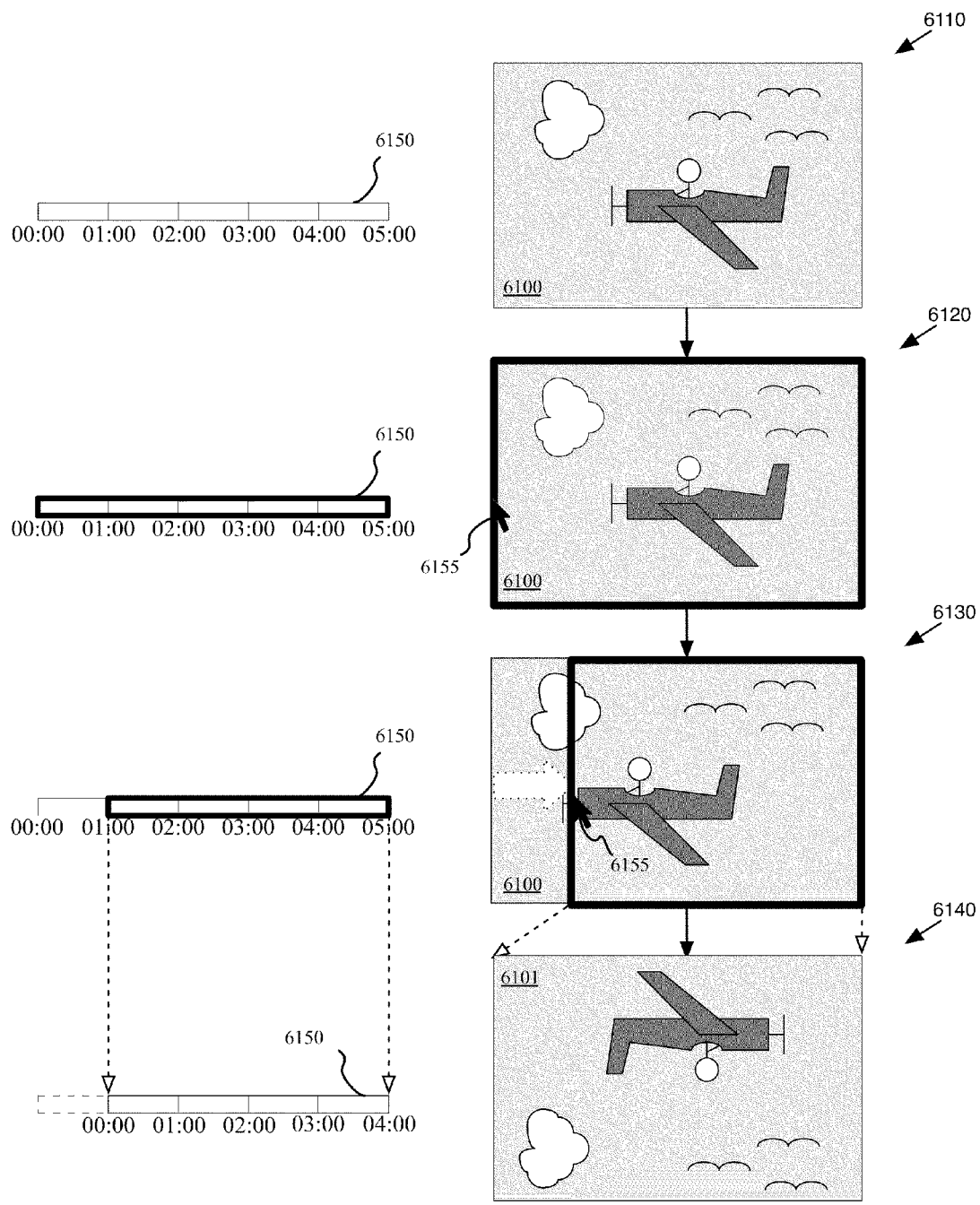
FIG. 61 illustrates an example of a media clip at several stages that show setting a new in-point for the media clip in some embodiments.

FIG. 61 illustrates an example of setting a new in-point for a media clip in a free-form display area of some embodiments. Specifically, FIG. 61 illustrates setting a new in-point for a media clip 6100 by trimming out the media content from the beginning of the media clip to a new in-point. For simplicity, the display area in which the media clip is displayed and edited is not illustrated in this figure. FIG. 61 illustrates media clip 6100 at four different stages 6110-6140. FIG. 61 also illustrates a time line 6150 of the media clip at each of the stages. The time line 6150 is not necessarily a part of the GUI that includes the display area, and is illustrated in this figure to show the details of the trimming operation.

In some embodiments, the media-editing application allows the user to set a new in-point for a media clip in the display area by selecting the left edge of the thumbnail representing the media clip and moving the selected edge to a new location. The in-point will be moved by a percentage of the duration of the media clip that is based on (e.g., equal to) the percentage of the width of the representative thumbnail. Thus, if a clip is one minute long and the left edge is moved halfway through the thumbnail, the new in-point will be thirty seconds after the previous in-point.

In the first stage 6110, media clip 6100 is displayed in the display area (not shown). In this example, media clip 6100 is a video clip with a five-minute duration as indicated by the time line 6150 illustrated on the left side of the media clip 6100 in this figure. In this example, the representative frame used for the thumbnail representation is the first frame of the media clip.

In the second stage 6120, the user selects media clip 6100 for editing. In some embodiments, the user moves the cursor 6155 and performs a left-click operation on the media clip. The border of the media clip is displayed in bold to indicate that the media clip is editable. The side edges can be now selected and dragged inwards in order to trim the media clip.

The third stage 6130 illustrates that the user has dragged the left edge of the clip to the right (inward) as indicated by the dotted hollow arrow by selecting the left edge with cursor 6155 and moving the cursor. This can also be performed on a touch-screen device by placing a finger on the edge of the selected clip and moving it to the right. The user has moved the left edge one fifth of the way through the thumbnail representation, representing the one minute mark of the clip, as indicated by the time line 6150. In some embodiments, as the bold edge is moved inwards, the original thin borders stay in place and retain the dimension of the clip representation. In addition, the frame displayed in the clip representation changes as though the left edge is a playhead, so that the user can see the exact frame he wants to use as the new in-point. The user releases the bold edge at this location to set the one minute mark as the new in-point of the media clip 6100.

The fourth stage 6140 illustrates the resulting media clip 6101 after the new in-point of the media clip 6100 is set at the point representing the end of the first minute in the duration of the media clip. As a result, the media clip 6100 now has a duration of four minutes rather than five minutes, as indicated by the timeline 6150. As all media clips regardless of their actual durations are represented in uniformly-dimensioned rectangles in some embodiments, the length of the media clip 6100 that used to represent five minutes now (i.e., the media clip 6101) represents four minutes. In addition, a new representative thumbnail is used at stage 6140, as the previous representative frame is no longer part of the media clip 6101. The default thumbnail is the frame at the new in-point of the media clip. In the case in which the representative frame is still part of the media clip after the trimming operation, some embodiments do not modify the representative frame after the edit.

In the case in which the media clip does not represent the entire source media file, some embodiments allow the user to make an in-point earlier by dragging the left edge to the left, outside of the thumbnail. For instance, the width of the thumbnail for media clip 6100 represents four minutes after the edit operation illustrated in FIG. 61. If a user were to later drag the left edge of the clip representation to the left a distance equal to one fourth of the width of the thumbnail, the in-point would be moved back to one minute earlier in the source file (i.e., the media clip would then be the same as at stage 6110.

Figure 62:
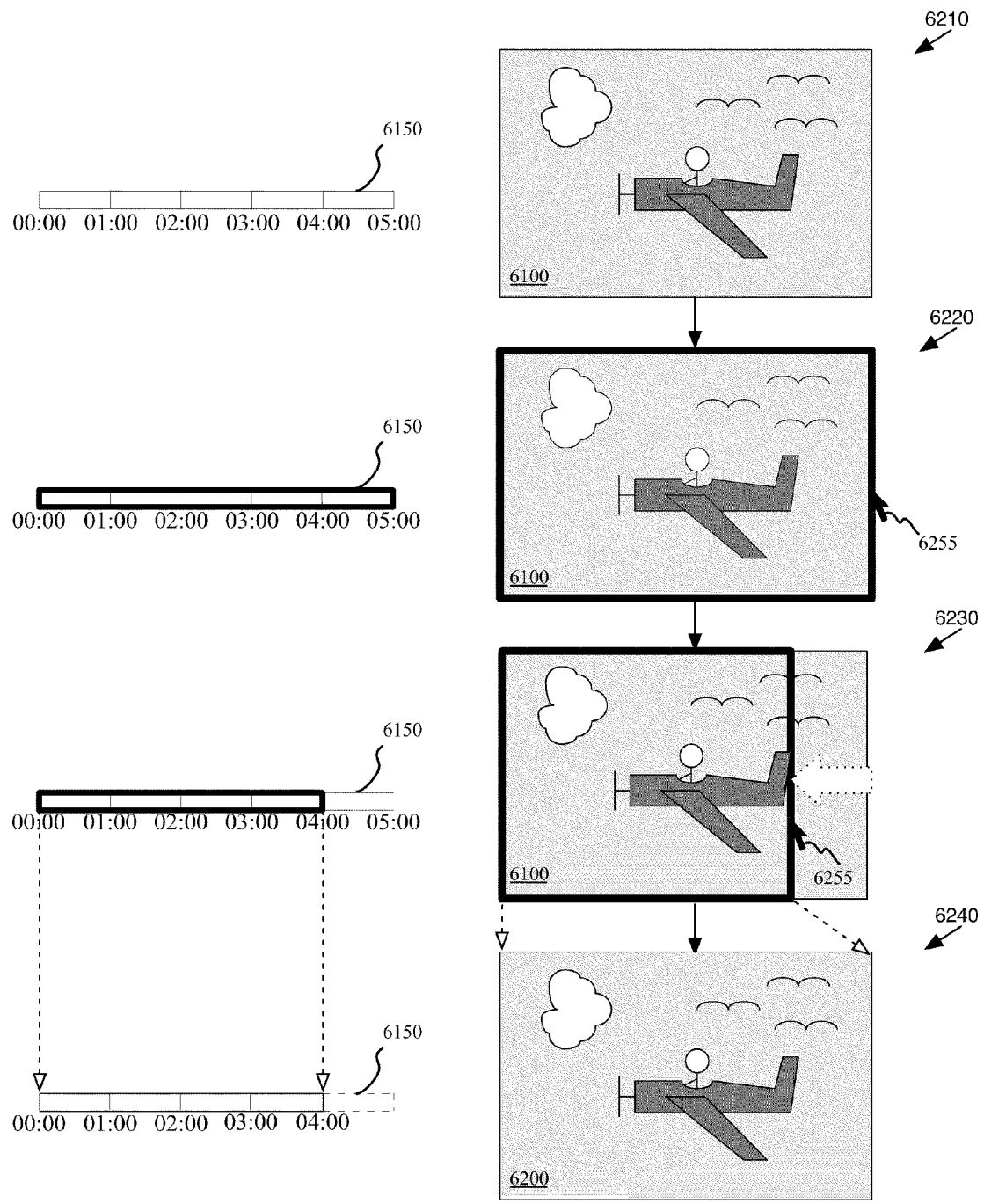
FIG. 62 illustrates an example of a media clip at several stages that show setting a new out-point for the media clip in some embodiments.

FIG. 62 illustrates an example of setting a new out-point for a media clip in a free-form display area of some embodiments. Specifically, FIG. 61 illustrates setting a new out-point for a media clip 6100 by trimming out the media content from the end of the media clip to a new out-point. For simplicity, the display area in which the media clip is displayed and edited is not illustrated in this figure. FIG. 62 illustrates media clip 6100 at four different stages 6210-6240. FIG. 62 also illustrates a time line 6150 of the media clip at each of the stages. The time line 6150 is not necessarily a part of the GUI that includes the display area, and is illustrated in this figure to show the details of the trimming operation.

In some embodiments, the media-editing application allows the user to set a new out-point for a media clip in the display area by selecting the right edge of the thumbnail representing the media clip and moving the selected edge to a new location. The out-point will be moved by a percentage of the duration of the media clip that is based on (e.g., equal to) the percentage of the width of the representative thumbnail. Thus, if a clip is one minute long and the right edge is moved halfway through the thumbnail, the new out-point will be thirty seconds before the previous out-point.

In the first stage 6210, media clip 6100 is displayed in the display area (not shown). In this example, media clip 6100 is a video clip with a five-minute duration as indicated by the time line 6150 illustrated on the left side of the media clip 6100 in this figure. In this example, the representative frame used for the thumbnail representation is the first frame of the media clip.

In the second stage 6220, the user selects media clip 6100 for editing. In some embodiments, the user moves the cursor 6255 and performs a left-click operation on the media clip. The border of the media clip is displayed in bold to indicate that the media clip is editable. The side edges can be now selected and dragged inwards in order to trim the media clip.

The third stage 6230 illustrates that the user has dragged the right edge of the clip to the left (inward) as indicated by the dotted hollow arrow by selecting the right edge with cursor 6255 and moving the cursor. This can also be performed on a touch-screen device by placing a finger on the edge of the selected clip and moving it to the left. The user has moved the right edge one-fifth of the way through the thumbnail representation, representing the four minute mark (one minute from the end) of the clip, as indicated by the time line 6150. In some embodiments, as the bold edge is moved inwards, the original thin borders stay in place and retain the dimension of the clip representation. In addition, the frame displayed in the clip representation changes as though the right edge is a playhead, so that the user can see the exact frame he wants to use as the new out-point. The user releases the bold edge at this location to set the four minute mark as the new out-point of the media clip 6100.

The fourth stage 6240 illustrates the resulting media clip 6200 after the new out-point of the media clip 6100 is set at the point representing the end of the fourth minute in the duration of the media clip. As a result, the media clip 6200 now has a duration of four minutes rather than five minutes, as indicated by the timeline 6150. As all media clips regardless of their actual durations are represented in uniformly-dimensioned rectangles in some embodiments, the length of the media clip 6100 that used to represent five minutes now (i.e., the media clip 6200) represents four minutes. As the previous representative frame is still part of the media clip 6100, this representative frame is still used. In the case in which the representative frame is no longer part of the media clip after the trimming operation, some embodiments default to the frame at the in-point of the media clip.

In the case in which the media clip does not represent the entire source media file, some embodiments allow the user to make an out-point later by dragging the right edge to the right, outside of the thumbnail. For instance, the width of the thumbnail for media clip 6100 represents four minutes after the edit operation illustrated in FIG. 62. If a user were to later drag the right edge of the clip representation to the right a distance equal to one fourth of the width of the thumbnail, the out-point would be moved back to one minute later in the source file (i.e., the media clip would then be the same as at stage 6110).

vi. Editing Commands During Playback

FIGS. 61 and 62 described above illustrate examples of setting edit points (i.e., in and out-points) of a media clip by pulling in the side edges of the media clip in some embodiments. In those examples, the edit points were set when the media clips were not playing back. In some embodiments, the user can set edit points of a media clip by invoking editing commands (e.g., by hitting or pressing hotkeys) while the media clip is being played back or skimmed. FIGS. 63-66, below, illustrate examples of setting edit points of a media clip by invoking editing commands while the media clip is being played back. In some embodiments, the operations to set edit points that are described below are performed when the media clip is being skimmed.

Figure 63:
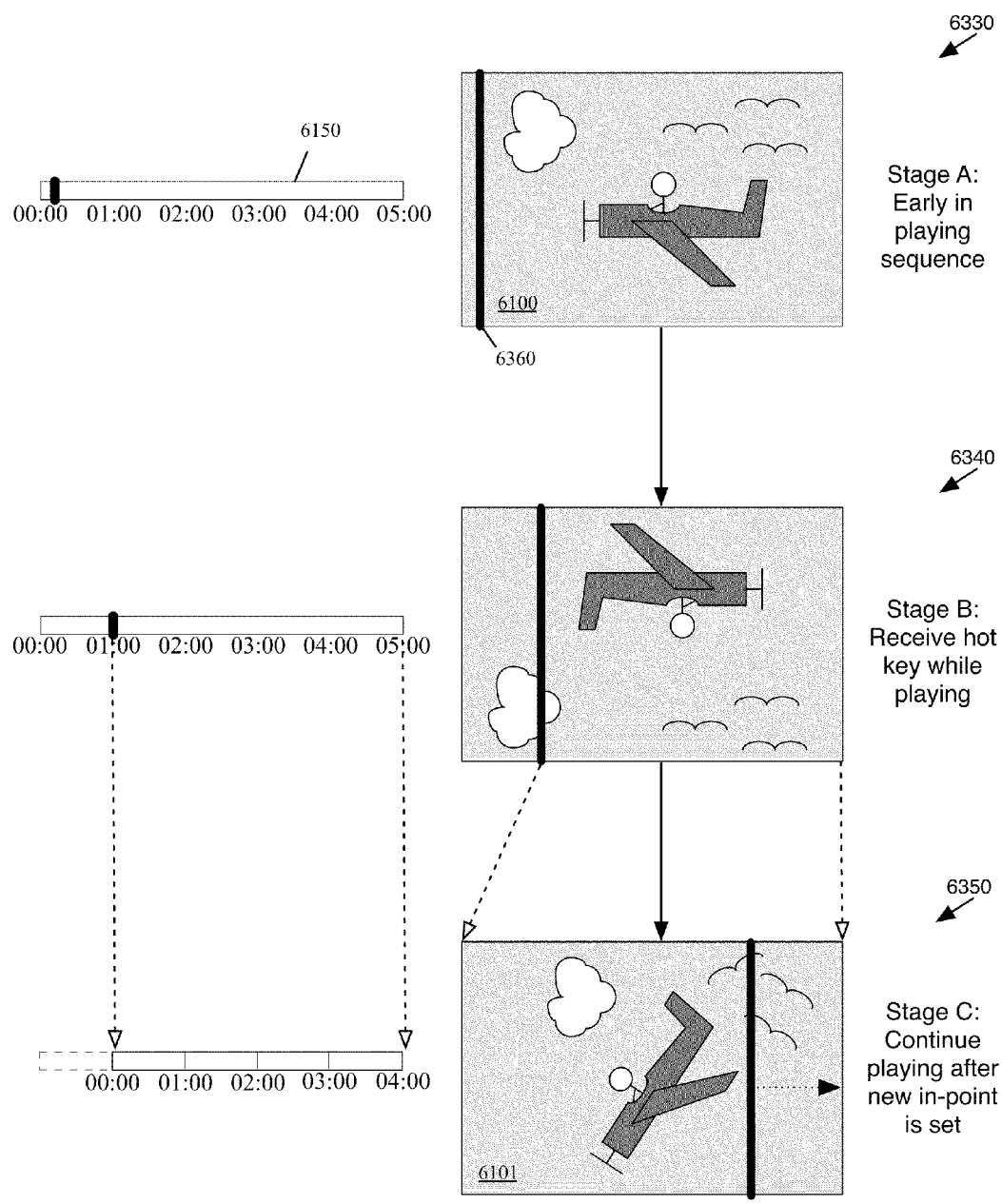
FIG. 63 illustrates an example of a media clip at several stages that show setting a new in-point for the media clip in some embodiments.

FIG. 63 illustrates setting an in-point of a media clip 6100 by invoking a command while the media clip 6100 is played back. FIG. 63 illustrates the media clip 6100 at three different stages 6330-6350. FIG. 63 also illustrates a time line 6150 at each of the stages, which is not necessarily a part of the GUI that includes the display area in which the media clip is displayed, and is illustrated in this figure to show the details of the trimming operation.

In some embodiments, the media-editing application allows the user to set a new in-point for a media clip in the display area as the media clip is played back. During playback, a playhead moves along the media clip. When the playhead is at a location in the media clip at which the user wants to set a new in-point for the media clip, the user can invoke a command that will cause the frame at that location to be set as the new in-point for the media clip. Thus, if a clip is one minute long and the playhead is at the thirty second mark, the clip will be thirty seconds long after the operation to move the in-point to the thirty second mark.

In the first stage 6330, the media clip 6100 is displayed in the display area (not shown). The media clip 6100 has a duration of five minutes, as indicated by the timeline 6150. A playhead 6360 indicates the position of the currently displayed frame in the duration of the media clip that is currently being played back. As mentioned above, the displayed lengths of different media clips do not necessarily represent the same length of time in some embodiments, as each media clip is displayed as the same size. In such cases, the playhead 6360 moves slower when it is on a longer media clip than when it is on a shorter media clip. In this example, the representative frames used for the thumbnail representations for the media clip is the first frame of the media clip. At the first stage 6330, the user has just invoked a playback command to start the playback process.

In the second stage 6340, the playback has reached the one minute mark of the media clip 6100. At this point, the user invokes a command that causes the in-point of the media clip 6100 to be set to the current location of the playhead 6360. In some embodiments, this edit operation is invoked through a hotkey (e.g., the "a" key).

The third stage 6350 illustrates that the media-editing application has modified the in-point of media clip 6100 such that the new in-point is the timecode in the source media file for the clip that corresponds to the one minute mark of the previous version of the clip before the edit. As a result, the resulting media clip 6101 now has a duration of four minutes rather than five minutes, as indicated by the timeline 6150. As all media clips regardless of their actual durations are represented in uniformly-dimensioned rectangles in some embodiments, the length of the media clip 6100 that used to represent five minutes now (i.e., the media clip 6101) represents four minutes, as indicated by the timeline 6150 and the dashed arrows pointing from the second stage 6340 to the third stage 6350. As shown in this stage, the playback of the media clip 6100 continues as indicated by the dotted arrow point from the playhead 6360 to the right edge of the media clip 6100. In this example, the end result is the same as that of setting a new in-point by dragging the left edge of the media clip 6100 in as described above by reference to FIG. 61.

Figure 64:
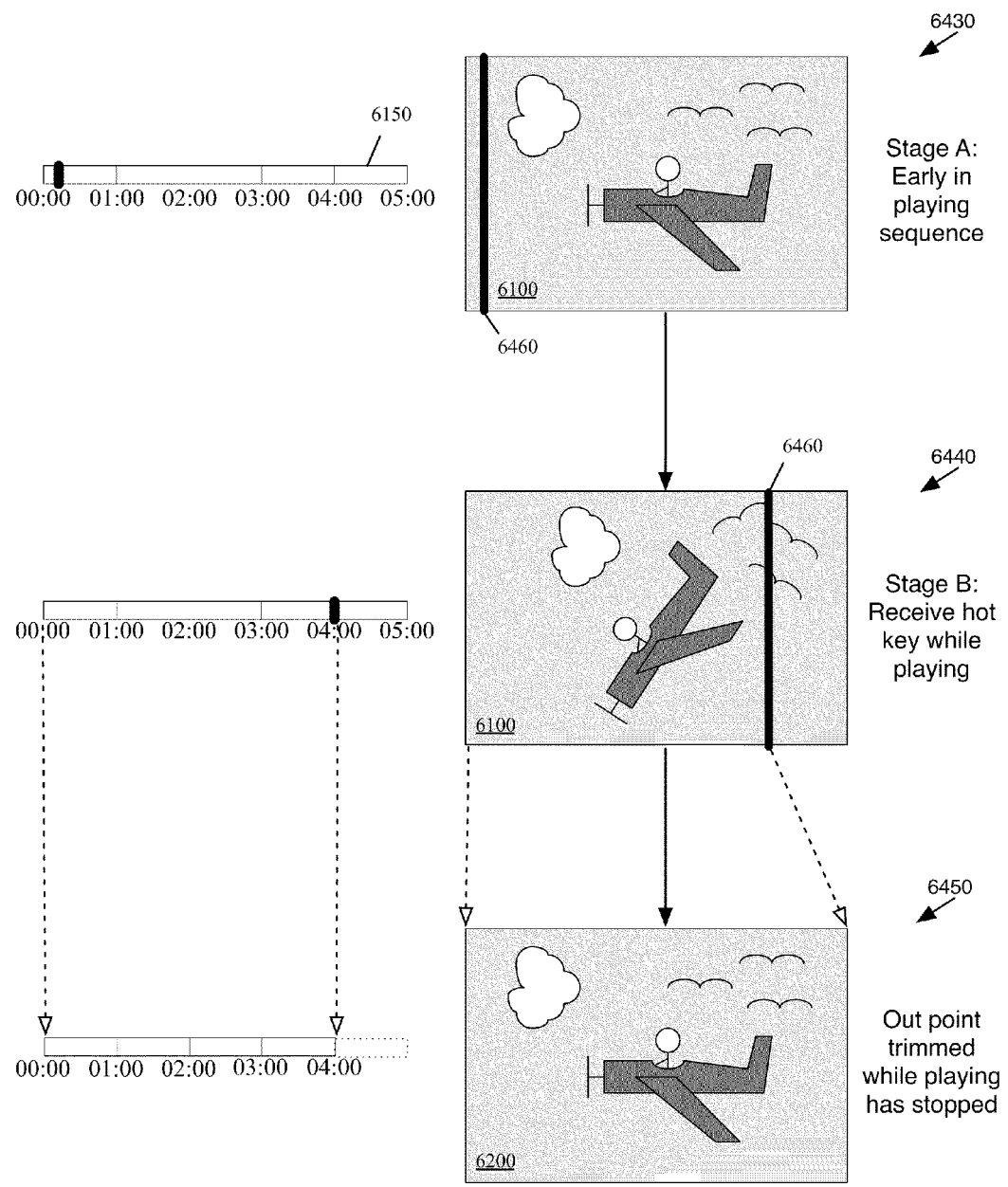
FIG. 64 illustrates an example of a media clip at several stages that show setting a new out-point for the media clip in some embodiments.

Various operations may be performed in some embodiments in order to set out-points for single clips in a sequence and for a sequence as a whole. FIG. 64 illustrates setting an in-point of a media clip 6100 by invoking a command while the media clip 6100 is played back. FIG. 64 illustrates the media clip 6100 at three different stages 6430-6450. FIG. 64 also illustrates a time line 6150 at each of the stages, which is not necessarily a part of the GUI that includes the display area in which the media clip is displayed, and is illustrated in this figure to show the details of the trimming operation.

In some embodiments, the media-editing application allows the user to set a new out-point for a media clip as the media clip is played back. During playback, a playhead moves along the media clip. When the playhead is at a location in a media clip at which the user wants to set a new out-point for the media clip, the user can invoke a command that will cause the frame at that location to be set as the new out-point for the media clip. Thus, if a clip is one minute long and the playhead is at the thirty second mark, the clip will be thirty seconds long after the operation to move the out-point to the thirty second mark.

In the first stage 6430, the media clip 6100 is displayed in the display area (not shown). The media clip 6100 has a duration of five minutes, as indicated by the timeline 6150. A playhead 6460 indicates the position of the currently displayed frame in the duration of the media clip that is currently being played back. As mentioned above, the displayed lengths of media clips do not necessarily represent the same length of time in some embodiments, as each media clip is displayed as the same size. In such cases, the playhead 6460 moves slower when it is on a longer media clip than when it is on a shorter media clip of the sequence. In this example, the representative frames used for the thumbnail representations for the media clip is the first frame of the media clip. At the first stage 6430, the user has just invoked a playback command to start the playback process.

In the second stage 6440, the playback has reached the four minute mark of the media clip 6100. At this point, the user invokes a command that causes the out-point of the media clip 6405 to be set to the current location of the playhead. In some embodiments, this edit operation is invoked through a hotkey (e.g., the "s" key).

The third stage 6450 illustrates that the media-editing application has modified the out-point of clip 6100 such that the new out-point is the timecode in the source media file for that clip that corresponds to the four minute mark of the clip. As a result, the resulting media clip 6200 now has a duration of four minute rather than five minutes, as indicated by the timeline 6150. As all media clips regardless of their actual durations are represented in uniformly-dimensioned rectangles in some embodiments, the length of the media clip 6100 that used to represent five minutes now (i.e., the media clip 6200) represents four minutes, as indicated by the timeline 6150 and the dashed arrows pointing from the second stage 6440 to the third stage 6450. As the previous representative frame is still part of the media clip 6100, this representative frame is still used. In this example, the end result is the same as that of setting a new out-point by dragging the right edge of the media clip 6100 in as described above by reference to FIG. 62.

Figure 65:
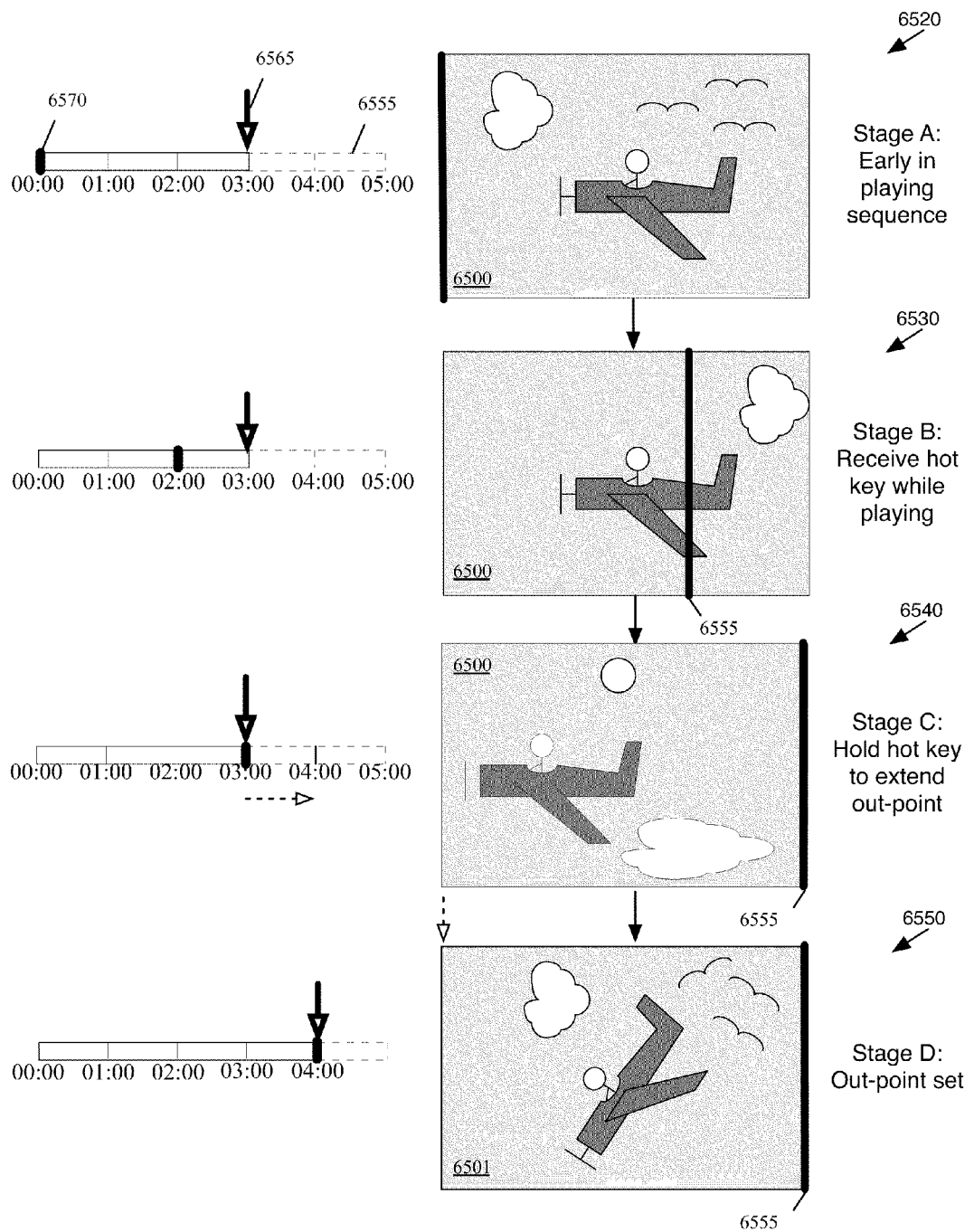
FIG. 65 illustrates an example of a media clip at several stages that show extending an out-point for the media clip in some embodiments.

FIG. 65 illustrates extending a media clip 6500 by extending its out-point by invoking a command while the media clip 6500 is played back. FIG. 65 illustrates the media clip 6500 at four different stages 6520-6550. FIG. 65 also illustrates a time line 6555, marker 6570, and arrow 6565 at each of the stages, which are not necessarily a part of the GUI that includes the display area in which the sequence is displayed, and are illustrated in this figure to show the details of the trimming operation.

In some embodiments, when a media clip does not contain the entirety of its source media file, the media-editing application allows the user to set a new out-point for the media clip as the media clip is played back. During playback, a playhead moves along the media clip. Before the playhead reaches the end of the media clip, the user can invoke a command that will cause the media clip to continue playing content from its source file after the current out-point is reached. When the playhead reaches a location in the media clip source at which the user wants to set a new out-point for the media clip, the user can invokes a command that will cause the frame at that location to be set as the new out-point for the media clip.

In the first stage 6520, the media clip 6500 is displayed in the display area (not shown). The media clip 6500 has a duration of three minutes, as indicated by the timeline 6555. As shown, however, the source media file for clip 6500 has a duration of five minutes, and the current out-point of the media clip 6500 is set to the timecode that corresponds to the three minute mark of the source media file. The arrow 6565 points to the current location of the out-point of the media clip 6500 along the duration of the media source file, while marker 6570 indicates the location of the playhead in the media source file. At the first stage 6520, the user has just invoked the playback command to start the playback process.

In the second stage 6530, the playback has reached the two minute mark of the media clip 6500. At this point, the user invokes a command that instructs the media-editing application to continue playing past the current out-point of the currently playing clip 6500. In some embodiments, this operation is invoked through a hotkey (e.g., the "d" key).

In the third stage 6540, the playback has reached the three minute mark that marks the end of the media clip 6500 according to its set out-point. The playhead is now at the end of the thumbnail representing the media clip 6500, and stays at that point as the media source file continues to play in the thumbnail representation. However, because the command was invoked at stage 6530, the media-editing application continues to play media data from the source file. At this point, the playhead marker 6570 is at the three minute mark, as is the out-point arrow 6565. In some embodiments, the playback of the media clip 6500 continues until the user releases the hotkey or the media source file ends. If the hotkey is released before the current out-point, then playback continues as it would have if the command had not been invoked at all.

In the fourth stage 6550, the playback is now at minute four of the source media file, as indicated by playhead marker 6570. As this is past the previous out-point, the out-point of the media file 6500 has been extended to this four minute mark, as indicated by out-point arrow 6565. The resulting media clip is media clip 6501. The out-point will be extended up until the user releases the hotkey in some embodiments or the source file ends, in which case the out-point will be set to the timecode marking the end of the source file.

Figure 66:
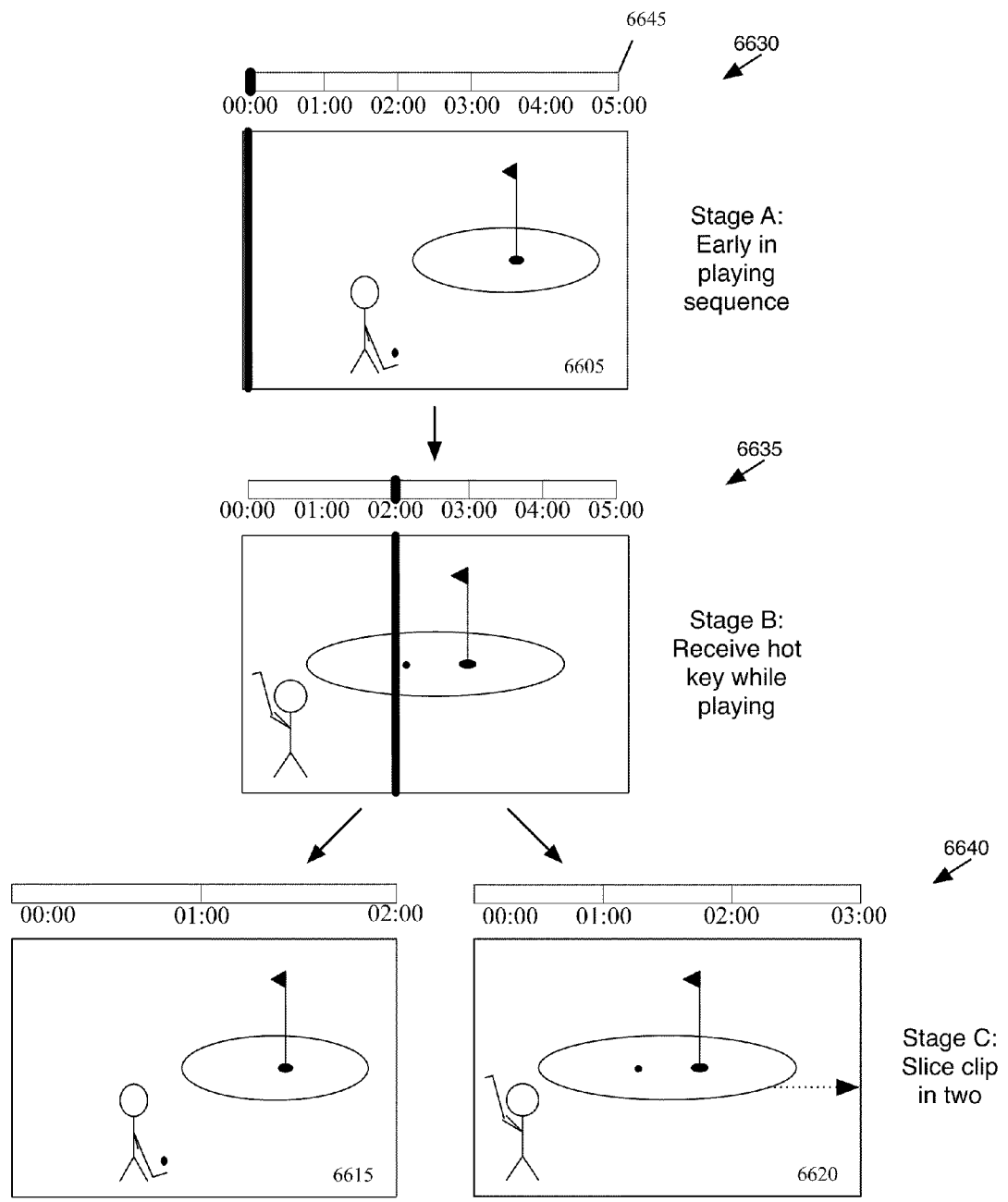
FIG. 66 illustrates an example of a media clip at several stages that show splitting the media clip in some embodiments.

In some embodiments, operations may be performed to split a media clip in a sequence into two clips. FIG. 66 illustrates splitting a media clip 6605 into two media clips 6615 and 6620 by invoking a command while the media clip 6605 is played back. FIG. 66 illustrates the media clip 6605 at three different stages 6630-6640. FIG. 66 also illustrates a time line 6645 at each of the stages, which is not necessarily a part of the GUI that includes the display area in which the sequence is displayed, and is illustrated in this figure to show the details of the editing operation In some embodiments, the media-editing application allows the user to split a media clip that is part of a sequence in the display area as the sequence is played back. During playback, a playhead moves along the media clips in the sequence. When the playhead is at a location in a media clip at which the user wants to split the media clip, the user can invoke a command that will cause the frame at that location to be set as the new out-point for the playing media clip and as the in-point for a new media clip that runs from that in-point to the previous out-point for the original media clip.

In the first stage 6630, the media clip 6605 is displayed in the display area (not shown). The media clip 6605 has a duration of five minutes, as indicated by the timeline 6645. At the first stage 6630, the user has just invoked a playback command to start the playback process. In the second stage 6635, the playback has reached the two minute mark of the media clip 6605. At this point, the user invokes a command that causes the currently playing clip 6605 to be split into two clips. In some embodiments, this edit operation is invoked through a hotkey (e.g., the "b" key).

The third stage 6640 illustrates that the media-editing application has split the media clip 6605 into clips 6615 and 6620. The clip 6615 will have the same in-point as media clip 6605 and an out-point two minutes later (at the frame playing when the split clip command was invoked). The clip 6620 will have an in-point one frame after the out-point of clip 6615 and the same out-point as media clip 6605. Some embodiments use the frame playing when the split clip command is invoked as the in-point of the second clip and the frame prior to that as the out-point of the first clip. The representative frame for clip 6615 is the same as that of clip 6605, while the representative frame for clip 6620 is that at its in-point. As all media clips regardless of their actual durations are represented in uniformly-dimensioned rectangles in some embodiments, the length of the two media clips that represent the same actual source content as the single clip 6605 has doubled in size.

Figure 67:
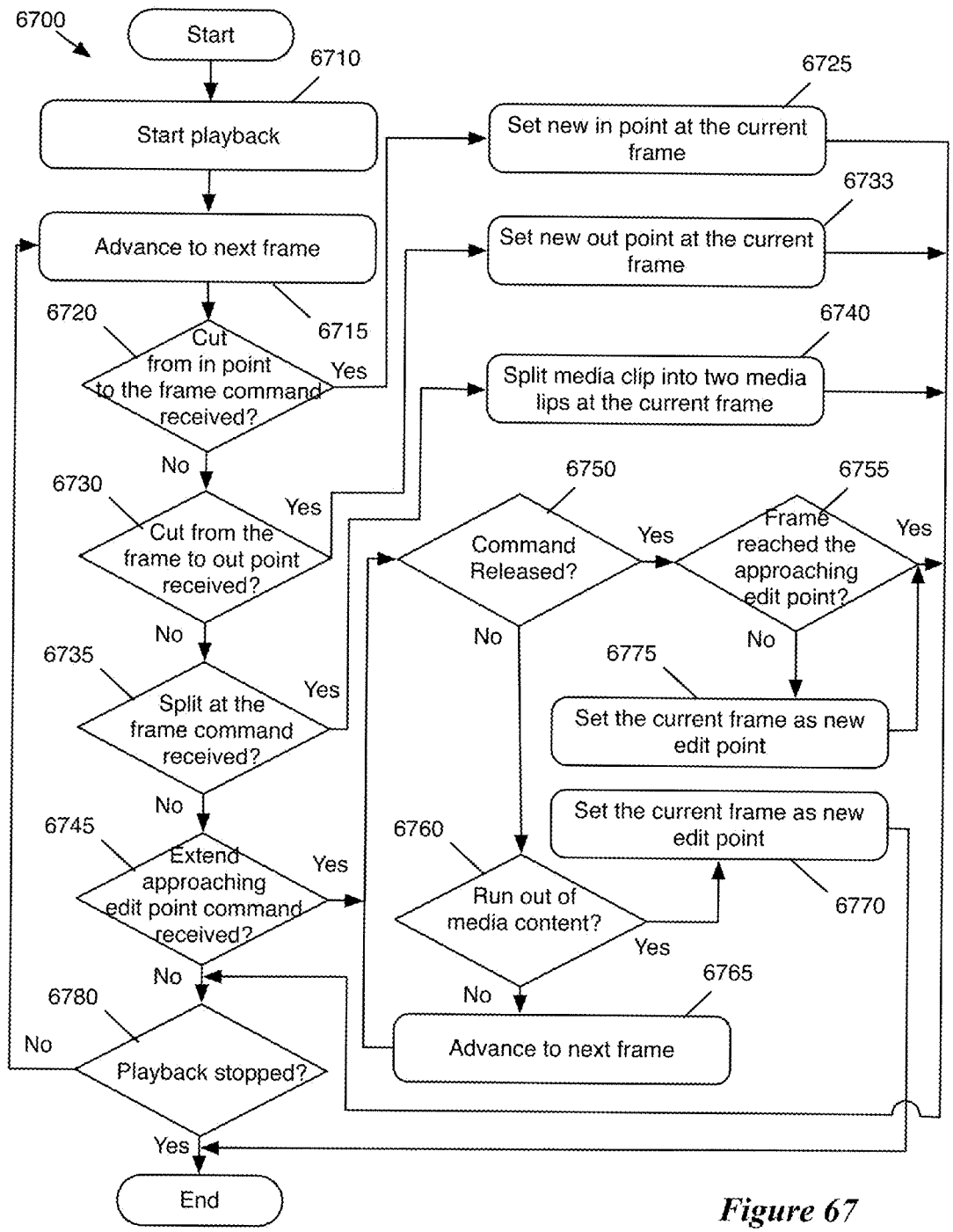
FIG. 67 illustrates an example of a conceptual process that some embodiments use to edit media clips.

As described above, some embodiments perform editing operations on a media clip based on editing commands that the user invokes. FIG. 67 illustrates an example of a conceptual process 6700 of some embodiments for performing a set of editing operations on a media clip in a free-form display area. In some embodiments, the process 6700 is performed by an media-editing application that provides a free-form display area that displays the media clip. In some such embodiments, the process 6700 is performed when the user has selected a media clip to play and has invoked a command to start playback of the media clip. In some cases, the selected media clip is part of a sequence. In other cases, the selected media clip is an individual media clip.

The process 6700 begins by starting (at 6710) playback of the media clip in response to the user invoking a command to start playback of a media clip in the display area. The media clip is played back from the beginning of the media clip (e.g., the beginning of the media source file or from a set in-point) or from a point within the media clip from which the user has chosen to play back. In some embodiments, the user chooses the point to play back from by placing a playhead on a location along the length of the media clip that represent the point and invoking a forward playback command. In some cases, the user plays back the media clip backwards by invoking a backward playback command. Some examples of invoking forward and backward playback commands are described above by reference to FIG. 2. In those cases when the media clip is part of a sequence, the media clip is played back after a neighboring media clip in the sequence is played back (i.e., a playhead moves to the media clip from the neighboring media clip) unless the user chooses to play back the media clip.

The process 6700 then advances (at 6715) to the next frame in the media clip to display in the display area. The next frame is a frame that comes chronologically after the current frame of the media clip being displayed when the media clip is being played back forwards. When the media clip is being played backwards, the next frame is the frame that comes chronologically before the current frame of the media clip being displayed. The process 6700 displays the next frame and the frame becomes the current frame being displayed.

Next, the process 6700 determines (at 6720) whether a command that cuts media content (e.g., image frames) of the media clip from the current in-point to the current frame is received. When the process 6700 determines that such a command is received, the process 6700 sets (at 6725) the in-point of the media clip to the current frame. As described above, the in-point of a media clip in some embodiments is the first frame of the media clip unless it is reset to another point in the media clip. In some embodiments, the process 6700 sets an in-point by changing the in-point data element of a data structure, such as the one described above by reference to FIG. 8. As described above, the next time the media clip is played back, the image frames cut out will not be played back and playback will start from the set in-point. A detailed example of an operation to set a new in-point is described above by reference to FIG. 63. The process 6700 then proceeds to 6780 which will be described further below.

When the process 6700 determines (at 6720) that it has not received a command to set a new in-point of the media clip, the process determines (at 6730) whether a command that cuts media content of the media clip from the current frame to the current out-point is received. When the process 6700 determines that such a command is received, the process 6700 sets (at 6733) the out-point of the media clip to the current frame. As describe above, the out-point of a media clip in some embodiments is the last frame of the media clip unless it is reset to another point in the media clip. In some embodiments, the process 6700 sets an out-point by changing the in-point data element of a data structure, such as the one described above by reference to FIG. 8. As described above, next time the media clip is played back, the image frames cut out will not be played back. A detailed example of an operation to set a new out-point is described above by reference to FIG. 64. The process 6700 then proceeds to 6780 which will be described further below.

When the process 6700 determines (at 6730) that it has not received a command to set a new out-point of the media clip, the process 6700 determines (at 6735) whether a command to split the media clip into two separate media clips at the current frame is received. When the process 6700 determines that such a command is received, the process 6700 splits the media clip into two different media clips. In some embodiments, the process creates two new media clips. One of the new media clips will represent the media content of the media clip being split from the beginning of the media clip to the current frame of the media clip. The other new media clip will represent the rest of the media content in the media clip. A detailed example of an operation to split a media clip is described above by reference to FIG. 66. The process 6700 then proceeds to 6780 which will be described further below.

When the process 6700 determines (at 6735) that it has not received a command to split the media clip, the process 6700 determines (at 6745) whether a command to extend an approaching edit point of the media clip is received. An approaching edit point is the edit point (e.g., in-point and out-point) that a playhead is getting closer to while the media clip is being played back forwards or backwards. That is, when the media clip is being played backwards the in-point of the media clip is the approaching edit point. When the media clip is being played forward, the out-point of the media clip is the approaching edit point. When the process 6700 determines that such a command is not received, the process 6700 then proceeds to 6780 which will be described further below.

When the process 6700 determines that such a command is received, the process 6700 determines (at 6750) whether the command is released (e.g., whether the user is holding down a hotkey that invokes the command). When the process 6700 determines that the user is still holding down the hotkey, the process proceeds to 6755 which will be described further below.

When the process 6700 determines that the user is no longer holding down the hotkey and thereby releasing the command, the process 6700 determines (at 6760) whether it has run out of media content to play. The process 6700 runs out of media content to play when it has played back forwards and has reached the last frame of the source media file. The process 6700 also runs out of media content to play when it has played back backwards and has reached the first frame of the source media file.

When the process 6700 determines that it has not run out of media content to play back, the process 6700 advances (at 6765) to the next frame in the playback direction and then goes back to 6750 to determine whether the user is still holding down the hotkey. When the process 6700 determines that it has run out of media content to play back, the process 6700 sets (at 6770) the current frame (e.g., the first or the last frame of the media clip) as a new edit point (i.e., the edit point has been extended to the new edit point.) and then the process 6700 ends.

When the process 6700 determines (at 6750) that the user is still holding down the hotkey, the process 6700 determines (at 6755) whether the current frame is past the edit point that was approaching at the time the command was invoked (i.e., at the time the user started to press and hold down the hotkey). If the process 6700 determines that the current frame is not past the edit point, the process 6700 sets (at 6775) the current frame as new edit point. Otherwise, the process proceeds to 6780.

At 6780, the process 6700 then determines whether the playback has stopped. The process 6700 stops when it runs out of media content to play back. The process 6700 also stops when it receives a command to stop the playback of the media clip (e.g., user's invoking a stop command). When the process 6700 determines that the playback has not stopped, the process 6700 return to 6715 to continue advancing to the next frame.

In this example, a media file that the process 6700 performs edit operations on represents media content in the form of image frames. However, one of ordinary skill will recognize that this conceptual process is applicable to media files that represent other type of media content such as audio data.

FIGS. 63-66 illustrate examples of editing a media clip in a sequence according to some embodiments by invoking editing commands while the media clip is being played back. In some embodiments, these commands can be invoked while the sequence is played back in full screen mode, which is described above by reference to FIG. 44.

Moreover, some embodiments allow the editing commands to be invoked while the sequence is displayed in a free-form display area (e.g., the free-form display area 700 described above by reference to FIG. 7) that is the only compositing area or one of multiple compositing areas of a media-editing application. Also, some embodiments allow editing a media clip by invoking editing commands while the media clip is displayed in a composite display area (such as the composite display area 1120 described above by reference to FIG. 11) that is the only compositing area or one of multiple compositing areas of a media-editing application.

B. Editing Composite Sequences

The above subsection described various editing operations that can be performed on media clips in some embodiments (e.g., trimming, splitting, extending, etc.). Some embodiments also perform a variety of similar editing operations on composite sequences, the creation of which was described above in Section III.

i. Setting In-Points

Figure 68:
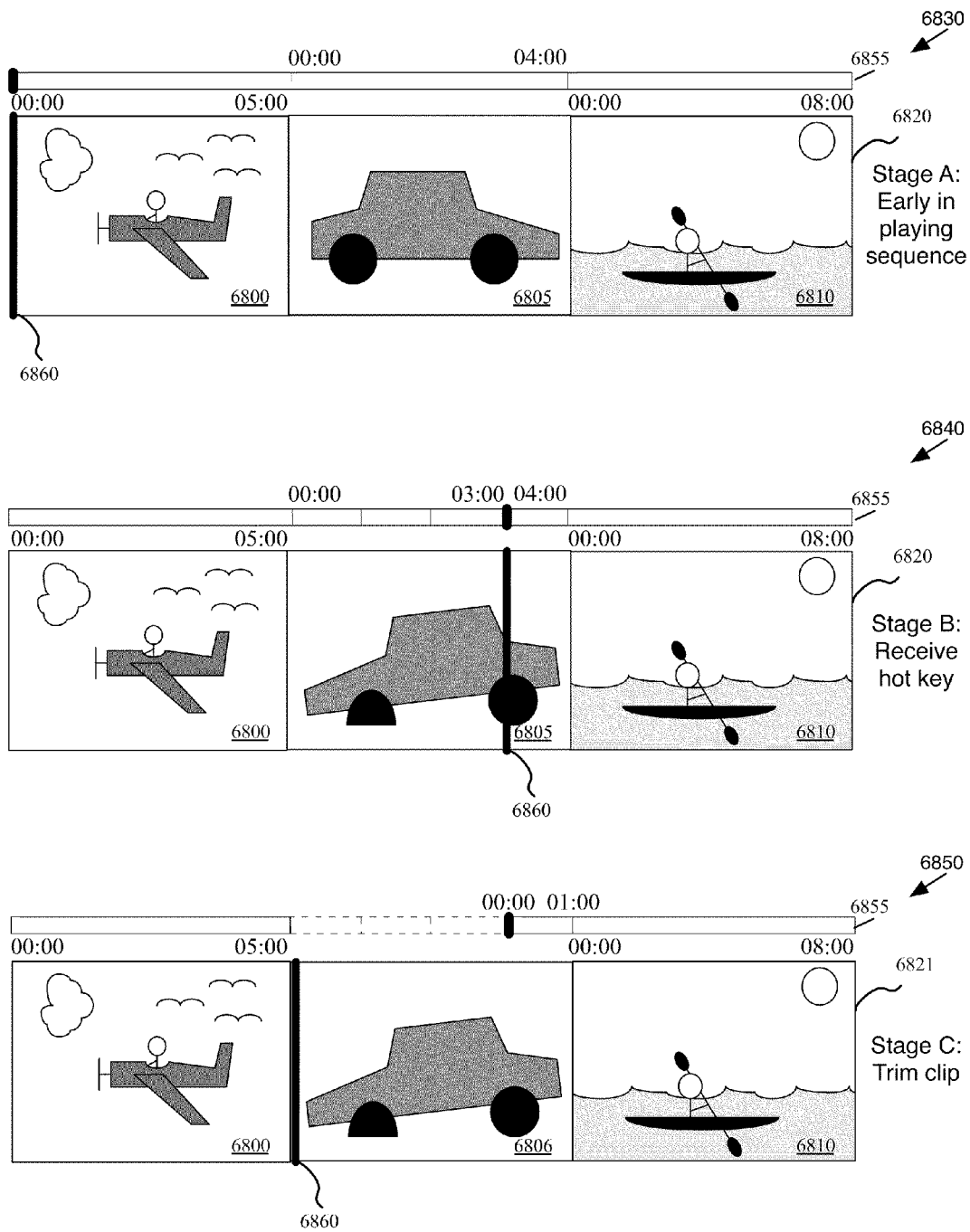
FIG. 68 illustrates an example of a sequence of media clips at several stages that show setting a new in-point for a media clip in the sequence in some embodiments.

Various operations may be performed in some embodiments in order to set in-points for single clips in a sequence and for a sequence as a whole. FIG. 68 illustrates setting an in-point of a media clip 6805 by invoking a command while a sequence 6820 of which the media clip 6805 is a part is played back. FIG. 68 illustrates sequence 6820 at three different stages 6830-6850. FIG. 68 also illustrates a time line 6855 at each of the stages, which is not necessarily a part of the GUI that includes the display area in which the sequence is displayed, and is illustrated in this figure to show the details of the trimming operation.

In some embodiments, the media-editing application allows the user to set a new in-point for a media clip that is part of a sequence in the display area as the sequence is played back. During playback, a playhead moves along the media clips in the sequence. When the playhead is at a location in a media clip at which the user wants to set a new in-point for the media clip, the user can invoke a command that will cause the frame at that location to be set as the new in-point for the media clip. Thus, if a clip is one minute long and the playhead is at the thirty second mark, the clip will be thirty seconds long after the operation to move the in-point to the thirty second mark.

In the first stage 6830, sequence 6820 is displayed in the display area (not shown). In this example, sequence 6820 is a sequence of media clips 6800, 6805, and 6810, arranged in that order. The media clip 6800 has a duration of five minutes, media clip 6805 has a duration of four minutes, and media clip 6810 has a duration of eight minutes, as indicated by the timeline 6855 illustrated along the sequence.

A playhead 6860 indicates the position of the currently displayed frame in the duration of the media clip that is currently being played back. As mentioned above, each displayed length of media clip in a sequence does not necessarily represent the same length of time in some embodiments, as each media clip is displayed as the same size. In such cases, the playhead 6860 moves slower when it is on a longer media clip than when it is on a shorter media clip of the sequence. In this example, the representative frames used for the thumbnail representations for each of the media clips are the first frame of the media clips. At the first stage 6830, the user has just invoked a playback command to start the playback process.

In the second stage 6840, the playback has reached the three minute mark of the second media clip 6805 in the sequence 6820. At this point, the user invokes a command that causes the in-point of the currently playing clip 6805 to be set to the current location of the playhead. In some embodiments, this edit operation is invoked through a hotkey (e.g., the "a" key). This hotkey is the same as that used to set the in-point of a single media clip in some embodiments.

The third stage 6850 illustrates that the media-editing application has modified the in-point of clip 6805 such that the new in-point is the timecode in the source media file for that clip that corresponds to the three minute mark of the previous version of the clip before the edit. As a result, the resulting media clip 6806 now has a duration of one minute rather than four minutes, as indicated by the timeline 6855. As all media clips regardless of their actual durations are represented in uniformly-dimensioned rectangles in some embodiments, the length of media clip 6805 that used to represent four minutes now (i.e., the media clip 6806) represents one minute. In addition, a new representative thumbnail is used at stage 6850, as the previous representative frame is no longer part of the media clip 6805. The default thumbnail is the frame at the new in-point of the media clip. In the case in which the representative frame is still part of the media clip after the trimming operation, some embodiments do not modify the representative frame after the edit.

Figure 69:
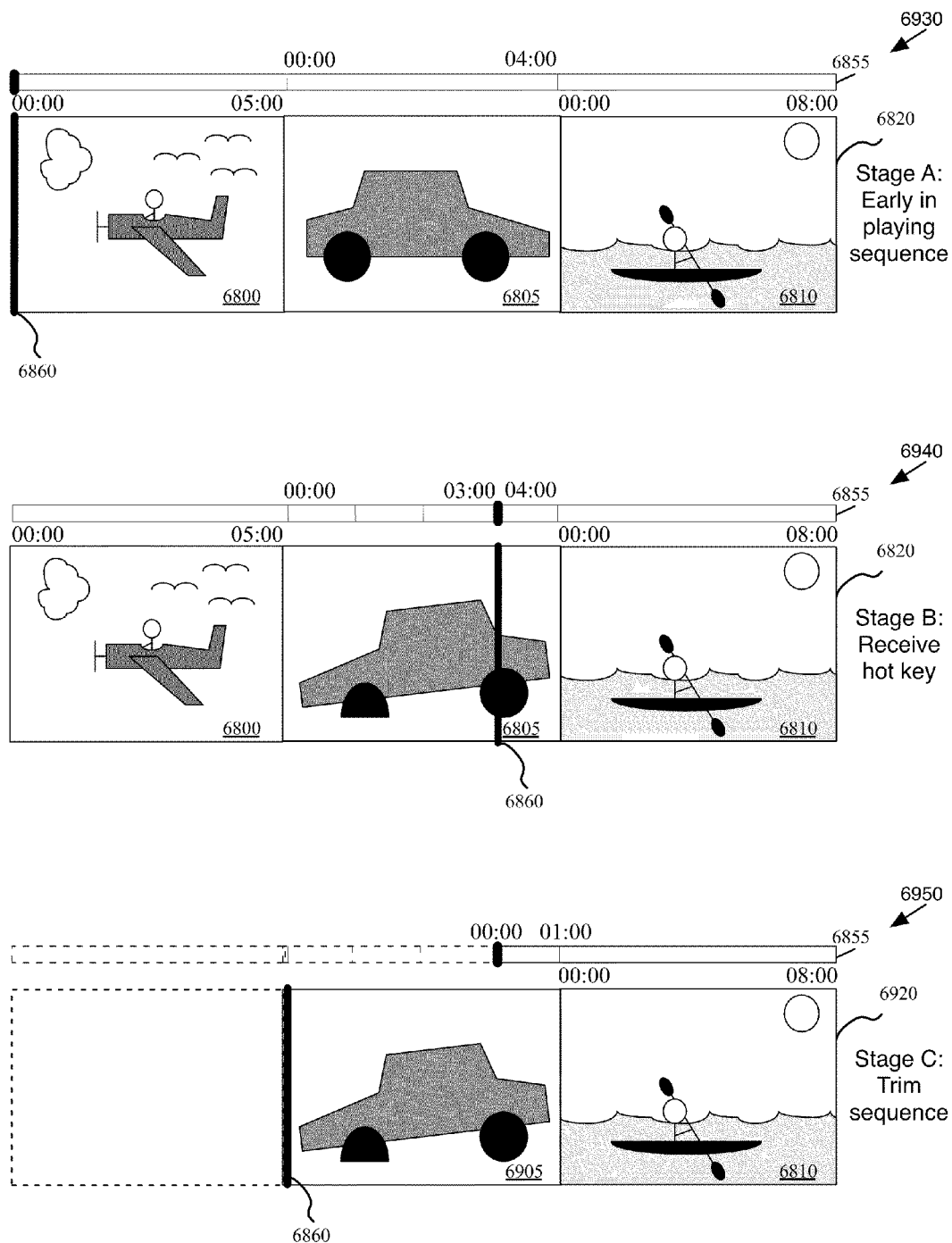
FIG. 69 illustrates an example of a sequence of media clips at several stages that show trimming the sequence in some embodiments.

FIG. 69 illustrates cutting a sequence 6820 so as to remove any media from the beginning of the sequence to a frame that is currently being played back. FIG. 69 illustrates sequence 6820 at three different stages 6930-6950. FIG. 69 also illustrates a time line 6855 at each of the stages, which is not necessarily a part of the GUI that includes the display area in which the sequence is displayed, and is illustrated in this figure to show the details of the trimming operation.

In some embodiments, the media-editing application allows the user to cut out the beginning of a sequence up to a particular point as the sequence is played back. Doing so will modify the in-point of the media clip that is playing back when the command is invoked, and will remove any previous clips from the sequence. During playback, a playhead moves along the media clips in the sequence. When the playhead is at a location in a media clip at which the user wants the sequence to start, the user can invoke a command that will cause the frame at that location to be set as the new in-point for the media clip, and will cause the previous clips to be removed from the sequence.

In the first stage 6930, sequence 6820 is displayed in the display area (not shown). In this example, sequence 6820 is a sequence of media clips 6800, 6805, and 6810, arranged in that order. A playhead 6860 indicates the position of the currently displayed frame in the duration of the media clip that is currently being played back. As mentioned above, each displayed length of media clip in a sequence does not necessarily represent the same length of time in some embodiments, as each media clip is displayed as the same size. In such cases, the playhead 6860 moves slower when it is on a longer media clip than when it is on a shorter media clip of the sequence. In this example, the representative frames used for the thumbnail representations for each of the media clips are the first frame of the media clips. At the first stage 6930, the user has just invoked a playback command to start the playback process.

In the second stage 6940, the playback has reached the three minute mark of the second media clip 6805 in the sequence 6820. At this point, the user invokes a command that causes the in-point of the currently playing clip 6805 to be set to the current location of the playhead, and the clip 6800 to be cut from the sequence 6820. In some embodiments, this edit operation is invoked through a hotkey (e.g., the "z" key). This hotkey is the same as that used to set the in-point of a single media clip in some embodiments.

The third stage 6950 illustrates that the media-editing application has removed the clip 6800 and modified the in-point of clip 6805 such that the new in-point is the timecode in the source file for that clip that corresponds to the three minute mark of the previous version of the clip before the edit. As a result, the resulting media clip 6905 now has a duration of one minute rather than four minutes, as indicated by the timeline 6855. In addition, a new representative thumbnail is used at stage 6950, as the previous representative frame is no longer part of the media clip 6805. The default thumbnail is the frame at the new in-point of the media clip. In the case in which the representative frame is still part of the media clip after the trimming operation, some embodiments do not modify the representative frame after the edit. The sequence now only consists of two clips and is nine minutes long. In some embodiments, the media clip 6800 is deleted, while in other embodiments it is merely split off from the sequence 6820 and remains in the free-form display area.

ii. Setting Out-points

Figure 70:
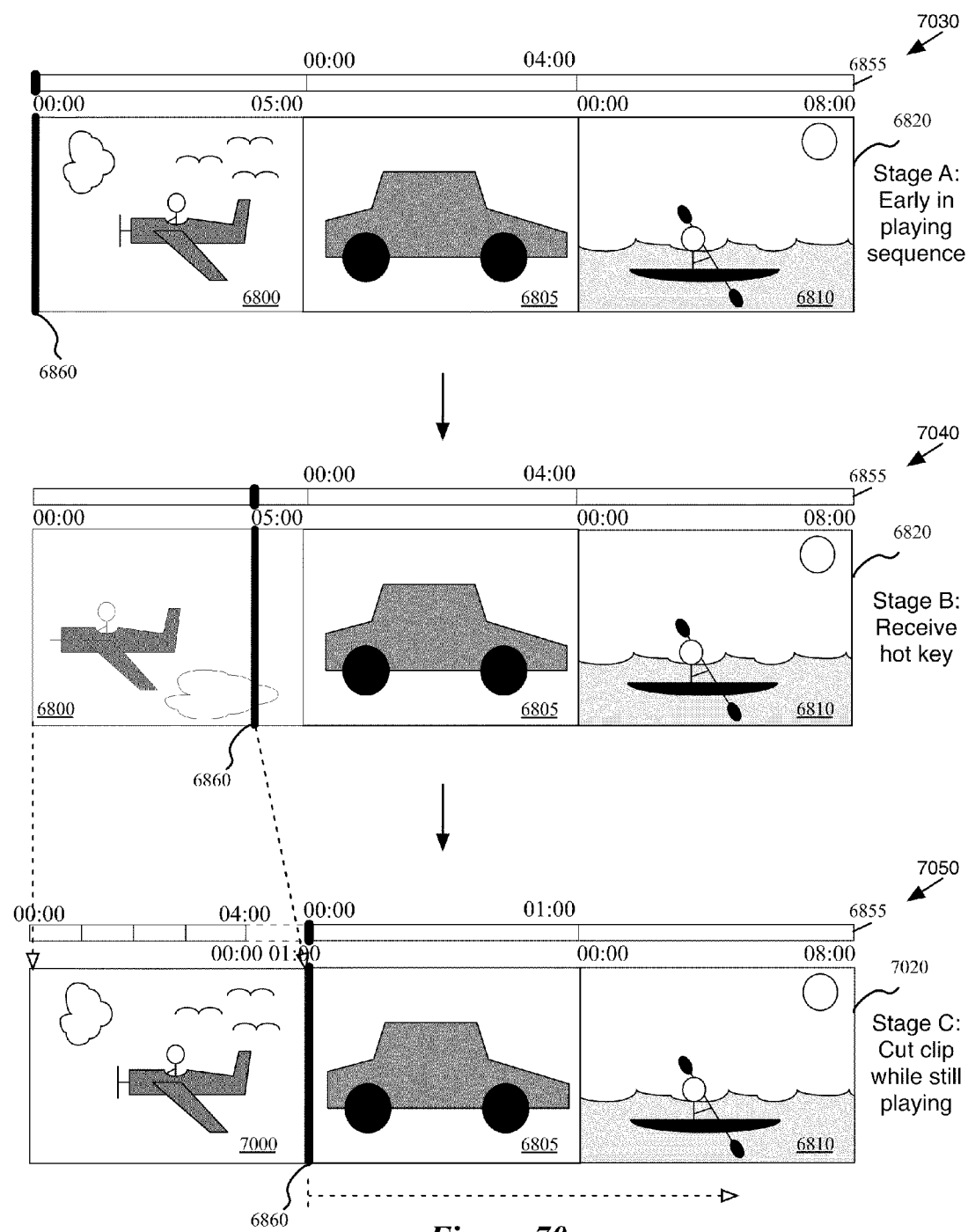
FIG. 70 illustrates an example of a sequence of media clips at several stages that show setting a new in-point for a media clip in the sequence in some embodiments.

Various operations may be performed in some embodiments in order to set out-points for single clips in a sequence and for a sequence as a whole. FIG. 70 illustrates setting an in-point of a media clip 6800 by invoking a command while a sequence 6820 of which the media clip 6800 is a part is played back. FIG. 70 illustrates sequence 6820 at three different stages 7030-7050. FIG. 70 also illustrates a time line 6855 at each of the stages, which is not necessarily a part of the GUI that includes the display area in which the sequence is displayed, and is illustrated in this figure to show the details of the trimming operation.

In some embodiments, the media-editing application allows the user to set a new out-point for a media clip that is part of a sequence in the display area as the sequence is played back. During playback, a playhead moves along the media clips in the sequence. When the playhead is at a location in a media clip at which the user wants to set a new out-point for the media clip, the user can invoke a command that will cause the frame at that location to be set as the new out-point for the media clip. Thus, if a clip is one minute long and the playhead is at the thirty second mark, the clip will be thirty seconds long after the operation to move the out-point to the thirty second mark.

In the first stage 7030, sequence 6820 is displayed in the display area (not shown).

A playhead 6860 indicates the position of the currently displayed frame in the duration of the media clip that is currently being played back. As mentioned above, each displayed length of media clip in a sequence does not necessarily represent the same length of time in some embodiments, as each media clip is displayed as the same size. In such cases, the playhead 6860 moves slower when it is on a longer media clip than when it is on a shorter media clip of the sequence. In this example, the representative frames used for the thumbnail representations for each of the media clips are the first frame of the media clips. At the first stage 7030, the user has just invoked a playback command to start the playback process.

In the second stage 7040, the playback has reached the four minute mark of the first media clip 6800 in the sequence 6820. At this point, the user invokes a command that causes the out-point of the currently playing clip 6805 to be set to the current location of the playhead. In some embodiments, this edit operation is invoked through a hotkey (e.g., the "s" key). This hotkey is the same as that used to set the out-point of a single media clip in some embodiments.

The third stage 7050 illustrates that the media-editing application has modified the out-point of clip 6800 such that the new out-point is the timecode in the source media file for that clip that corresponds to the four minute mark of the clip. As a result, the resulting media clip 7000 now has a duration of four minute rather than five minutes, as indicated by the timeline 6855. As all media clips regardless of their actual durations are represented in uniformly-dimensioned rectangles in some embodiments, the length of media clip 6800 that used to represent five minutes now represents four minutes. As the previous representative frame is still part of the media clip 6800, this representative frame is still used. In the case in which the representative frame is no longer part of the media clip after the trimming operation, some embodiments default to the frame at the in-point of the media clip.

Figure 71:
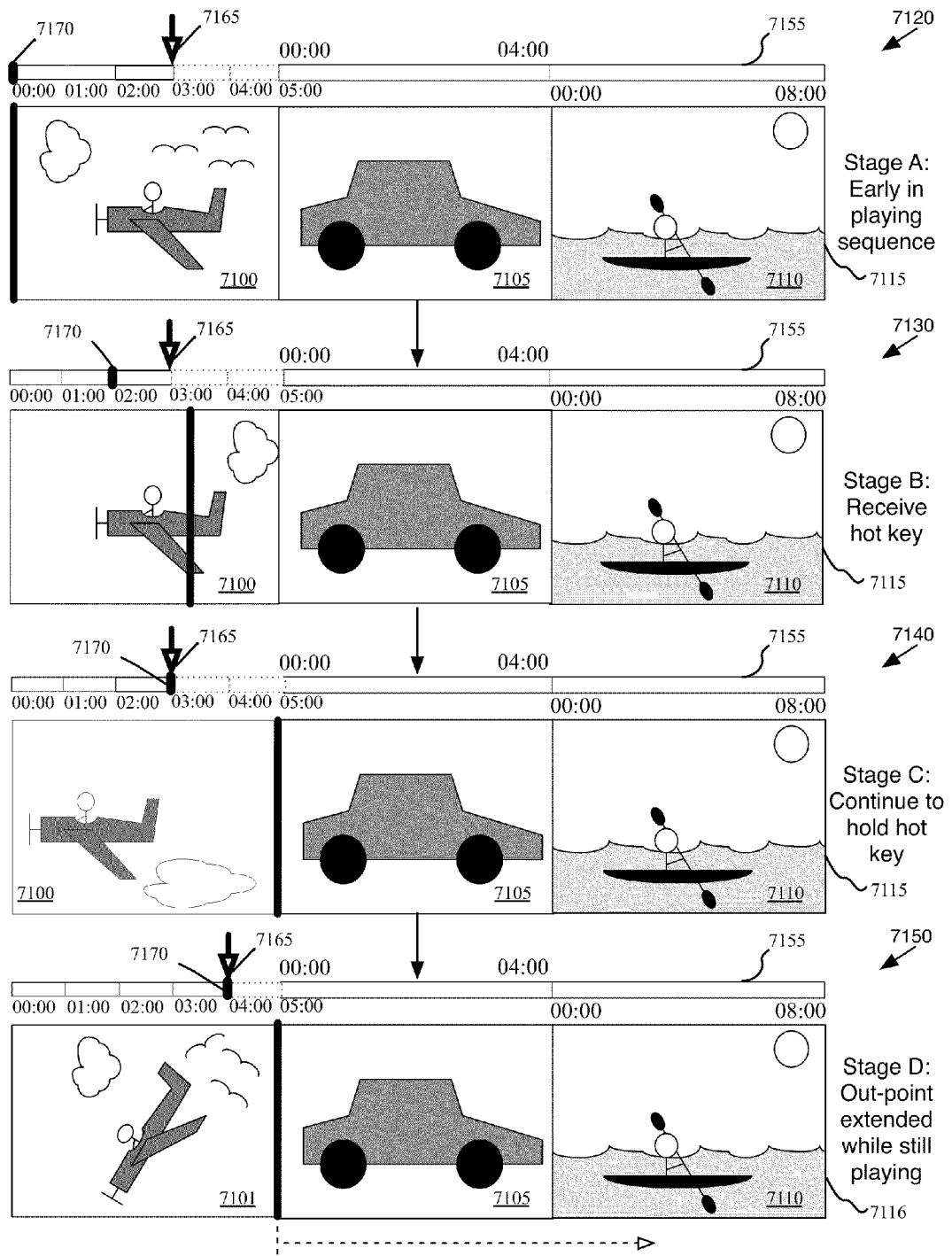
FIG. 71 illustrates an example of a sequence of media clips at several stages that show extending an out-point for a media clip in the sequence in some embodiments.

FIG. 71 illustrates extending a media clip 7100 by extending its out-point by invoking a command while a sequence 7115 of which the media clip 7100 is a part is played back. FIG. 71 illustrates sequence 7115 at four different stages 7120-7150. FIG. 71 also illustrates a time line 7155, marker 7170, and arrow 7165 at each of the stages, which are not necessarily a part of the GUI that includes the display area in which the sequence is displayed, and are illustrated in this figure to show the details of the trimming operation.

In some embodiments, when a media clip in a sequence does not contain the entirety of its source media file, the media-editing application allows the user to set a new out-point for the media clip as the sequence is played back. During playback, a playhead moves along the media clips in the sequence. Before the playhead reaches the end of the media clip, the user can invoke a command that will cause the media clip to continue playing content from its source file after the current out-point is reached. When the playhead reaches a location in the media clip source at which the user wants to set a new out-point for the media clip, the user can invoke a command that will cause the frame at that location to be set as the new out-point for the media clip.

In the first stage 7120, sequence 7115 is displayed in the display area (not shown). In this example, sequence 7115 is a sequence of media clips 7100, 7105, and 7110, arranged in that order. The media clip 7100 has a duration of three minutes, media clip 7105 has a duration of four minutes, and media clip 7110 has a duration of eight minutes, as indicated by the timeline 7155 illustrated along the sequence. As shown, however, the source media file for clip 7100 has a duration of five minutes, and the current out-point of clip 7100 is set to the timecode that corresponds to the three minute mark of the source media file. The arrow 7165 points to the current location of the out-point of the media clip along the duration of the media source file, while marker 7170 indicates the location of the playhead in the media source file. At the first stage 7120, the user has just invoked the playback command to start the playback process.

In the second stage 7130, the playback has reached the two minute mark of the first media clip 7100 in the sequence 7115. At this point, the user invokes a command that instructs the media-editing application to continue playing past the current out-point of the currently playing clip 7100. In some embodiments, this operation is invoked through a hotkey (e.g., the "d" key). This hotkey is the same as that used to extend the out-point of a single media clip in some embodiments.

In the third stage 7140, the playback has reached the three minute mark that marks the end of the media clip 7100 according to its set out-point. The playhead 7160 is now at the end of the thumbnail representing the media clip, and stays at that point as the media source file continues to play in the thumbnail representation. However, because the command was invoked at stage 7130, the media-editing application continues to play media data from the source file. At this point, the playhead marker 7170 is at the three minute mark, as is the out-point arrow 7165. In some embodiments, the playback of clip 7100 continues until the user releases the hotkey or the media source file ends. If the hotkey is released before the current out-point, then playback continues as it would have if the command had not been invoked at all.

In the fourth stage, the playback is now at minute four of the source media file, as indicated by playhead marker 7170. As this is past the previous out-point, the out-point of the media file 7100 has been extended to this four minute mark, as indicated by out-point arrow 7165. The resulting media clip is media clip 7101 and the resulting sequence is sequence 7116.

The out-point will be extended up until the user releases the hotkey in some embodiments or the source file ends, in which case the out-point will be set to the timecode marking the end of the source file.

Similarly, an in-point of a media clip (e.g., a video clip) in a sequence (or a single media clip not part of a sequence) is extendable in some embodiments. That is, these embodiments allow the user to set a new in-point for the media clip to a point in a portion of the source media file that is not currently represented by the media clip while the media clip is being played back. Some embodiments require the media clip to be played back backwards (i.e., reverse chronology) for the user to invoke a command that instructs the media-editing application to continue playing backward past the current in-point of the playing clip.

In some such embodiments, the user invokes separate commands for starting backward playback of the media clip and for extending the in-point. The user in some cases stops or pauses forward playback of the clip and then starts playing backwards. In other cases, the user reverses the playback direction to the backward direction without stopping the forward playback. Other embodiments provide a single command that allows the user to playback the media clip backwards and extend the in-point. Such a command is invokable regardless of the playback status of the media clip (e.g., stopped, paused, playing backwards or forwards). Regardless of how the in-point extension command is invoked, this command results in the redefining of the in-point to include in a media clip an earlier portion (e.g., earlier frames from the video content) of the source media file.

iii. Splitting a Clip

Figure 72:
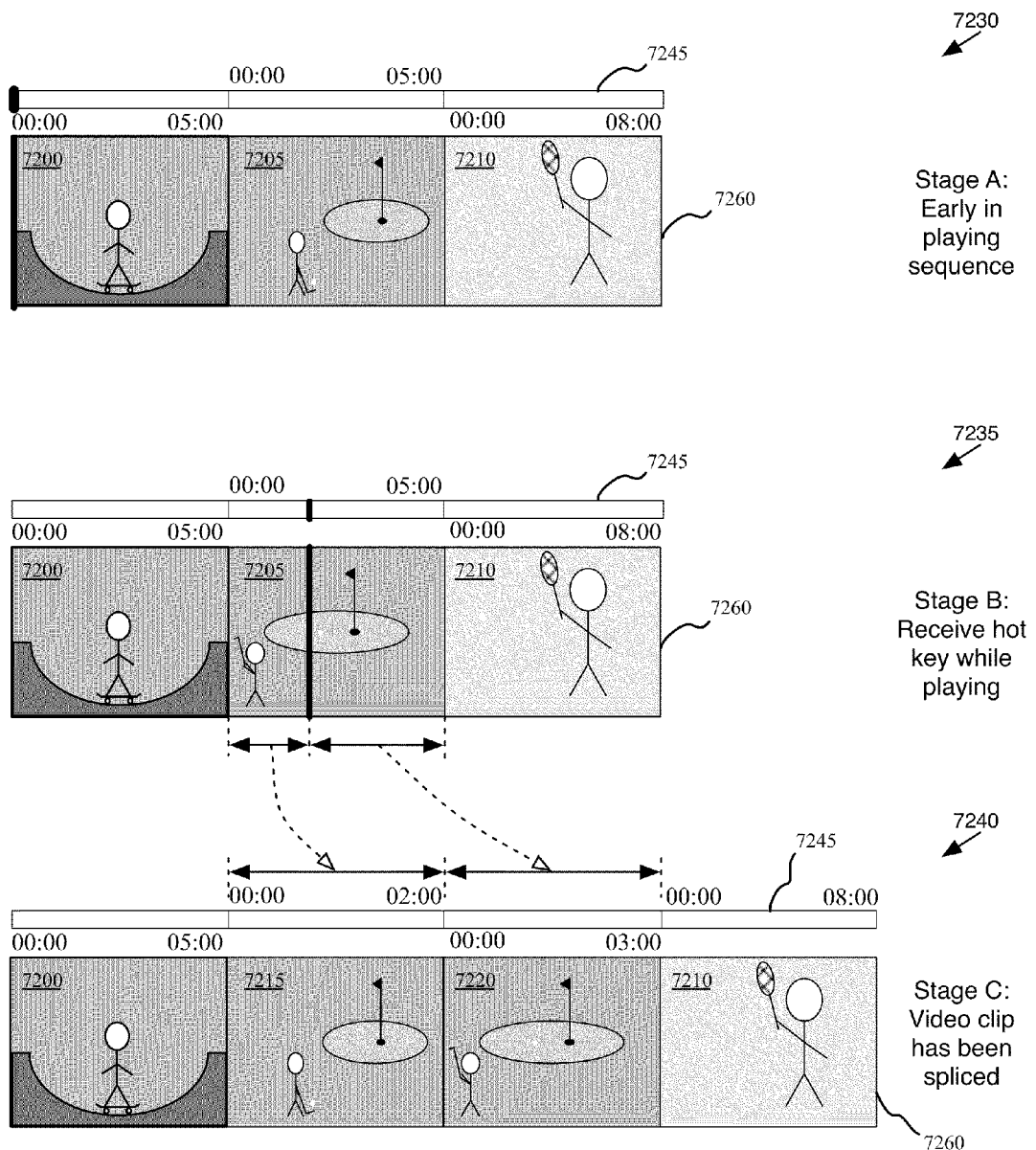
FIG. 72 illustrates an example of a sequence of media clips at several stages that show splitting a media clip in the sequence in some embodiments.

In some embodiments, operations may be performed to split a media clip in a sequence into two clips. FIG. 72 illustrates splitting a media clip 7205 into two media clips 7215 and 7220 by invoking a command while a sequence 7260 of which the media clip 7205 is a part is played back. FIG. 72 illustrates the sequence 7260 at three different stages 7230-7240. FIG. 72 also illustrates a time line 7245 at each of the stages, which is not necessarily a part of the GUI that includes the display area in which the sequence is displayed, and is illustrated in this figure to show the details of the editing operation.

In some embodiments, the media-editing application allows the user to split a media clip that is part of a sequence in the display area as the sequence is played back. During playback, a playhead moves along the media clips in the sequence. When the playhead is at a location in a media clip at which the user wants to split the media clip, the user can invoke a command that will cause the frame at that location to be set as the new out-point for the playing media clip and as the in-point for a new media clip that runs from that in-point to the previous out-point for the original media clip.

In the first stage 7230, sequence 7260 is displayed in the display area (not shown). In this example, sequence 7260 is a sequence of media clips 7200, 7205, and 7210, arranged in that order. The media clip 7200 has a duration of five minutes, media clip 7205 has a duration of six minutes, and media clip 7210 has a duration of eight minutes, as indicated by the timeline 7245 illustrated along the sequence. At the first stage 7230, the user has just invoked a playback command to start the playback process.

In the second stage 7235, the playback has reached the two minute mark of the second media clip 7205 in the sequence 7260. At this point, the user invokes a command that causes the currently playing clip 7205 to be split into two clips. In some embodiments, this edit operation is invoked through a hotkey (e.g., the "b" key). This hotkey is the same as that used to split a single media clip in some embodiments.

The third stage 7240 illustrates that the media-editing application has split the media clip 7205 into clips 7215 and 7220. The clip 7215 will have the same in-point as media clip 7205 and an out-point two minutes later (at the frame playing when the split clip command was invoked). The clip 7220 will have an in-point one frame after the out-point of clip 7215 and the same out-point as media clip 7205. Some embodiments use the frame playing when the split clip command is invoked as the in-point of the second clip and the frame prior to that as the out-point of the first clip. The representative frame for clip 7215 is the same as that of clip 7205, while the representative frame for clip 7220 is that at its in-point. As all media clips regardless of their actual durations are represented in uniformly-dimensioned rectangles in some embodiments, the length of the two media clips that represent the same actual source content as the single clip 7205 has doubled in size, and the sequence 7260 now includes four clips rather than three.

FIGS. 68-72 illustrate examples of dynamically editing a sequence of video clips in a free-form display area of some embodiments. That is, these examples show editing a sequence of video clips by invoking editing commands while the sequence is being played back within the thumbnails of the sequence in the free-form display area. In some embodiments, these editing commands can also be invoked while the sequence is played back in a bigger viewing area such as the viewing area 4350 or in a full screen mode, an example of which is described above by reference to FIG. 44. The ability to edit a sequence of video clips while playing back the sequence in the viewing area 4350 or in a full screen mode is beneficial to a user of the media-editing application because the user is able to see the effects or results of the edits immediately (or as the sequence is being played back) and the effects viewed in the viewing area 4350 or in a full screen mode provides different experience than those viewed in a small viewing area (e.g., thumbnails of the sequence) of the media editing application.

As an example of seeing the effects of edits in the viewing area 4350 or in a full screen mode immediately, while playing back the sequence of video clips in the viewing area 4350 or in a full screen mode, some embodiments allow the user to trim the video clip currently being played back to the end of the clip (i.e., setting a new out-point) by pressing a hotkey. Upon receiving the hotkey, the full screen playback quickly transitions to the first frame in the next video clip in the sequence. As such, the user is able to see the effects of the edits as the user is making edits in the viewing area 4350 or in a full screen mode.

Extending an out-point of a media clip in a sequence while the sequence is played back in the viewing area 4350 or in a full screen mode in some embodiments shows a similar transition to the next video clip from a new out-point. As soon as the user releases a hotkey when a desired frame is displayed during the playback of the media clip in some embodiments, the playback transitions to the first frame of the next video clip in the sequence and the playback continues from that frame on.

iv. Marking a Region of Interest

Figure 73:
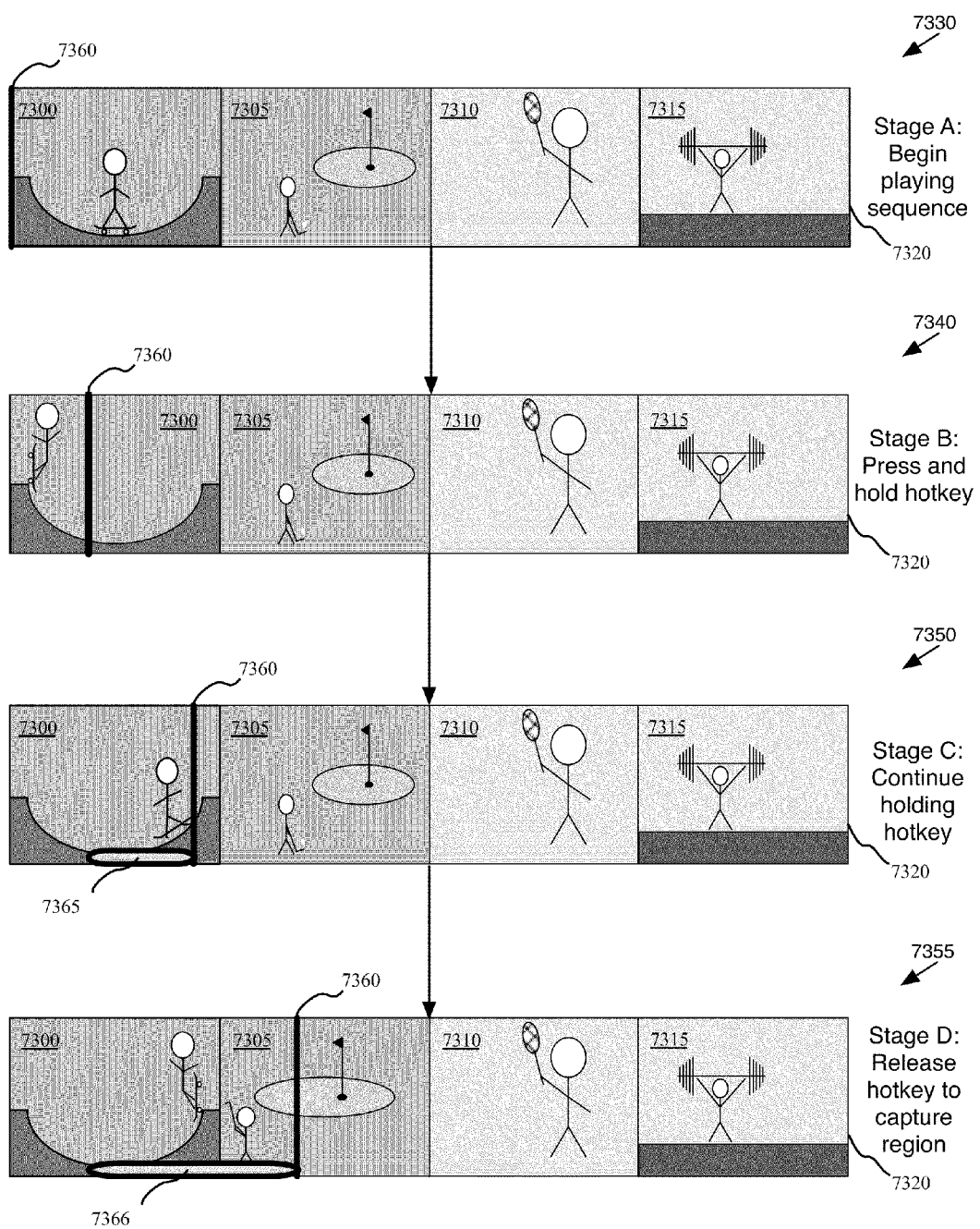
FIG. 73 illustrates an example of a sequence of media clips at several stages that show marking a region of interest over several media clips in the sequence in some embodiments.

Some embodiments enable a user to mark a region of interest of a sequence in the free-form display area. As described above, a region of interest is a temporal portion of a sequence that is selected by the user. FIG. 73 illustrates marking a region of interest of sequence 7320 while the sequence is played back. FIG. 73 illustrates sequence 7320 at four stages 7330-7355.

The first stage 7330 illustrates that the user has begun playback of the sequence 7320. The sequence 7320 consists of media clips 7300, 7305, 7310, and 7315, arranged in that order. At the second stage 7340 the playhead is approximately two-fifths of the way through the first clip 7300 when the user invokes a command to start defining and marking a region of interest. In some embodiments, the user holds down a hotkey during playback in order to define the region of interest.

At the third stage 7350, the user has not yet invoked a command to end the region of interest (e.g., releasing the hotkey). At this point, the playhead (and thus the end of the region of interest) is most of the way through the first media clip in the sequence 7320. At the fourth stage 7355, the user invokes the command to end the region of interest, which includes portions of both clip 7300 and clip 7305 at this point. The command is invoked by releasing the hotkey in some embodiments.

The region of interest is now marked on the sequence by the resulting marker 7366, which spans from the start point in the first clip to the end point in the second clip. Owing to the difference in duration of the different clips, equal distances along the marker at different portions of the marker may represent different temporal lengths of media. In some embodiments, as described above for a single clip, the marker can be selected and dragged out of the sequence (or copied and pasted) in order to create a new single clip (if spanning only one clip) or sequence (if spanning multiple clips).

This Sub-section IV.B has so far described editing operations on composite sequences that are performed when the sequences are displayed and or played back in a free-form display area. Some embodiments allow these operations to be performed on composite sequences when they are displayed in a composite display area such as 1120 described above by reference to FIG. 11. Several specific examples of the editing operations that some embodiments allow to be performed on sequences displayed in a composite display area are now described below by reference to the next two FIGS. 74 and 75.

Figure 74:
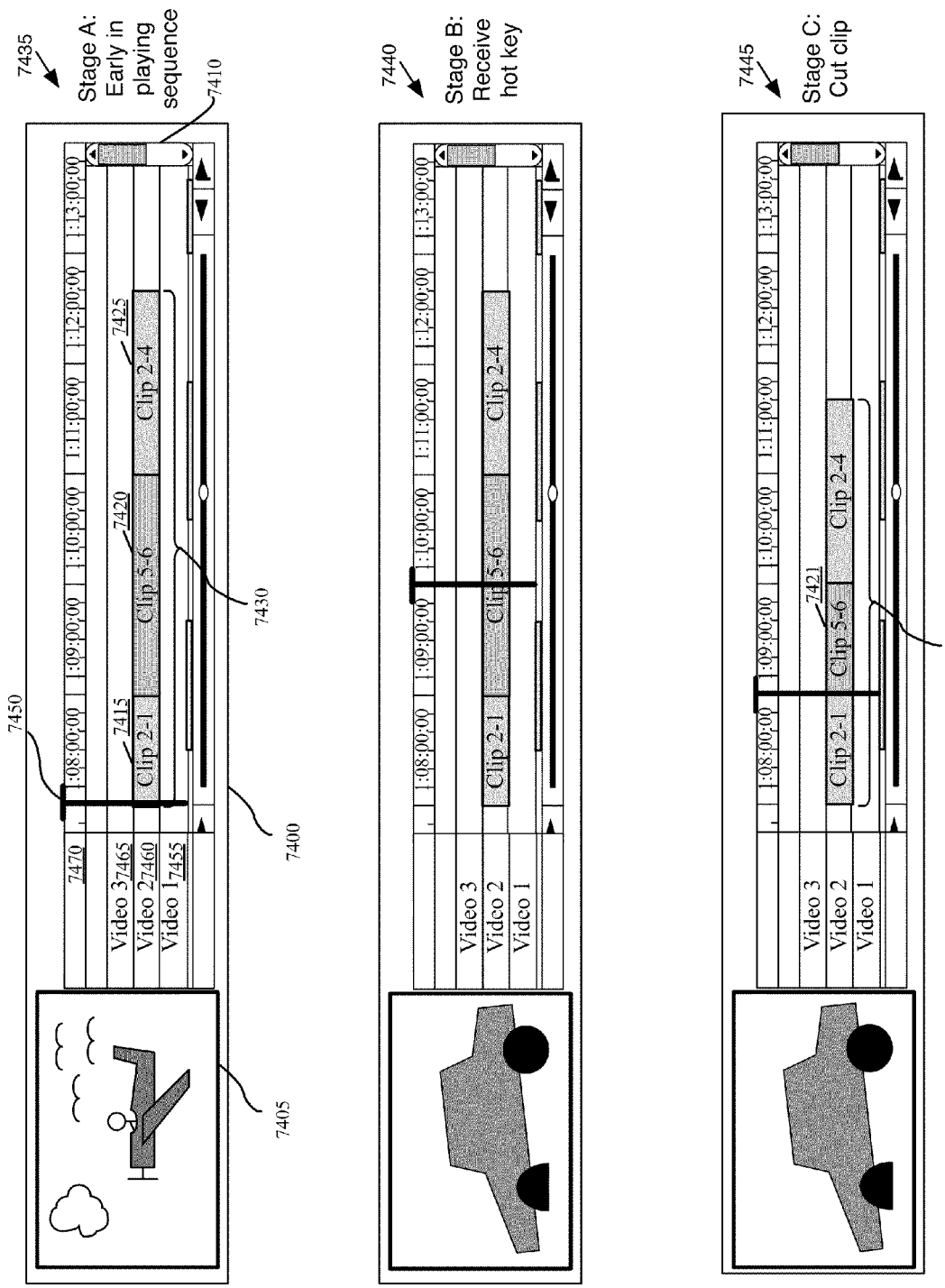
FIG. 74 illustrates an example GUI at several stages that show setting a new in-point for a media clip in a sequence of media clips in some embodiments.

FIG. 74 illustrates a GUI 7400 of a media-editing application of some embodiments that includes a viewing area 7405 and a composite display area 7410. Specifically, FIG. 74 illustrates an example of setting an in-point of a media clip 7420 by invoking a command while a sequence 7430 of which the media clip 7420 is a part is played back. FIG. 74 illustrates the GUI 7400 at three different stages 7435-7445.

The composite display area 7410 is similar to the composite display area 1120 described above by reference to FIG. 11. The composite display area includes multiple tracks 7455-7465 that span a time line 7470 and displays a graphical representation of the composite presentation by displaying media clips 7415-7425 (or sequence 7430) that form the composite presentation. As described above, media clips in some embodiments are represented in a composite display area as a set of rectangular representations where the length of the rectangle provides a visual indicator of the length of the associated clip.

The composite display area 7410 is the only compositing space in the GUI 7400 of the media-editing application in some embodiments. Other embodiments provide the composite display area 7410 as one of several composite display areas of the GUI 7400. One such composite display area of the GUI 7400 may be the free-form display area 1305 described above in 1305.

The timeline 7470 shows where in the duration of the composite presentation the media clips and sequences are located. Also, as the length of a media clip or a sequence is proportional to its actual duration in the composite display area, a media clip or a sequence's span along the timeline indicates the begin and end of the duration of the media clip within the duration of the composite presentation.

A viewing area 7405 is an area in the GUI 7400 for displaying playback of a media clip, a sequence of media clips, or a composite presentation. The viewing area 7405 is similar to ones described above by reference to FIGS. 10-13. In some embodiments, the viewing area 7405 is one of several areas for displaying playback of media clips, a sequence, or a composite presentation in the tracks. In some such embodiments, a viewing area is assigned to each track to display playback of the media clips or sequences in the track, in addition to a viewing area dedicated to display playback of a composite presentation (i.e., media clips in multiple tracks).

In some embodiments, a media clip or a sequence in the track is played back by the user selecting a play option (e.g., by clicking on, tapping) displayed in a pop-up menu. In some embodiments, the pop-up menu is accessed through a cursor control operation (e.g., a right-click cursor operation or a control-click cursor operation). In some embodiments, playback of the media clip or a sequence is only displayed in the viewing area (i.e., playback is not displayed in the selected media clip or sequence itself).

The playhead 7450 is represented as a T-shape object that spans the timeline and multiple tracks vertically. It moves horizontally along the composite display area (i.e., along the timeline) and its position along the timeline indicates the timecode of the composite presentation. As such, when the content of a media clip is being played back in the viewing area, the playhead indicates the position of the currently displayed frame in the duration of the composite presentation that the media clip is a part of. Also, it can indicate the position of the currently displayed frame in the duration of the media clip because the beginning and ending of the duration of the media clip (i.e., the in and out-points of the media clip) is indicated as positions in the timeline.

In the first stage 7435, sequence 7430 is displayed in the composite display area 7410, more specifically in the track 7460. In this example, sequence 7430 is a sequence of media clips 7415, 7420, and 7425 arranged in that order. There may be other media clips and sequences displayed in the composite display area but they are not illustrated in this figure for simplicity. The media clip 7415 has a duration of one minute as it spans from the one hour eight minute mark to the one hour nine minute mark in the timeline 7470. The media clip 7420 has a duration of two minutes. The media clip 7425 has a duration of about one minute and forty seconds as indicated by their span along the time line. In this stage, the user has just invoked a playback command to start the playback process. The playhead 7450 is just past the beginning of the media clip 7415 and a frame of the media clip is displayed in the viewing area 7405.

In the second stage 7440, the playback has reached the one hour ten minute mark of the timeline. This point in the timeline also marks the beginning of the second minute in the duration of the media clip 7420, which begins at one hour nine minute mark of the timeline 7450. At this point, the user invokes a command that causes the in-point of the currently playing clip 7420 to be set to the current location of the playhead. In some embodiments, this edit operation is invoked through a hotkey (e.g., the "a" key). The frame at the beginning of the second minute in the media clip is displayed in the viewing area 7405.

The third stage 7445 illustrates that the media-editing application has modified the in-point of the media clip 7420 such that the new in-point is the timecode in the source media file for that clip that corresponds to the two minute mark of the previous version of the clip before the edit. As a result, the resulting media clip 7421 now has a duration of one minute rather than two minutes, as indicated by the span of the media clip 7420 along the timeline 7420, i.e., the media clip begins at the one hour and nine minute mark and ends at the one hour and ten minute mark. As the length of the media clip 7420 has been shifted to the left along the timeline by one minute, the media clip 7425, which is the next media clip in the sequence, is also shifted by one minute to the left. The playhead is now located at the beginning of the media clip 7420. The frame that is displayed in the viewing area is the first frame of the media clip which is also the frame at the beginning of the second minute in the previous version of the media clip. The resulting sequence is sequence 7431.

Figure 75:
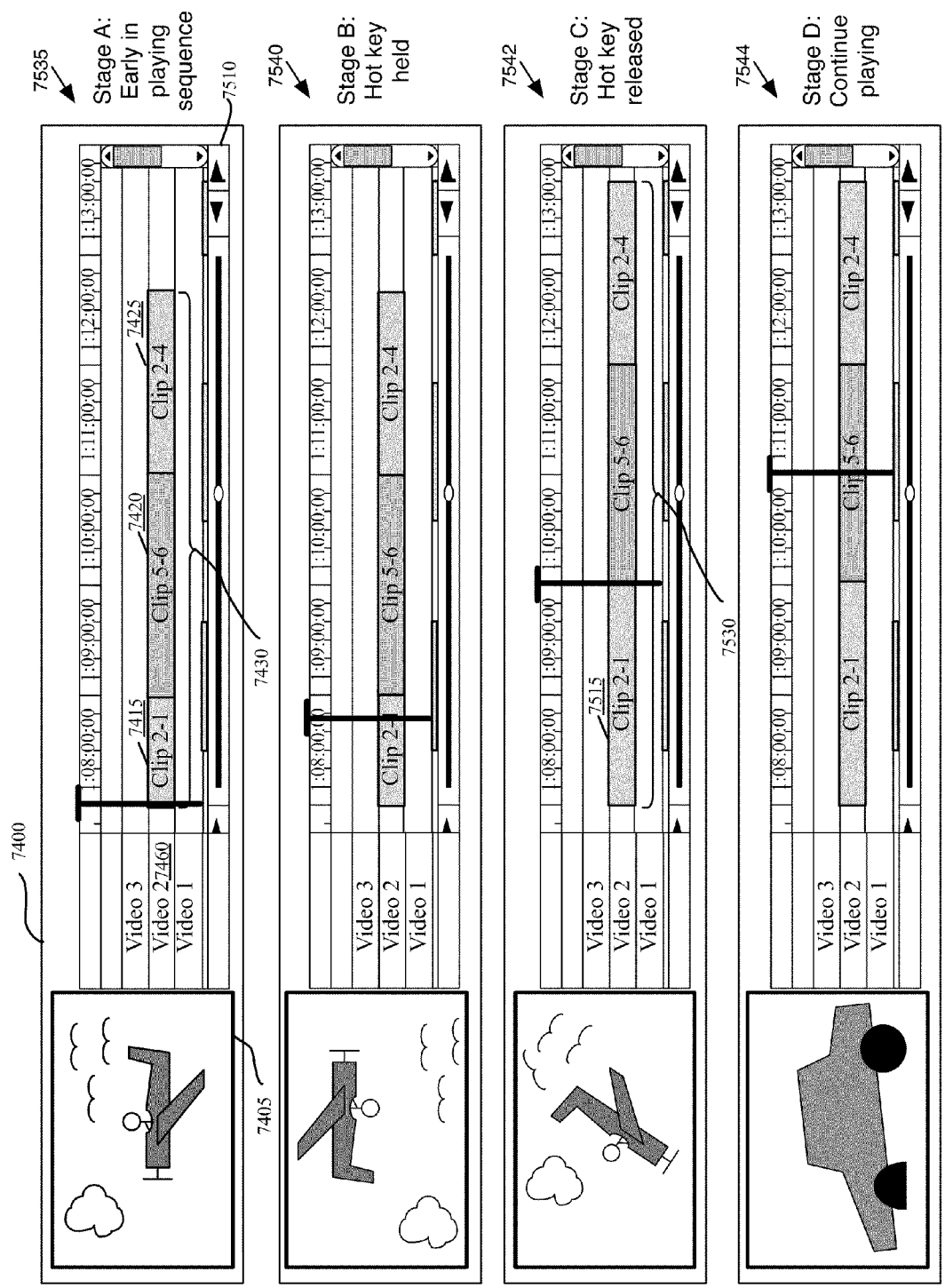
FIG. 75 illustrates an example GUI at several stages that show extending an out-point of a media clip in a sequence of media clips in some embodiments.

FIG. 75 illustrates a GUI 7400 of a media-editing application of some embodiments. Specifically, FIG. 75 illustrates extending a media clip 7415 by extending its out-point by invoking a command while a sequence 7430 of which the media clip 7415 is a part is played back. FIG. 75 illustrates the GUI 7400 at four different stages 7535, 7540, 7542, and 7544.

In some embodiments, when a media clip in a sequence does not contain the entirety of its source media file, the media-editing application allows the user to set a new out-point for the media clip as the sequence is played back. During playback, a playhead moves along the media clips in the sequence. Before the playhead reaches the end of the media clip, the user can invoke a command that will cause the media clip to continue playing content from its source file after the current out-point is reached. When the playhead reaches a location in the media clip source at which the user wants to set a new out-point for the media clip, the user can invokes a command that will cause the frame at that location to be set as the new out-point for the media clip. As output point of the media clip is extended, a rectangle that represents the media clip in a track of a composite display area gets extended in some embodiments.

In the first stage 7535, sequence 7430 is displayed in the track 7460 of the composite display area 7410. In this example, sequence 7430 is a sequence of media clips 7415, 7420, and 7425, arranged in that order. The sequence 7430 is a sequence of media clips 7415, 7420, and 7425 arranged in that order. There may be other media clips and sequences displayed in the composite display area but they are not illustrated in this figure for simplicity. In this stage, the user has just invoked a playback command to start the playback process. The playhead 7450 is just past the beginning of the media clip 7415 and a frame of the media clip is displayed in the viewing area 7405.

In this example, the source media file for clip 7410 has a duration of three minutes, and the current out-point of clip 7415 is set to the end of the first minute of the source media file. The current in-point of clip 7415 is set to the beginning of the source media file. As such, the duration of the media clip 7415 is one minute as indicated by the span of the media clip 7415 along the timeline 7450. That is, the media clip 7415 spans from on from one hour eight minute mark to one hour nine minute mark in the timeline 7470. The media clip 7420 has a duration of two minutes. The media clip 7425 has a duration of about one minute and forty seconds as indicated by their span along the time line.

In the second stage 7540, the playback has reached about the one hour eight minutes and fifty second mark of the timeline 7550, which is about the fifty second mark of the first media clip 7515 in the sequence 7530. At this point, the user invokes a command that instructs the media-editing application to continue playing past the current out-point of the currently playing clip 7515. In some embodiments, this operation is invoked through a hotkey (e.g., the "d" key). In some embodiments, the playback of clip 7515 continues until the user releases the hotkey or the media source file ends. If the hotkey is released before the current out-point, then playback continues as it would have if the command had not been invoked at all.

In the third stage 7542, the user stops invoking the command by releasing the hotkey when the playback has past the one hour nine minute mark that marks the end of the media clip 7515 according to its set out-point. They playback has continued past the out-point and the playhead 7550 is now at the one hour ten minute mark, which is equivalent to the two minute mark of the media clip. Since the user has released the hotkey now, the one hour ten minute mark, or the two minute mark of the media clip is the new out-point of the media clip. The rectangle representing the resulting media clip 7515 has now also extended to the one hour ten minute mark, accordingly. The second and third media clips 7520 and 7525 of the sequence 7530 has been pushed to the right by one minute as the first media clip 7415 (i.e., the media clip 7515 now) has been extended to the right by one minute. The resulting sequence is sequence 7530.

In the fourth stage 7544, the playback is now at the one hour eleven minute mark of the timeline 7450. Since the user released the hotkey a minute before, thereby marking the end of the first media clip 7415, the second media clip 7420 of the sequence has been played back for one minute as indicated by the current playhead position. However, had the user been still holding the hotkey, the media clip 7415 would have been able to extend to this point because the source media file for clip 7415 has a duration of three minutes, a minute longer than the media clip 7415 after the new out-point was set. Moreover, this point was as far as the media clip 7415 have been able to be extended because this point is also the end of the source media file for the media clip.

This Sub-section IV.B has described editing operations on composite sequences. There are more edit operations that some embodiments allow the user to perform. One of those edit operations is jumping to the next edit point in the media clips of a sequence while the sequence is being played back. In some embodiments, this edit operation is invoked through a hotkey (e.g., the "'" key). When the hotkey command is invoked while the sequence is being played back, the playback jumps to the frame at the next edit point (e.g., in- or out-points that are later than the current playhead position in the sequence) and the playback continues from that edit point (i.e., from the frame at the next edit point).

Another of those operations is jumping to the previous edit point in the media clips of a sequence while the sequence is being played back. In some embodiments, this edit operations is invoked through a hotkey (e.g., the ";" key). When this hotkey command is invoked while the sequence is being played back, the playback jumps back to the frame at the previous edit point (e.g., in- or out-point that is ahead of the current playhead position in the sequence) and the playback continues from that edit point on (i.e., the frame at the previous edit point).

V. Software Architecture

Figure 76:
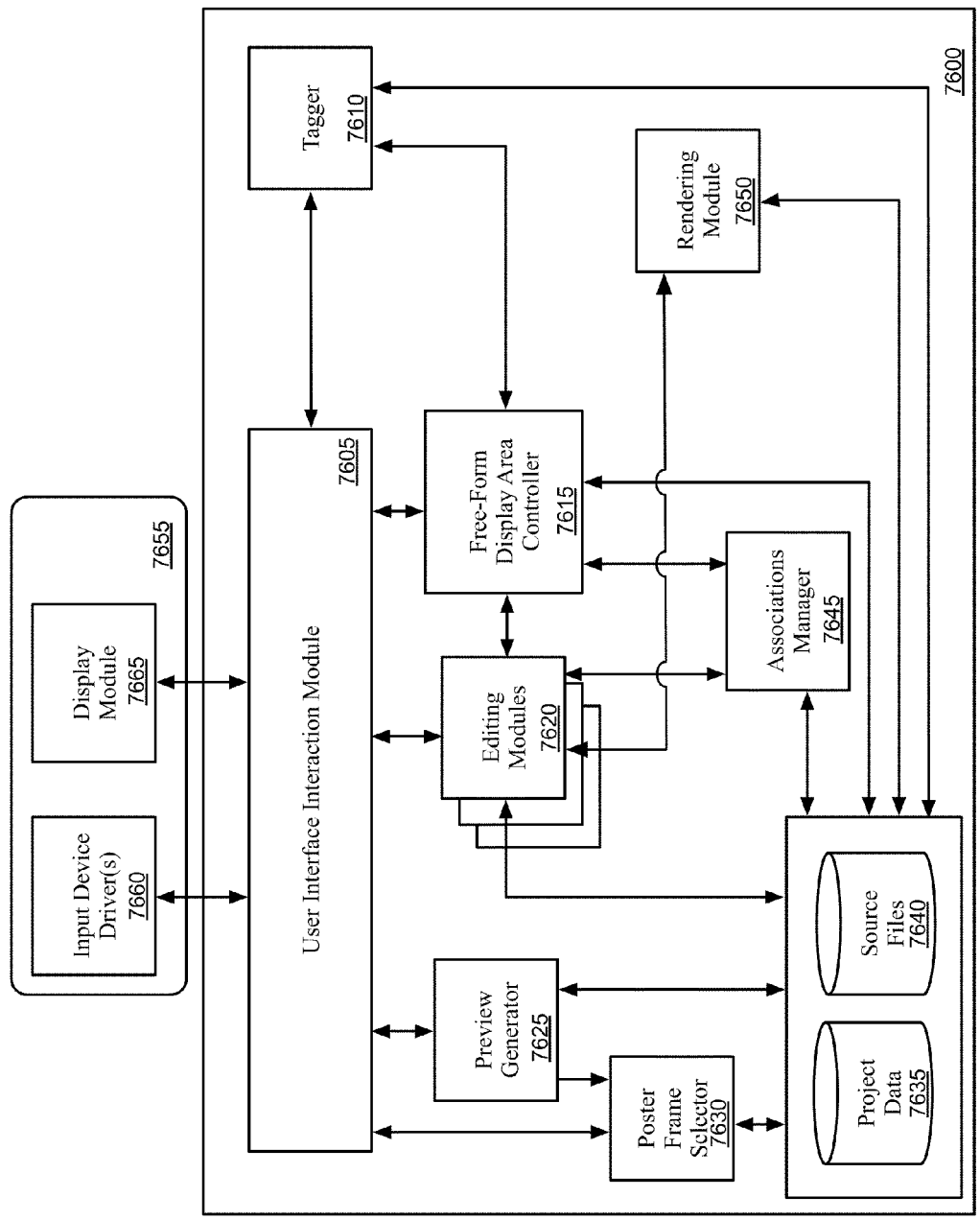
FIG. 76 conceptually illustrates the software architecture of the media-editing application of some embodiments.

In some embodiments, the processes described above are implemented as software running on a particular machine, such as a computer or a handheld device, or stored in a computer readable medium. FIG. 76 conceptually illustrates the software architecture of a media-editing application 7600 of some embodiments. In some embodiments, the media-editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media-editing application 7600 includes a user interface (UI) interaction module 7605, a tagger 7610, a free-form display area controller 7615, a set of editing modules 7620, a preview generator 7625, a poster frame selector 7630, and a other project data 7635. The media production application also includes source files 7640, association manager 7645, and rendering module 7650. In some embodiments, the source files stores the media content (e.g. text, audio, image, and video content) data of media clips. The project data stores data structures for sequences and media clips that include a reference to media content data stored as .mov, .avi, .jpg, .png, .mp3, .wav, .txt, etc. files in the source files 7640. In some embodiments, storages 7635 and 7640 are all stored in one physical storage. In other embodiments, the storages are in separate physical storages, or one of the storages is in one physical storage while the other is in a different physical storage. For instance, the other project data and the source files will often be separated.

FIG. 76 also illustrates an operating system 7655 that includes input device driver(s) 7660 and display module 7665. In some embodiments, as illustrated, the device drivers 7660 and display module 7665 are part of the operating system 7655 even when the media-editing application is an application separate from the operating system.

The input device drivers 7660 may include drivers for translating signals from a keyboard, mouse, touchpad, tablet, touch screen, etc. A user interacts with one or more of these input devices, which send signals to their corresponding device driver. The device driver then translates the signals into user input data that is provided to the UI interaction module 7605.

The present application describes a graphical user interface that provides users with numerous ways to perform different sets of operations and functionalities. In some embodiments, these operations and functionalities are performed based on different commands that are received from users through different input devices (e.g., keyboard, track pad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch-screen device. In some embodiments, with touch control, a user can directly manipulate objects by interacting with the graphical user interface that is displayed on the display of the touch-screen device. For instance, a user can select a particular object in the graphical user interface by simply touching that particular object on the display of the touch-screen device. As such, when touch control is utilized, a cursor may not even be provided for enabling selection of an object of a graphical user interface in some embodiments. However, when a cursor is provided in a graphical user interface, touch control can be used to control the cursor in some embodiments.

Moreover, the present application describes the use of hotkeys to invoke various commands (e.g., editing commands such as trimming, extending edit points, splitting, marking regions of interest, etc.) to edit a media clip or a sequence of media clips in some embodiments. In some embodiments, the hotkeys are tangible keys in a typical keyboard (e.g., keyboard for a desktop computer, keypad for a smartphone, etc.). However, in other embodiments, hotkeys are provided through a touch control. A hotkey in some such embodiments is a key in a graphical keyboard rendered on a touch-screen device, any user interface item that is selectable or clickable, or any other touch-screen methods.

The display module 7665 translates the output of a user interface for a display device. That is, the display module 7665 receives signals (e.g., from the UI interaction module 7605) describing what should be displayed and translates these signals into pixel information that is sent to the display device. The display device may be an LCD, plasma screen, CRT monitor, touch screen, etc.

The UI interaction module 7605 of media-editing application 7600 interprets the user input data received from the input device drivers and passes it to various modules, including the tagger 7610, the free-form display area controller 7615, the editing modules 7620, the preview generator 7625, and the poster frame selector 7630. The UI interaction module also manages the display of the UI, and outputs this display information to the display module 7665. This UI display information may be based on information from the poster frame selector 7630, tagger 7610, etc., or directly from input data (e.g., when a user moves an item in the UI that does not affect any of the other modules of the application 7600).

The free-form display area controller 7615 manages the display of and interaction with the free-form display area of some embodiments. The module 7615 generates the free-form display area based on information in the data structure for the display area and passes this information to the UI interaction module 7605 for incorporation into the user interface. The module 7615 also receives user input from the UI interaction module 7605 to modify the free-form display area (e.g., moving and piling clips and sequences, adding new clips to the display area, concatenating clips into sequences, etc.). The free-form display area controller 7615 utilizes the associations manager 7645 in some embodiments to manage the creation and modification of sequences.

The editing modules 7620 receive the various editing commands (trimming clips and sequences, etc.) and edit the clips and sequences in the free-form display area accordingly. In addition, editing modules 7620 of some embodiments perform edit operations in a composite display area. The editing modules 7620 use the associations manager 7645 for management of the sequences when the edits modify the structure of a sequence (e.g., a trim that cuts a clip out of a sequence, etc.). The editing module modifies the clip data structures when clips are edited.

The tagger 7610 receives a clip ID of a tagged media clip, tagged position of a media clip, and metadata (i.e., tags) from the UI interface module, and adds this data to the data structure for the media clip in some embodiments. In some embodiments, the tagger also creates a bin in the project data associated with the metadata. The tagger may also perform autosuggestion functions.

The preview generator 7625 enables the output of audio and video from the media-editing application so that a user can preview clips or composite sequences. The preview generator 7625 uses the project data and the source media to send display instructions to the UI interaction module 7605, which incorporates the information into the user interface.

The poster frame selector 7630 receives input to select a representative frame of a playing media clip, and identifies the current frame from the preview generator 7625. The poster frame selector stores this information in the data structure for the playing media clip.

The associations manager 7645 handles the creation and modification of sequences. When two clips are moved within a particular proximity of each other in the free-form display area, the associations manager 7645 of some embodiments associates the clips in a sequence. The associations manager 7645 creates new data structures for the sequences, and modifies the data structures when clips are added to or removed from a sequence, or when clips are moved around within a sequence.

The rendering engine 7650 enables the storage or output of a composite media presentation using the media-editing application 7600. Rendering engine 7650 receives data from the editing engine 6820 and/or storages 7635 and 7640 and, in some embodiments creates a composite media presentation from the source files 7640. The composite media presentation can be stored in the storages or a different storage.

While many of the features have been described as being performed by one module (e.g., free-form display area controller 7615 or preview generator 7625), one of ordinary skill would recognize that the functions might be split up into multiple modules, and the performance of one feature might even require multiple modules.

VI. Process for Defining Media Editing Application

Figure 77:
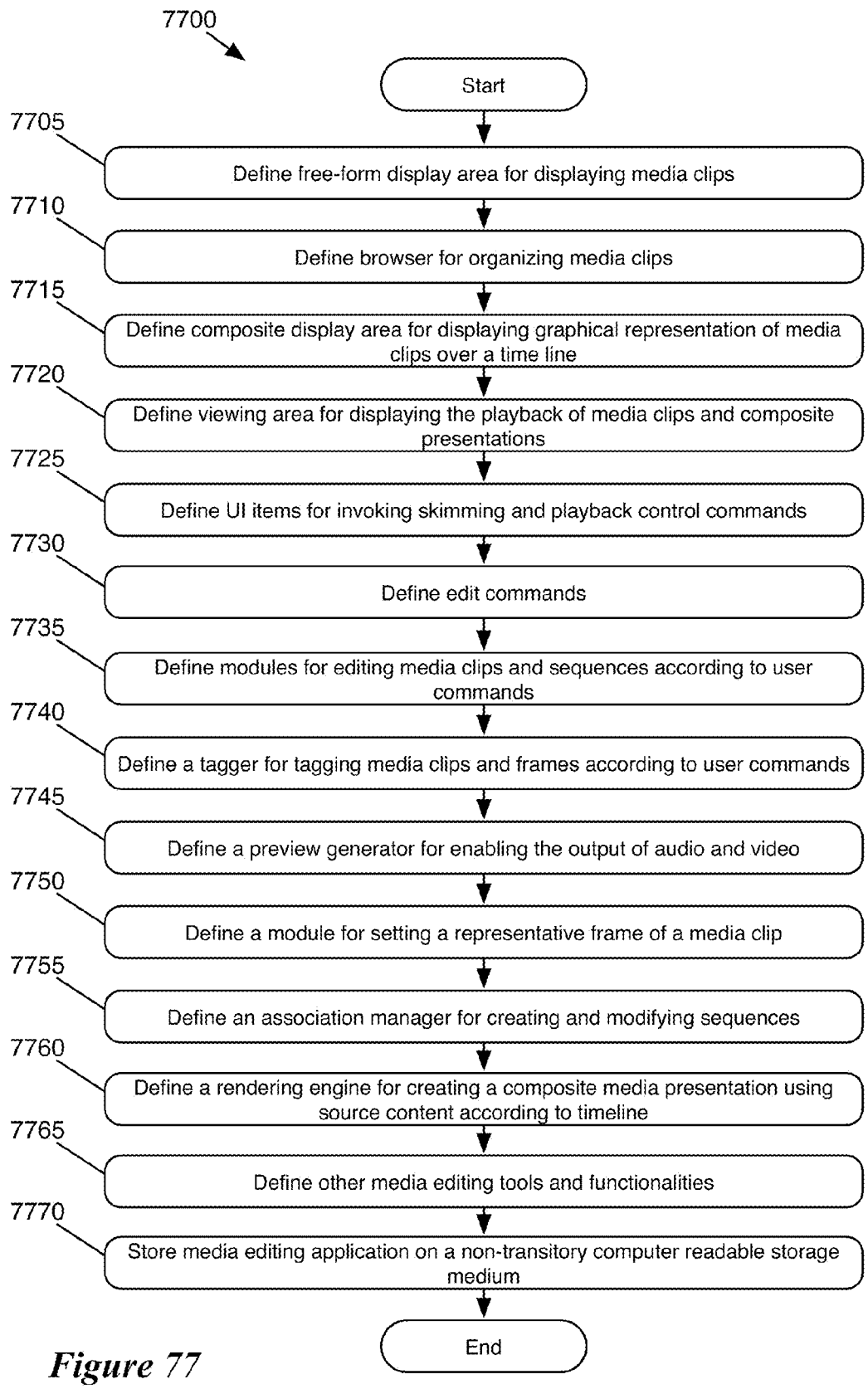
FIG. 77 conceptually illustrates a process used by some embodiments to define a media-editing application.

FIG. 77 conceptually illustrates a process 7700 of some embodiments for manufacturing a computer readable medium that stores a media editing application such as the application described above by reference to FIG. 13. In some embodiments, the computer readable medium is a distributable CD-ROM. As shown, process 7700 begins by defining (at 7705) a free-form display area for displaying media clips. A free-form display area in some embodiments is a composite display area for displaying media clips over a timeline. For instance, the display areas 700 and 1305 of FIGS. 7 and 13 are examples of the defined free-form display area. The process 7700 next defines (at 7710) a browser for organizing media clips, such as the browsers 1310 and 5315 illustrated in FIGS. 13 and 53. Process 7700 then defines (at 7715) a composite display area for displaying media clips over a time line. For instance, the composite display areas 1120 and 1315 of FIGS. 11 and 13 are examples of the defined composite display area.

The process 7700 next defines (at 7720) a viewing area for displaying the playback of media clips and composite presentations, such as the viewer 1320 and the viewing area 2310 illustrated in FIGS. 13 and 41, respectively. Process 7700 then defines (at 7725) UI items for invoking skimming and playback control commands, such as the playback controls 245 and 4355-4365 of FIGS. 2 and 43. Process 7700 also defines (at 7730) edit commands, such as the editing commands described above by reference to FIGS. 63-66 and 67-73.

Next, the process defines (at 7735) modules for editing media clips and sequences according to user commands, such as the editing modules 7620. The process 7700 then defines (at 7740) a tagger for tagging media clips and frames according to user commands. The tagger 7610 is one such tagger. The process 7700 also defines (at 7745) a preview generator for enabling the output of audio and video, such as the preview generator 7625. The process 7700 then defines (7750) a module for setting a representative frame of a media clip, such as the poster frame selector 7630.

Next, the process 7700 defines (at 7755) an association manager for managing media project data. The associations manager 7645 is an example of such defined association manager. Process 7700 then defines (at 7760) a rendering engine for creating a composite media presentation using source content according to timeline, such as the rendering module 7650.

The process 7700 then defines (at 7765) other media editing tools and functionalities. Examples of such editing tools may include zoom, color enhancement, blemish removal, audio mixing, trim tools, etc. In addition, various other media editing functionalities may be defined. Such functionalities may include library functions, format conversion functions, etc. The process 7700 defines these additional tools in order to create a media editing application that includes other features in addition to the features described above.

Figure 78:
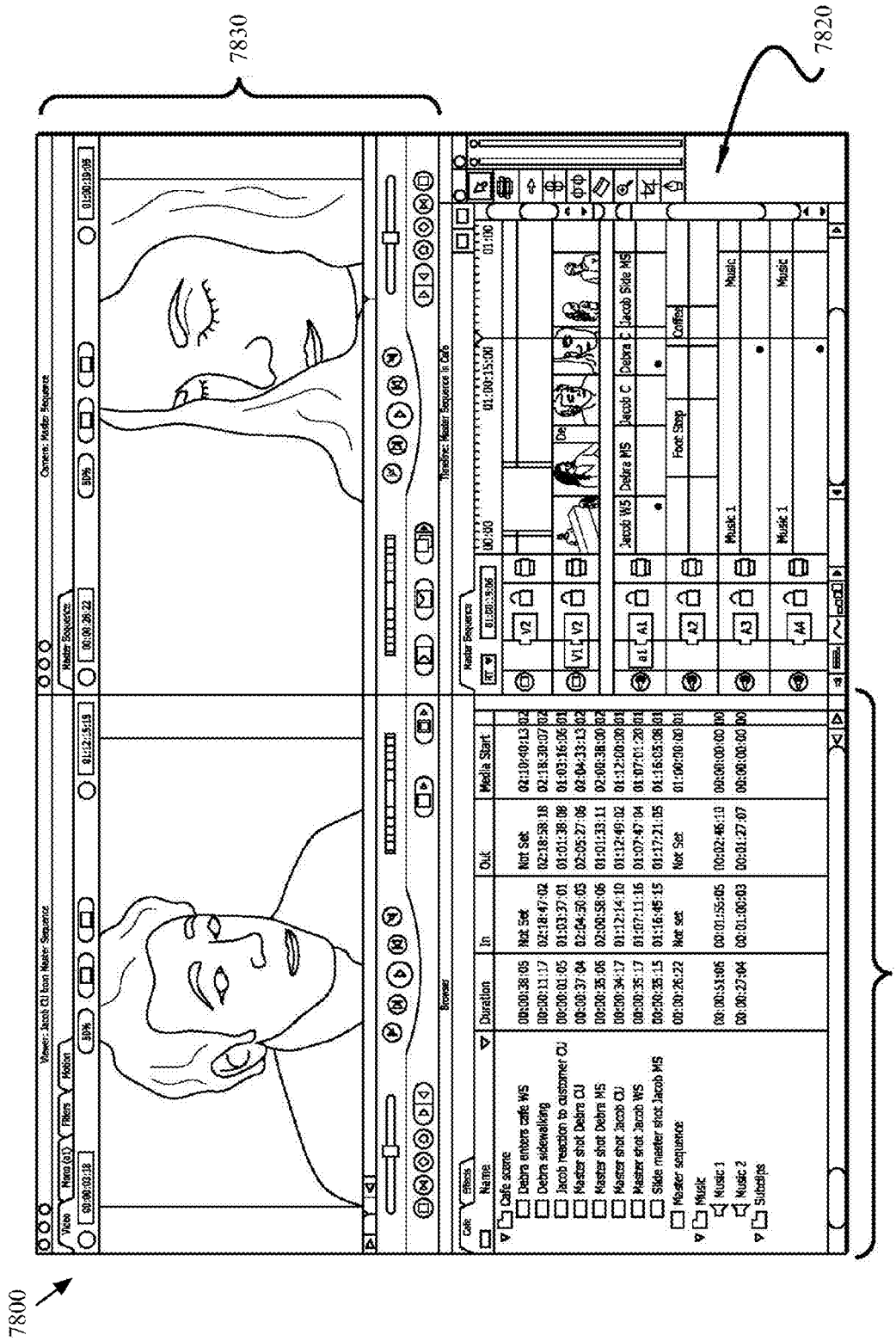
FIG. 78 illustrates an alternative GUI of the media-editing application of some embodiments.

A more detailed view of a media editing application that includes some of these additional features is illustrated in FIG. 78. Specifically, this figure shows a media editing application with these additional tools. FIG. 78 illustrates a list of video and/or audio clips 7810, video editing tools 7820, and video displays 7830. The list of clips 7810 includes video clips along with metadata (e.g., timecode information) about the video clips. In some embodiments, the list of video clips is the list of video clips in a particular sequence of video clips, and the metadata specifies in and out-points, durations, etc. for the video clips.

The video editing tools 7820 include tools that allow a user to graphically set in and out-points for video clips (in other words, where in the final product a specific clip or part of a clip will be shown). The video editing tools 7820 can be used to modify the temporal sequence of the video frame and to synchronize audio tracks with video tracks (e.g., in order to add music over a video clip). In some embodiments, video editing tools 7820 also give users the ability to edit in effects or perform other video editing functions. In some embodiments, the video editing tools include trim tools for performing edits such as slide edits, ripple edits, slip edits, roll edits, etc.

Video displays 7830 allow a user to watch multiple video clips at once, thereby enabling easier selection of in and out-points for the video clips. The screen shot 7800 illustrates a few of many different editing tools that a video editing application of some embodiments may have to edit digital video.

In some cases, some or all of the video clips that are displayed in the list of clips 7810, played in displays 7830, and edited by a user with video editing tools 7820, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

Returning to FIG. 77, process 7700 next stores (at 7770) the defined media-editing application on a non-transitory computer readable storage medium. As mentioned above, in some embodiments the computer readable storage medium is a distributable CD-ROM. In some embodiments, the medium is one or more of a solid-state device, a hard disk, a CD-ROM, or other non-volatile computer readable storage medium.

One of ordinary skill in the art will recognize that the various elements defined by process 7700 are not exhaustive of the modules, rules, processes, and UI items that could be defined and stored on a computer readable storage medium for a media editing application incorporating some embodiments of the invention. In addition, the process 7700 is a conceptual process, and the actual implementations may vary. For example, different embodiments may define the various elements in a different order, may define several elements in one operation, may decompose the definition of a single element into multiple operations, etc. In addition, the process 7700 may be implemented as several sub-processes or combined with other operations within a macro-process.

VII. Computer System

Many of the above-described features and applications are implemented as software processes that are specified as a set of instructions recorded on a non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 79:
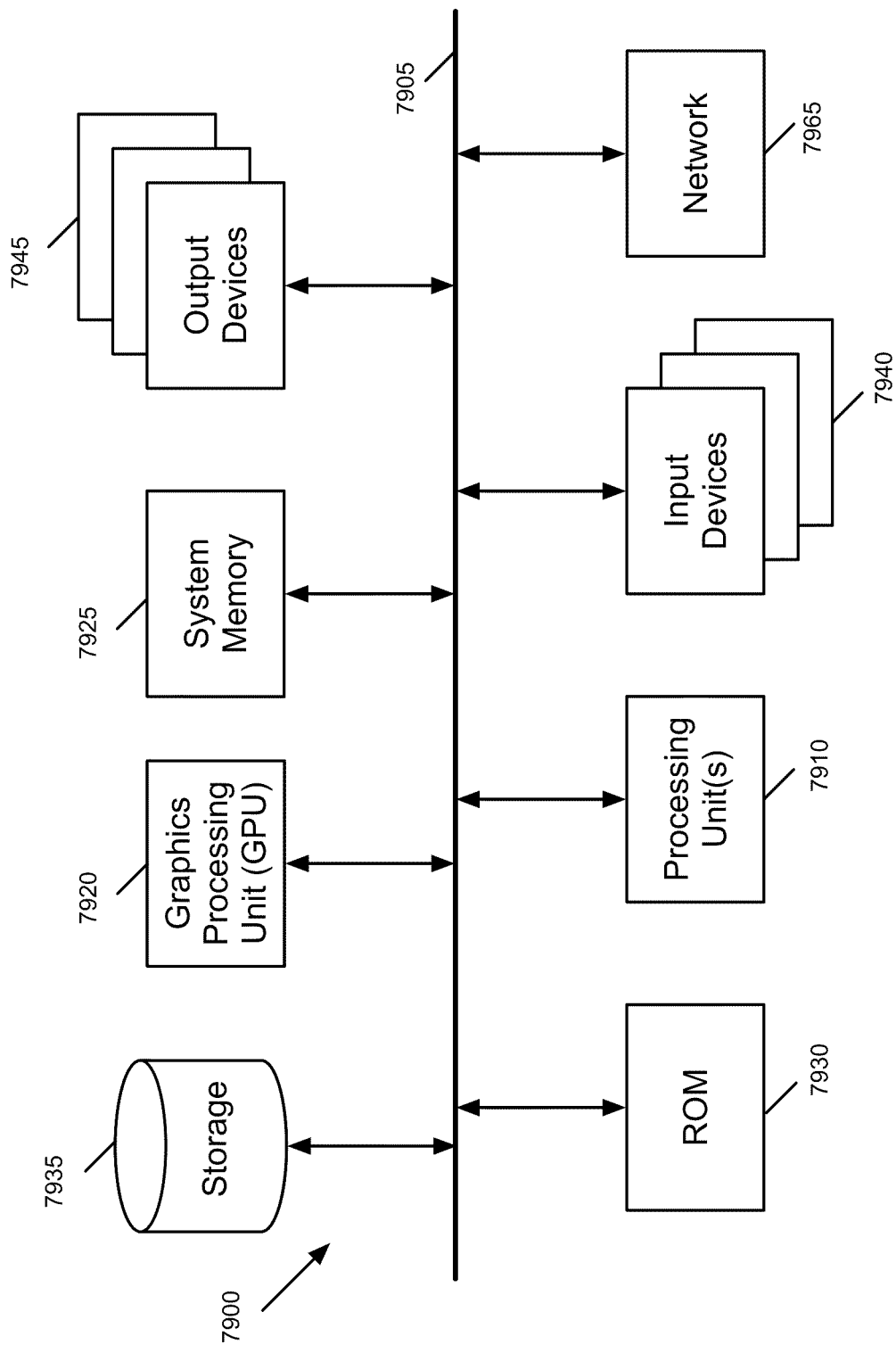
FIG. 79 illustrates a computer system with which some embodiments of the invention are implemented.

FIG. 79 conceptually illustrates a computer system with which some embodiments of the invention are implemented. Such a computer system includes various types of computer readable media and interfaces for various other types of computer readable media. One of ordinary skill in the art will also note that the digital video camera of some embodiments also includes various types of computer readable media. Computer system 7900 includes a bus 7905, processing unit(s) 7910, a graphics processing unit (GPU) 7920, a system memory 7925, a read-only memory 7930, a permanent storage device 7935, input devices 7940, and output devices 7945.

The bus 7905 collectively represents all system, peripheral, and chipset buses that communicatively connect the numerous internal devices of the computer system 7900. For instance, the bus 7905 communicatively connects the processing unit(s) 7910 with the read-only memory 7930, the GPU 7920, the system memory 7925, and the permanent storage device 7935.

From these various memory units, the processing unit(s) 7910 retrieve instructions to execute and data to process in order to execute the processes of the invention. The processing unit(s) may be a single processor or a multi-core processor in different embodiments. While the discussion in this section primarily refers to software executed by a microprocessor or multi-core processor, in some embodiments the processing unit(s) include a Field Programmable Gate Array (FPGA), an ASIC, or various other electronic components for executing instructions that are stored on the processor.

Some instructions are passed to and executed by the GPU 7920. The GPU 7920 can offload various computations or complement the image processing provided by the processing unit(s) 7910. In some embodiments, such functionality can be provided using CoreImage's kernel shading language.

The read-only-memory (ROM) 7930 stores static data and instructions that are needed by the processing unit(s) 7910 and other modules of the computer system. The permanent storage device 7935, on the other hand, is a read-and-write memory device. This device is a non-volatile memory unit that stores instructions and data even when the computer system 7900 is off. Some embodiments of the invention use a mass-storage device (such as a magnetic or optical disk and its corresponding disk drive) as the permanent storage device 7935.

Other embodiments use a removable storage device (such as a floppy disk, flash drive, or ZIP® disk, and its corresponding disk drive) as the permanent storage device. Like the permanent storage device 7935, the system memory 7925 is a read-and-write memory device. However, unlike storage device 7935, the system memory is a volatile read-and-write memory, such a random access memory. The system memory stores some of the instructions and data that the processor needs at runtime. In some embodiments, the invention's processes are stored in the system memory 7925, the permanent storage device 7935, and/or the read-only memory 7930. For example, the various memory units include instructions for processing multimedia items in accordance with some embodiments. From these various memory units, the processing unit(s) 7910 retrieve instructions to execute and data to process in order to execute the processes of some embodiments.

The bus 7905 also connects to the input and output devices 7940 and 7945. The input devices enable the user to communicate information and select commands to the computer system. The input devices 7940 include alphanumeric keyboards and pointing devices (also called "cursor control devices"). The output devices 7945 display images generated by the computer system. The output devices include printers and display devices, such as cathode ray tubes (CRT) or liquid crystal displays (LCD).

Finally, as shown in FIG. 79, bus 7905 also couples computer 7900 to a network 7965 through a network adapter (not shown). In this manner, the computer can be a part of a network of computers (such as a local area network ("LAN"), a wide area network ("WAN"), or an Intranet, or a network of networks, such as the internet. Any or all components of computer system 7900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Although the above description of the various embodiments of the invention show video editing, many examples of this free form space can be used for audio editing as well. While the invention has been described with reference to numerous specific details, one of ordinary skill in the art will recognize that the invention can be embodied in other specific forms without departing from the spirit of the invention. In addition, a number of the figures (including FIGS. 21, 30, 47, 50, 55, 58, and 67) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory computer-readable medium storing a media-editing application for creating media presentations, said application comprising a graphical user interface (GUI), said GUI comprising:
    a display area for (i) organizing media clips and (ii) compositing media clips by creating an association between a set of the media clips to form a concatenated sequence of media clips that are to be played back sequentially;
    a timeline for organizing and compositing a media presentation;
    a user interface tool for adding to the timeline the concatenated sequence of media clips from the display area; and
    a viewing area for playing back a media clip.

2. The non-transitory computer-readable medium of claim 1, wherein said GUI further comprises a media library area for selecting media clips to be added to the display area.

3. The non-transitory computer-readable medium of claim 1, wherein each media clip has a first graphical representation in the display area and has a second graphical representation, different than the first graphical representation, in the timeline.

4. The non-transitory computer-readable medium of claim 1,
    wherein each of a plurality of media clips is a video clip,
    wherein a video clip has a thumbnail representation in the display area,
    wherein the video clip's content is playable in the video clip's thumbnail representation.

5. The non-transitory computer-readable medium of claim 1, wherein the timeline is further for compositing sequences of media clips added from the display area to produce the media presentation.

6. The non-transitory computer readable medium of claim 4, wherein the viewing area is further for concurrently playing the content of the video clip as the content is also being played back in the video clip's thumbnail representation.

7. The non-transitory computer-readable medium of claim 1, wherein media clips in the display area are attachable to each other in order to form the concatenated sequence of media clips.

8. The non-transitory computer-readable medium of claim 7, wherein within the display area, each media clip has a graphical representation, a portion of which is defined to attract and attach to portions of the graphical representations of other media clips.

9. The non-transitory computer-readable medium of claim 1,
    wherein within the display area, each media clip has a graphical representation,
    wherein the GUI further comprises a set of tools for marking with a visual marker a portion of a first media clip while the first media clip is being played back,
    wherein the marked portion of the first media clip represents a portion of media content associated with the first media clip.

10. The non-transitory computer-readable medium of claim 9, wherein the GUI specifies the visual marker as a selectable user interface (UI) item that allows the marked portion of the first media clip to be extracted from the first media clip to create a second media clip, wherein the second media clip represents media content that is the portion of the media content associated with the first media clip.

11. The non-transitory computer-readable medium of claim 1, wherein said display area does not include any smaller display areas within it.

12. A method of defining a media-editing application for creating media presentations, said application comprising a graphical user interface (GUI), the method comprising:
    in the GUI,
        defining a display area for (i) organizing media clips and (ii) compositing media clips by creating an association between a set of the media clips to form a concatenated sequence of media clips that are to be played back sequentially;
        defining a timeline for (i) organizing and compositing a media presentation and (ii) receiving the concatenated sequence of media clips from the display area for placement within the media presentation; and
        defining a viewing area for playing back a media clip.

13. The method of claim 12, wherein the display area is a first display area, the method further comprising:
    in the GUI, defining a second display area for organizing and compositing media clips, and
    defining a set of operations for moving media clips between the first display area, the second display area, and the timeline.

14. The method of claim 12,
wherein each of a plurality of media clips represents a piece of video content,
wherein each video content piece includes a plurality of frames,
wherein each media clip includes a graphical display that displays a thumbnail image of one of the frames of the media clip's associated video content,
the method further comprising defining a set of tools for allowing a user to change the graphical display of a media clip from a thumbnail image of one frame of the media clip's associated video content to another thumbnail image of another frame of the media clip's associated video content.

15. The method of claim 12, wherein each media clip has a first graphical representation in the display area and has a second graphical representation, different than the first graphical representation, in the timeline.

16. The method of claim 12 further comprising defining a graphical representation for each media clip in the display area to include a set of locations that attract and attach to a set of locations of the graphical representations of other media clips.

17. The method of claim 12, wherein within the display area, each media clip has a graphical representation, wherein the method further comprises:
defining a set of tools for marking with a selectable visual marker a portion of a first media clip while the first media clip is being played back, wherein the marked portion of the first media clip represents a portion of media content associated with the first media clip;
defining a set of operations for allowing the marked portion of the first media clip to be extracted from the first media clip to create a second media clip, wherein the second media clip has media content that is the portion of the media content associated with the first media clip.

18. A non-transitory computer-readable medium storing a media-editing application for creating media presentations, said application comprising sets of instructions for:
displaying a first display area for compositing sets of media clips to form a concatenated sequence of media clips, the media clips of each sequence of media clips to be played back sequentially; and
displaying a second display area for organizing and compositing media clips for placement within a media presentation;
providing a user interface tool for adding to the second display area the concatenated sequence of media clips from the first display area; and
displaying a viewing area for playing back the sequence of media clips.

19. The non-transitory computer-readable medium of claim 18, wherein the application further comprises a set of instructions for displaying a media library area for selecting media clips to be added to the first display area.

20. The non-transitory computer-readable medium of claim 18, wherein each media clip has a first graphical representation in the first display area and has a second graphical representation, different than the first graphical representation, in the second display area.

21. The non-transitory computer-readable medium of claim 18, wherein the application further comprises a set of instructions for displaying each media clip in the first display area as a graphical representation that has a set of locations that attract and attach to a set of locations of the graphical representations of other media clips.

22. The non-transitory computer-readable medium of claim 18, wherein within the first display area, each media clip has a graphical representation, wherein the application further comprises sets of instructions for:
while a first media clip is being played back, receiving instructions to mark with a selectable visual marker a portion of the first media clip, wherein the marked portion of the first media clip represents a portion of media content associated with the first media clip;
receiving selection and movement of the visual marker of the first media clip;
in response to the selection and movement of the visual marker, extracting the marked portion from the first media clip to create a second media clip, wherein the second media clip represents media content that is the portion of the media content associated with the first media clip.

23. The non-transitory computer-readable medium of claim 18,
wherein the first display area allows more than one set of media clips to be concatenated to form more than one sequence of the media clips that are concurrently displayed in the first display area;
wherein the media clips within each sequence have a temporal relationship to one another, but two different sequences that do not abut in the first display area do not have the temporal relationship with one another.

\* \* \* \* \*